United States Patent [19]
Donaldson et al.

[11] Patent Number: 6,044,393
[45] Date of Patent: Mar. 28, 2000

[54] ELECTRONIC CONTROL SYSTEM AND METHOD FOR EXTERNALLY AND DIRECTLY CONTROLLING PROCESSES IN A COMPUTER SYSTEM

[75] Inventors: Robert E. Donaldson, Edina; Jeffrey J. Jensen, Eagan; Steven J. McDowall, Coon Rapids, all of Minn.

[73] Assignee: Global Maintech, Inc., Eden Prairie, Minn.

[21] Appl. No.: 08/757,045

[22] Filed: Nov. 26, 1996

[51] Int. Cl.[7] .................................................... G06F 9/00
[52] U.S. Cl. ............................................................ 709/100
[58] Field of Search ........................ 395/200.51, 200.52; 345/332, 333; 702/18; 709/100, 102, 104, 106

[56] References Cited

U.S. PATENT DOCUMENTS

| | | |
|---|---|---|
| 4,800,510 | 1/1989 | Vinberg et al. . |
| 4,852,019 | 7/1989 | Vinberg et al. . |
| 4,918,602 | 4/1990 | Bone et al. . |
| 4,974,160 | 11/1990 | Bone et al. . |
| 5,095,444 | 3/1992 | Motles . |
| 5,293,608 | 3/1994 | Johnson et al. . |
| 5,325,361 | 6/1994 | Lederer et al. . |
| 5,437,046 | 7/1995 | Bright et al. . |
| 5,742,778 | 4/1998 | Hao et al. .............................. 707/200 |
| 5,781,909 | 7/1998 | Logon et al. ........................... 345/772 |

OTHER PUBLICATIONS

Boole & Babbage, Inc., "Central Point–of–Control for Pro-active Management," Feb. 23, 1996, pp. 1–2.
Boole & Babbage, Inc., "COMMAND/Post, Product Info," Feb. 23, 1996, pp. 1–3.
Boole & Babbage, Inc., "Welcome to Boole & Babbage!," Copyright 1995, pp. 1–2.
Boole & Babbage, Inc., "COMMAND/Post 3.1, Product Announcement," Copyright 1994.
Boole & Babbage, Inc., "Intercommunications 3.1, Technology Announcement," undated.
Boole & Babbage, Inc., "COMMAND/Post, Family Brochure," undated.
Boole & Babbage, Inc., "COMMAND/Post™, Product Overview," undated.
Boole & Babbage, Inc., "A White Paper on AutoCOMMAND and Enterprise Automation," Copyright 1992.
Candle Corporation, "About Candle," Feb. 23, 1996, p. 1.
Candle Corporation, "MVS/Mainframe Solutions," Feb. 23, 1996, p. 1.
Candle Corporation,"Automation/Console Management," Feb. 23, 1996, p. 1.
Candle Corporation, "Candle Command Center," Feb. 23, 1996, pp. 1–2.
Computer Associates International, Inc., "Welcome to Computer Associates," Copyright 1996, pp. 1–2.
Computer Associates International, Inc., "CA–Unicenter®/The Next Generation™," Feb. 23, 1996, pp. 1–2.

(List continued on next page.)

*Primary Examiner*—Majid A. Banankhah
*Attorney, Agent, or Firm*—Merchant & Gould P.C.

[57] ABSTRACT

An electronic control method for externally controlling processes in the computer system is provided in which electronic data is presented as graphical information to a user on a display device. In addition, electronic data input by the user is received. Processing rules are obtained from user input provided through the input device in response to processing rules displayed to the user on the display device. Operations of the computer system are controlled based on the processing rules with the electronic data processor such that the computer system can be automatically externally and directly controlled with the processing rules by only utilizing preexisting computer system signals received from the computer system and control signals sent to the computer system. In addition, a control system for implementing the external control method is provided.

6 Claims, 106 Drawing Sheets

OTHER PUBLICATIONS

Computer Associates International, Inc., "CA–Unicenter, Technology Is My Passion," Feb. 23, 1996, pp. 1–2.

Computer Associates International, Inc., "Prevail/XP–Automation Point," Feb. 23, 1996, pp. 1–2.

Computer Associates International, Inc., "Prevail/XP–Automation Point Technical Features," Feb. 23, 1996, p. 1.

Computer Associates International, Inc., "Prevail/XP–Automation Point Requirements," Feb. 23, 1996, p. 1.

Computer Associates International, Inc., "Prevail/XP–Multi–image ManagerÖ," Feb. 23, 1996, pp. 1–4.

Computer Associates International, Inc., "CA–Unicenter®, Enterprise Mangement Software," Copyright 1995.

IBM®, "Not a bad day's work for someone who never left their desk", Copyright 1995, p. 1.

IBM®, "Mastering the fine art of systems management . . . ," Copyright 1995, p. 1.

IBM®, "Systems Management," Copyright 1995, pp. 1–2.

IBM®, "Systems Management/SystemView Technologies," Copyright 1995, pp. 1–2.

IBM®, "SystemView Agents," Copyright 1995, pp. 1–2.

IBM®, "SystemView Agent Technology," Copyright 1995, pp. 1–6.

IBM®, "DMI Service Layer & Software Developers Kit," Copyright 1995, pp. 1–4.

IBM®, "Key systems vendors to deploy common Agent technology," Copyright 1995, pp. 1–5.

The Reference Press, Inc., Hoover's Company Profile Database, "Boole & Babbage Inc.," Copyright 1996, pp. 1–3.

The Reference Press, Inc., Hoover's Company Profile Database, "Computer Associates International, Inc.," Copyright 1996, pp. 1–5.

The Reference Press, Inc., Hoover's Company Profile Database, "Legent Corporation," Copyright 1996, pp. 1–3.

FIG. 6

Filtered Message Display

```
Select
950228 1549 PROD   TSU 1030 CCS03 ENDED
950228 1550 PROD   TSU 1031 CCS04 ENDED
950228 1550 PROD   TSU 1032 CCS05 ENDED
950228 1550 TEST1  STC  881 IST259I INOP RECEIVED FOR PU002 CODE = 05
950228 1550 TEST1  STC  881 IST259I INOP RECEIVED FOR PU001 CODE = 05
950228 1551 PROD   TSU 1000 CCS05 STARTED
950228 1552 PROD   TSU 1031 CCS04 ENDED
950228 1552 PROD   TSU 1032 CCS05 ENDED
950228 1556 PROD   TSU  998 CCS03 STARTED
950228 1557 PROD   TSU  995 CCS04 ENDED
950228 1557 PROD   TSU  998 CCS03 ENDED
950228 1601 PROD   TSU 1001 CCS03 STARTED
950228 1601 PROD   TSU 1000 CCS05 ENDED
950228 1602 PROD   TSU 1002 CCS05 ENDED
950228 1602 PROD   TSU 1001 CCS03 ENDED
950228 1609 PROD   TSU 1022 CCS05 STARTED
950228 1610 PROD   TSU 1021 CCS04 ENDED
950228 1610 PROD   TSU 1024 CCS04 STARTED
950228 1610 PROD   TSU 1022 CCS05 ENDED
```

FIG. 15

| File | Edit | | | | | | |
|---|---|---|---|---|---|---|---|
| 1995 ** 3 ** | | | | | | | |
| Daily Schedule | | | | | | | |
| SUN | MON | TUE | WED | THU | FRI | SAT | |
| | | | 1 | 2 | 3 | 4 | |
| 5 | 6 | 7 | 8 | 9 | 10 | 11 | |
| 12 | 13 | 14 | 15 | 16 | 17 | 18 | |
| 19 | 20 | 21 | 22 | 23 | 24 | 25 | |
| 26 | 27 | 28 | 29 | 30 | 31 | | |

Edit Schedule

Prev    Next

| Ch  | Stat | Name            |
|-----|------|-----------------|
| 001 | Off  | Package No.1 Alarm |
| 002 | Off  | Package No.2 Alarm |
| 003 | Off  | N/A |
| 004 | Off  | N/A |
| 005 | Off  | N/A |
| 006 | Off  | N/A |
| 007 | Off  | N/A |
| 008 | Off  | N/A |

Close

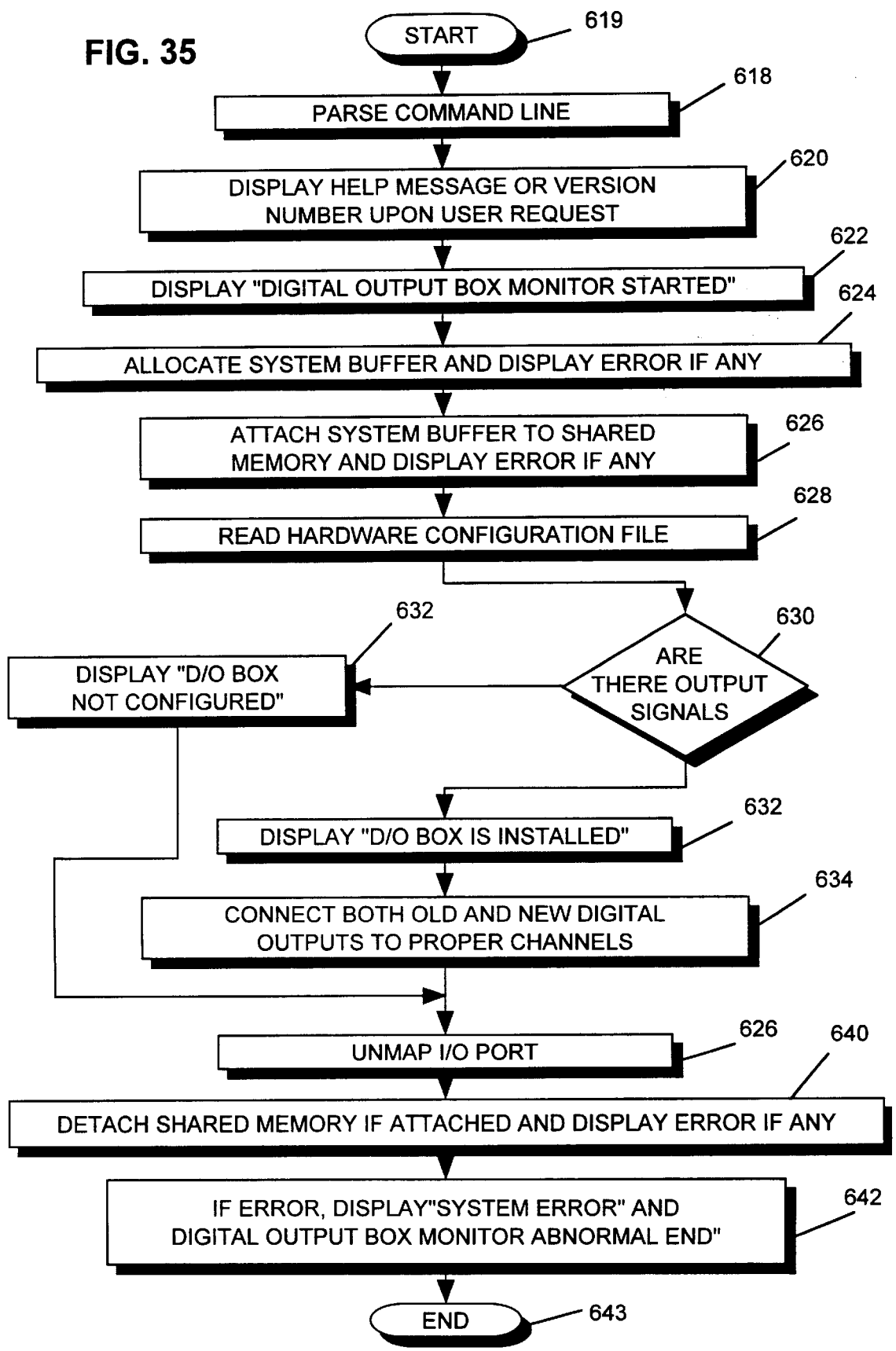

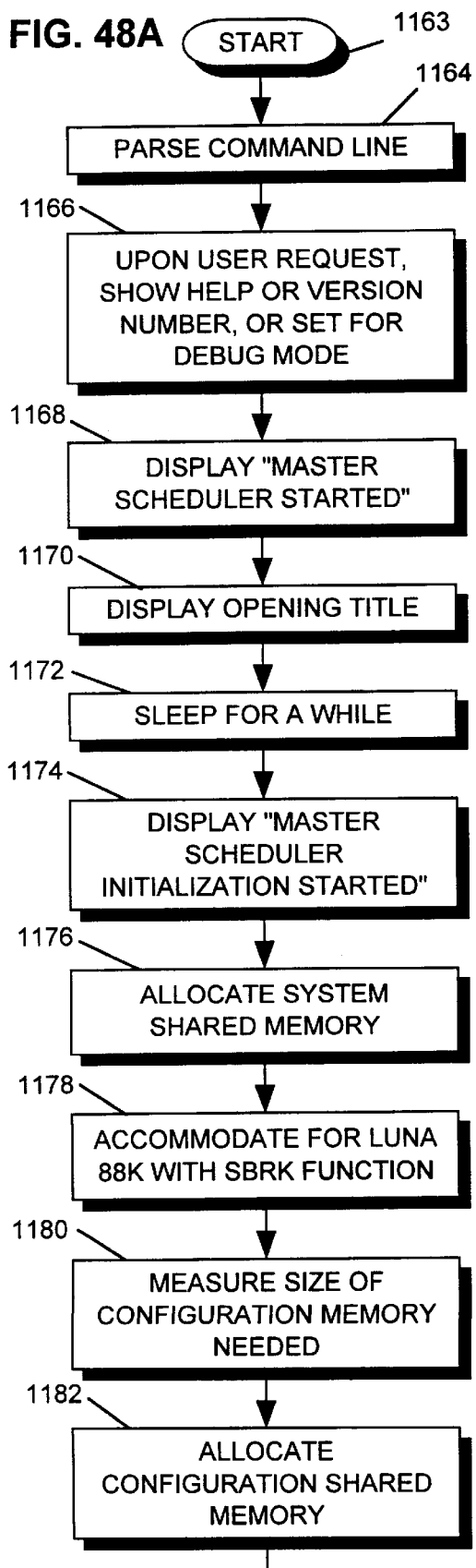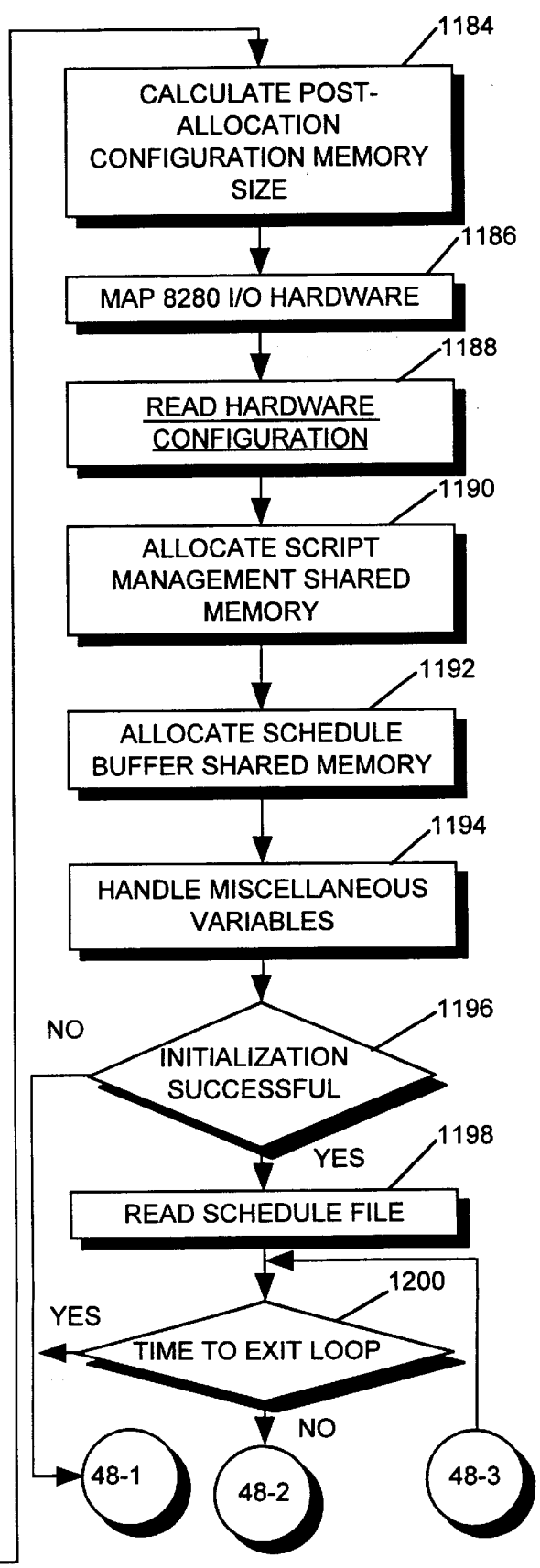
FIG. 48A

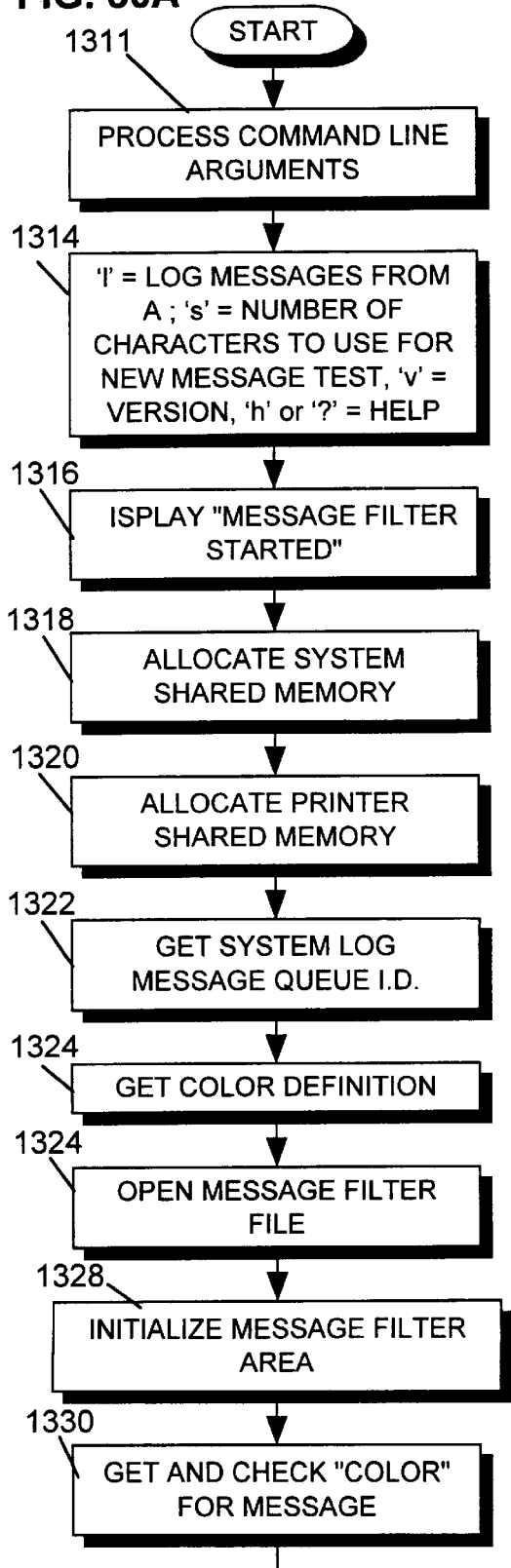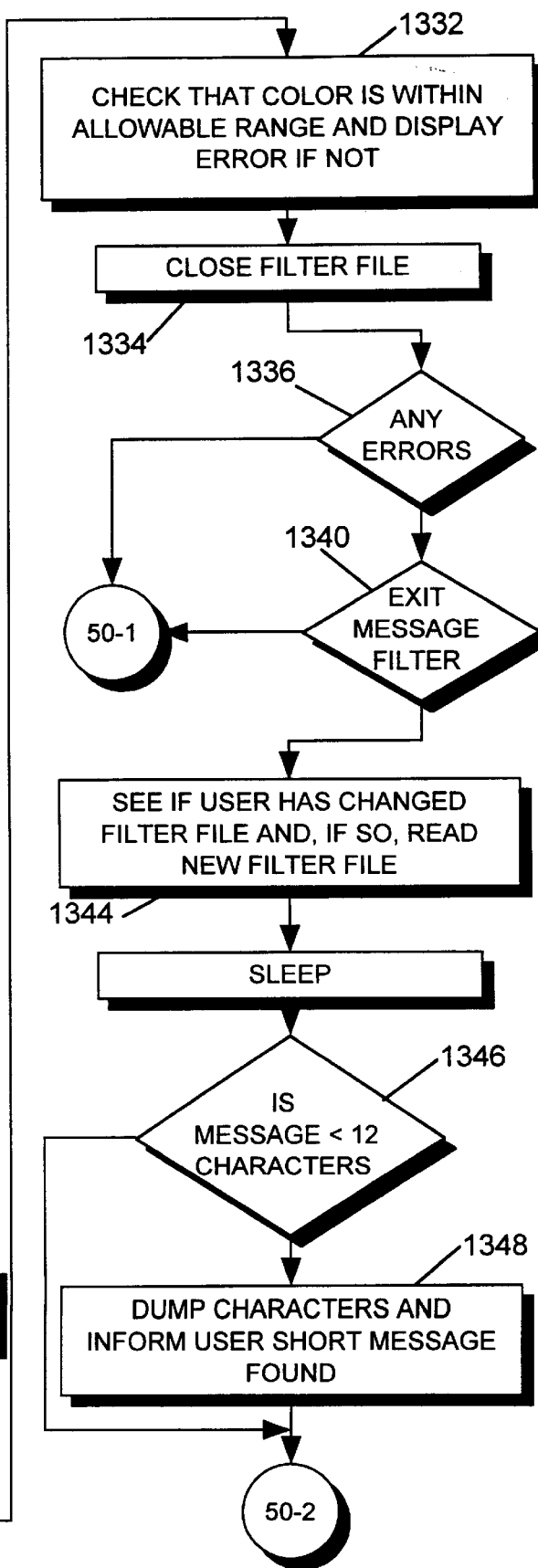
FIG. 50A

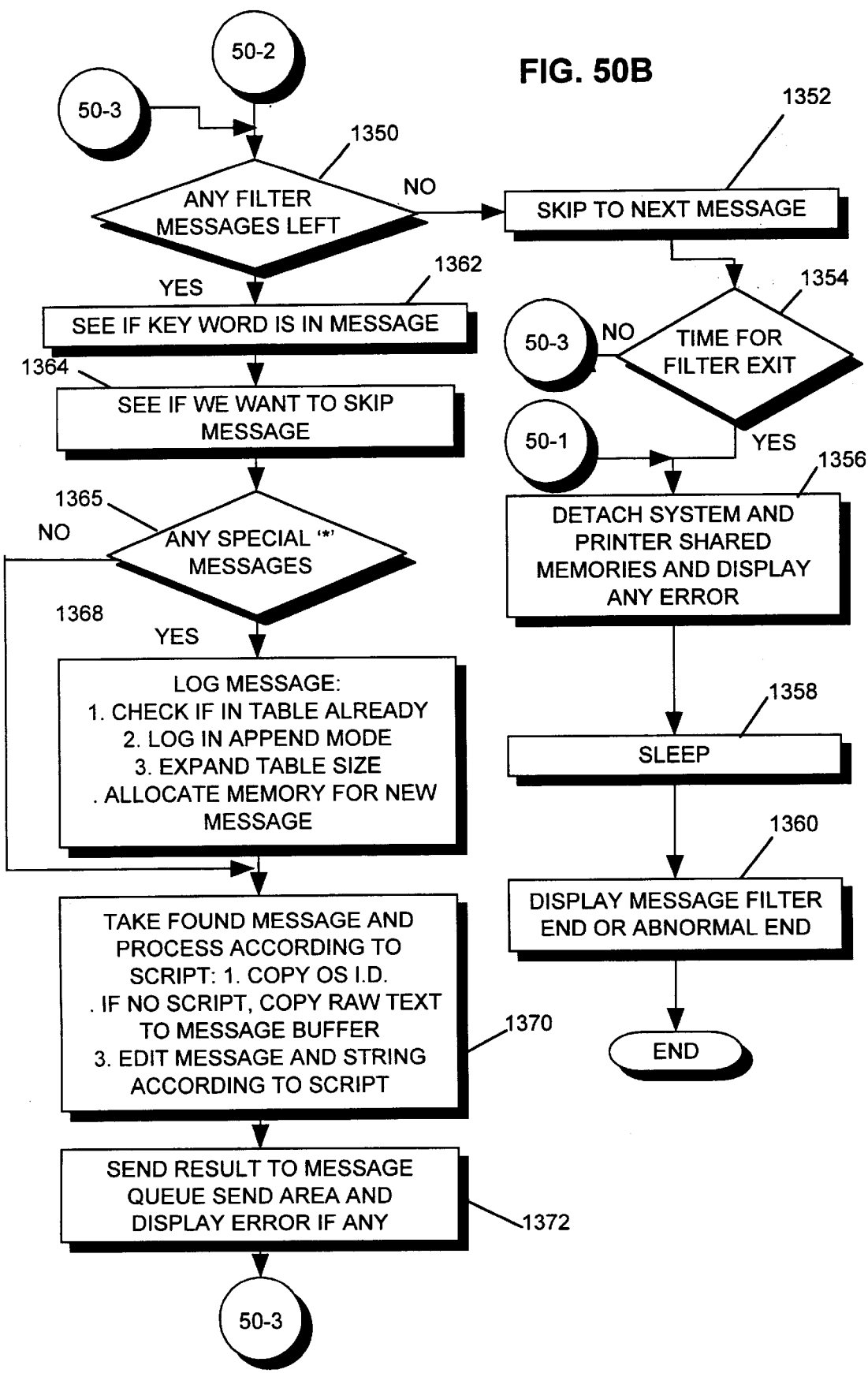

6,044,393

ELECTRONIC CONTROL SYSTEM AND METHOD FOR EXTERNALLY AND DIRECTLY CONTROLLING PROCESSES IN A COMPUTER SYSTEM

FIELD OF THE INVENTION

The present invention relates generally to monitoring and control systems. More particularly, the present invention relates to an electronic monitoring and control system for externally monitoring processes in one or more computer systems.

BACKGROUND OF THE INVENTION

Over the past several years, the number of installed computer systems has increased. In addition, these computer systems are getting more and more complicated with many subsystems. Also, computer systems are being integrated with others across a room, in another building, and perhaps in another part of the country. This proliferation of computer systems has resulted in an increase in productivity of certain types of employees, but at the same time it has created a need for many new employees. In particular, new computer technicians have been hired to monitor and repair the new computer systems. To help aid in the monitoring process many of these computer systems include an operating console which is displayed on a video display. The operating console shows the status of various system components like disk drives, chillers, data communication lines, etc.

A need exists for a way to consolidate all of these monitoring activities into a single site. For example, eight operating consoles could be consolidated into one monitoring device which would reduce the need for employees who perform monitoring operations by 8 to 1.

In addition, a need exists for automating some of the routine control situations like restarting a computer system, calling a repair or service representative, and rerouting data communication links. Such automation has been done in the past by adding additional hardware and software agents or processes which run on the computer system being monitored. The disadvantage of such approaches are that they are inflexible to changes made to the underlying computer system. For example, if a controller board is added to a mainframe computer and then that system is updated to a new data bus type, the old controller board is no longer useful. Similarly, when software agents are run on the computer system to be monitored, they must be tailored to the operating system being run on the computer system and must be tested to determine whether they interfere with other software or processes which are to be run on the computer system.

A better solution to this monitoring and control problem would be to find a way to perform these operations without adding hardware or software to the computer system to be monitored. The present invention provides a solution to this and other problems, and offers other advantages over the prior art.

SUMMARY OF THE INVENTION

An electronic control method for externally controlling processes in the computer system is provided in which electronic data is presented as graphical information to a user on a display device. In addition, electronic data input by the user is received. Processing rules are obtained from user input provided through the input device in response to processing rules displayed to the user on the display device. Operations of the computer system are controlled based on the processing rules with the electronic data processor such that the computer system can be automatically externally and directly controlled with the processing rules by only utilizing preexisting computer system signals received from the computer system and control signals sent to the computer system. In addition, a control system for implementing the external control method is provided.

These and various other features as well as advantages which characterize the present invention will be apparent upon reading of the following detailed description and review of the associated drawings.

BRIEF DESCRIPTION OF THE DRAWINGS

FIG. 6 is a screen display of the Filtered Message Display.

FIG. 15 is a screen display of the Edit Schedule window.

DETAILED DESCRIPTION

Figure 1:
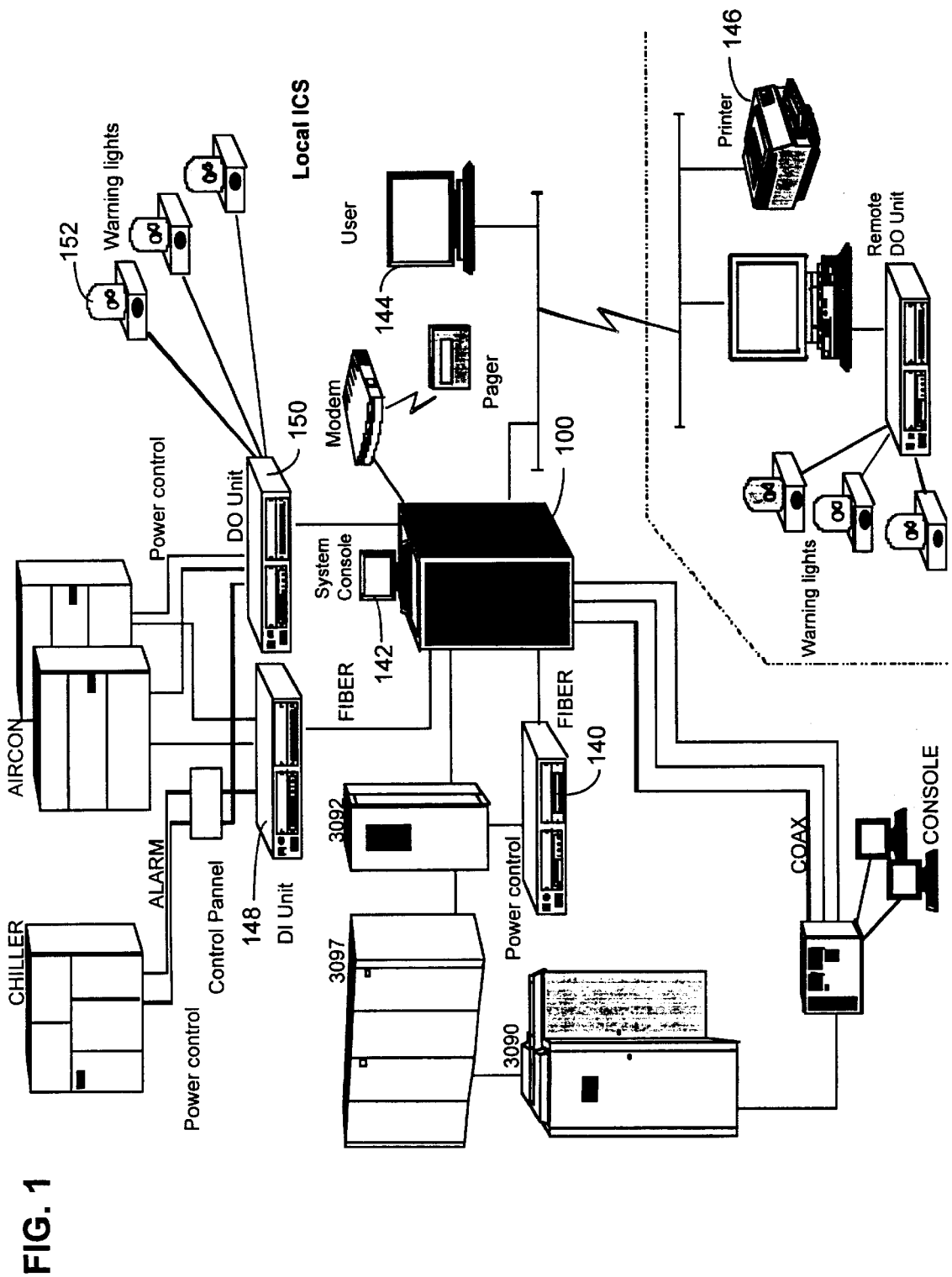
FIG. 1 is a block diagram of a monitoring and control system in accordance with a preferred embodiment of the present invention.

A preferred embodiment of the present invention is an Intelligent Console System (ICS) 100 which is shown in FIG. 1. The ICS 100 is designed for the primary purpose of automating operations—monitoring, operating, and alerting of all processes performed or observed. This includes mainframe startup (power on, IML, IPL, etc.), mainframe shutdown (OS shutdown, CPU power off, etc.), operational monitoring and controlling of the complex (scanning and alerting of messages and signals, responding to operational processing, initiating recovery responses, etc.), and operational consolidation (multiple data centers or servers monitored and controlled from a single location).

The ICS 100 is entirely outboard—there are no invasive "hooks" to any of the host environments. Not only does this approach make installation simple and fast, but expensive host CPU time is not used by the ICS 100 monitoring and automation routines.

FIG. 1 illustrates an example of a preferred embodiment ICS 100 installation. It will be appreciated by those skilled in the art that the interface types and quantity of ICS components depend on each installation and as such the particular arrangement described below is for illustrative purposes only.

The ICS rack 100 houses the main processing components—central processing unit (CPU) case, Universal Service Bus unit (USB), and power distribution unit (PDU). The CPU case includes a hot-swappable redundant power supply, hard disk, tape drive, UNIX operating system, and the ICS software. Each USB unit has a 15 slot capacity for interface cards. One slot is used for the interface to the ICS CPU and the other 14 slots house the connectivity interface cards.

The Power Distribution Unit (PDU) 140 protects the ICS equipment 100 with its built in circuit breakers. Also, it provides a convenient centralized power source for the ICS components from the customer site (i.e.,. a single 30 A 110V power feed).

The ICS system console 142 preferably is a UNIX VT100 terminal interface and keyboard. It is used for starting up and shutting down the ICS 100 (and UNIX) and other administrative activities. It connects to the CPU case via a RS232C interface.

The ICS user console 144 is the Xterminal: a large monitor (utilizing a graphical user interface), 3270 keyboard, and mouse. It is the user interface to the ICS 100. It connects to the CPU case via a small Ethernet (IEEE802.3) TCP/IP network.

The ICS printer 146 is used for printing ICS logs and scripts. It connects to the CPU case via a small Ethernet (IEEE802.3) TCP/IP network.

The ICS digital input (DI) unit 148 is the interface for monitoring warning signals from air conditioners, chillers, water leak sensors, and other equipment with digital interfaces. Each DI unit 148 has an 8 device capacity. A maximum of 16 DI units can be connected to one ICS 100.

It connects to the USB via fiber optic cable, which provides for high interference tolerance and approximately a one mile range. The physical placement of DI units is flexible—normally placed under the raised floor near the equipment connected to it.

The ICS digital output (DO) unit 150 is the interface for controlling air conditioners, chillers, warning lights, and other equipment with digital interfaces. Each DO unit 150 has an 8 device capacity. A maximum of 16 DO units can be connected to one ICS 100.

It connects to the USB via fiber optic cable, which provides for high interference tolerance and approximately a one mile range. The physical placement of DO units is flexible—normally placed under the raised floor near the equipment connected to it.

The ICS power unit 140 is the interface for controlling the power source of mainframe CPUs. Each unit controls one CPU. A maximum of 4 power units can be connected to one ICS 100.

It connects to the USB via fiber optic cable, which provides for high interference tolerance and approximately a one mile range. The physical placement of power units is flexible—normally placed under the raised floor near the CPU or CPU control device.

The ICS sensor unit (not shown) has temperature and humidity sensors for monitoring the temperature and humidity at the location the sensor unit is placed. A maximum of 4 sensor units can be connected to one ICS 100. It connects to the USB via fiber optic cable, which provides for high interference tolerance and approximately a one mile range. The physical placement of sensor units is flexible—normally placed near a CPU.

The ICS warning light 152 is for alerting support staff that the ICS 100 needs attention. The required attention is generally for a detected problem situation. In operation, the warning light 152 flashes and produces an alarm sound. This type of alerting allows the ICS 100 to operate unattended—no baby-sitting required—and support staff is alerted when attention is needed. It connects to a DO unit 150. The physical placement of the warning light 152 should be near support staff.

Figure 2:
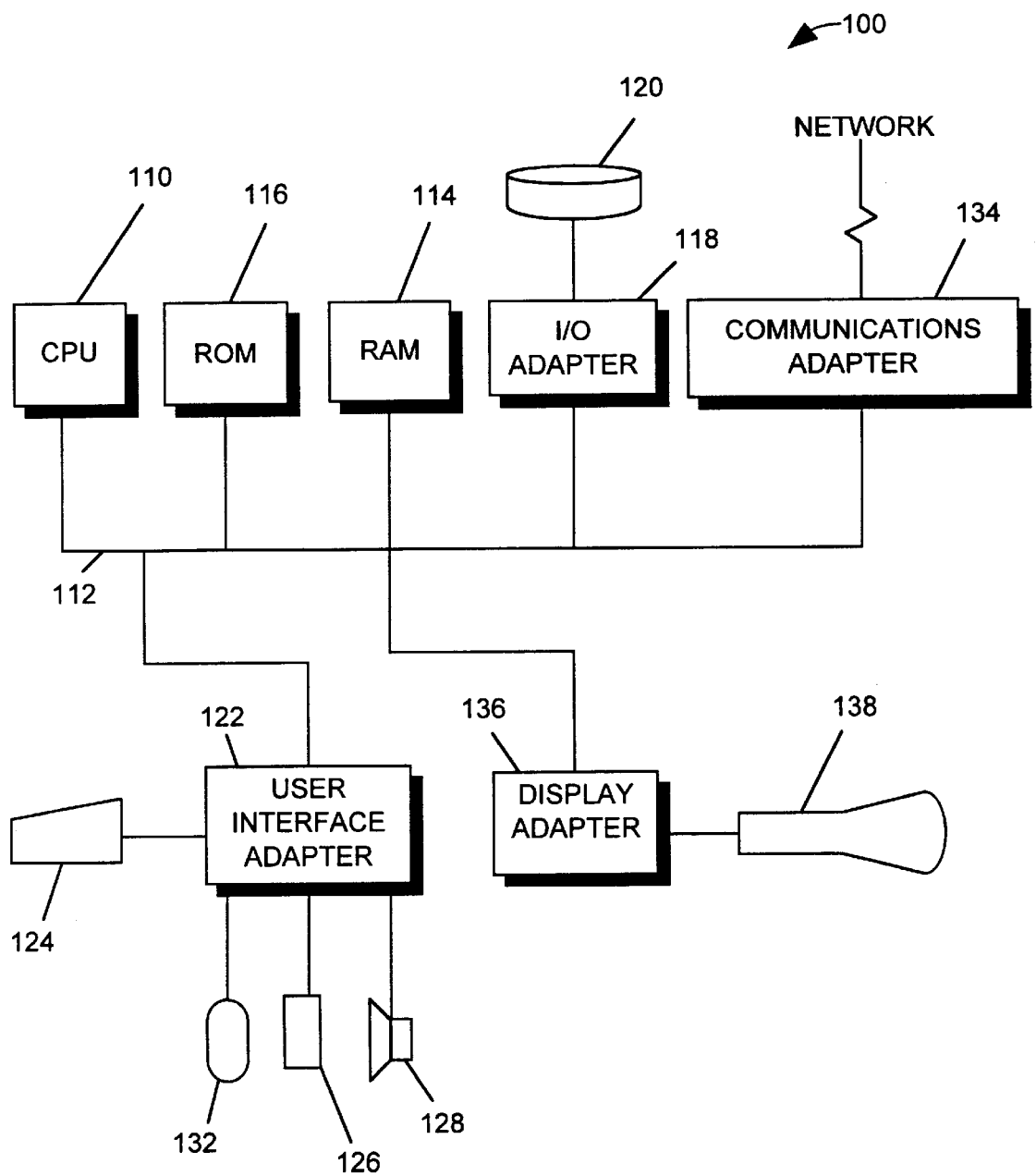
FIG. 2 is a block diagram of a computer system which could execute processes and functions for the preferred embodiment monitoring and control system shown in FIG. 1.

Referring now to FIG. 2, a system 100 is shown capable of performing the automated control operation of the preferred embodiment intelligent console system (ICS) 100 shown in FIG. 1. The preferred embodiment of the present invention is preferably practiced in the context of an operating system resident on a workstation or personal computer such as the Sun Microsystems® Sparc Station®, IBM® PS/2® or Apple® Macintosh® computer. A representative hardware environment is depicted in FIG. 2, which illustrates a typical hardware configuration of a workstation in accordance with the preferred embodiment having a central processing unit 110, such as a microprocessor, and a number of other units interconnected via a system bus 112. The workstation shown in FIG. 2 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch pad or touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as UNIX® or the Microsoft® Windows NT operating system.

To implement a high-level user interface, the Intelligent Console System, referred to as "ICS" 100 throughout this description, a UNIX window system (X-Windows with a Motif interface) is used. A pointing device called a "mouse" is used to manipulate objects in windows on the screen and perform basic operations. The ICS system uses a separate window for each function. Almost all operations can be controlled using the mouse.

Each window shown on the display can be divided into. a client region, used for entering and displaying data through graphics or with key input, and a window function region on the periphery, used to control the window.

How to start the ICS will now be discussed.

First, switch on power to the ICS. Boot the OSF/1 system by typing the word "boot" on the ICS system console and pressing the Enter key. If the startup procedure is successful, a login prompt will appear on the ICS system console. Switch on power to the ICS user console. The ICS Start Session screen will be displayed on the user console. Move the mouse cursor over the login text-entry box and click on it. Type in a login name and press the Enter key. Type in the password and press the Enter key or click on the OK button. If the login name and password are valid, the ICS system should start.

Figure 3:
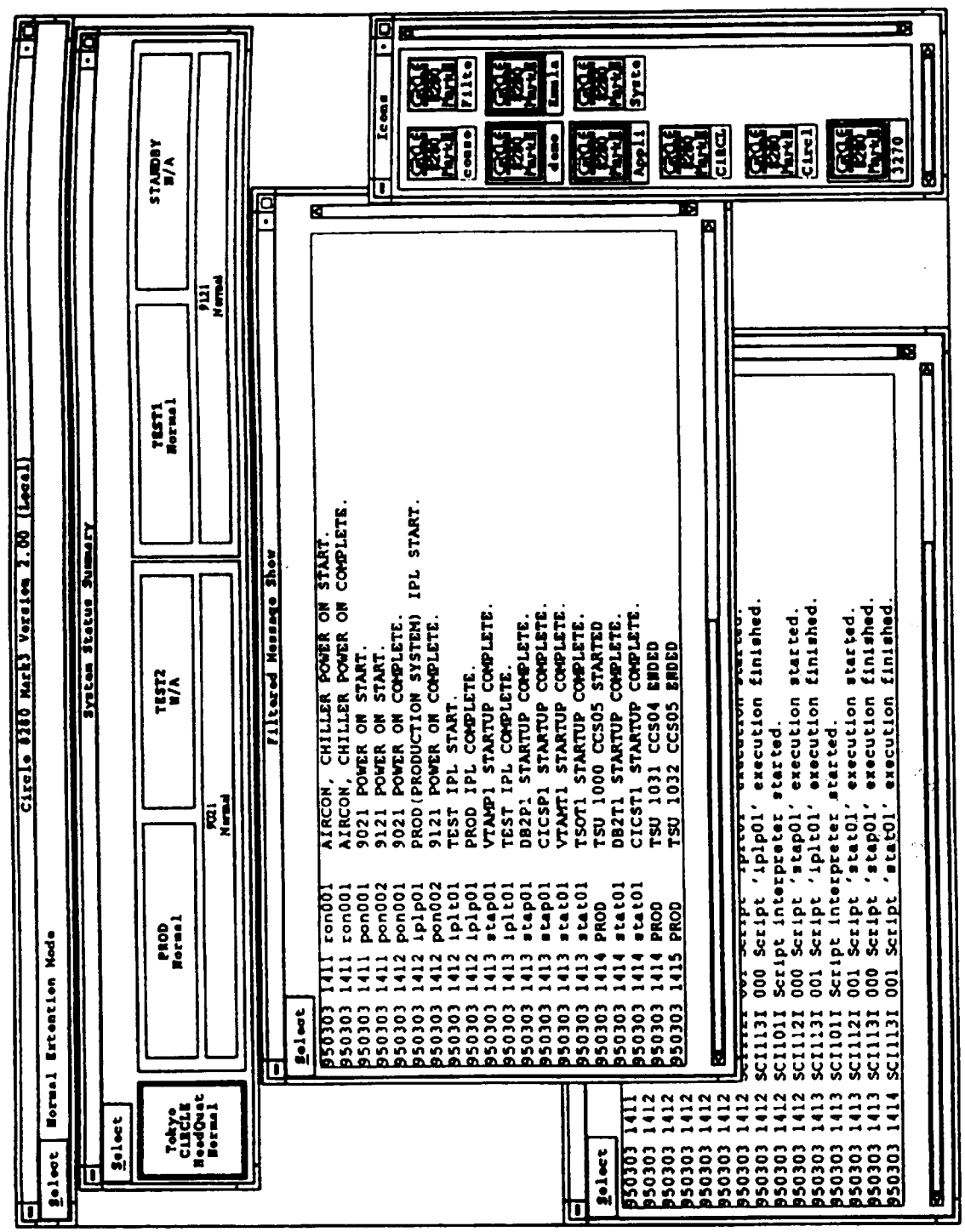
FIG. 3 is a screen display of the ICS system screen.

Once the ICS session is running, an ICS system screen will be displayed on the ICS user console, as shown in FIG. 3.

This screen displays the status of the data center environment, CPU, and the operating system. This screen also displays messages coming from the operating system.

The ICS session allows the user to open several windows at the same time. This provides quick access to informational and control screens for all the systems connected to the ICS. Note that while several windows can be displayed at the same time, commands can be entered only in the "active" window.

If an operator without appropriate authority tries to open a protected window, a message will be displayed stating that the operator does not have authority to operate the window.

The basic windows available and their operations will now be discussed. The ICS Main (or system root) Window allows the screen operation mode to be changed and the ICS system to be shut down.

Figure 4:
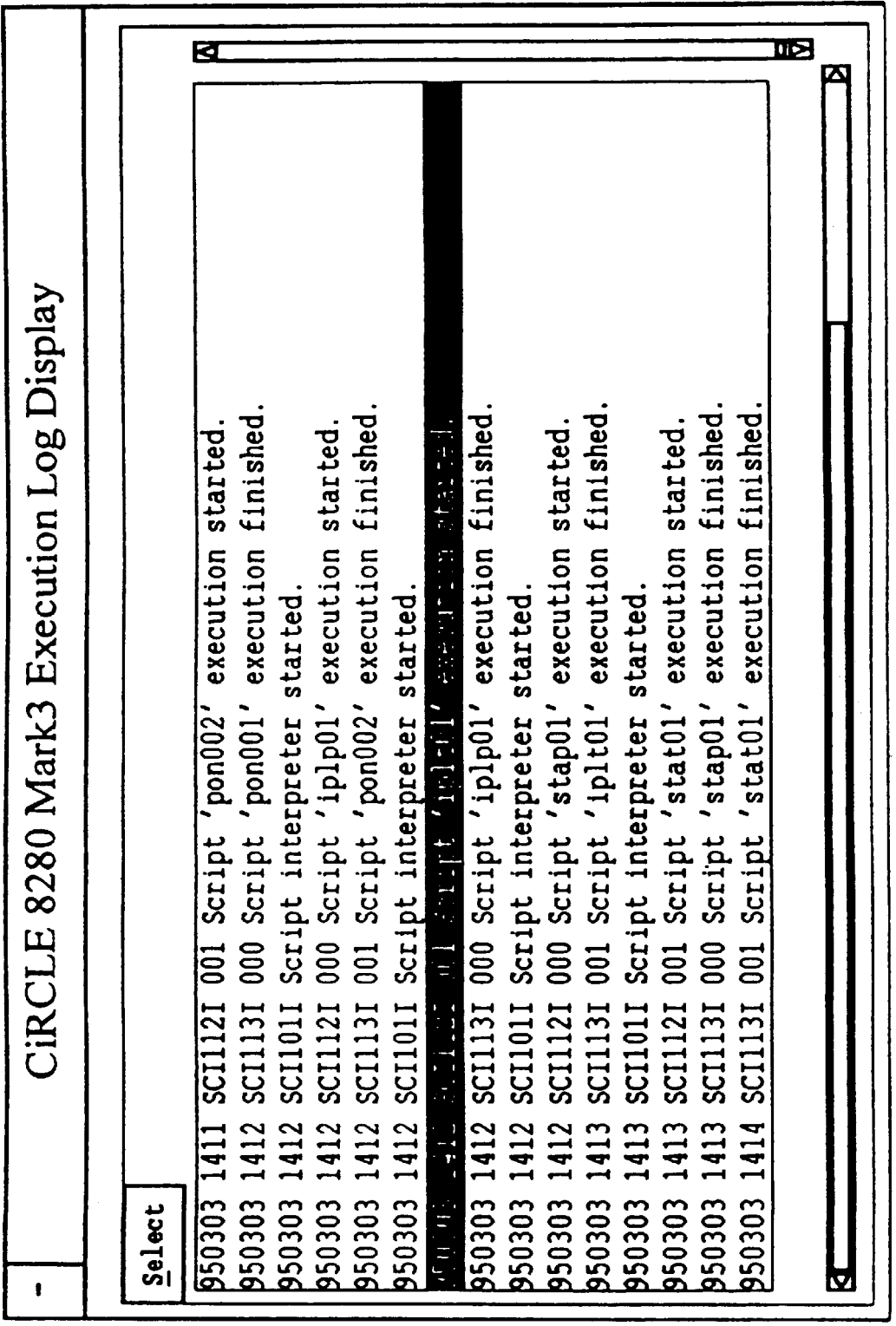
FIG. 4 is a screen display of the ICS Execution Log Display.

The ICS Execution Log Display, as shown in FIG. 4, (called the ICS log window throughout) displays the ICS system execution log (this is not the user system log). This window allows the operator to reference the ICS system log. To display previous messages, click on the up arrow on the vertical scroll bar. This window also allows the user to print the ICS system log. To do this, click on the Print button on the Select menu. The Filtered Message Display (called the System message window), shown in FIG. 6, displays the user operating system message log. These messages are selected or modified by the message filter. Operator comments will be displayed with the system messages. The user can refer to the system filtered message log by clicking on the vertical scroll bar. Click on the up arrow to see earlier messages.

Figure 8:
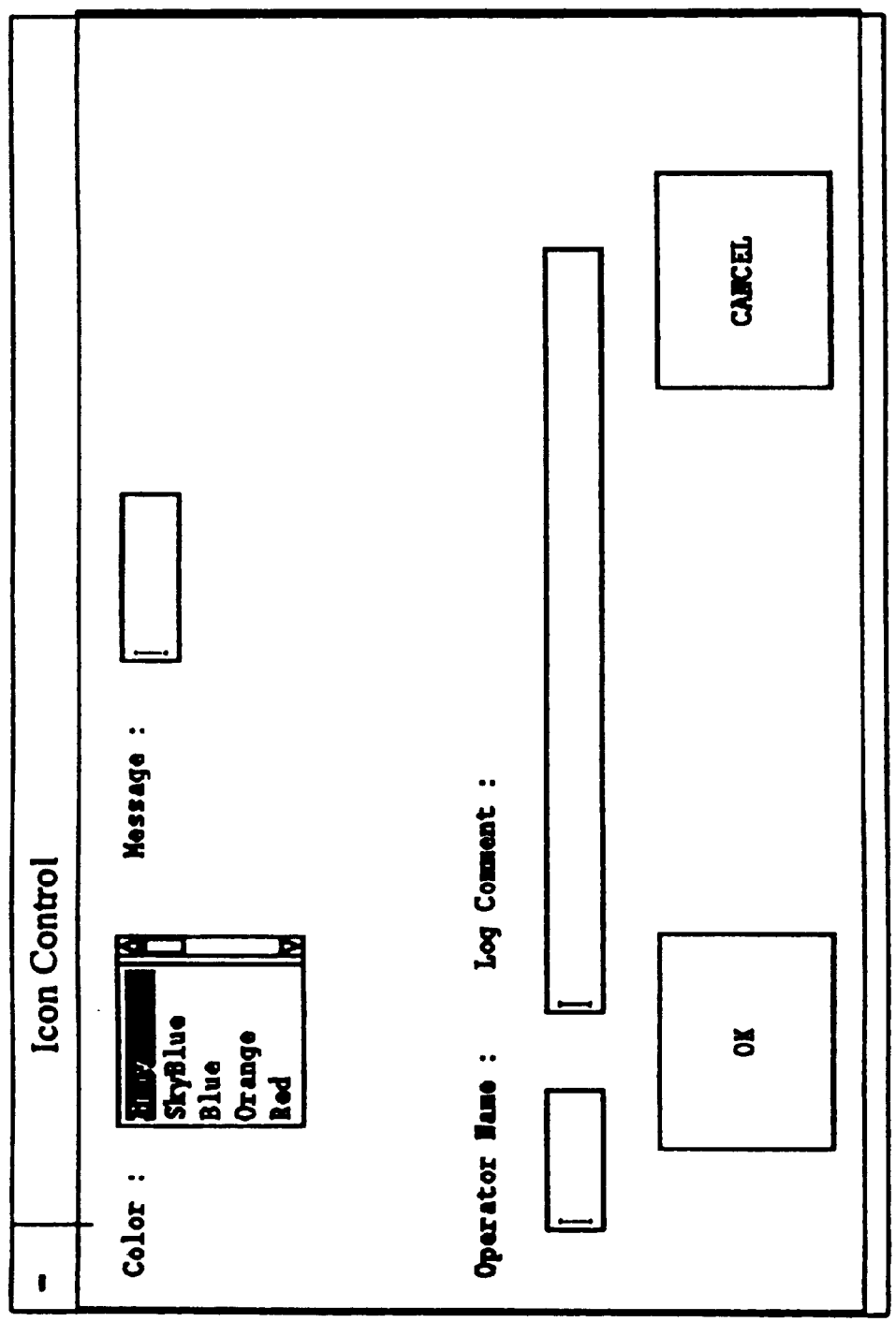
FIG. 8 is a screen display of the Icon Control window.

To display the Icon Control window, FIG. 8, double click on the Icon Control button. This window allows the user to put a specific message into the system log. The buttons on this screen perform the following functions. The Color Box allows selection of the color of the message being entered into the log. The ICS session uses different colors to indicate the priority of a message. The Message Box allows the operator to add messages to the system message log. The Operator name Box allows the operator to type in a name up to eight characters long. The Log comment Box allows the operator to add a comment to the system message log. This message is displayed on the Filtered Message Display, FIG. 6. The comment may be up to 50 characters long. When a special log message has been typed in, save the message in the log by clicking on the "OK" button. To return to the previous window without saving any entries, click on the "Cancel" button.

Figure 9:
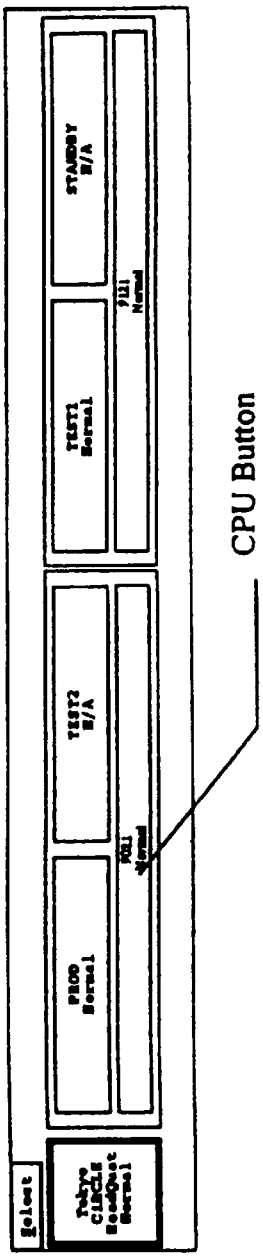
FIG. 9 is a screen display of the System Status Summary Window.

The System Status Summary window, shown in FIG. 9, (called the System Summary window) displays the status of the data center, hardware, or operating system and I/O box signal. Information is displayed in specific colors to indicate the status, such as the room, CPU, and operating system status. To display a window with detailed information on the specified room, CPU, or operating system, double click on the appropriate button.

The Room button displays information about the data center environment in specific colors. The data comes from the ICS I/O boxes. Double clicking on this button will display the Room Selection menu, FIG. 11. The ICS operator can open the Schedule, Script, Configuration, and I/O management windows from this menu.

The CPU button of FIG. 9 displays the CPU condition in specific colors. Depending on the display mode, double clicking on this button will display a window with the following choices. In special extension mode, the ICS system log window is displayed. In normal extension mode, the H/W configuration window is displayed. In non extension mode, the Emulator window (system console) is displayed.

The OS button of FIG. 9 displays operating system conditions in specific colors and with specific messages. Depending on the display mode, double clicking on this button will display a window with the following choices. In special extension mode, the ICS system log window is displayed. In normal extension mode, the H/W configuration window is displayed. In non extension mode, the Emulator window (system console) is displayed.

The Application Summary window displays the operating system and application status. The Application program execution status window displays the operating system status in specific colors and with specific messages. To display-the S/W Configuration window, double click on the OS button, titled "Tokyo CiRCLE HeadQuat Normal." This window displays the status of running application programs.

The Display Emulator window (called the Emulator window) allows the ICS operator to operate all consoles that are connected to the ICS. To display the function key template, click on the SoftKey button on the Select menu.

The Emulator Selection window displays all consoles managed by the ICS. To display the Console Emulation window, double click on the console icon.

Figure 13:
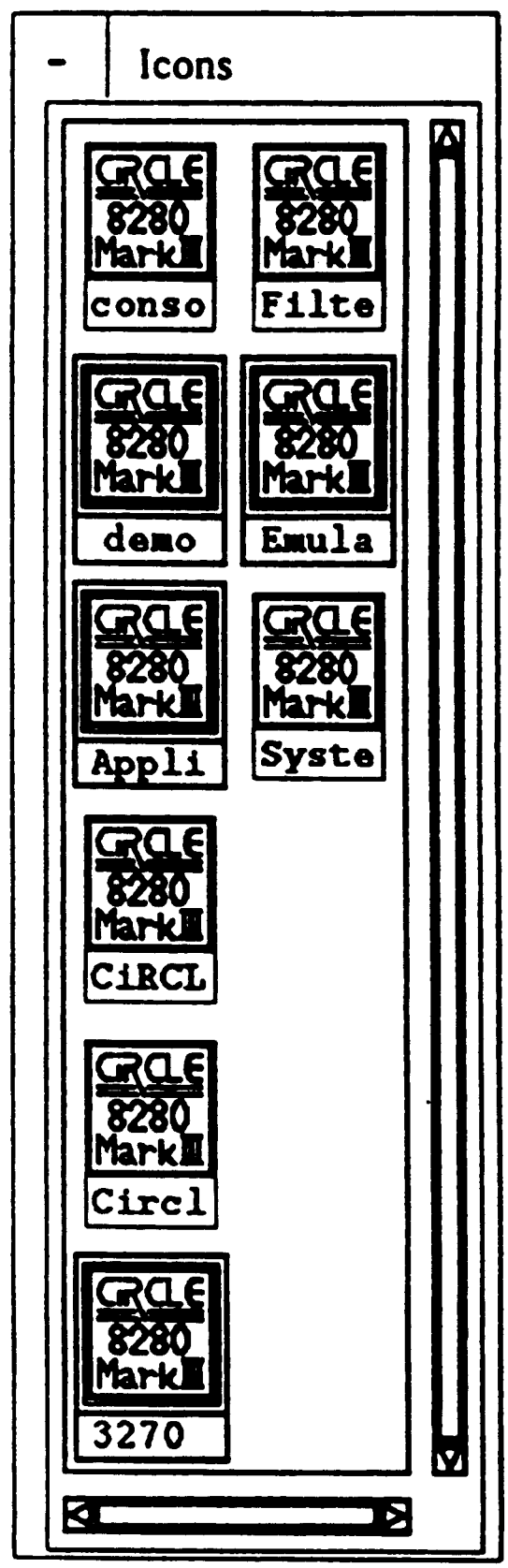
FIG. 13 is a screen display of Icon Display, or Console Emulation, window.
Figure 14:
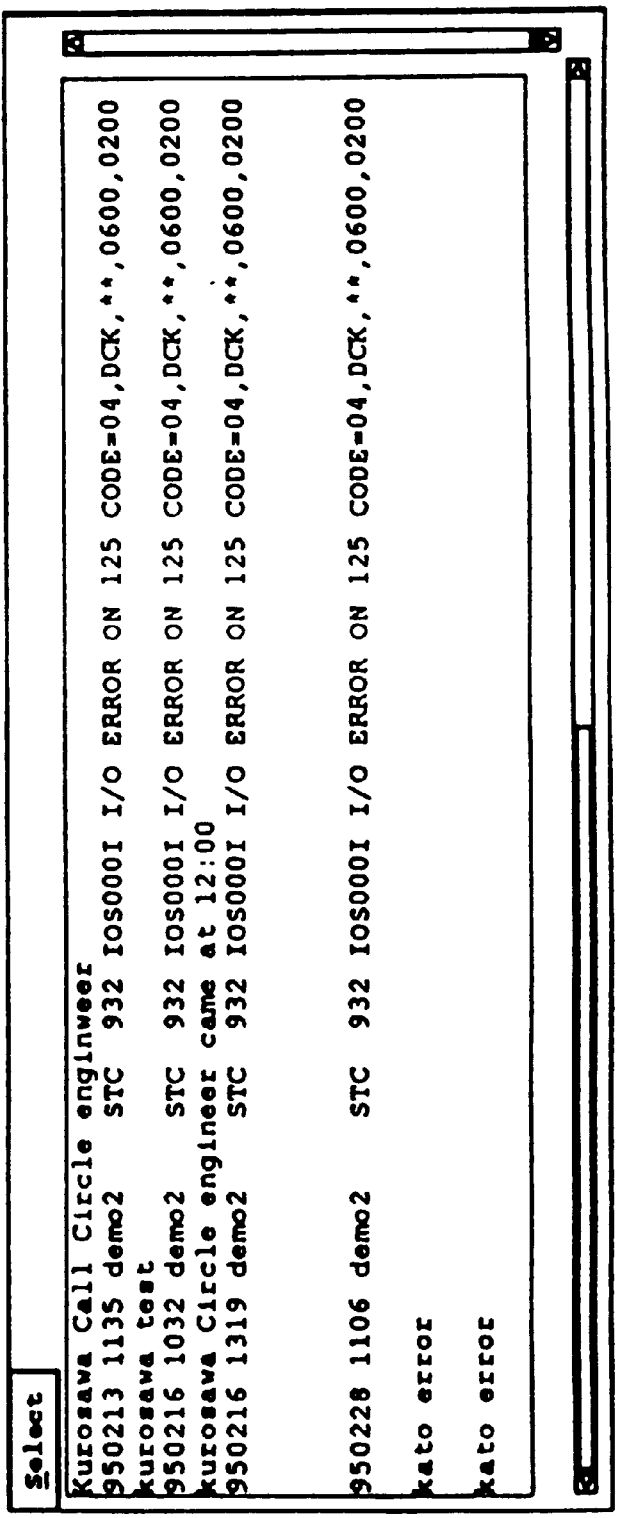
FIG. 14 is a screen display of the Channel Log window.

All of the basic ICS windows are displayed as icons in this window, shown in FIG. 13. To view a specific window, double click on the appropriate icon.

The Console window, called the UNIX Console Window, provides an area in which the operator can enter UNIX commands. This window is used for system maintenance, not standard ICS operation.

The Editor window is a screen editor for the Schedule file, the Script file, and the Configuration file.

Figure 7:
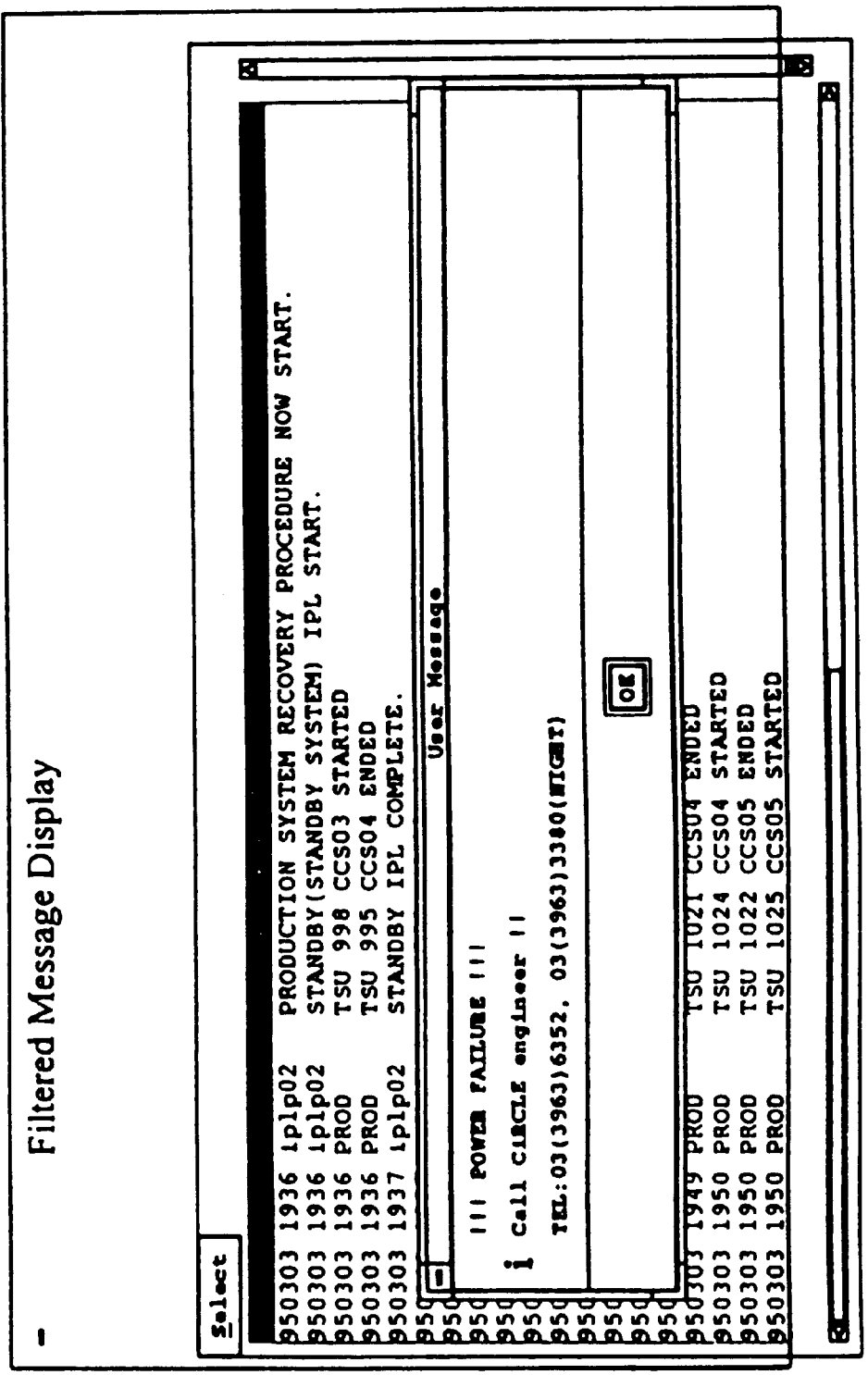
FIG. 7 is a screen display of the User-Defined Message window.

To display the User-Defined Message window, double click on the message line of the Emulator window. A window as shown in FIG. 7 is displayed. These messages are defined in the User Message file.

Now the editing of schedules on the ICS will be discussed. There are four types of files used to manage schedules on the ICS: Daily schedule file, Weekly schedule files, Specific-day files, and Holiday file. To display the Room Selection window, FIG. 11, double click on the Room button on the System Summary window, FIG. 9. To display the Edit Schedule window, click on the Edit Schedule button on the Room Selection window. A screen as shown in FIG. 15 will appear. The holiday file schedule has a higher priority than weekly and daily schedules, but if holiday data and specific-day data are found for the same day, then the ICS will use the specific-day schedule instead of the holiday schedule. The daily schedule may use one of three ranges: Monday to Friday (5 days), Monday to Saturday (6 days), or Monday to Sunday (7 days). This range is determined at installation time and cannot be changed by the ICS operator. To print the schedule summary, double click the Print button on the File menu. The ICS operator can alter the schedule by using the Cut Schedule, Copy Schedule, and Paste Schedule functions.

Figure 16:
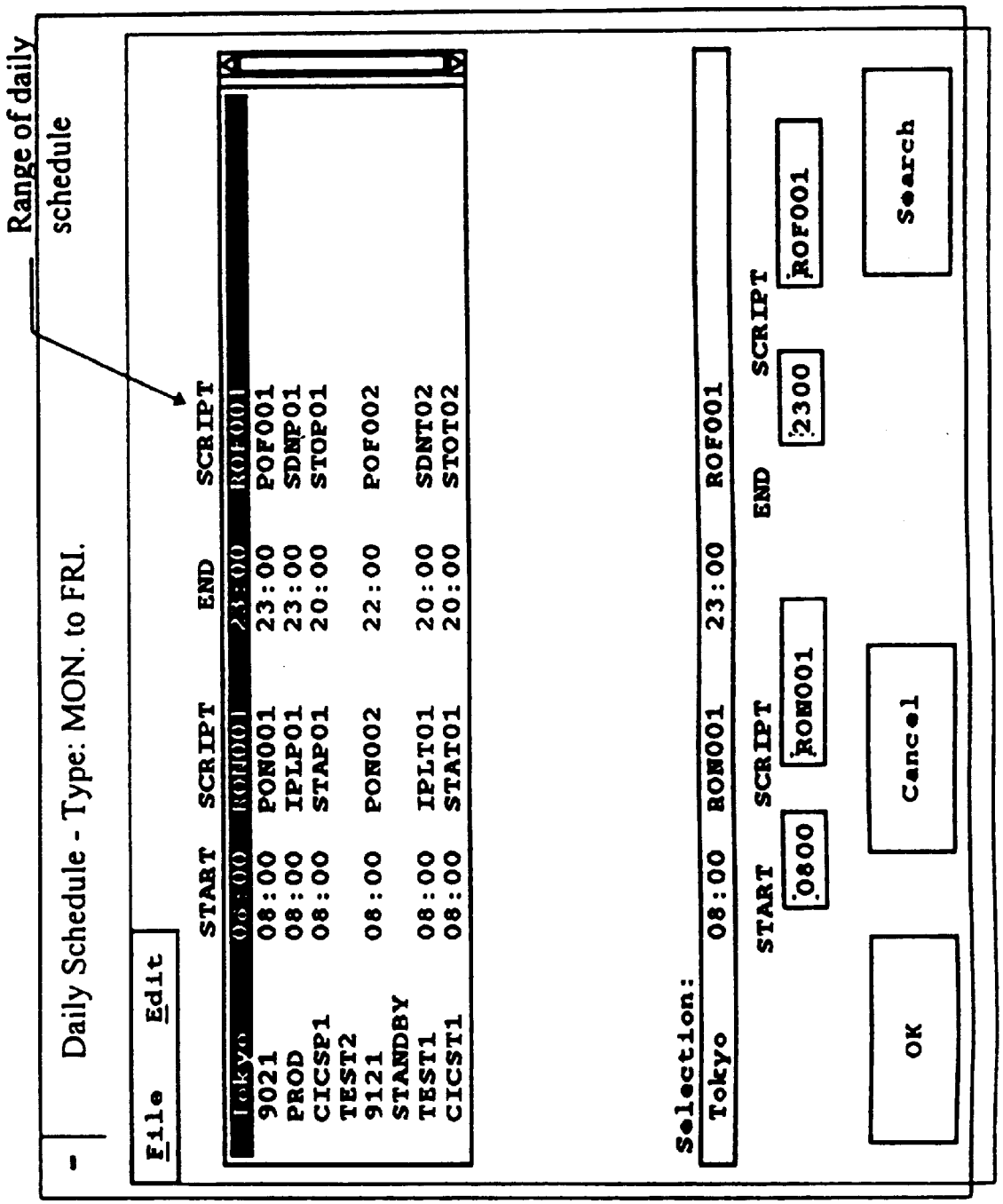
FIG. 16 is a screen display of the Display Contents window.

When editing a schedule, the Display contents window, FIG. 16, shows the following scripts and their associated start times: Room-preparation scripts, room-shutdown scripts, CPU IMPL script, CPU shutdown script, OS IPL script, OS shutdown script, Subsystem startup script, and subsystem shutdown script. When scripts have the same start time, the priority used is: Room, then CPU, then OS, then Subsystem.

Figure 11:
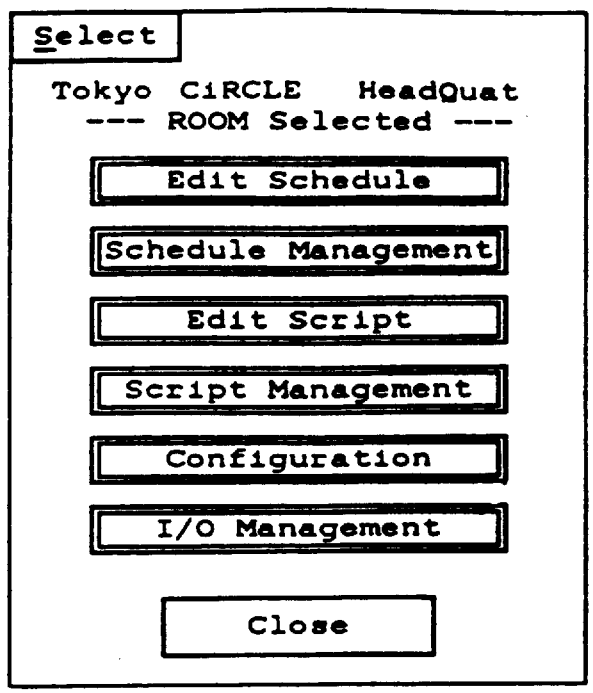
FIG. 11 is a screen display of the Room Selection menu.

Now the management of the various scripts will be discussed. For example, the Room Selection window, FIG. 11, is accessed by a double click on the Room button on the System Summary window, FIG. 9. To display the Edit Script window, click on the Edit Script button on the Room Selection window. All of the script source files (which have the file name extension of scr) will be displayed on the Open File window. To select a file, move up and down through the list using the vertical scroll bar. After selecting the Script File Name line, click the Open button. Then display the Edit window. Clicking on the Cancel button, the Edit window allows the user to create files.

Figure 10:
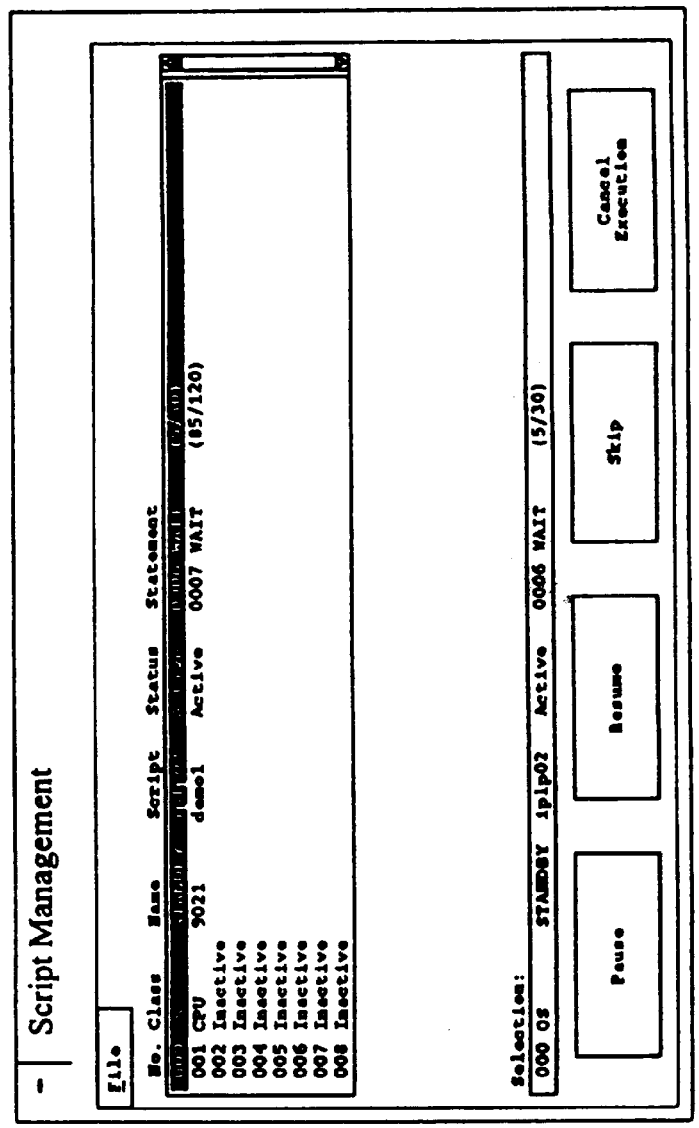
FIG. 10 is a screen display of Script Management window.

Also from the Room selection window, to display the Script Management window, FIG. 10, click on the Script Management button. These are displayed for each initiator: Initiator number, Execution class/Target class (Room, CPU, or OS), Script name, Execution status, Wait time in script. Use the vertical scroll bar to move up and down the list of options. Control the executing script by selecting one of the initiator lines and clicking one of these action buttons: pause, resume, skip or cancel execution. The ICS will prompt the user to confirm the change being requested. To confirm the change, click on the YES button. To cancel the request and return to the previous window, click on the NO button. To return to the previous window, click on the Close button.

Figure 17:
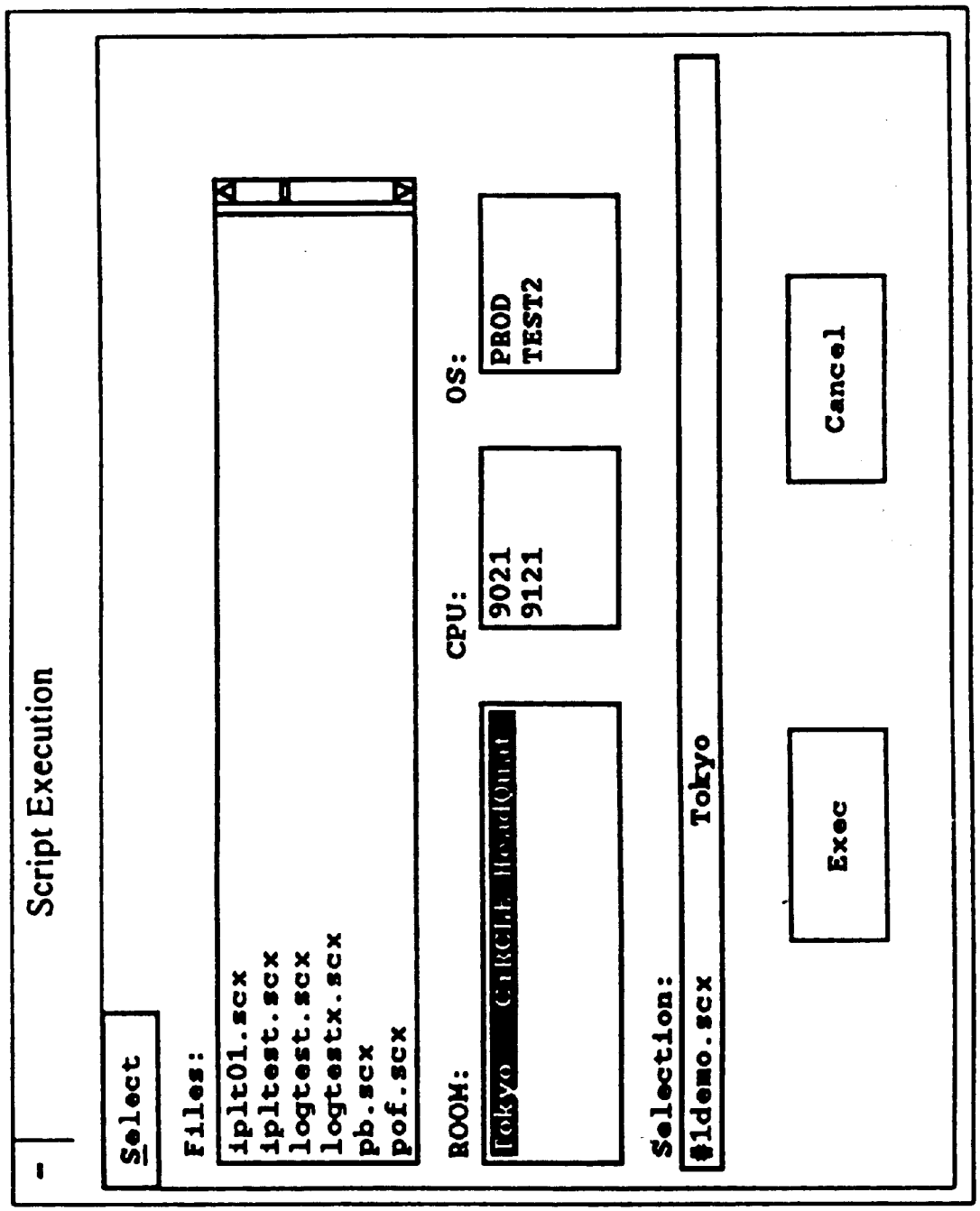
FIG. 17 is a screen display of the Script Execution window.

To display the Script Execution window, FIG. 17, click on the Exec button on the File Menu on the Script Management window. All of the script object files (which have the file name extension of scx) will be displayed. Select an object file by double clicking on the line containing the file's name. Move up and down through the list of files by using the vertical scroll bar. Start script execution by clicking on the Exec button. Then close this window. Return to the previous window by clicking on the Cancel button or select the Close button from the menu.

Now the control and observation of the hardware environment will be discussed, starting with the CPU configuration. The hardware status and start control operation can be checked from the hardware connection figure window. To display the H/W Configuration window, FIG. 19, double click on the CPU button on the System Summary window, FIG. 9.

Figures 18, 19:
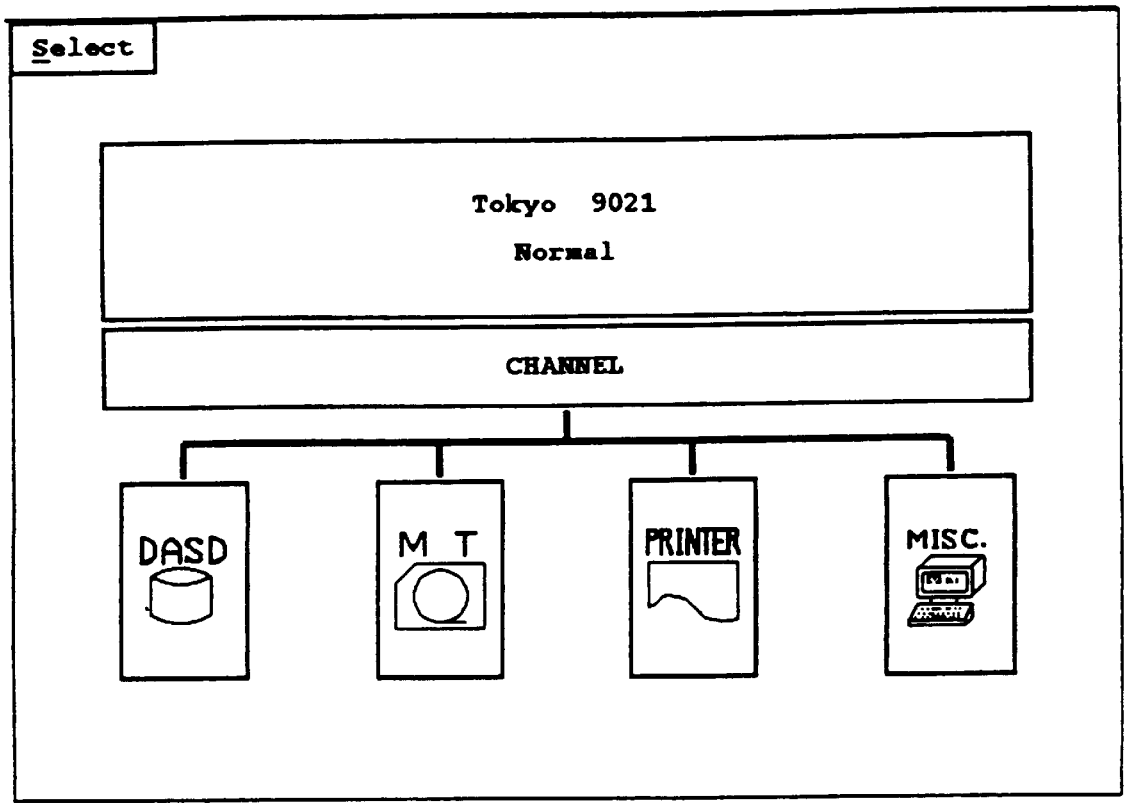
FIG. 18 is a screen display of the D/0 Box.
FIG. 19 is a screen display of the H/W Configuration window.

There are six buttons on the H/W Configuration Window, FIG. 19. Each button displays the operational status. If anything unusual happens, the appropriate button will change color. The top button displays the status of the CPU (for example, "Tokyo 9021 normal"). The middle button displays the status of the CPU channel. The bottom four buttons display the status of the I/O units (DASD, Tape, Printer and Miscellaneous). These screen relations are in "Normal Extension" mode. In the other modes, the screen relation will be different. In "Not Extension" mode, if the top button is clicked, the Emulator window will be displayed. In "Express Extension" mode, if the top button is clicked, the CPU log window will be displayed. To change the color or name of a button, click on the desired button. Click on the Select Icon menu. Then display the Icon Control window. The operator will be able to change the color or name from this window.

To check the CPU error log when an event occurs, display the CPU Log window by double clicking on the top button of the H/W configuration window, FIG. 19. Then, double click one of the message lines to display the user-defined message. If a user message is not defined, a warning message will be displayed. If the ICS is being run in Express Extension mode, the operator can display the log window for the specified CPU either by clicking on the CPU button on the System Summary window or on the top button on the H/W Configuration window.

Figure 20:
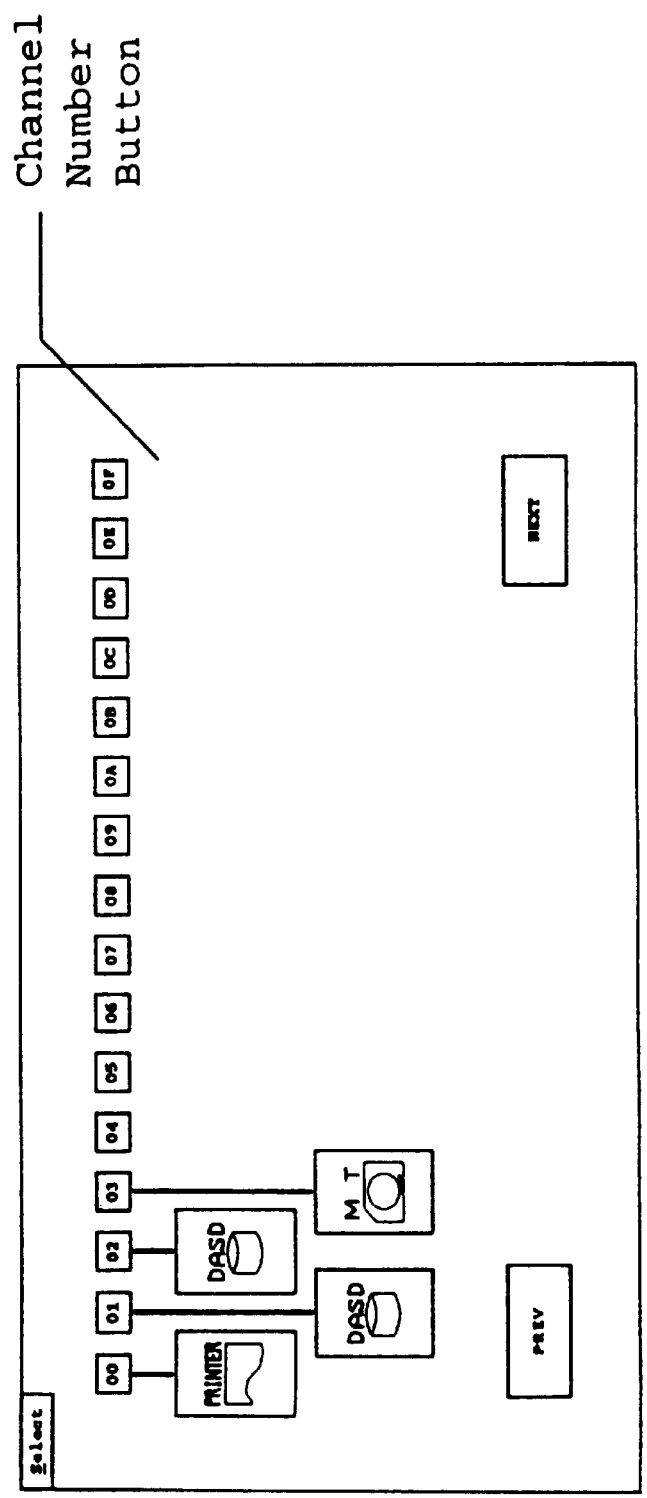
FIG. 20 is a screen display of the Channel Configuration window.

The Channel Configuration, FIG. 20, is used to check the status of I/O Channel or I/O units. To bring up the Channel Configuration window, double click the middle button on the configuration window. CHPID numbers and Connected I/O units are displayed on this window. If the status is not normal, change the color.

To check the I/O channel error messages log, display the Channel Log window by double clicking on the channel number button on Channel Configuration window. There is a log of "Priority messages" and "I/O error messages." Display the user-defined message by double clicking on one of the message lines. If a user message is not defined, a warning message will be displayed.

Figure 5:
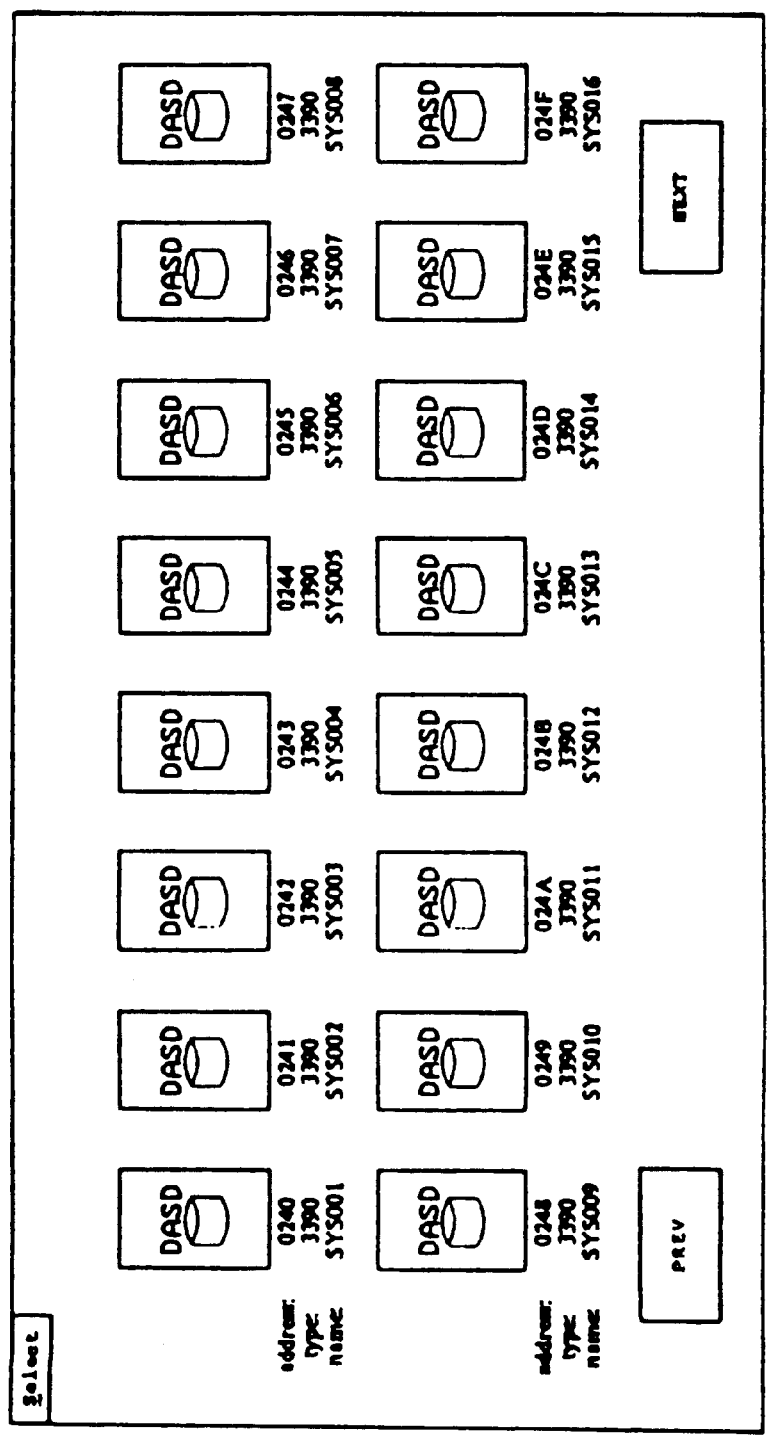
FIG. 5 is a screen display of the I/O Configuration window.

The operator can check the status of an I/O unit by displaying the I/O Configuration window, FIG. 5. Double click on the I/O Unit button on the H/W Configuration window, FIG. 19. The operator also may double click on the I/O Unit button on the Channel Configuration window, FIG. 20. However, this method will display data for only one channel. The I/O address, I/O device type, and Volume Name are displayed. If the status of a device is not normal, the color will change.

To check the I/O unit error messages log, the user displays the I/O unit error log window by double clicking on the I/O Unit button in the I/O Configuration Window, FIG. 5. A log of I/O error messages is shown. To display the user-defined message, double click on a message line. If a user message is not defined, a warning message will be displayed.

It is possible to observe the execution status of the mainframe operating system for each CPU. The color of the icon will indicate the status of the Operating System. Open the Application Summary Window by double clicking on the Application Summary Icon in the Icon window, FIG. 13. To display details of the software configuration by displaying the S/W configuration window, double click on the desired line.

The operator may also check the execution status of subsystems in each Operating System. The icon color indicates the status of the subsystem. To open the S/W Configuration Window, double click on the Operating System button on the Application Summary window. The top line displays the name of Operating System (PROD) and its status (Normal). The other lines denote subsystems running under the Operating System (for example, VTAMP1, CICSP1, and DB2P1). If a status changes, the color also will change. The operator can also display the S/W Configuration window by clicking on the OS button on the System Summary window. To check the execution log of the Subsystem for each Operating System, open the S/W Log Window by double clicking on the Subsystem button on the S/W Configuration window. The error history of the subsystem is displayed.

Figure 12:
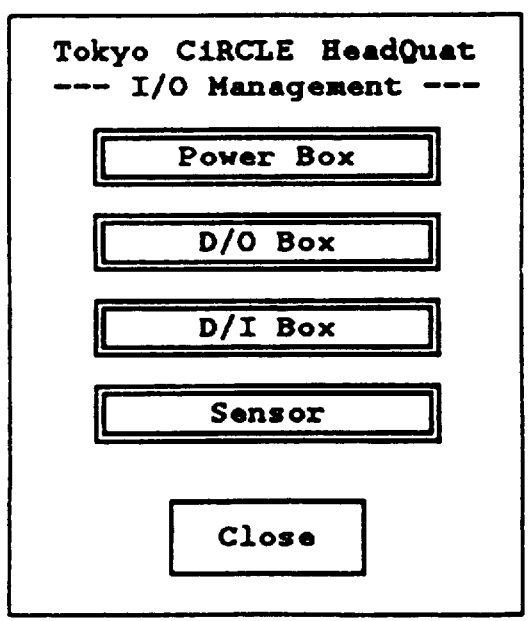
FIG. 12 is a screen display of the I/O Management menu.

The present invention also allows for observation and control of environmental devices. For example, the operator can check the status of CPU power (on or off) and control CPU power remotely. First, the user opens the Room Selection Menu, FIG. 11, by double clicking on the Room button on the System Summary Window, FIG. 9. Then open the I/O Management Window, FIG. 12, by clicking on the I/O Management button on the Room Selection Menu, FIG. 11. Next, open the Power Box window by clicking on the Power Box button on the I/O Management Menu window, FIG. 12. If the "On Action" button is green, CPU power is on. If the "Off Action" button is red, CPU power is off. If both buttons are colored, then the CPU is still powering up. To display the confirmation window, click on the "Action Button." To start the power operation sequence, click on the YES button. To cancel the previously- selected operation, click on the NO button. Click on the Close button on the Power Box window to close the Power Box window.

The Control Data Center equipment is connected to a D/O box. To observe and control this equipment, open the Room Selection Menu, FIG. 11, by double clicking on the Room button on the System Summary Window, FIG. 9. Open the I/O Management Window, FIG. 12, by clicking on the I/O Management button on the Room Selection Menu, FIG. 11. Open the D/O Box window, FIG. 18, and display the I/O Management Menu window by clicking on the D/O Box button. To display the status of a piece of equipment, click on the desired line. Its status will be displayed in the selection box.

To check the status of Data Center equipment connected to the D/I box, open the Room Selection Menu, FIG. 11, by double clicking on the Room button on the System Summary Window. Then open the I/O Management Window by clicking on the I/O Management button on the Room Selection Menu. Open the D/I Box window by clicking on the D/I Box button on the I/O Management Menu window.

It is also possible to check the Data Center temperature and humidity. This information is gathered from the sensor box. Open the Room Selection Menu by double clicking on the Room button on the System Summary Window. Open the I/O Management Window by clicking on the I/O Management button on the Room Selection Menu. Then open the Sensor Box window by clicking on the Sensor button on the I/O Management Menu window.) The temperature and humidity measured are displayed at the sensor box. Temperatures can be displayed in degrees Fahrenheit or Celsius.

As noted above, the ICS 100 is capable of automating the monitoring, operating, and alerting of all processes performed or observed in the data center. Because the ICS 100 can automatically process up to several thousand messages per second, it does not miss messages. Additionally, the ICS 100 can monitor multiple consoles (i.e., screen outputs from tasks or processes executing on a mainframe computer) at the same time with the same accuracy as monitoring only one console.

Normally, a user/operator manually controls the system IPL, operations, and shutdown by interacting with the system console 142 and an operating system (OS) console. All of the operations, such as entering commands, monitoring for special messages, and entering responses are based on some set of rules. These rules can be explicitly written as a detailed set of procedures. Each procedure can be written as one or more ICS scripts.

Procedures that were traditionally performed manually can be automated on the ICS 100 by use of these scripts. Designing scripts for automatic operation can begin by creating detailed documentation of the repetitive operations performed by the operator. ICS scripts can then be written to automatically perform the steps defined in the documentation.

Automation is accomplished through the use of steps stored in scripts. Script files are created using the ICS 100 script editor and are written in the ICS script language. This script language has been specifically designed for monitoring and control environments. The script language is a powerful, flexible, easy to use programming language similar to other structured, high- level programming languages such as BASIC.

After saving a script source from within the script editor, the script is automatically compiled into a form that can be executed on the ICS 100; this form is called a "script object". In the preferred embodiment, the script sources and objects are stored as UNIX files in the ICS system 100.

A source script can be comprised of several different steps:

*STEP1:
TURN ON AIR CONDITIONERS, CHILLER, AND CPU POWER
*STEP2:
CPU IML RESET
*STEP3:
LOAD OS
*STEP4:
BOOT SUBSYSTEM

Script lines such as "STEP1" are called "labels" or "label statements". Labels help make the script source easier to read and, most importantly, are used as reference points for script logic control. Labels generally define a cohesive set of commands that are always executed together. As a reference point, a label is used for branch execution or a "go to" —an immediate transfer of script execution to the reference point. A go to can be made to any step within the current script.

Certain script names are reserved as special—they are automatically executed when a status change in the digital-input, digital output, sensor, or power units is detected. The reserved scripts enable automatic customized response to status changes. The ICS attempts to execute the appropriate reserved script when necessary. If a reserved script to be executed does not exist, nothing happens—no error occurs.

TABLE 1

| Status Change | Reserved Script Name Executed in Response |
|---|---|
| Temp or humidity sensor limit is exceeded | #snserrs.scr |
| Temp or humidity sensor returns to within limits | #snsredv.scr |
| Sensor unit is unreadable | #snslost.scr |
| Sensor unit is recovered/readable | #snsfind.scr |
| DI port #1 changes to ON | #dier001.scr |
| DI port #2 changes to ON | #dier002.scr |
| DI port #n changes to ON | #diernnn.scr |
| DI port #n changes to OFF | #dircnnn.scr |

TABLE 1-continued

| Status Change | Reserved Script Name Executed in Response |
|---|---|
| DI unit is unreadable | #dilost.scr |
| DI unit is recovered/readable | #difind.scr |
| DO unit is unreadable | #dolost.scr |
| DO unit is recovered/readable | #dofind.scr |
| Power unit is unreadable | #pwrlost.scr |
| Power unit is recovered/readable | #pwrfind.scr |

Reserved scripts must be written by the user/operator due to their customized nature (very simple reserved scripts typically are supplied that only display informational messages—no corrective action is taken). For example, the "#snserrs.scr" is executed when either the temperature or humidity sensor limit is exceeded. This script may contain instructions to start up the backup air conditioner and send a message to the pager of the person responsible for maintaining the air conditioners. The actions and depth of automated response is entirely decided by the user/operator.

There are four ways to execute a script as noted in Tables 2 and 3.

TABLE 2

| | |
|---|---|
| Schedule: | Add a script to the schedule to execute on a certain date/day and time or to execute on reoccurring intervals. |
| Immediate: | Select a script for immediate execution. |
| Script: | An executing script can initiate the execution of another script. |
| Reserved: | Automatic execution of special scripts is triggered by digital input, digital output, sensor, or power unit status changes. |

TABLE 3

| Method | Non-Reserved Script | Reserved Script |
|---|---|---|
| Schedule | Yes | No |
| Immediate | Yes | Yes |
| Script | Yes | Yes |
| Reserved | No | Yes |

The syntax for one script executing another script deserves special attention. The syntax (and the "rules") for calling/executing another script from within a script is the same as for calling a built in command. For example, the built in HEXSTR command requires one parameter—a number—and has a return value of a string. The format in a script will look something like this:

$HexNum := HEXSTR( 15)

If a script was named MYSCRIPT and accepted one parameter—a number—and had a return value of a string, the format for calling MYSCRIPT from within another script will look something like:

$RetVal := MYSCRIPT( 42)

Turning now to script organization, the concept of a "master script" which is a "big looping" procedure preferably is used. This "master script" reads the next message, checks if it needs processing and initiates any needed procedure(s)/action, and begins again by reading the next new message.

A master script will contain a READMSG statement to retrieve the next message. Next, a SWITCH statement is used to perform the initial check to see if it requires processing. If the message requires additional processing (a CASE statement evaluates TRUE), the commands in the CASE statement of the SWITCH command first do any additional checking of the message needed and second call another script to process the message.

In most other ways the script language follows the organization and structure of typically second and third generation programming languages like Fortran or "c". In particular the syntax, handling of variables and arrays, string expressions, mathematical expressions and the like are substantially similar to those typically found in other higher level programming languages.

Several intrinsic manifest constants preferably are predefined in order to make scripts easier to read, write, and maintain. The constants can be used anywhere in a script—they are equivalent to the value they represent. For example, instead of using: QUEUE( 1). The following is more clear: QUEUE( ON).

Additionally, even though the following is a valid numeric expression, it is not the true intention for the use of manifest constants:

%Num := TRUE +1 //%Num would contain 2

Some possible intrinsic manifest constants are listed below in Table 4.

TABLE 4

| Constant | Value |
|---|---|
| OFF | 0 |
| ON | 1 |
| RESET | 2 |
| FALSE | 0 |
| TRUE | 1 |
| OVERWRITE | 0 |
| APPEND | 1 |
| ASC | 1 |
| DESC | −1 |
| ROOM | 1 |
| CPU | 2 |
| OS | 6 |
| SW | 7 |
| IO | 4 |
| FLT | 3 |
| CON | 1 |
| PRN | 32 |
| UNIT | 4 |
| GROUP | 16 |
| ALL | 255 |
| ERROR | −1 |
| CHAN | 3 |
| SYS | 2 |
| APPL | 7 |
| BOTH | 0 |
| LEFT | 1 |
| RIGHT | −1 |

In the context of the script language a port number refers to a logical number assigned to each "ICS to customer equipment" interface. The port numbers are defined in a configuration file at installation time. Each interface-type (coax, DI, DO, power, sensor, modem) has its own sequence of unique port numbers. Each interface-type command pertains to only one type of interface.

The ICS Object Manager is an extensible facility that encompasses object definition and manipulation across the entire ICS system 100. The objects are a flexible way for the user/operator to create and manage real-world operations in the ICS 100. Since installations and operations vary per customer, the ICS object manager enables each operator to define specific customized routines. The object manager provides the framework and the operator provides the definitions.

Each object is created or defined by its "type" definition (the object type). The object manager contains two types:

default and custom. Default types are those inherent to the system and custom types are those created by the operator. The object manager's openness enables the operator to modify default types and to define their own types for use in various functions of the ICS 100.

Each type has one or more attributes (e.g., name, colors, and fields). The attributes are defined and initialized in the ICS configuration files and the values are set and read with script commands. Object manager script commands all begin with the prefix "OBJ".

Object type refers to the "map" or the definition of an object type. Each type has a name and is referred to by its name. The type definition contains the information to define the type to the object manager. The "type" parameter for the object manager script commands is a string and is the type name.

Object Name is the name of an object. In object-oriented terms, the object itself is an instance of the type. Each instance will have a unique name—the object name. The basic syntax rules for object names are:

Cannot contain a colon
Object name in the CPU class must be unique per ICS
Object name in the OS class must be unique per CPU
Object name in the SW class must be unique per OS
Object name in the UNIT class must be unique per CPU In addition, each object has a "hierarchical" key, referred to as the object key. This key is a string expression that specifies a precise object by referring to the chain of object names. Only one script command uses the object key—OBJID. The rest of the commands utilize the object id. The syntax rules require that each object name must be separated by colons. For example, Full syntax: "CPU:OS:SW" or "CPU:UNIT:??".

Object ID is the unique id for each object. The advantages of using object Ids include speed of execution, reduced script maintenance issues, and ease of implementation.

A script executes in a class on an object. Each object is also represented by an icon displayed on a window, such as the System Summary or CPU Configuration window. Table 5 shows some of the icon class constants.

TABLE 5

| Class Constant | Description |
| --- | --- |
| ROOM | Represents a "room". A room can hold up to 4 CPUs. A ROOM icon is on the "System Summary" window. |
| CFU | Represents a CPU. A CFU icon is on the "System Summary" window. |
| OS | Represents an operating system. An OS icon is on the "System Summary" window. |
| SW | Represents a "software" program. A SW icon is on the "Software Configuration" window (accessed by double-clicking an OS icon). |
| UNIT | Represents an I/O unit such as DASD or Tape. A UNIT icon is on the "I/O Unit" window (accessed by double-clicking a CPU icon) |

Each icon in a class has a unique name referred to as the "Icon Name". This name is displayed on the icon and is used in some script commands. The icon name is used to uniquely identify an icon in a class. The icon classes are pre-defined, but icon names are user defined. Some examples of icon names are 3090, 9021, CPU #1, MVS #3, and Sys5. Icon name and icon class are both optional arguments. However, if the icon name is specified, then the icon class is required. If class and name are both omitted on a relevant script command, then the icon affected defaults to the one the script is executing on.

The default class and name for a script are determined when the script begins executing:

A script started from another script defaults to the class and name of the calling script and, where applicable, can use parameters to override the defaults.
A scheduled script's class and name are set by its definition in the scheduler.
An immediately executed script's class and name are set by the user in the script execution window.
A reserved script's class and name are special, and are set by the system.

In a script executing on a lower-level class (any class below ROOM), when a higher-level icon class is specified without the icon name, the icon affected is the icon in the specified class that is an ascendant of the script's class. In a script executing on a higher-level class, when a lower-level icon class is specified without the icon name, the icon affected is all icons in the specified class.

The following set of Tables provide list of script commands organized by type. The commands shown in Table 6 are used for manipulating files.

TABLE 6

| NAME | DESCRIPTION |
| --- | --- |
| FCLOSE | Closes an open file. |
| FDELETE | Permanently deletes a file. |
| FEXISTS | Determines if a file exists. |
| FMODTIME | Returns the time value of a last modified date/time stamp for a file. |
| FOPEN | Opens a file for I/O access. |
| FPOS | Returns an open file's current record pointer position. |
| FREAD | Reads values from an open file into variables. |
| FRENAME | Renames a file. |
| FREWIND | Moves an open file's current record pointer to the beginning. |
| FSEEK | Moves an open file's current record pointer to a byte offset. |
| FWRITE | Writes expressions to an open file. |
| LOG | Enters a message in a log. |

The following flow control commands shown in Table 7 are used for controlling the execution order of scripts and script commands.

TABLE 7

| NAME | DESCRIPTION |
| --- | --- |
| END | Ends the execution of the script thread. |
| EXEC | Executes a script whose name is stored in a string variable. |
| GOSUB | Immediately transfers script execution to the specified label and waits until the called routine finishes execution. |
| GOTO | Immediately transfers script execution to the specified label. |
| IF | Evaluates an expression for TRUE or FALSE. - if . . . then statement. |
| REPEAT | Repeats a sequence of commands until an expression evaluates to TRUE. |
| RETURN | Returns execution to the calling routine. |
| START | Initiates execution of another script for concurrent processing. |
| STOP | Halts execution of another script. |
| SWITCH | Execute command(s) based on the contents of a variable. |
| SYSEXEC | Executes a system (UNIX) command with parameters. |
| WHILE | Repeats a sequence of commands while an expression evaluates to TRUE. |

The following host message commands shown in Table 8 are used for sending or obtaining information relating to host messages.

TABLE 8

| NAME | DESCRIPTION |
| --- | --- |
| ASCRN | Fill an array with the text of a screen. |
| BLOCKSCAN | Enables up to 256 SCANB commands to execute as a group. |
| KEY | Enters a character string to the specified console. |
| PORT | Returns the port number for a console definition. |
| QUEUE | Starts/stops/resets a queue of OS printer console messages. |
| READMSG | Reads the next message from a script's message queue. |
| SCANB | Same as SCANP except for use with the BLOCKSCAN command. |
| SCANP | Searches a console for a specified character string. |
| SCRNTEXT | Returns characters from a console screen. |

The following interface control commands shown in Table 9 are used for controlling the interfaces.

TABLE 9

| NAME | DESCRIPTION |
| --- | --- |
| CPUPOWER | Switches a CPU's power ON or OFF. |
| DIUNIT | Check the status of a device connected to a DI unit. |
| DOUNIT | Controls the device connected to a DO unit. |
| HUMID | Reads the current humidity from a sensor unit. |
| TEL | Uses the modem to call a phone number and send an alphanumeric message. |
| TEMP | Reads the current temperature from a sensor unit. |

The following object manager commands shown in Table 10 are used for interacting with the ICS Object Manager.

TABLE 10

| NAME | DESCRIPTION |
| --- | --- |
| OBJEXEC | The action specified by the Action parm is performed on the object specified by ObjID. |
| OBJGET | Returns the current value in an object's field. |
| OBJGETARRAY | Populates an associative string array with the current field values from an object. |
| OBJID | Returns the unique ID for an ICS object. |
| OBJIDARRAY | Populates an associative numeric array with object ids from the children of a parent object. |
| OBJSET | Sets the current value in an object's field. |
| OBJSETARRAY | Sets the field values for an object from an associative string array. |

The following time commands shown in Table 11 are used in relation to time.

TABLE 11

| NAME | DESCRIPTION |
| --- | --- |
| DATE | Converts a date string to a date value. |
| SECONDS | Returns the time value for the current time. |
| TIME | Converts a time string to a time value. |
| TIMESTR | Formats epoch seconds into a date/time string. |
| WAITFOR | Pauses script execution for the specified number of seconds. |
| WAITUNTIL | Pauses current script execution until the specified time is reached. |

TABLE 11-continued

| NAME | DESCRIPTION |
| --- | --- |

The following variable commands shown in Table 12 are used for manipulating script variables.

TABLE 12

| NAME | DESCRIPTION |
| --- | --- |
| AICONNAMES | Fill an array with all of the icon names in a class. |
| ALEN | Returns the number of elements in the array. |
| ARESET | Reset the contents of an array to "empty". |
| ASORT | Sort a normal array. |
| ASSOCKEYS | Populate a normal string array with the string index keys of an associative array |
| ATSTR | Returns the starting position of a substring within a string. |
| DEC | Subtracts one from a numeric variable's value. |
| FINDSTR | Searches a string for a regular expression pattern. |
| FORMATSTR | Formats a string by combining literal characters with conversion specifications. |
| HEXSTR | Converts an integer to a hex string. |
| INC | Adds one to a numeric variable's value. |
| JOIN | Combines the elements of an array into a string. |
| LEFTSTR | Returns the leftmost specified number of characters of a string expression. |
| LEN | Returns the number of characters in a string expression. |
| LOWER | Converts uppercase characters to lowercase. |
| PARMS | Receives parameters into the script. |
| REPSTR | Returns a string repeated a specified number of times. |
| RIGHTSTR | Returns the rightmost specified number of characters of a string expression. |
| SET | Make the contents of a variable equal to the specified expression. |
| SPLIT | Populates an array with the fields of a string delimited by a string. |
| STR | Converts a numeric expression to a string. |
| SUBSTR | Extract a substring from a character string. |
| TRIMSTR | Removes leading and trailing spaces from a string. |
| UPPER | Converts lowercase characters to uppercase. |
| VAL | Converts a string expression to a number. |

The functionality of most of these script commands is readily apparent from the brief description given in the above tables and is otherwise well known in the software programming language art. However, some of these script commands have been specifically developed for use in the monitoring and control environment from which the present invention was developed. As such, these commands may be unfamiliar to those of ordinary skill in the art of software programming. A brief discussion of these monitoring and control specific script language commands is given in the following portion of the detailed description.

AICONNAMES

This command fills an array with all of the icon names in a class. An associative string array is created with its index keys being the names of the icons in the specified class. The set of icons obtained for the specified class is determined by the ParentIcon parm. Not all icons in the specified class are obtained, only the icons whose parent icon name is ParentIcon. In the preferred embodiment, the ParentIcon parm is ignored for class of CPU.

The syntax for the command is:
AICONNAMES ($AssocArray, Class, ParentIcon)
where,

| | |
|---|---|
| $AssocArray | Associative string array variable. The associative array to receive the icon names as its keys. Each icon name becomes an index key in the array. The data for each element remains at the itialization state - empty string "". |
| Class | Numeric expression. The icon class. Please refer to Icon Class/Icon Name on page 3–5. Valid classes are CPU, OS, SW, and UNIT. |
| ParentIcon | String expression. The name of the parent icon to the class of icons. |

No values are returned by this command. An example of how to use this command is shown in Table 13.

TABLE 13

```
//The OS class is the parent class of the SW class.
//In this example, we have a mainframe LPAR (which is OS
//level) called SYS5.
//Place the names of all software (SW) applications
//as keys in the $Icons associative string array.
$LparName := "SYS5"     // a mainframe OS icon name
AICONNAMES( $Icons, SW, $LparName)
//place the names of all CPUs in the room called "Mpls"
//as keys in the $Icons associative string array.
AICONNAMES( $Icons, CPU, "Mpls")
```

BLOCKSCAN

This command enables up to 256 SCANB commands to execute as a group. BLOCKSCAN delineates the beginning and ENDBLOCK delineates the ending of a group of SCANB commands to execute as a group. The SCANB commands are executed simultaneously and script execution continues with the branching logic of the first SCANB command that fulfills its own scanning condition. If the Wait time expires, script execution branches to the label specified by the *Timeout parm.

The syntax for the command is:
BLOCKSCAN (Wait, *Timeout {, $Array}) . . . ENDBLOCK
where,

| | |
|---|---|
| Wait | Numeric expression. The number of seconds to wait before timing out when none of the SCANB commands are successful. This number specifies how long the command waits for the scans to be successful. |
| *Timeout | Label literal. The label to jump to when the Wait time expires. |
| $Array | Normal string array. Optional. The array to populate with subexpression results, if any, from the Text parm in a SCANB command. Each array element will contain one subexpression result - element one will hold the result for subexpression one, element two will hold the result for subexpression two, etc. The subexpressions are "numbered" from left to right in the Text parm. $Array is only populated when the Text parm contains subexpressions and the scan text is found. |

Only the first 9 subexpression results can be returned. An example of how to use this command is shown in Table 14.

TABLE 14

```
//*********************************************************
// Example 1
//*********************************************************
*START:
BLOCKSCAN(1800, *START, $Msg)
SCANB( 1, "JOBA END", *JOBA)
SCANB( 2, "JOBB END", *JOBB)
ENDBLOCK
//*********************************************************
// Example 2
//*********************************************************
*START:
LOG( FLT, "JOB A - C REPLY SCAN")
WAITFOR( 10)
BLOCKSCAN(20, *START, $Msg)
//put 2 digit job # in pp
SCANB( 2, "*pp JOB-A", *JOBA)
SCANB( 2, "*pp JOB-B", *JOBB)
SCANB( 2, "*pp JOB-C", *JOBC)
ENDBLOCK
*JOBA:
//send job # in pp with reply
KEY( 2, "R pp,CANCEL[ENT]")
```

CPUPOWER

This command switches a CPU's power ON or OFF. The power to the CPU that is connected to the specified ICS power unit port is turned ON or OFF. 2. When powering off, an operator should be sure to first check that the operating systems are shut down.

The syntax for the command is:
CPUPOWER(Port, Operation) where,

| | |
|---|---|
| Port | Numeric expression. The assigned power port number the CPU is connected to. Please refer to Ports on page 3-2. |
| Operation | Numeric expression. ON switches on the power and OFF switches off the power. |

No values are returned by this command. An example of how to use this command is shown in Table 15.

TABLE 15

```
%Operation := OFF
CPUPOWER( 1, ON)
CPUPOWER( 1, %Operation)
```

DIUNIT

This command checks the status of a device connected to a DI unit. The command sets the value of the specified variable to the status of the DI unit connected to the specified port.

The syntax for the command is:
DIUNIT(Port) ==> %Status
where,

| | |
|---|---|
| Port | Numeric expression. This parameter refers to the assigned DI port number to which the device is connected. |

This command returns a numeric value. The value of the DI status—either 0 or 1. 0 implies OFF and 1 implies ON. However, depending on the type of connected device, the values can have other meanings. An example of how to use this command is shown in Table 16.

TABLE 16

```
% Status := DIUNIT( 3)
IF % Status == ON
  LOG( FLT, "DI #3 is on")
ENDIF
```

DOUNIT

This command controls the device connected to a DO unit. The switch on the specified DO unit port is opened or closed, thereby changing the status of the connected equipment. This effectively switches the equipment ON and OFF.

The syntax for the command is:
DOUNIT(Port{, Operation}) ==> %DOSwitch
where,

| | |
|---|---|
| Port | Numeric expression. The assigned power port number to which the CPU is connected. |
| Operation | Numeric expression. Optional. ON closes the switch and OFF opens the switch. If not specified, the DO switch setting remains the same. |

This command returns a numeric value. The setting of the DO switch is returned (not the current status of the device connected to the DO unit—use DIUNIT for that). If the Operation parm is specified, the return value is the old DO switch setting value. If the Operation parm is not specified, the return value is the current DO switch setting value. An example of how to use this command is shown in Table 17.

TABLE 17

```
DOUNIT( 4, ON)
%DOSwitch := DOUNIT( 4, ON)
%DOSwitch := DOUNIT( 4)
```

HUMID

This command reads the current humidity from a sensor unit. The humidity value is read from the sensor unit connected to the specified port.

The syntax for the command is:
HUMID(Port) ==>%Humidity
where,

| | |
|---|---|
| Port | Numeric expression. The assigned sensor port number to which the sensor is connected. |

This command returns a numeric value which is the current humidity reading.

An example of how to use this command is shown in Table 18.

TABLE 18

```
%Hum := HUMID( 2)
LOG( CONS, "HUMIDITY 2 = " + STR( %Hum))
```

ICON

This command changes icon characteristics. The status/color, message, class, and name are changed for the specified icon. The default message for a status can be overridden with the "Message" parameter. Also, the default colors can be changed by editing the colors configuration file.

The syntax for the command is:
ICON(Status{, Message} {, Class} {, Name})
where,

| | |
|---|---|
| Status | Numeric expression. The status number to set the icon to, which effectively changes its color. The range of status numbers is from 1 to 16. Some representative icon status numbers, default messages, and default colors are shown in Table 19. |

TABLE 19

| Status # | Default Message | Default Color |
|---|---|---|
| 1 | Power Off | LightSteelBlue |
| 2 | Power On | LightSkyBlue |
| 3 | Normal | SteelBlue |
| 4 | Warning | Orange |
| 5 | Alarm | Red |
| 6 | | Gray |
| 7 | | White |
| 8 | | PaleGreen |
| 9 | | Yellow |
| 10 | | HotPink |
| 11 | | VioletRed |
| 12 | | Cyan |
| 13 | | Aquamarine |
| 14 | | Blue |
| 15 | | Brown |
| 16 | | Gold |
| Message | String expression. Optional. The text to appear on the bottom line of the icon. The maximum number of characters is 10. A message with length of greater than 10 is truncated to the first 10 characters. | |
| Class | Numeric expression. Optional, but required with Name. The icon class. | |
| Name | String expression. Optional. The icon name. | |

No values are returned by this command. An example of how to use this command is shown in Table 20.

TABLE 20

```
//change current (default) icon status to 3
ICON( 3)
//change current icon status to 5 and its msg to "ERROR"
ICON( 5, "ERROR")
//change 3090 CPU icon status to 4
ICON( 4, , CPU, "3090")
//if this script were executing on a LPAR,
//the higher-level CPU icon for the LPAR would be changed
//because the CPU name is omitted
ICON( 2, , CPU)
```

ICONMSG

This command returns an icon's current message. The message text for the specified icon is returned.

The syntax for the command is:
ICONMSG( {Class} {, Name}) ==> $Message
where,

| | |
|---|---|
| Class | Numeric expression. Optional, but required with Name. The icon class. |
| Name | String expression. Optional. The icon name. |

This command returns a string value which is the icon's message (i.e., the text that appears on the bottom line of the icon).

ICONNAME

This command returns an icon's name. In particular, the name of the icon is returned for the specified class and port.

The syntax for the command is:

ICONNAME( {Class} {, Port}) ==> $Name where,

| | |
|---|---|
| Class | Numeric expression. Optional, but required with Port. The icon class. Valid constants are CPU, OS, SW, and PRN. |
| Port | Numeric expression. Optional. The icon's assigned port number the object it represents is connected to. |

This command returns a string value. The name of the icon. If Class and Port are not specified, then the name of the current icon (the icon the script is executing on) is returned. If Port is not specified but Class is, the name of the icon in the current icon's "lineage" in the specified class is returned. An example of how to use this command is shown in Table 21.

TABLE 21

$Name := ICONNAME()
$Name := ICONNAME( CPU)
$Name := ICONNAME( CPU, 2)

ICONSTATUS

This command returns an icon's current status. In particular, the message text for the specified icon is returned.

The syntax for the command is:

ICONSTATUS( {Class} {, Name}) ==>%Status where,

| | |
|---|---|
| Class | Numeric expression. Optional, but required with Name. The icon class. |
| Name | String expression. Optional. The icon name. |

This command returns a numeric value which is the icon's status.

KEY

This command enters a character string to the specified console. Keyboard keys, represented by the characters in Keys, are sent to the console connected to the specified port just as if they were typed from the console keyboard.

The syntax for the command is:

KEY(Port, Keys)

where,

| | |
|---|---|
| Port | Numeric expression. The assigned console port number to which the console is connected. |
| Keys | String expression. Characters and key representations to send as keyboard typing. |

No values are returned by this command. Some specific keyboard keys and their KEY command equivalents are shown in Table 22. All characters within the brackets [ ] must be upper case.

TABLE 22

| Keyboard Key | Key Command |
|---|---|
| ASSIGN CONS | [CNS] or [ASGNCNS] |
| ATTN | [ATN] or [ATTN] |
| BACK TAB | [BKTAB] |
| BKWD | [BWD] or [BKWD] |
| CLEAR | [CLR] or [CLEAR] |
| CNCL (PA2) | [CP2] or [CNCL] |
| CURSOR UP | [CUP] |
| CURSOR DOWN | [CDW] or [CDN] |
| CURSOR LEFT | [CLT] |
| CURSOR RIGHT | [CRT] |
| DEL | [DEL] |
| DEVICE | [DVCNL] |
| CANCEL | |
| DUP | [DUP] |
| END | [END] |
| ENTER | [ENT] or [ENTER] |
| ERASE EOF | [EOF] or [EREOF] |
| ERASE INPUT | [INP] or [ERINP] |
| FIELD MARK | [FMK] or [FLDMRK] |
| FWD | [FWD] |
| HOME | [HOME] |
| INDEX | [INDEX] |
| INS (`a) | [INS] |
| IRPT | [IPT] or [IRPT] |
| ISTEP EOF | [ISTEP] |
| LAST CMD | [LASTCMD] |
| LEFT | [LEFT] |
| PA1 | [PA1] |
| PA2 | [PA2] |
| PF-KEY nn (01 to 24) | [Fnn] |
| REFRESH | [REF] or [REFRESH] |
| RESET | [RESET] |
| RESTART | [RST] or [RESTART] |
| RIGHT | [RIGHT] |
| START | [STR] or [START] |
| STOP | [STP] or [STOP] |
| SWAP CONS | [SWAPCNS] |
| SYS REQ | [SRQ] or [SYSREQ] |
| TAB | [TAB] |
| TOD | [TOD] |
| VIEW LOG | [VIEWLOG] |

Some date formats and their respective KEY commands are shown below in Table 23.

TABLE 23

| Date Format | Key Command |
|---|---|
| yymmdd | [DT1] |
| yy.mm.dd | [DT2] |
| yyddd | [DT3] |
| yy.ddd | [DT4] |
| yy/mm/dd | [DT5] |
| mmddyy | [DT6] |
| mm.dd.yy | [DT7] |
| mm/dd/yy | [DTB] |
| dddyy | [DT9] |
| ddd.yy | [DTA] |

Some time formats and their respective KEY commands are shown below in Table 24.

TABLE 24

| Time Format | Key Command |
|---|---|
| HHMMSS | [TM1] |
| HH.MM.SS | [TM2] |
| HH:MM:SS | [TM3] |
| HHMM | [TM4] |

TABLE 24-continued

| Time Format | Key Command |
|---|---|
| HH.MM | [TM5] |
| HH:MM | [TM6] |

PORT

This command returns the port number for a console definition. A console's port number is returned for a class and an optional icon name.

The syntax for the command is:

PORT(Class{, IconName}) ==> %Port where,

| | |
|---|---|
| Class | Numeric expression. The icon class. The unique port sequence type. Only CPU, OS, PRN, and SW are valid for the PORT function. |
| IconName | String expression. Optional. The name of the icon whose port number we are interested in. If not specified, the icon used is the icon in the class specified by the port type that is in the same lineage as the icon the script is executing on. |

This command returns a numeric value which is the port number. An example of how to use this command is shown in Table 25.

TABLE 25

%Port := PORT( OS)

QUEUE

This command starts/stops/resets a queue of OS printer console messages. A current message pointer in a script is set, reset, and cleared with the QUEUE command.

The ICS has one large message queue that holds all of the incoming printer console messages. In the preferred embodiment, the queue holds the most recent 6500 messages. The oldest message is discarded when a new message is added (i.e., a circular message queue). Each script has multiple current message pointers into the message queue. The message pointers are set and reset with the QUEUE command and advanced with the READMSG command. The next message in a queue is retrieved with the READMSG command. QUEUE only creates a queue for OS printer console messages. If a port is specified, it must be an OS printer console port. If a port is not specified, the script must be executing on an OS icon. Only QUEUE ( RESET) a queue that has had the QUEUE( ON) command activated on it.

The syntax for the command is:

QUEUE(Operation{, Port})

where,

| | |
|---|---|
| Operation | Numeric Expression. Determines how a current message pointer is manipulated. Table 26 shows some possible QUEUE command operation parameter options. |

TABLE 26

| Operation Constant | Description |
|---|---|
| ON | Creates a message queue in the script by creating a current message pointer. The current message pointer is set to the end of the messages - the next new message received will be the first message in the script's queue (and the next message read with the READMSG command) |
| RESET | A current message pointer is set to the end of the messages, thereby quickly skipping any remaining messages (unread with the READMSG command) in the script's queue. This is the same as executing:<br>QUEUE( OFF)<br>QUEUE( ON) |
| OFF | Turns off a message queue in the script by removing the current message pointer for the queue. |
| Port | Numeric expression. Optional. The assigned OS printer console port number the to create a queue for. If not specified, a queue is created for the OS printer console the script is executing on. |

No values are returned by this command. An example of how to use this command is shown in Table 27.

TABLE 27

QUEUE( ON)
QUEUE( RESET)
QUEUE( OFF)

READMSG

This command reads the next message from a script's message queue. The next message is defined by a script's current message pointer created with the QUEUE command. The entire message is placed in the array specified by the $MSG array parm. Each word in the message is placed sequentially by position into the array's elements ($Msg[ 1] contains the 1st word, $Msg[ 2] contains the 2nd word, $Msg[ 3] contains the 3rd word, etc.). When the queue is empty, the READMSG command acts as specified by the Wait and *Timeout parms.

In the preferred embodiment, the QUEUE( ON) must be executed before the READMSG command. READMSG only reads OS printer console messages. If a port is specified, it must be an OS printer console port. If a port is not specified, the script must be executing on an OS icon.

The syntax for the command is:

READMSG($Msg, Wait, *Timeout{, Port} {, Filter})

where,

| | |
|---|---|
| $Msg | Normal string array. The array to populate with each word from the message. Each array element will hold one word. The words are split up by "white space" - one or more space characters. |
| Wait | Numeric expression. The number of seconds to wait before timing out. When the queue is empty, this number specifies how long the command waits for a message. |
| *Timeout | Label. The label to jump to when the READMSG command times out. |
| Port | Numeric expression. Optional. The OS printer console to read a message from. A queue must already have been created for the specified port with the QUEUE() command. If not specified, a message is |

-continued

| | |
|---|---|
| | read from the default queue (the OS printer console the script is executing on). |
| Filter | String Expression. Optional. The text in this string acts as filter criteria - the criteria text must be in the console message in order for READMSG to receive it. Messages will only "appear" to READMSG if they contain the criteria text. It should be noted that a filter value of null string "" is the same as omitting the Filter parm. |

No values are returned by this command. An example of how to use this command is shown in Table 28.

TABLE 28

```
//=====================================================
// Example 1
//=====================================================
QUEUE( ON)                       //turn on queuing
*READ:
READMSG($Msg, 1800, *TIMEOUT)
//check first word for IO err
IF $MSG[ 1] == "IOS000I"
IOERROR()        //call IO err handling script
ENDIF
GOTO *READ       //repeat process continually
*TIMEOUT:
LOG( FLT, "No messages in 3 minutes!")
GOTO *READ
//=====================================================
// Example 2
//=====================================================
%PortPrnSys5 := PORT( PRN, "SYS5")
QUEUE( ON, %QueueSys5)
READMSG( $Msg, 30, *TIMEOUT, %PortPrnSys5)
```

SCANB

This command is similar to the SCANP command except for its use with the BLOCKSCAN command.

The syntax for the command is:
SCANB(Port, Text, *Found)
where,

| | |
|---|---|
| Port | Numeric expression. The assigned console port number to scan. |
| Text | Regular expression. The text expression to scan for in the console. |
| *Found | Label literal. The label to jump to when the Text parm is found within the time limit specified by the Wait parm in the BLOCKSCAN command. |

SCANP

This command searches a console for a specified character string. Script execution can branch based on whether or not the scan was successful within a specified time limit. If found within the number of seconds specified by the Wait parm, script execution continues with the next statement. If not found within the number of seconds specified by the Wait parm, script execution jumps to the label specified by the *Timeout parm.

It should be noted that the position of the scan text on the console and character attributes (e.g. only highlighted characters) cannot be specified. In addition, SCANP is not for scanning the printer console. Instead, the READMSG command can be used for reading the printer console.

The syntax for the command is:
SCANP(Port, Text, Wait, *Timeout{, $ $Array})
where,

| | |
|---|---|
| Port | Numeric expression. The assigned console port number to scan. |
| Text | Regular expression. The text expression to scan for in the console. |
| Wait | Numeric expression. The number of seconds to wait before timing out when the Text parm is not found. This number specifies how long the command waits for the scan to be successful. |
| *Timeout | Label literal. The label to jump to when the Wait time expires. |
| $Array | Normal string array. Optional. The array to populate with subexpression results, if any, from the Text parm. Each array element will contain one subexpression result - element one will hold the result for subexpression one, element two will hold the result for subexpression two, etc. The subexpressions are "numbered" from left to right in the Text parm. $Array is only populated when the Text parm contains subexpressions and the scan text is found. |

In the preferred embodiment, only the first 9 subexpression results can be returned; however, it will be appreciated by those skilled in the art that provisions for returning more or less results could be devised without departing from the scope and spirit of the present invention.

SCRNTEXT

This command returns characters from a console screen. The characters begin at absolute position Start and continue for Length on the console represented by Port are returned.

The syntax for the command is:
SCRNTEXT(Port, Start, Length) ==> $Text
where,

| | |
|---|---|
| Port | Numeric expression. The assigned console port number. |
| Start | Numeric expression. The absolute position to begin copying characters from the console. The minimum value is 1 and the maximum value is the console's row quantity * its column quantity. |
| Length | Numeric expression. The quantity of characters to copy from the console. The minimum value is 1 and the maximum value is the console's row quantity * its column quantity less the Start parm. |

This command returns a string value. The characters are copied from the console.

TEMP

This command reads the current temperature from a sensor unit. The temperature value is read from the sensor unit connected to the specified port.

The syntax for the command is:
TEMP(Port) ==> %Temp
where,

| | |
|---|---|
| Port | Numeric expression. The assigned sensor port number to which the sensor is connected. |

This command returns a numeric value of the current temperature reading. An example of how to use this command is shown in Table 29.

TABLE 29

%Temp := TEMP( 2)
LOG( CONS, "TEMP 2 = " + STR( %Temp))

Figure 21:
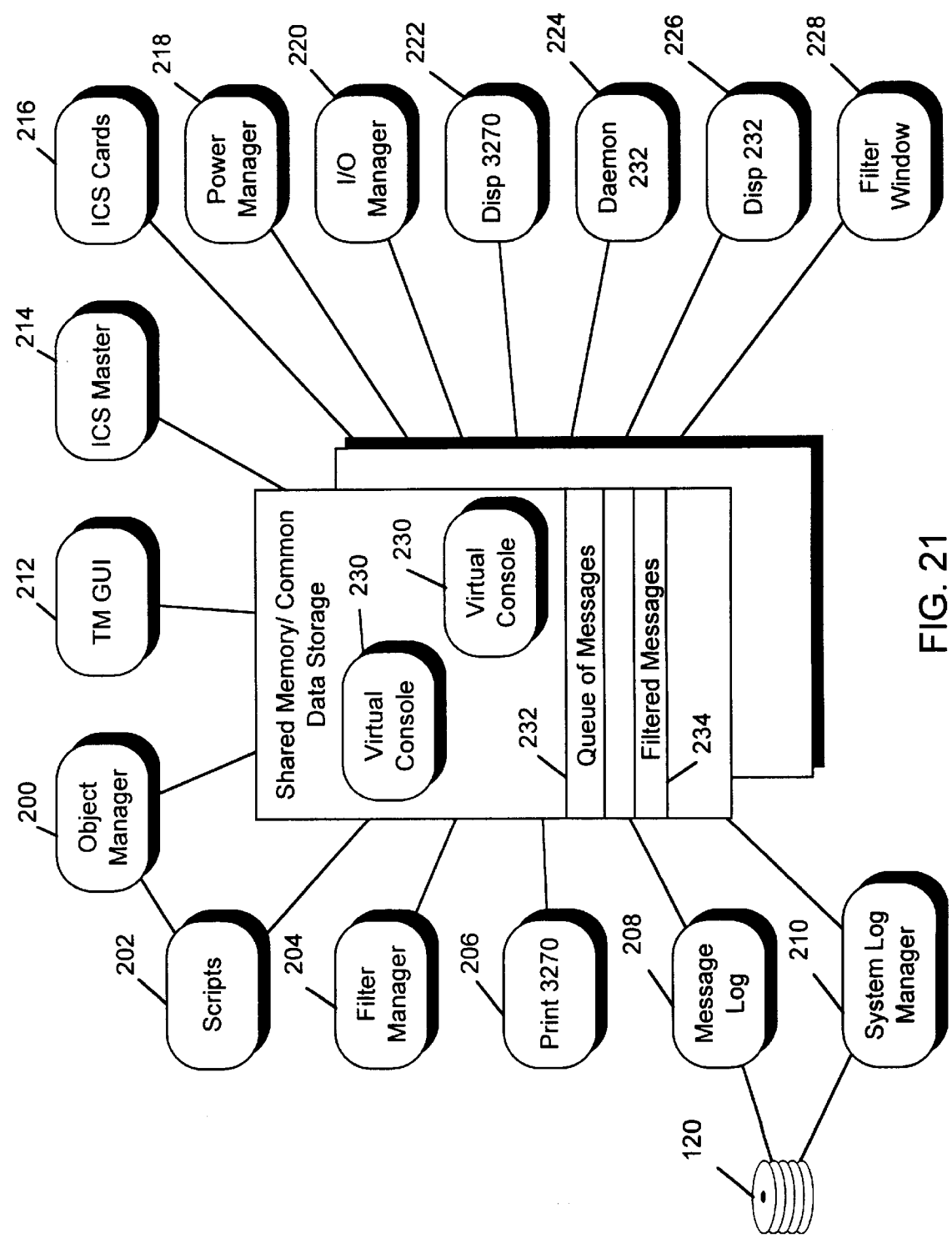
FIG. 21 is a high level overview of the interactions of various daemon processes and functions which implement the preferred embodiment monitoring and control system shown in FIG. 1.

Turning now to FIG. 21, a high level description of the UNIX®-based daemons and functions which implement a preferred embodiment ICS 100. These daemons and functions are described in detail in reference to the flowcharts shown in FIGS. 22–74. The shared memory 114 (i.e., the common data storage) preferably consists of RAM which is accessed by many of the daemons whenever data needs to be retrieved for processing by an individual daemon or updated in the shared memory. In addition, long term storage is provided by one or more hard disk drives interfaced through the message log 208 and system log manager 210. The message log 208 is described in more detail in the following description in reference to FIG. 52. Similarly, the description below for FIG. 64 describes the system log manager 210.

This shared memory 114 also holds copies of or "virtual" consoles 230 for each of the mainframe or other computer system consoles which are being monitored by the ICS 100. By being placed in this shared memory 114, the data within the virtual consoles can displayed at will on a computer monitor or filtered for monitoring information such as error conditions. In addition, the shared memory 114 includes a queue of messages 232 being sent to the ICS 100 and a set of filtered messages 234 which have been processed or filtered by one or more daemons.

Figure 54A:
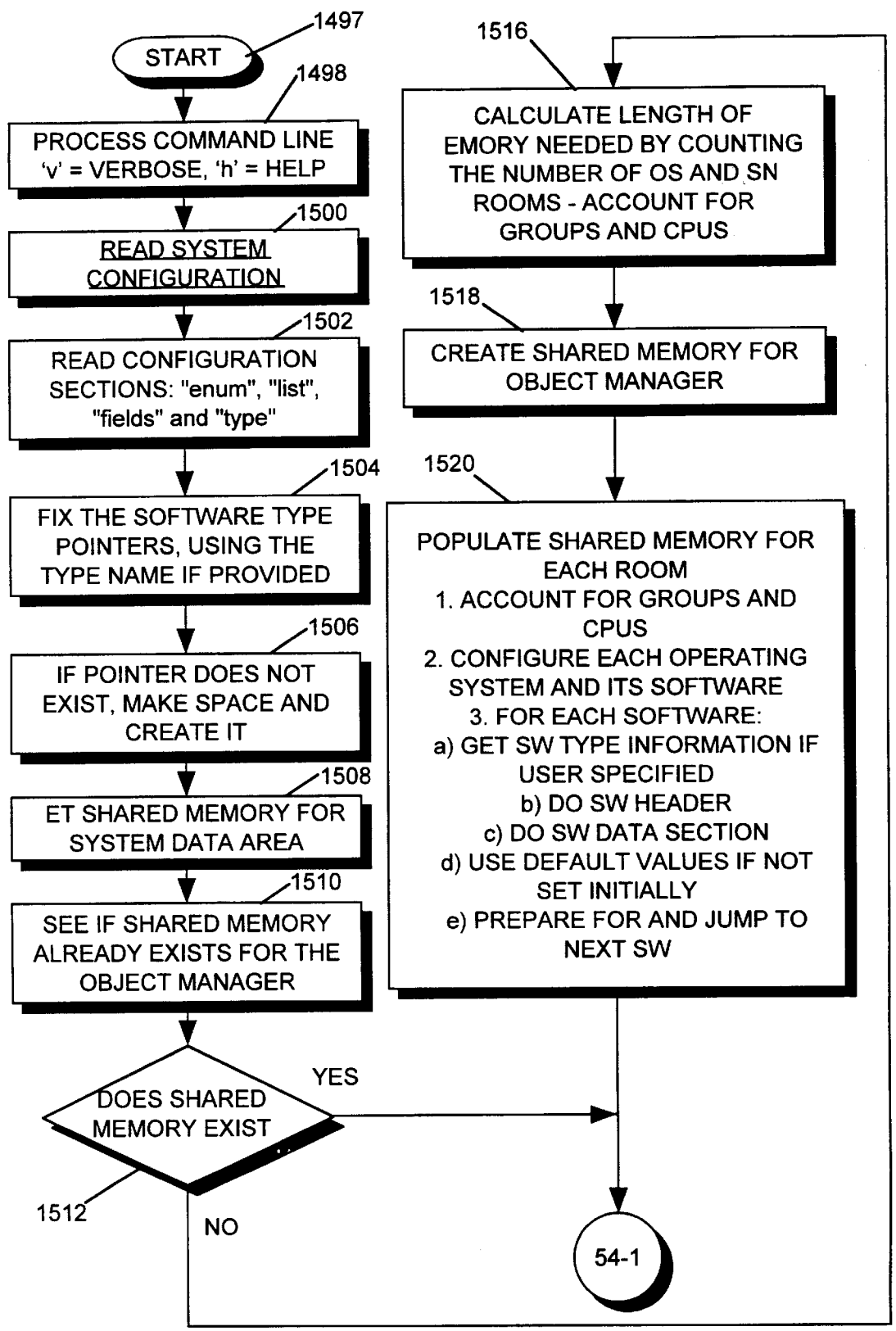
Figure 54B:
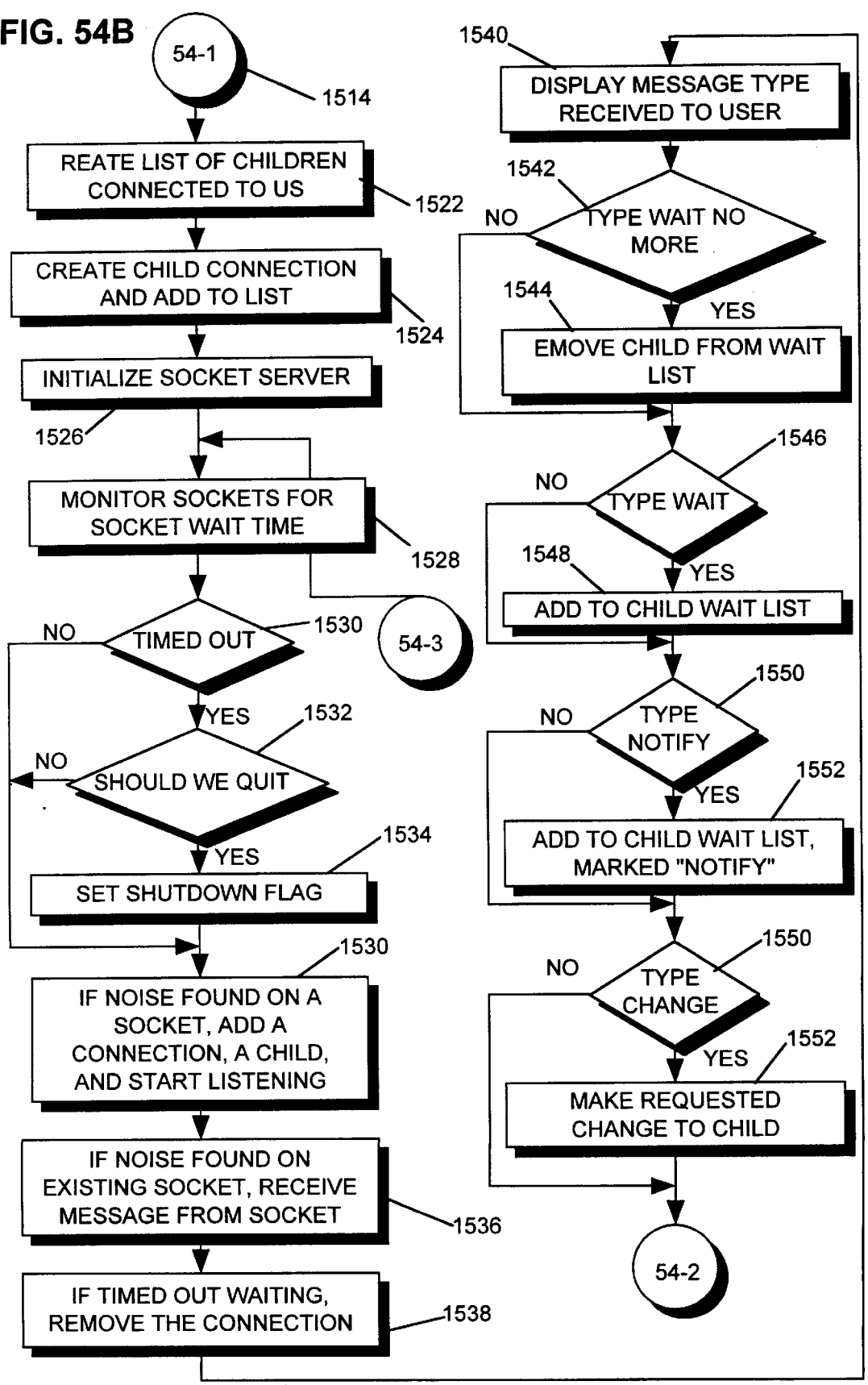
Figure 54C:
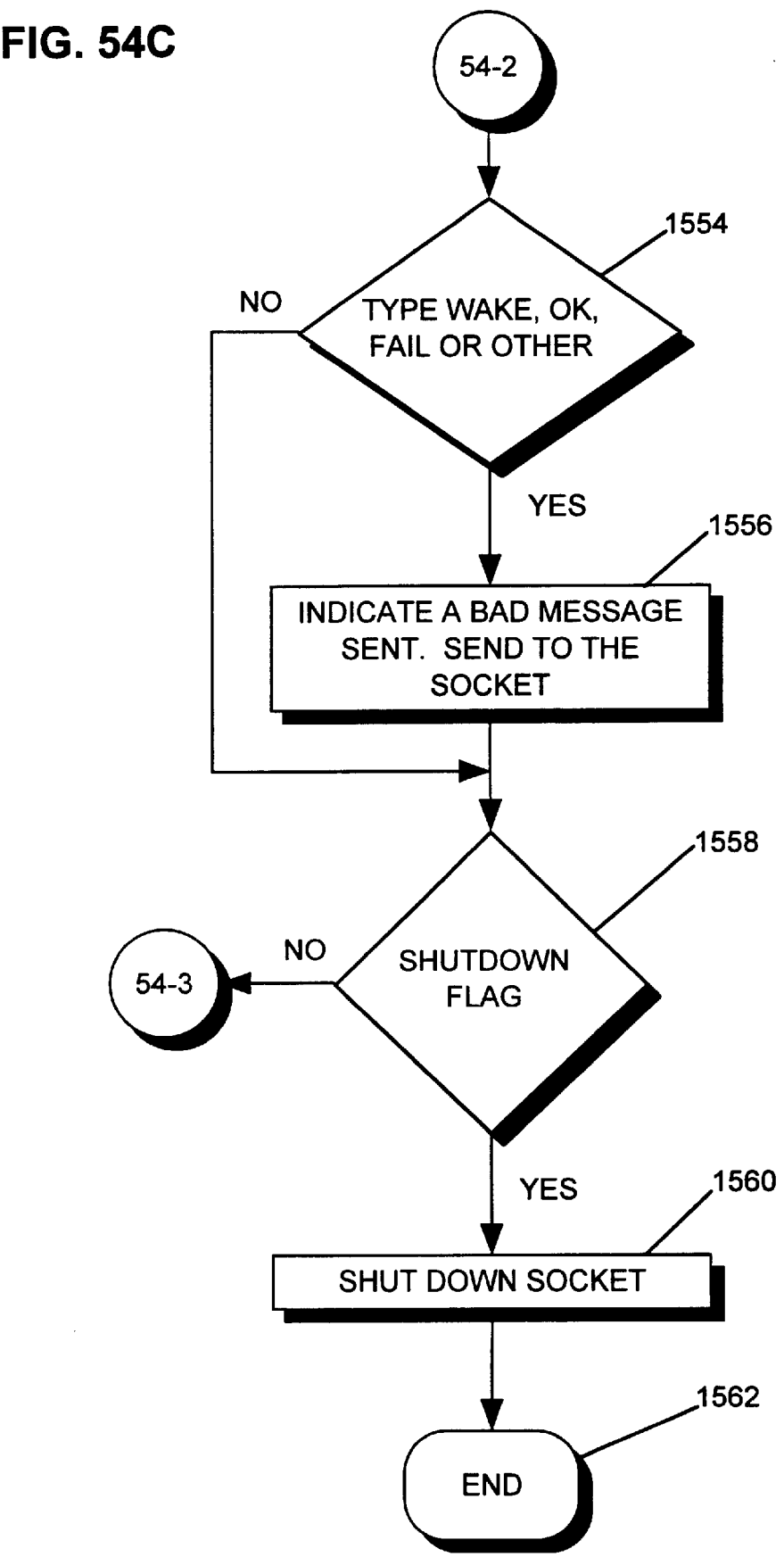
Figure 62A:
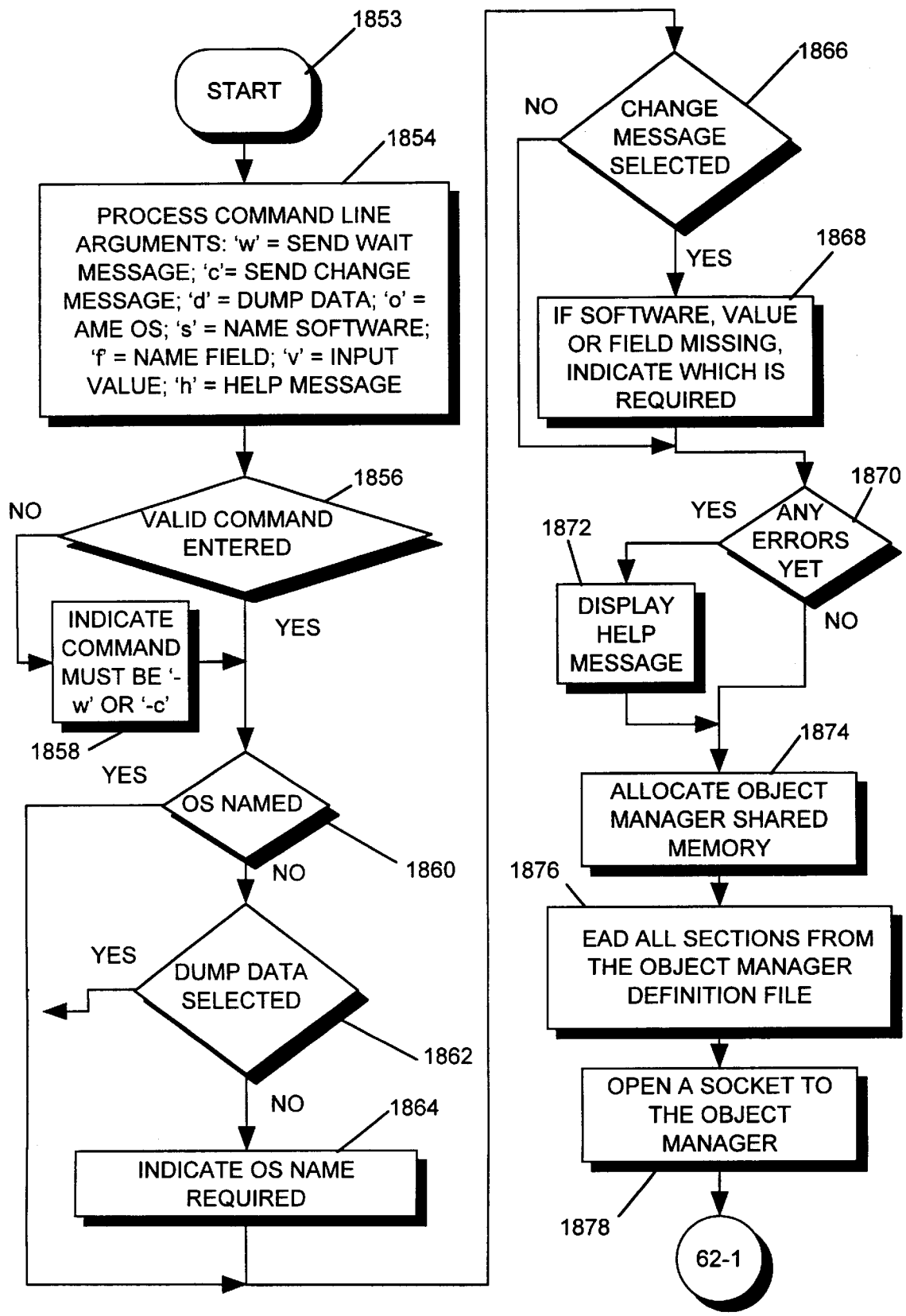
Figure 62B:
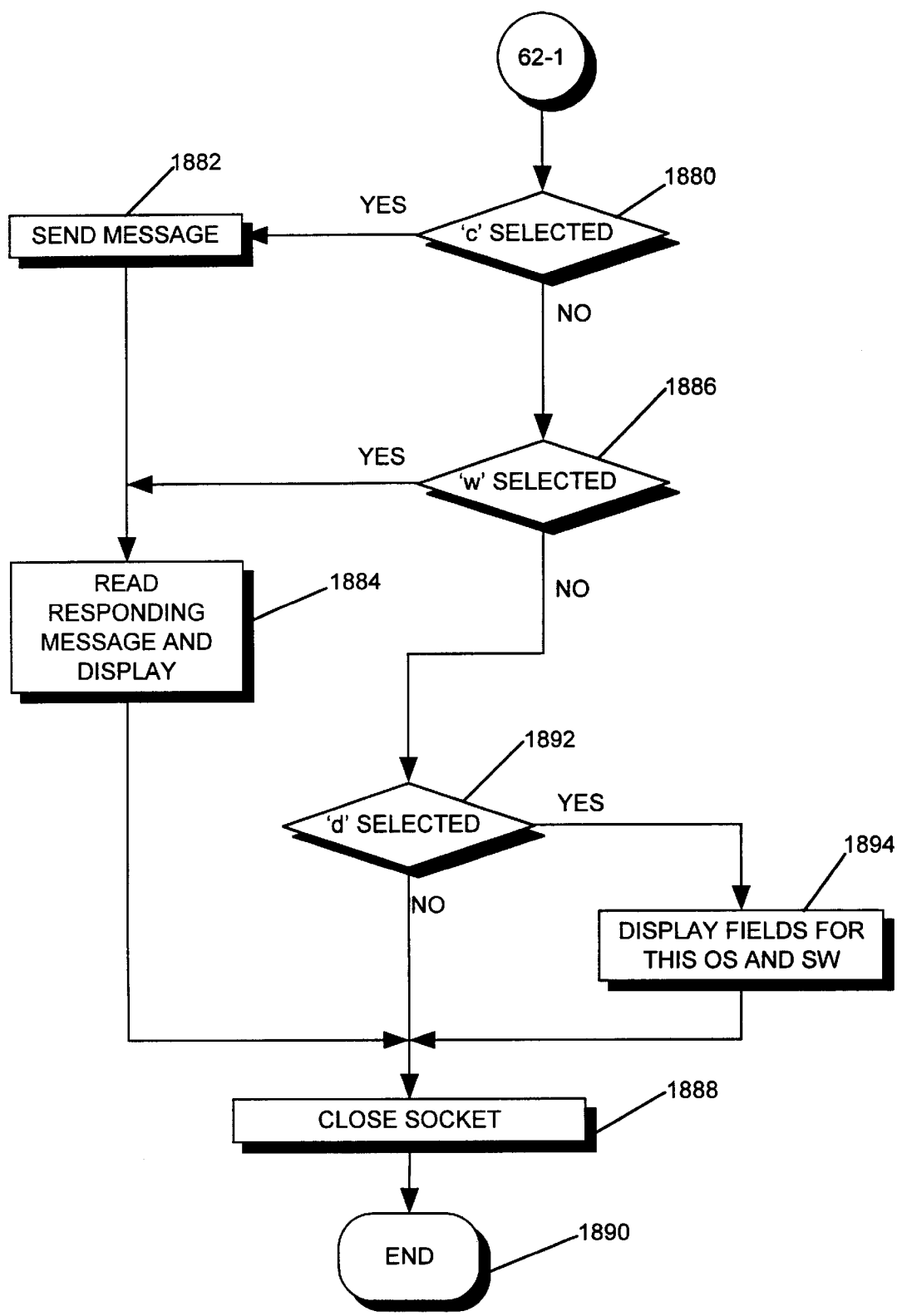

FIGS. 54 and 62, provide some details on the operations of the object manager 200. The object manager 200 interacts with other function and daemons in part through user input provided via the task manager graphic user interface 212 and the script manager 202. The script manager is described in some detail in reference to FIGS. 42, 44, and 60. The interactions of the object manager 200 and the script manager 202 are so closely intertwined that in the preferred embodiment a means of direct communication between the two daemons (i.e., UNIX® processes) is provided. However, like all other daemons in the ICS 100 communications between the two daemons may also be done via the shared memory 114 where data is placed in the shared memory 114 by one daemon and then copied out again by another daemon.

Figure 51:
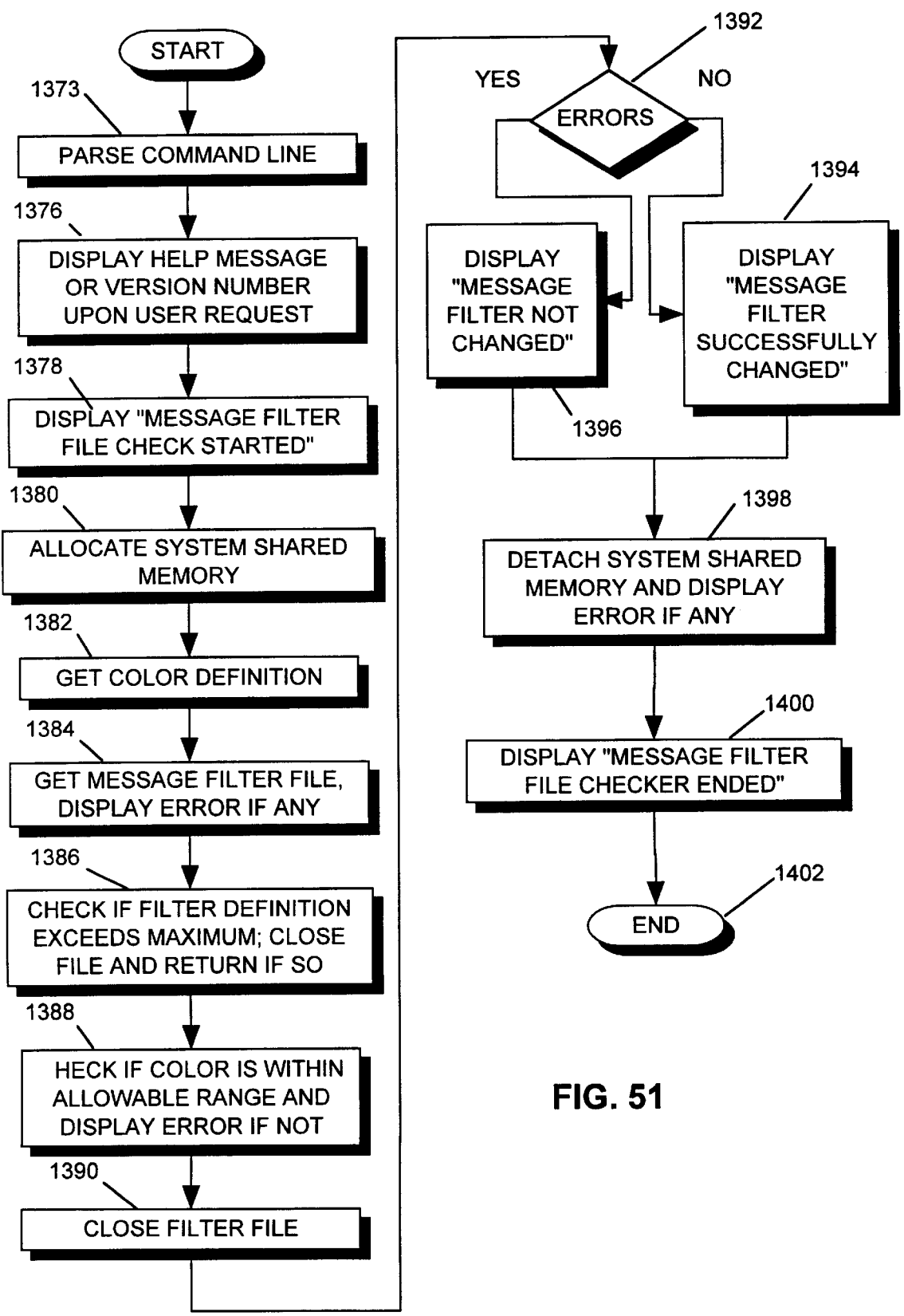

The filter manager 204 is described in reference to FIGS. 50 and 51. The print 3270 daemons 206 are described in reference to FIGS. 33 and 57. The main or master ICS control daemon 214 is described in reference to FIG. 45. The power manager 218 is described in reference to FIG. 56. The I/O manager 220 is described in reference to FIG. 34. The display manager 222 for a 3270 terminal is described in reference to FIG. 37. The operations of an RS-232 display 226 and I/O 224 are described in reference to FIGS. 22, 23, and 58. The filter window or display 228 is described in reference to FIG. 39.

These and other daemons or functions are described below.

Figure 22:
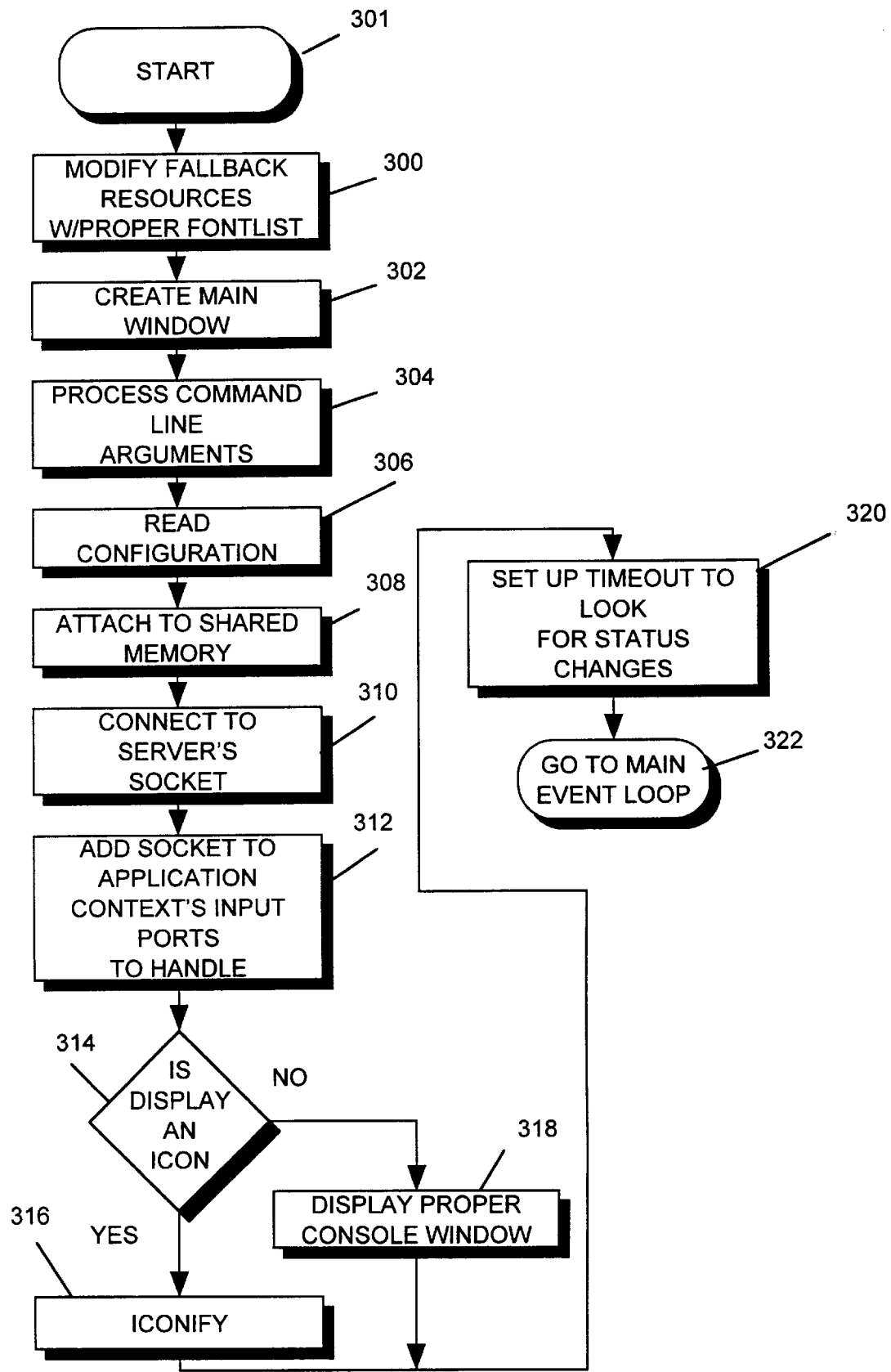
FIGS. 22 through 74 are flowcharts detailing a preferred embodiment daemon processes and functions for implementing the preferred embodiment monitoring and control system shown in FIG. 1.

Referring first to FIG. 22, there is shown a method for displaying the RS-232 screens. First, the fallback resources are modified 300 to contain the proper font list. The main window is created 302. The arguments on the command line are processed 304. The configuration is read 306. The module is attached 308 to the shared memory. The module is connected 310 to the server's socket. The socket is added 312 to the application context import ports for handling. The display is checked 314 to see if it is an icon. If it is, then the screen is iconified 316. Alternatively, the proper console window is displayed 318. A time out is prepared 320 to look for any changes in the status of the RS-232 screens. Finally, the main event loop is called 322.

Figure 23:
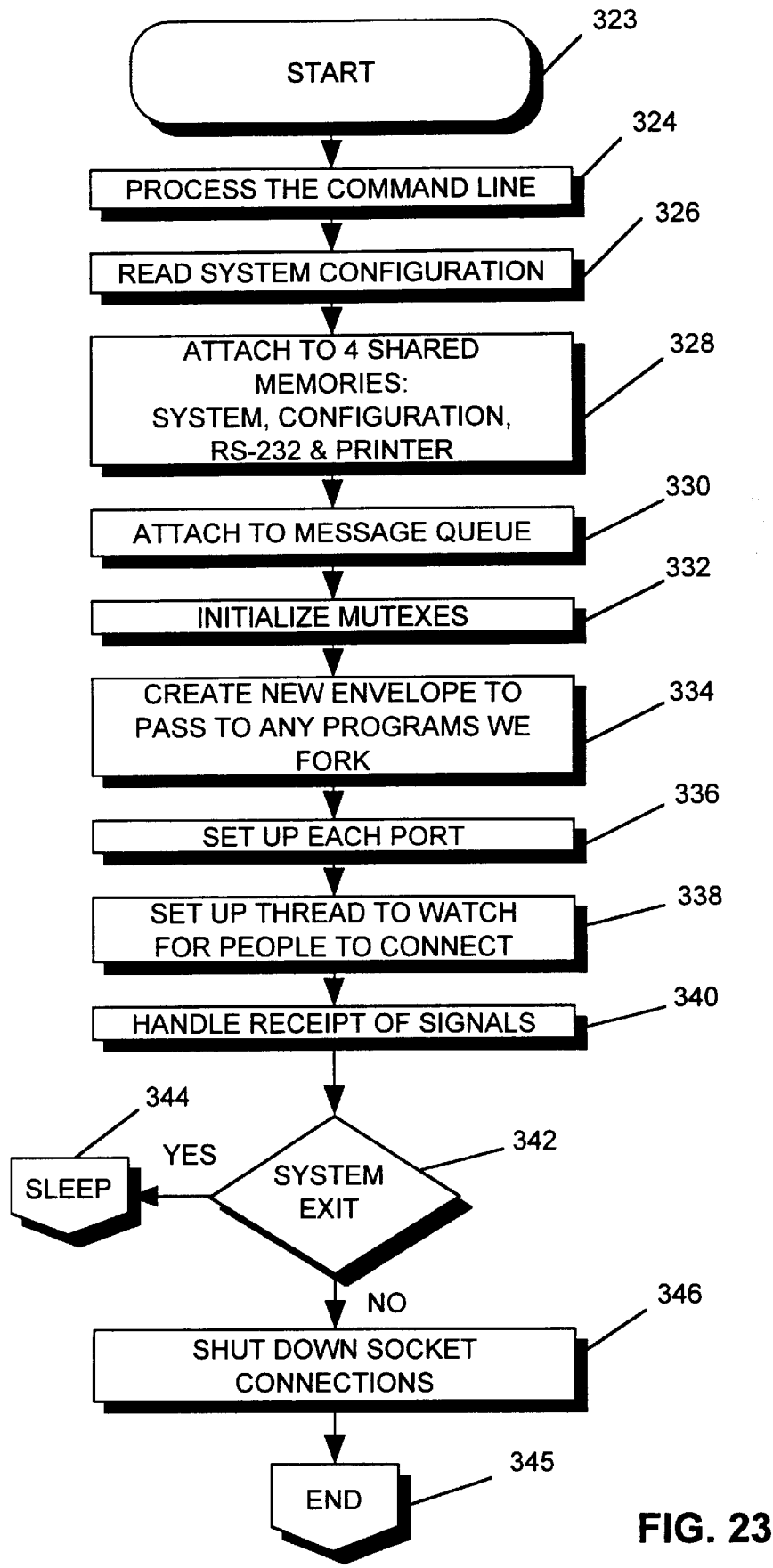

Referring now to FIG. 23, there is shown a method for operating an RS-232 I/O handler for the ICS system. First, the command line is processed 324. The system configuration is read 326. The module is attached 328 to four shared memories: system shared memory, configuration shared memory, RS-232 shared memory and printer shared memory. The module is attached to the message queue 330. Then the mutexes are initialized 332. Then a new envelope is created 334 through which any programs that the module forks are passed. Each port is set up 336. The thread is set up 338 to watch for people to connect. Receipt of incoming signals is handled 340. If it is time for system exit 342 the module goes to sleep 344. Alternatively, the socket connections are shut down 346.

Figure 24:
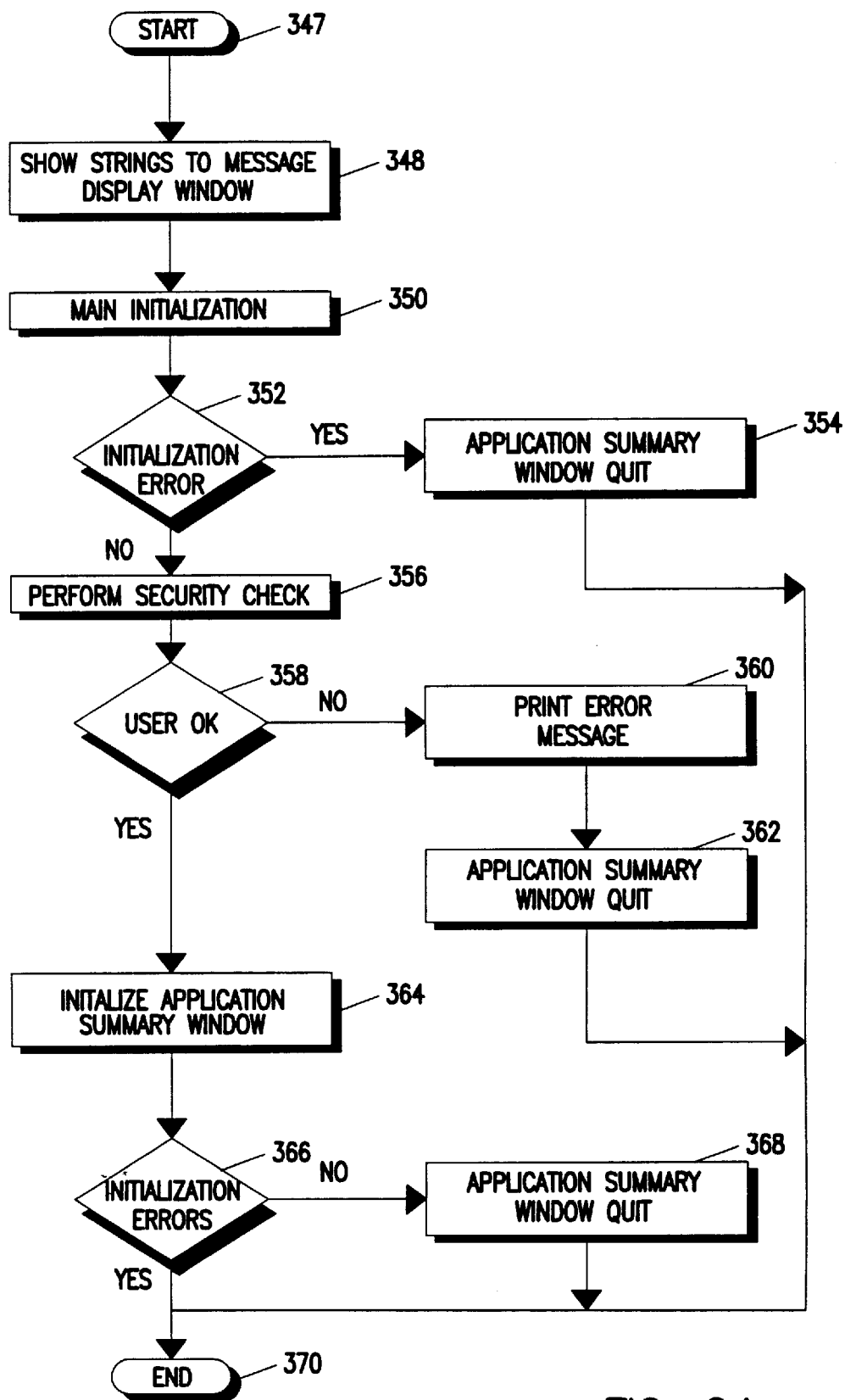

Referring now to FIG. 24, there is shown a method of displaying an application summary window. First, all strings are shown 348 to the message display window. The main initialization is performed 350. If there is an initialization error 352 the application summary window quits 354. Alternatively, a security check is performed 356 to assure the user has access to this module. If the user is not okay 358, an error message is printed 360 and the application summary window is exited 362. Alternatively, the application summary window is initialized 364. If there are any initialization errors 366, the application summary window is exited 368. Alternatively, the module ends 370.

Figure 25:
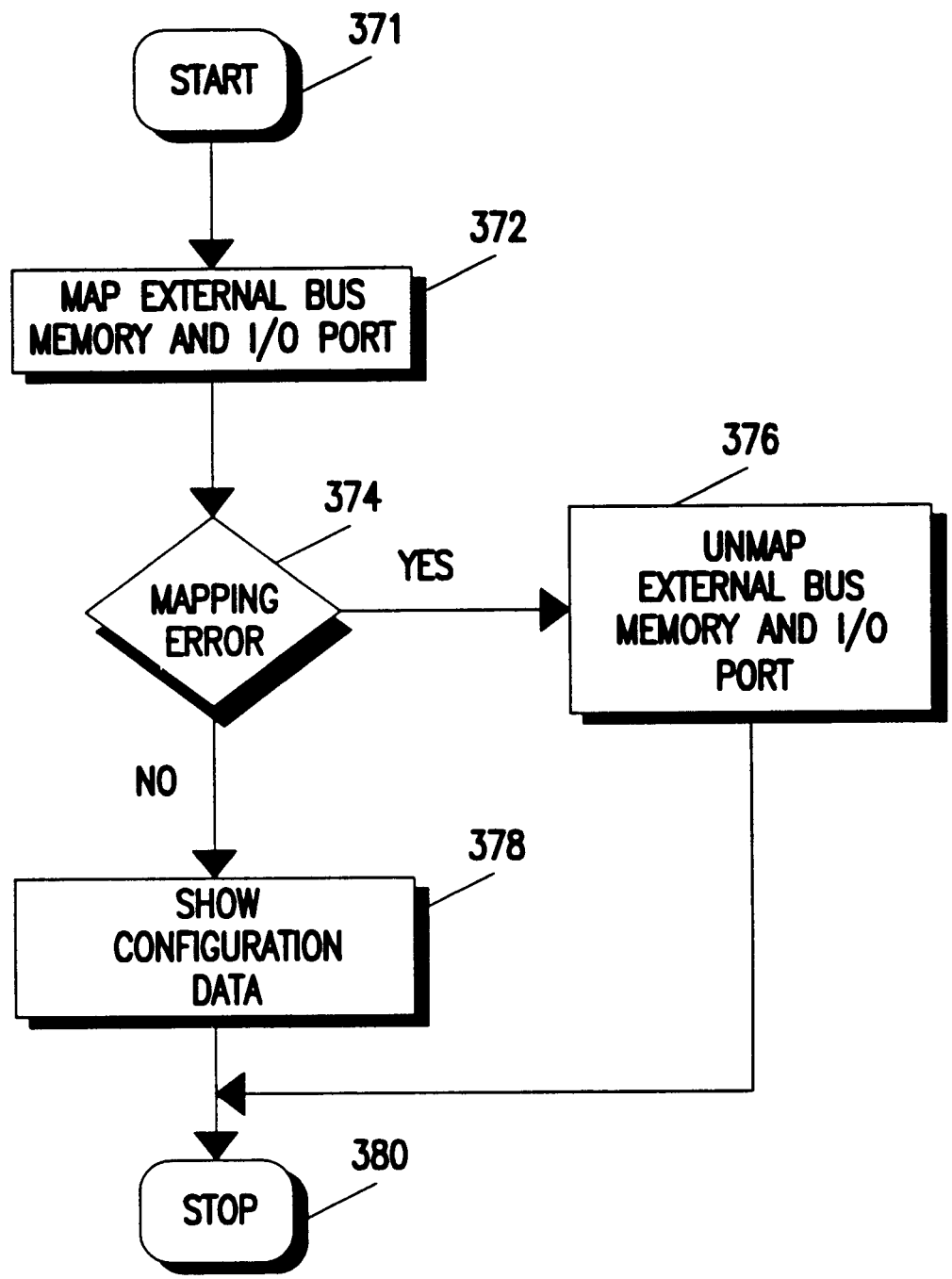

Referring now to FIG. 25, there is shown a method of configuring the I/O box. First, the external bus memory and the I/O port are mapped 372. If a mapping error is found 374, then the external bus memory and I/O ports are unmapped 376. Alternatively, the configuration data is shown 378 and the module ends 380.

Figure 26:
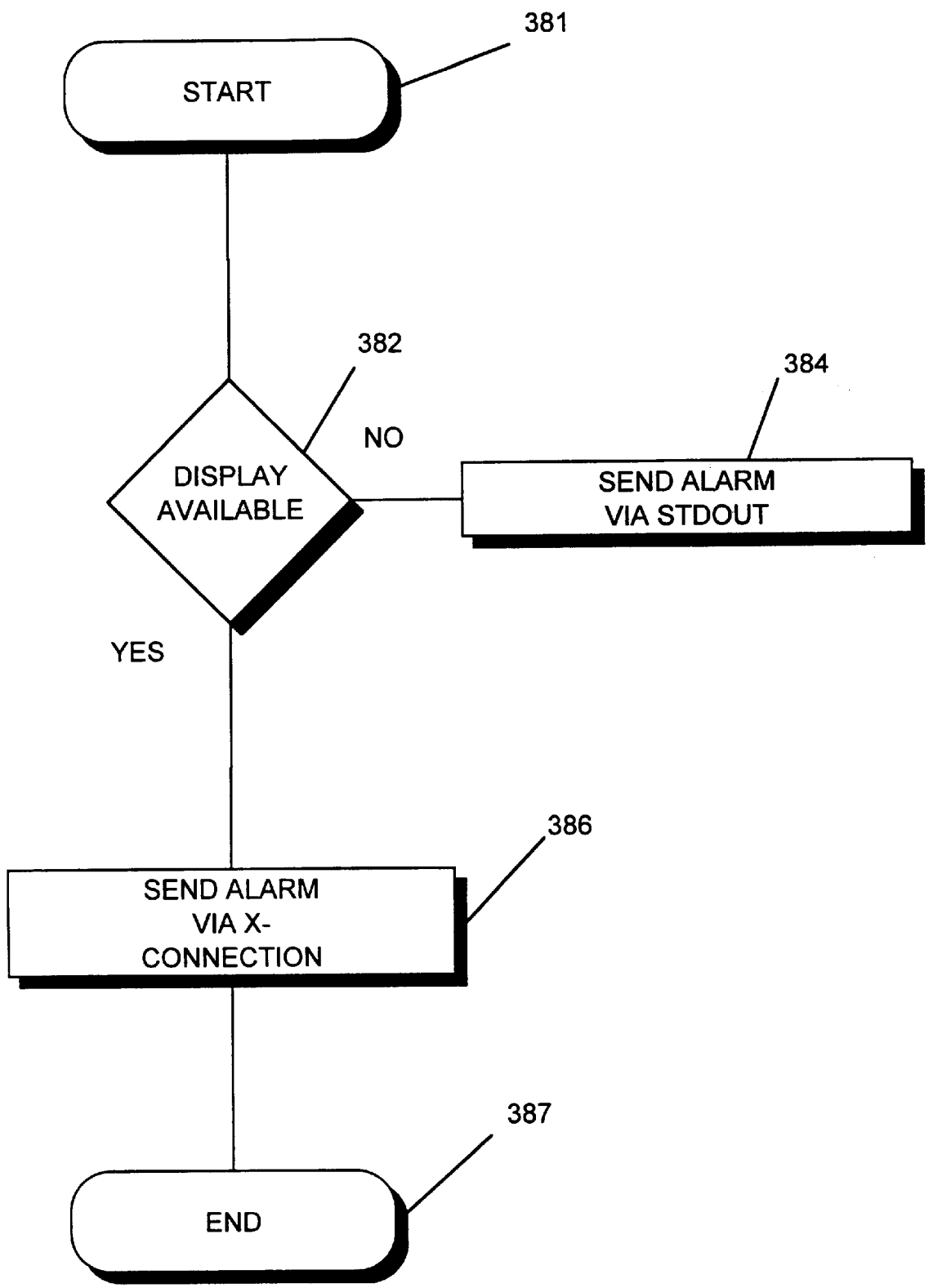

Referring now to FIG. 26, there is shown a method of triggering an alarm manager. First, if there is no display available 382 an alarm is sent 384 via STOUDT. Alternatively, an alarm is sent 386 via X connection.

Figure 27:
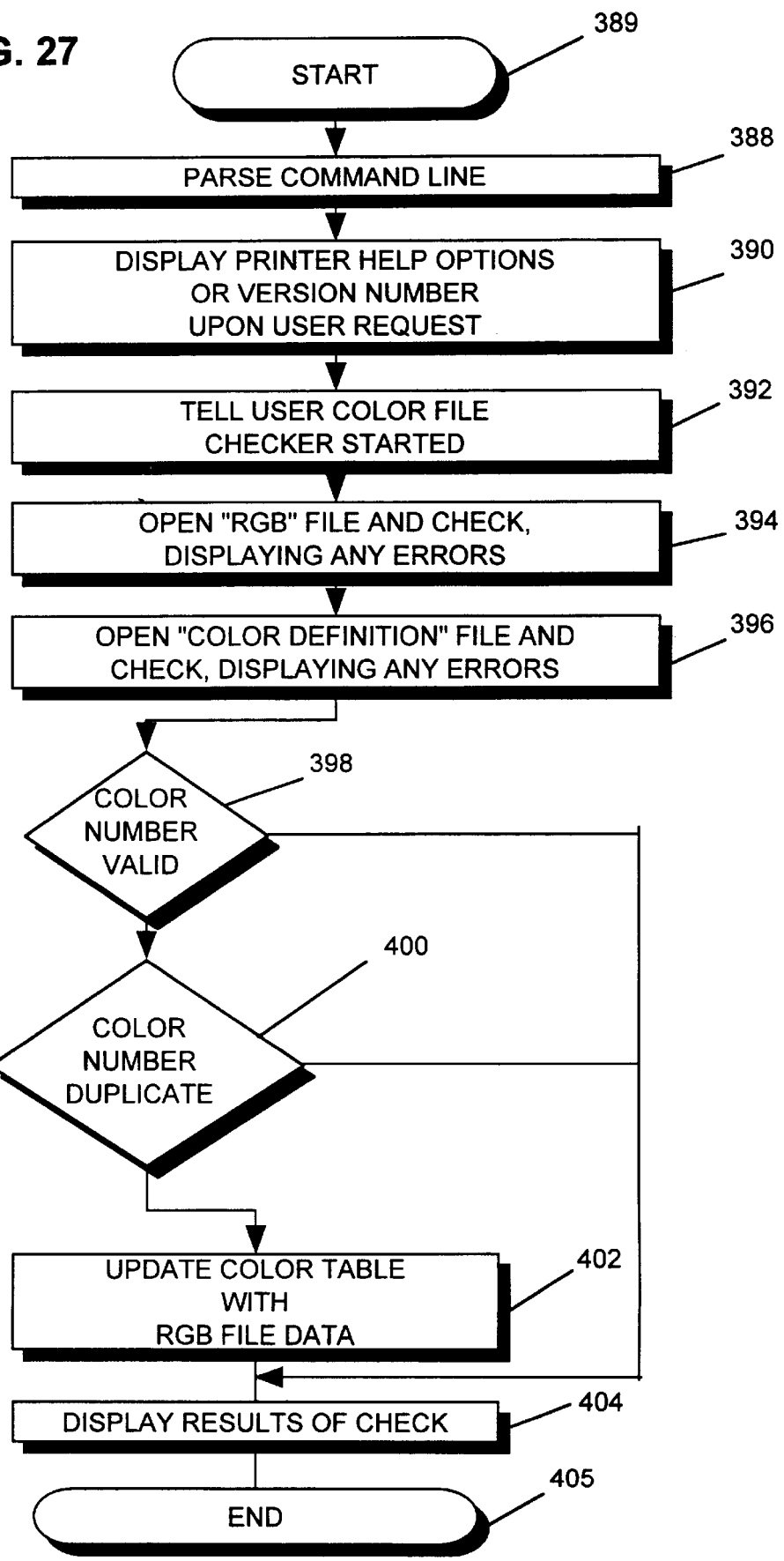

Referring now to FIG. 27, there is shown a method of checking the color scheme. First, the command line is parsed 388. Then, upon user request, either the printer help options or the version number of an alarm manger is displayed 390. The user is told 392 that the color file checker is started. The RGB file is opened 394 and checked, and any errors found are displayed 396. The color number requested is checked for validity 398 and it is checked for being a duplicate 400. If the color number is valid and is not a duplicate, then the color table is updated 402 with the data contained in the RGB file. In the event either the color number is not valid or the color number is a duplicate, then the color table is not updated with the RGB file data. In either case the results are displayed 404.

Figure 28:
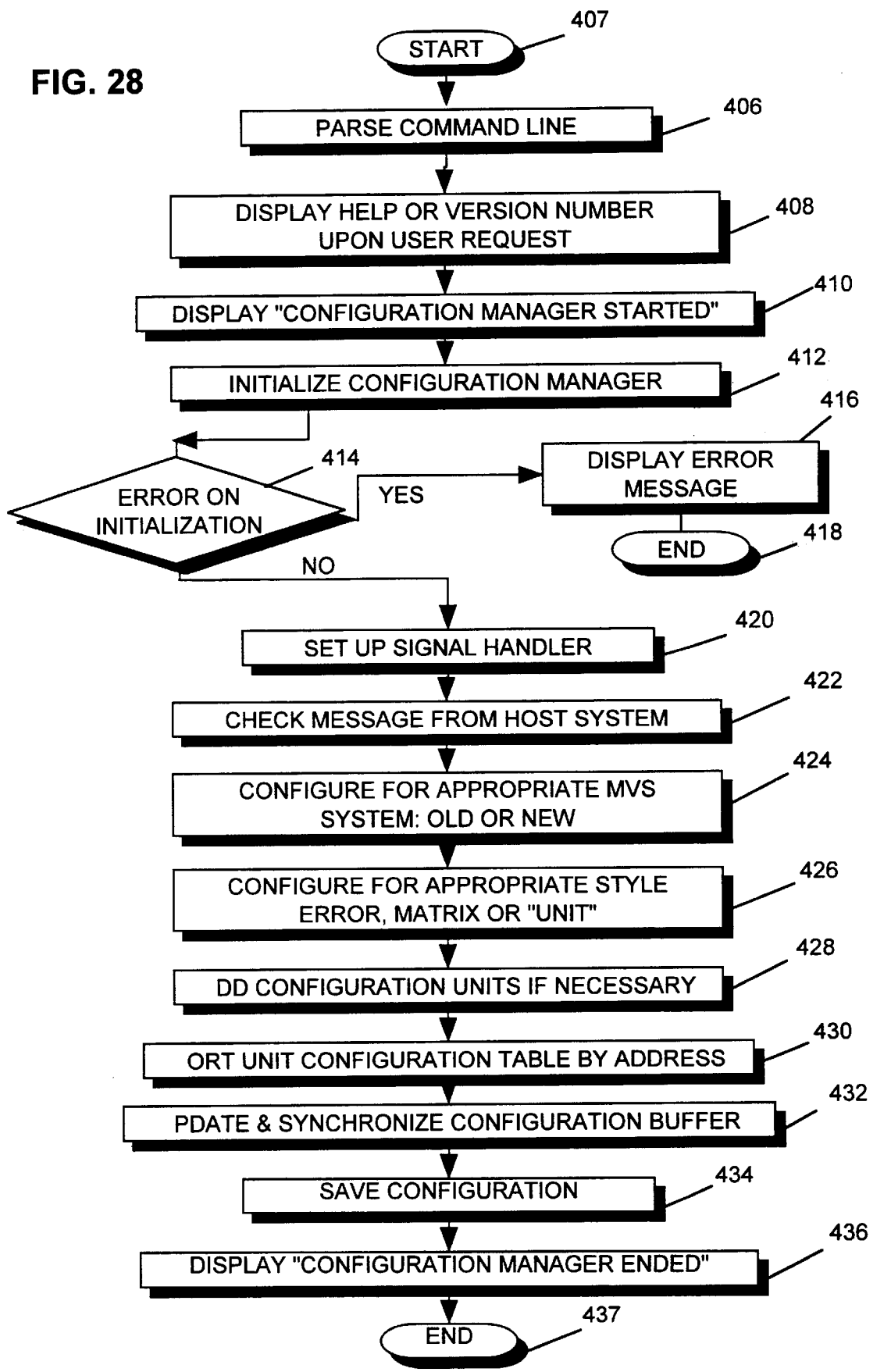

Referring now to FIG. 28 there is shown a method of operating the configuration manager. First, the command line is parsed 406. Upon user request, either the help message or aversion number is displayed 408. "Configuration Manager Started" is displayed 410. The configuration manager is initialized 412. If there was an error during initialization 414, an error message is displayed 416 and the module ends 418. Alternatively, a signal handler is set up 420. The message from the host system is checked 422. The system is configured 424 for the appropriate MVS system, whether it is old or new. The system is configured 426 for the appropriate style error, whether it is matrix or "unit". Configuration units are added 428 if necessary. The unit configuration table is sorted 430 by address. The configuration buffer is updated and synchronized 432. The configuration buffer is saved 434. "Configuration Manager Ended" is displayed 436.

Figure 29A:
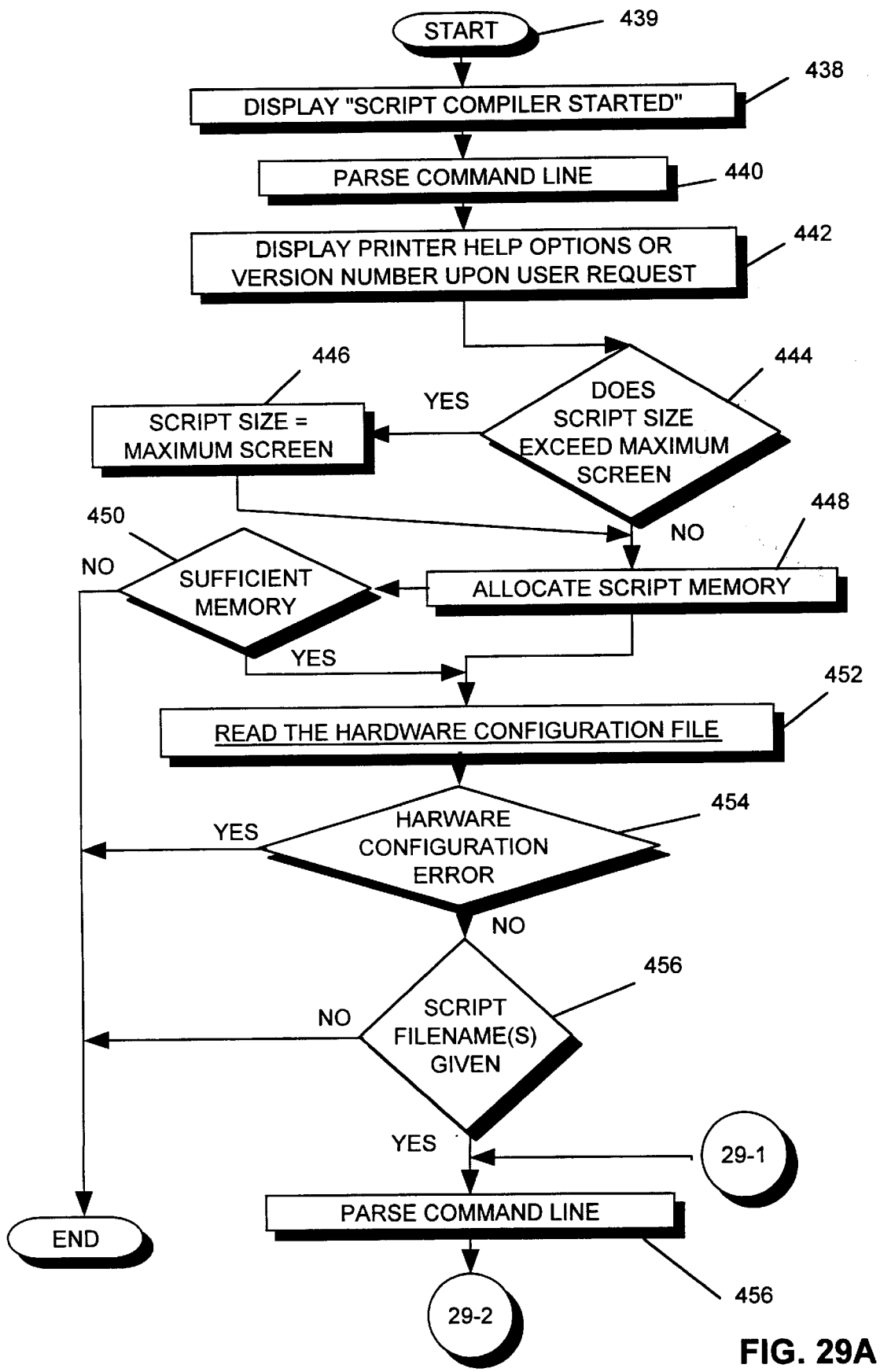
Figure 29B:
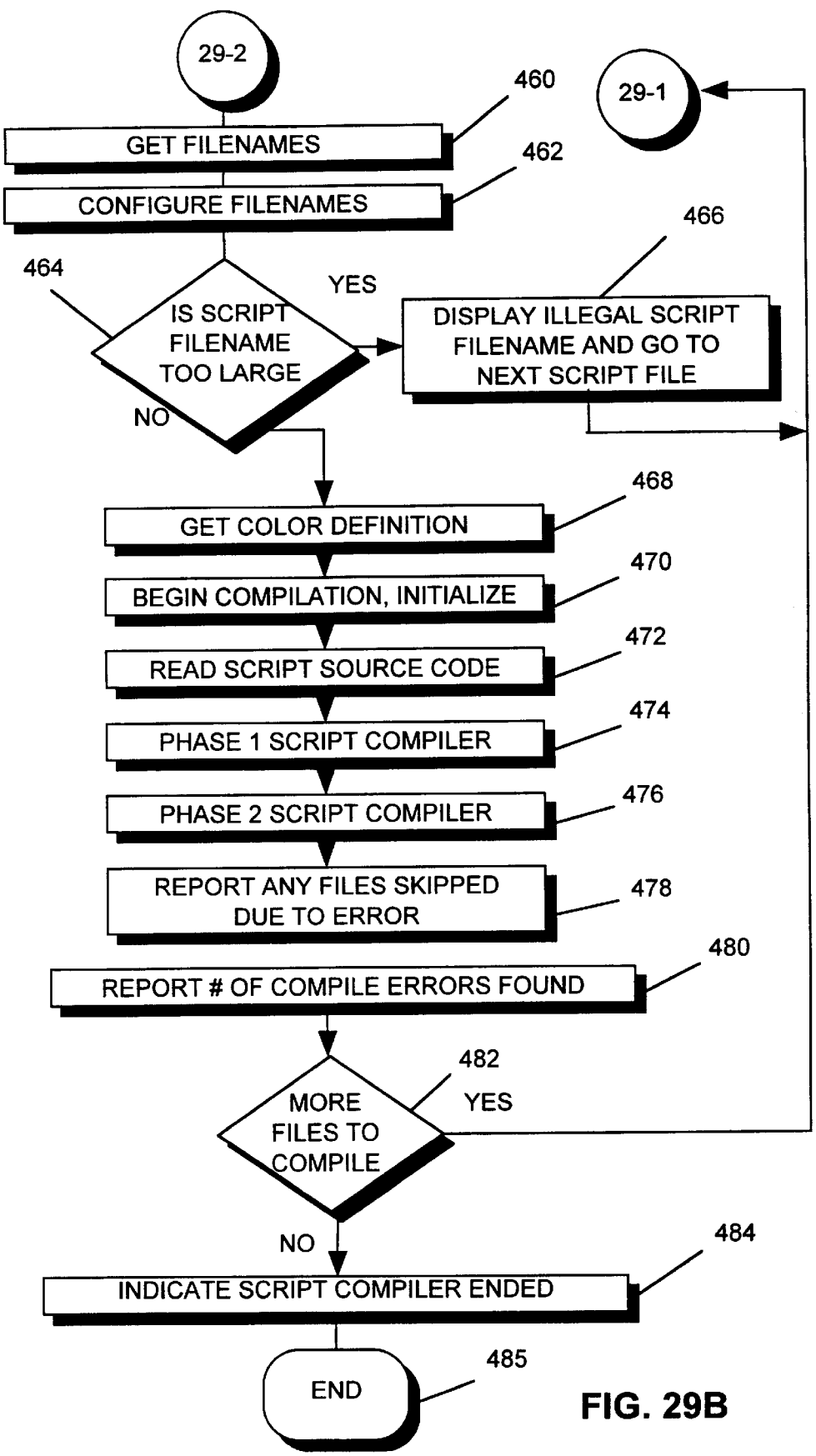

Referring now to FIG. 29, there is shown a module for compiling a script. First, "Script Compiler Started" is displayed 438. The command line is parsed 440. Upon user request, either printer help options or the version number is displayed 442. If the script size exceeds the maximum screen size 444, a message is displayed 446. Script memory is allocated 448. If there is insufficient memory 450 then the process is ended. Alternatively, the hardware configuration file is read 452. See FIG. 51. If there is a hardware configuration error 454, the module is ended. Alternatively, if the script file name is not given 456, then the module is ended. Alternatively, the command line is parsed 458. File names are obtained 460. File names are configured 462. If the script file name is too large 464, then "Illegal Script File Name" is displayed 466 and the next script file is loaded 466. Alternatively, the color definition is obtained 468. Compilation and initialization are begun 470. The script source code is read 472. Phase 1 of the script compiler is run 474. Phase 2 of the script compiler is run 476. Any file skipped due to an error are reported 478. The number of compiled errors found are reported 480. If there are more files to compile 482, the files are run through the above procedure from 458. Alternatively, the script compiler is ended and the user is so notified 484.

Figure 30:
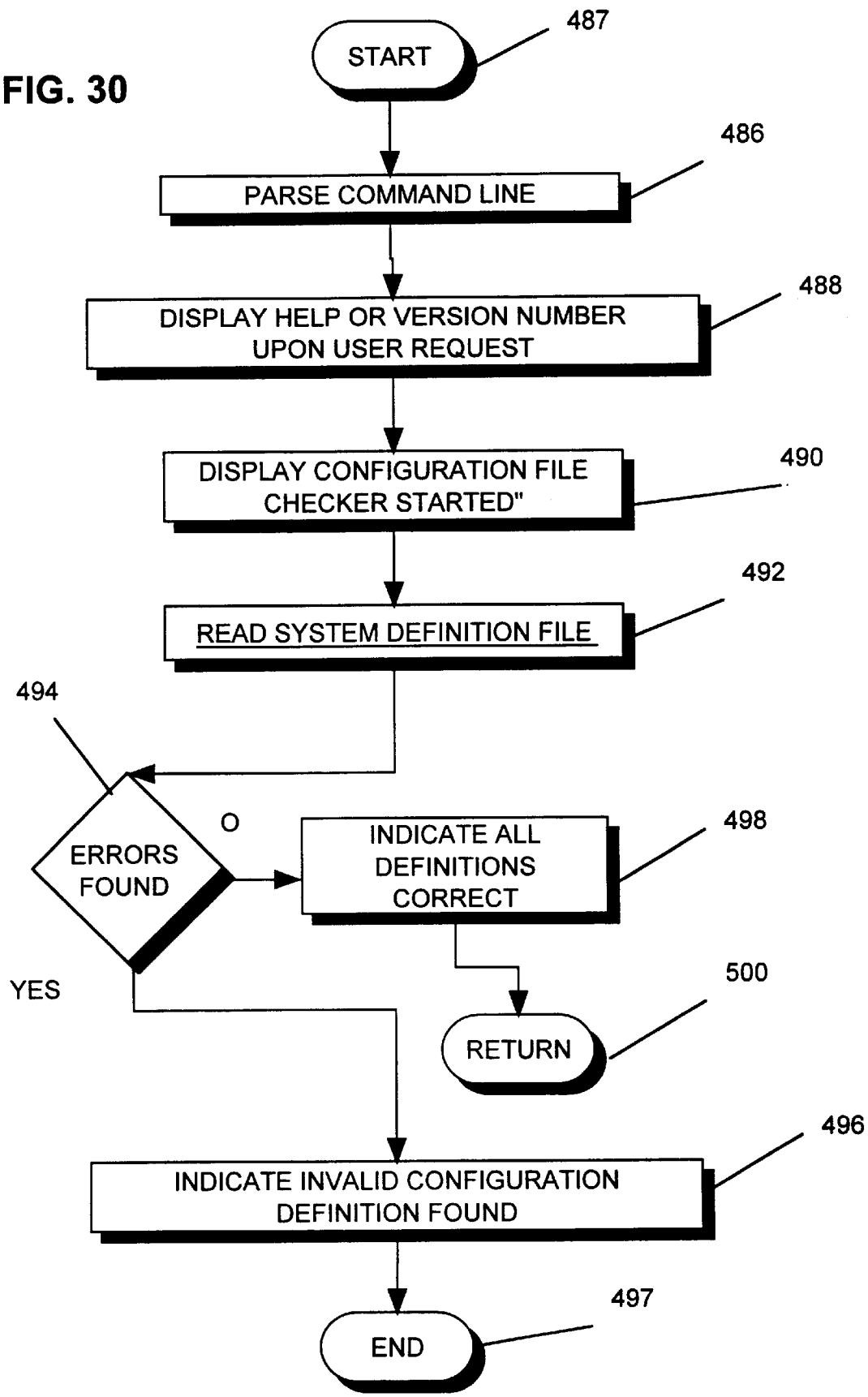

Referring now to FIG. 30, there is shown a module for checking the configuration file. First, the command line is parsed 486. The help message or version number is displayed 488. The message "Configuration File Checker Started" is displayed 490. The system definition file is read 492 (see FIG. 50). If errors are found 494, then it is indicated 496 that an invalid configuration definition is found. Alternatively it is indicated 498 that all definitions are correct and the module returns 500 to the calling function.

Figure 31:
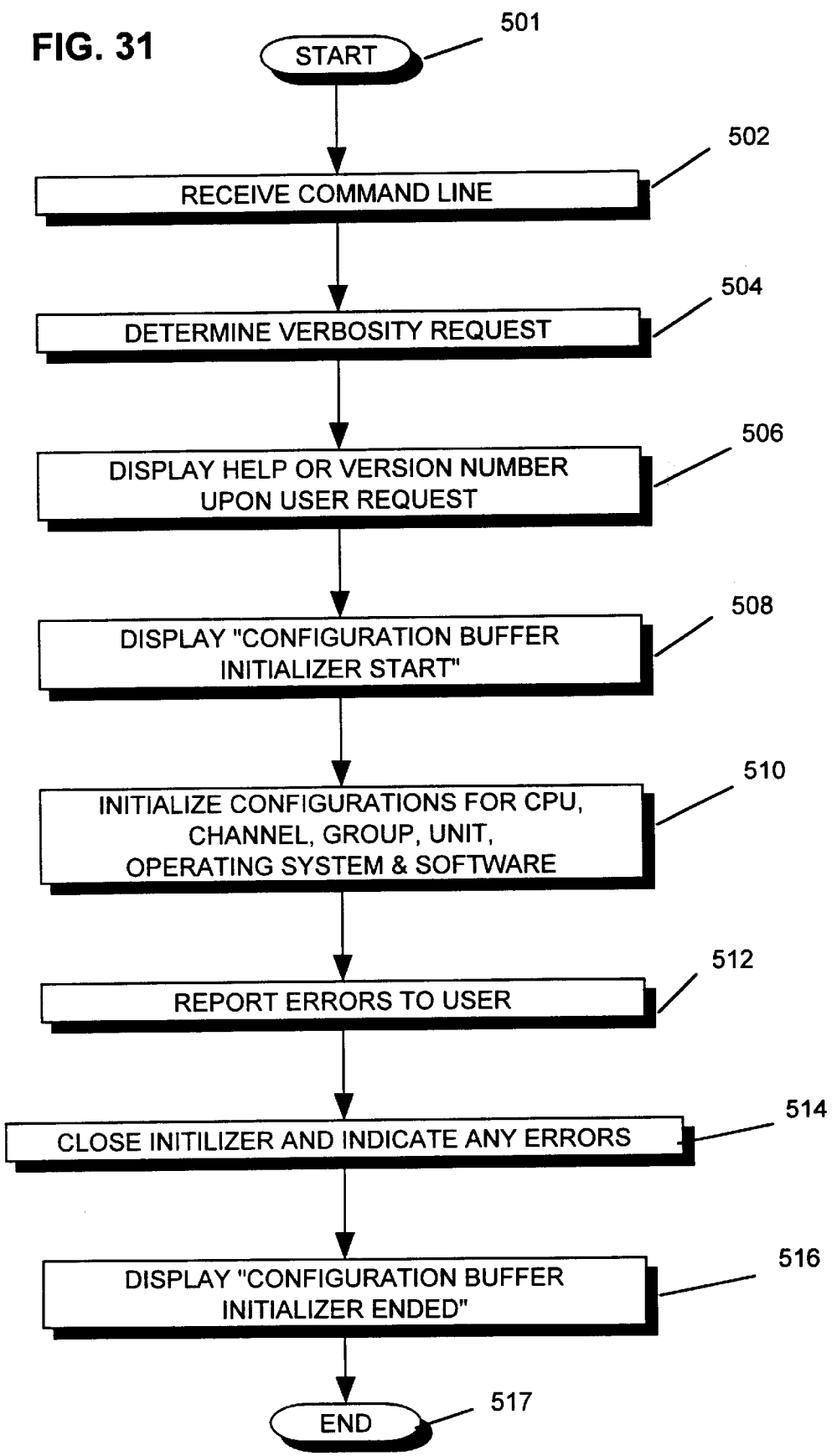

Referring now to FIG. 31, there is shown a module for initializing the configuration buffer. First, the command line is received 502. The extent of verbosity is determined 504. A help message or version number is displayed 506 upon user request. The message "Configuration Buffer Initializer Started" is displayed 508. Configurations for cpu, channel, group, unit, operating system and software are initialized 510. Any errors are reported to the user 512. The initializer is closed 514 and any errors are indicated 514. "Configuration Buffer Initializer Ended" is displayed 516.

Figure 32:
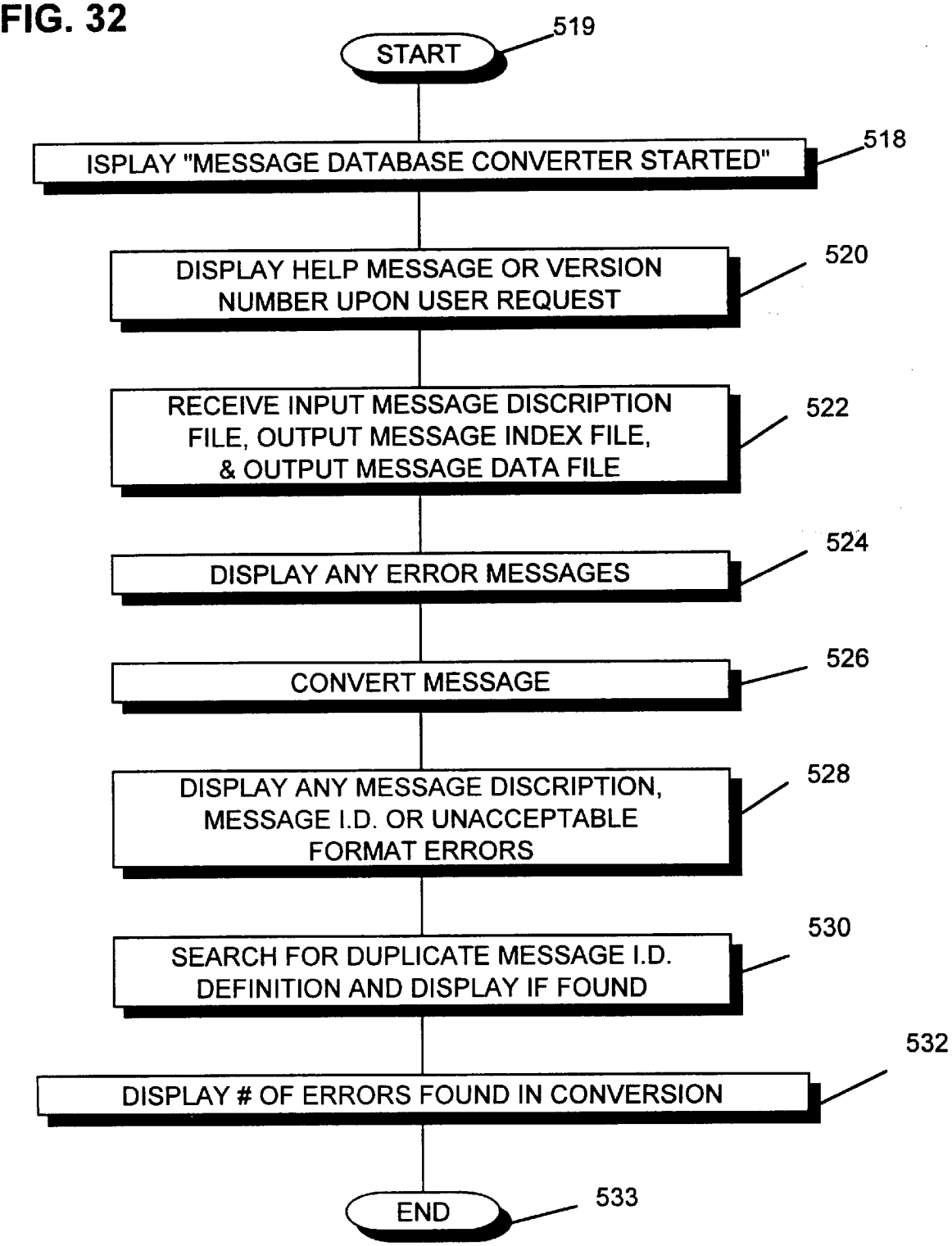

Referring now to FIG. 32, there is shown a module for converting the message database. First, the message "Message Database Converter Started" is displayed 518. A help message or version number is displayed 520 upon user request. An input message description file, an output message index file, and an output message data file are received 522. Any error messages are displayed 524. The message is converted 526. Any message description, message ID or unacceptable format errors are displayed 528. Duplicate message ID definitions are searched 530 and displayed 530 if found. The number of errors found in the conversion is displayed 532.

Figure 33A:
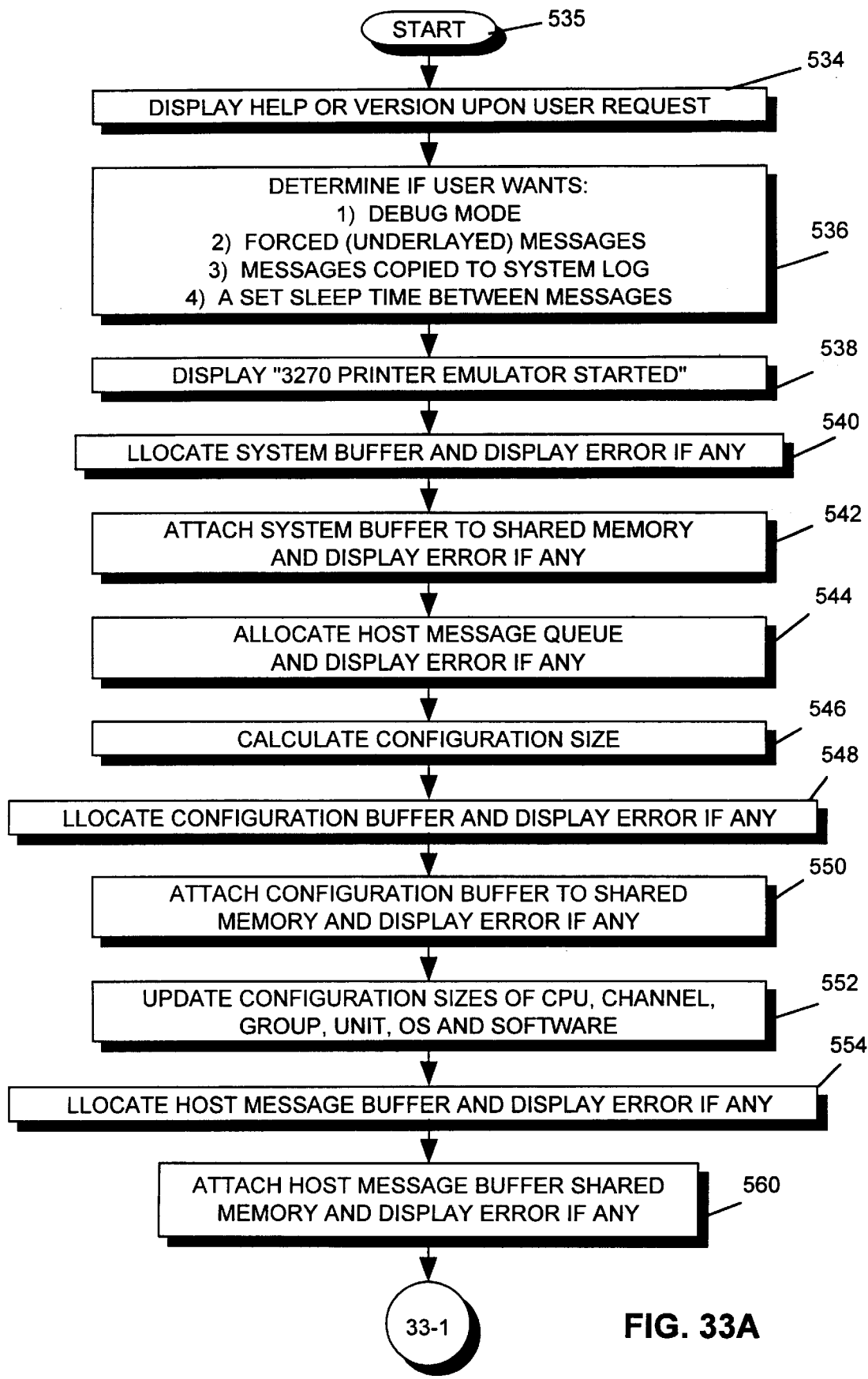
Figure 33B:
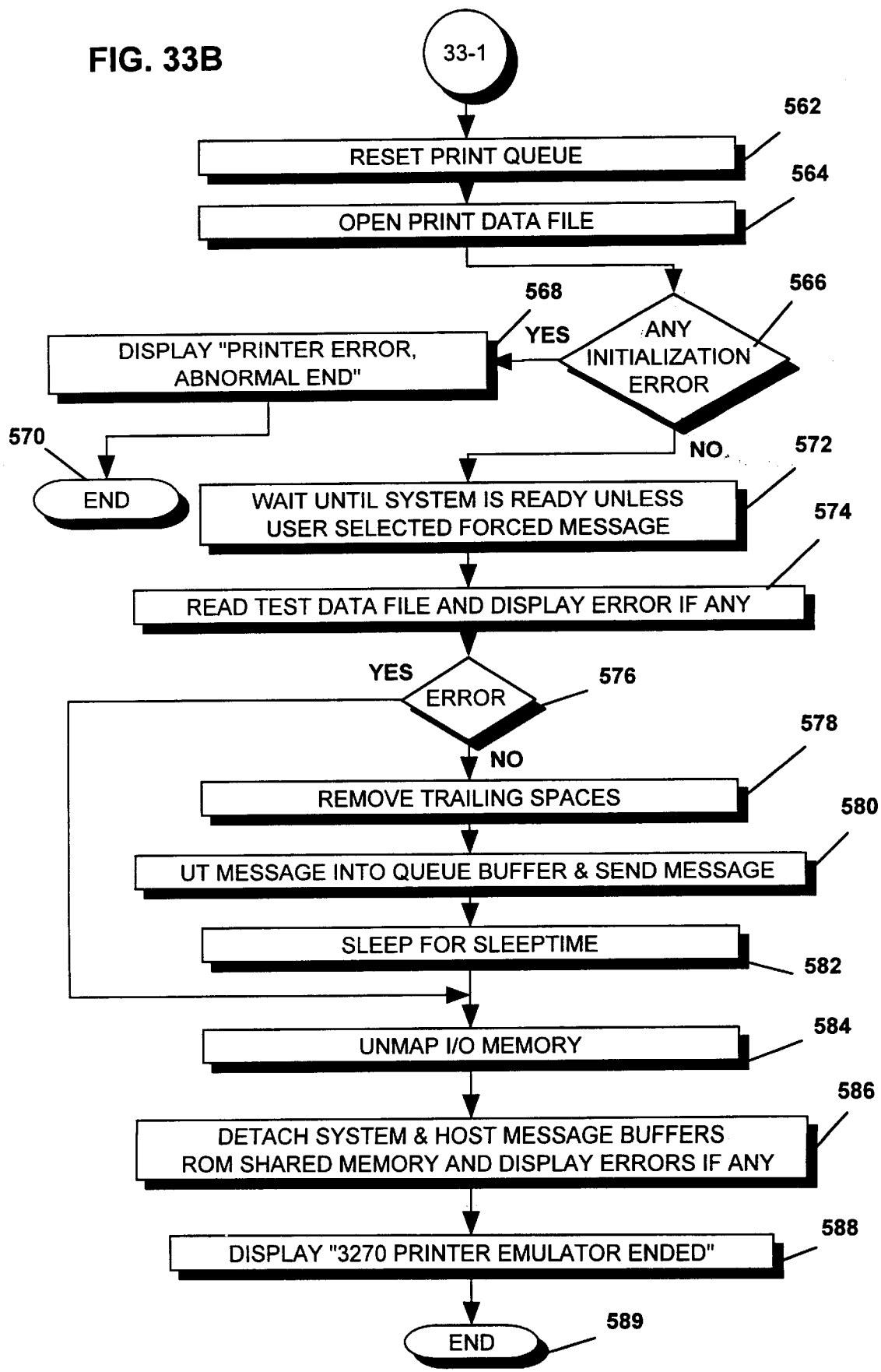

Referring now to FIG. 33, there is shown a module for emulating a 3270 printer. First, a help message or version number is displayed 534 upon user request. The user input is determined 536. The user has the options of: 1. debug mode, 2. forced messages, 3. copying messages to the system log, and 4. setting a sleep time between messages. The message "3270 Printer Emulator Started" is displayed 538. The system buffer is allocated 540 and any errors are displayed 540. The system buffer is attached 542 to shared memory and any errors are displayed 542. The host message queue is allocated 544 and any errors are displayed 544. A configuration size is calculated 546. The configuration buffer is allocated 548 and an error is displayed 548, if any. The configuration buffer is attached 550 to shared memory and any errors are displayed 550. Configuration sizes for cpu, channel, group, unit, operating system and software are updated 552. The host message buffer is allocated 554 and any errors are displayed 554. The host message buffer is attached 560 to shared memory and any errors are displayed 560. The print queue is reset 562. The print data file is opened 564. If there is an initialization error 566, an error message is displayed 568 and the module ends 570. Alternatively the process is delayed 572 unless the user selected the forced message option. The test data file is read 574 and any errors are displayed 574. If there was an error 576, the process jumps to 584. Alternatively, trailing spaces are removed 578, a message is put 580 into the queue buffer, and a message is sent 580. The procedure sleeps 582. The I/O memory is unmapped 584. System and host message buffers are detached 586 from shared memory and any errors are displayed 586. The message "3270 Printer Emulator Ended" is displayed 588.

Figure 34:
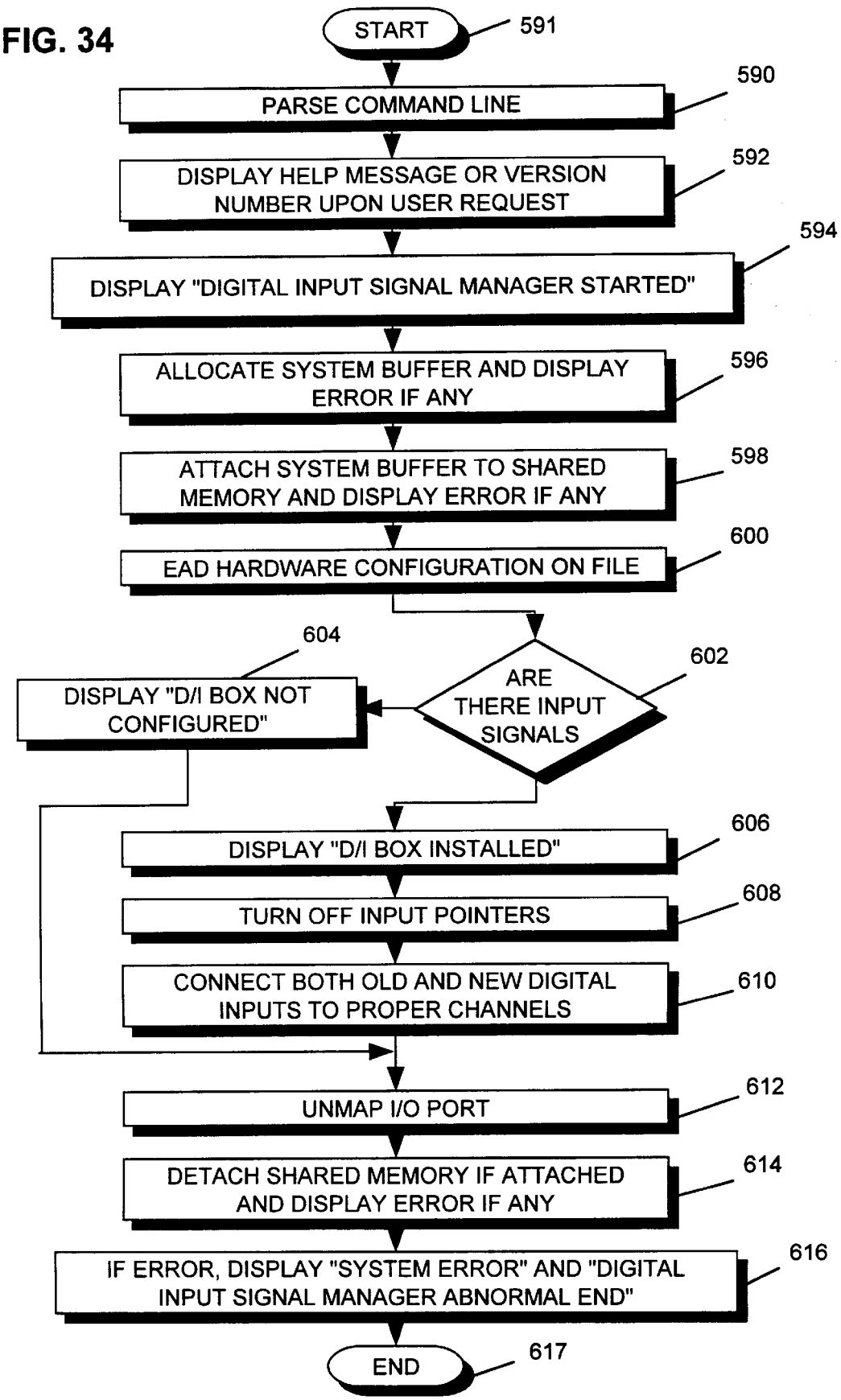

Referring now to FIG. 34, there is shown the method for managing a digital input signal. First, the command line is parsed 590. The help message or version number is displayed 592 upon user request. The message "Digital Input Signal Manager Started" is displayed 594. The system buffer is allocated 596 and any error is displayed 596. The system buffer is attached 598 to shared memory and any error is displayed 598. The hardware configuration file is read 600. See FIG. 72. If there are no input signals 602, the message "D/I Box Not Configured" is displayed 604 and the process continues at 612. Alternatively, the message "D/I box installed" is displayed 606. Input pointers are turned off 608. Both old and new digital inputs are connected 610 to their proper channels. The I/O port is unmapped 612. The shared memory is detached 614 and any errors are displayed 614. If there were any errors causing an abnormal end, an appropriate message is displayed 616.

Referring now to FIG. 35, there is shown a method of starting the digital output box monitor. First, the command line is parsed 618. A help message or version number is displayed 620 upon user request. Then the message "digital output box monitor started" is displayed 622. The system buffer is allocated 624 and any errors are displayed 624. The system buffer is attached 626 to shared memory and any errors are displayed 626. The hardware configuration file is read 628. See FIG. 72. If there are no output signals 630 then the message "D/O Box Not Configured" is displayed 632 and the process continues at 638. Alternatively, the message "D/O Box is Installed" is displayed 632. Both old and new digital outputs are connected 634 to the proper channels. The I/O port is unmapped 638. The shared memory is detached 640 and any errors are displayed 640. If any errors causing an abnormal end have occurred, then they are displayed 642.

Figure 36A:
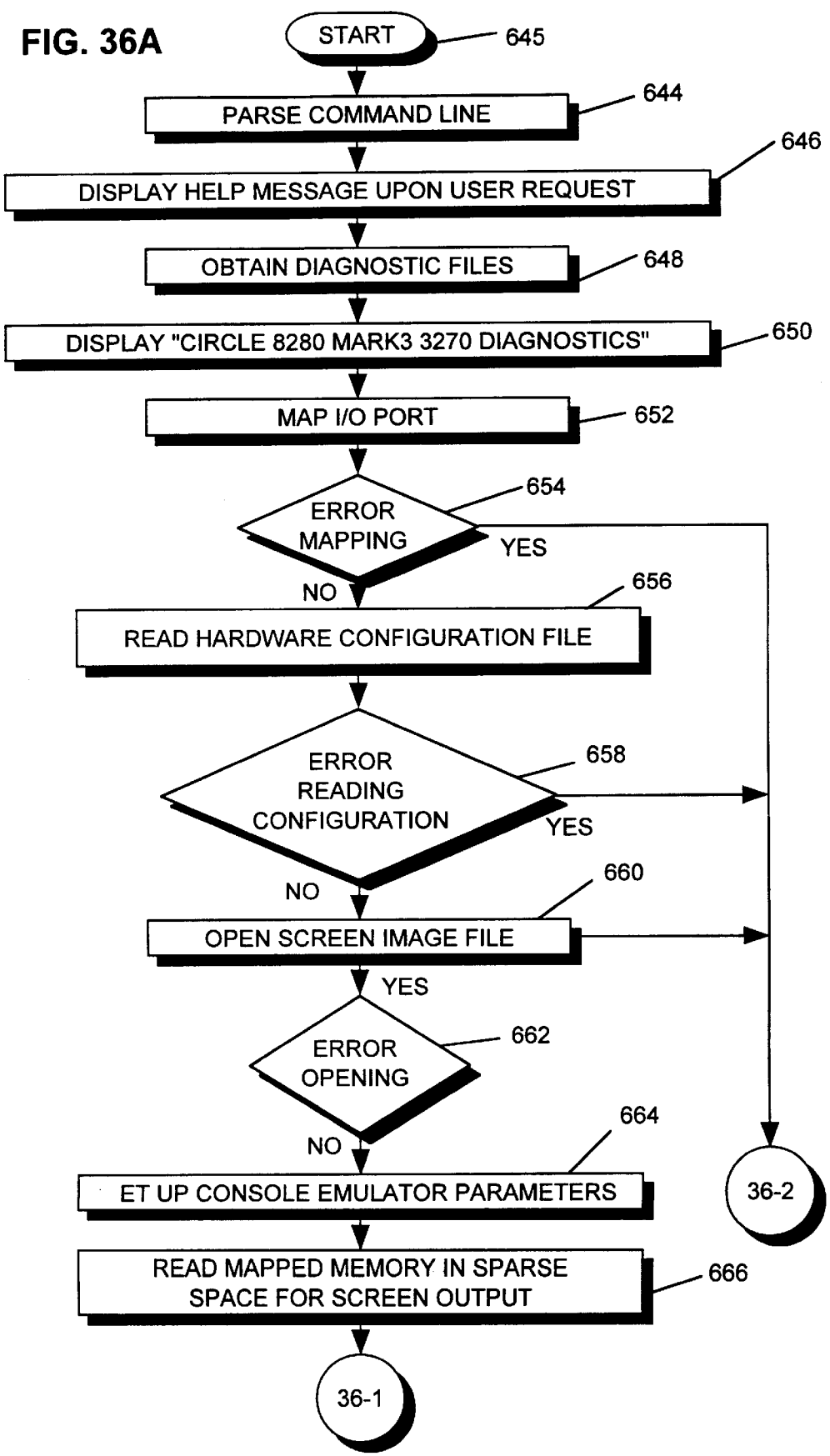
Figure 36B:
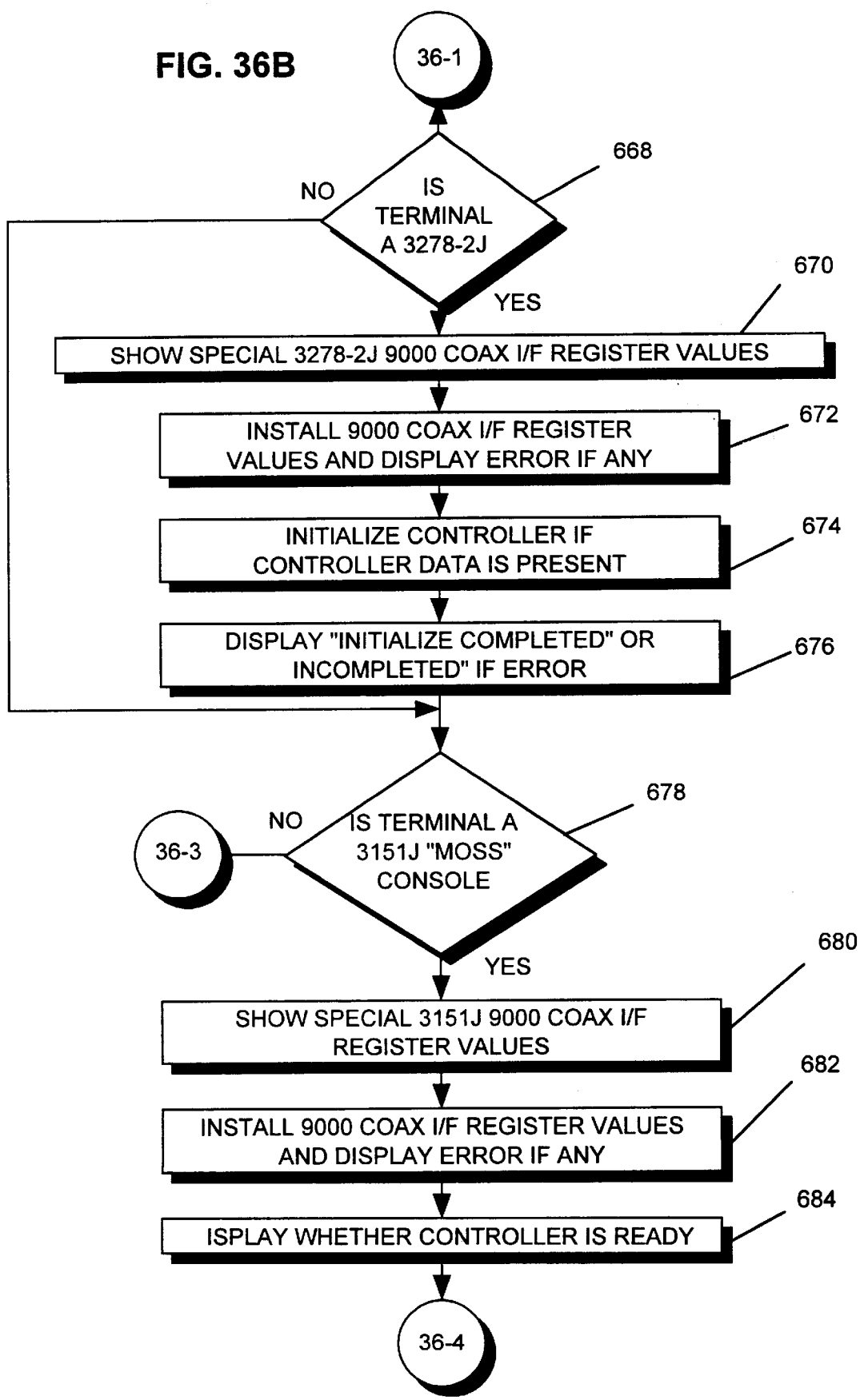
Figure 36C:
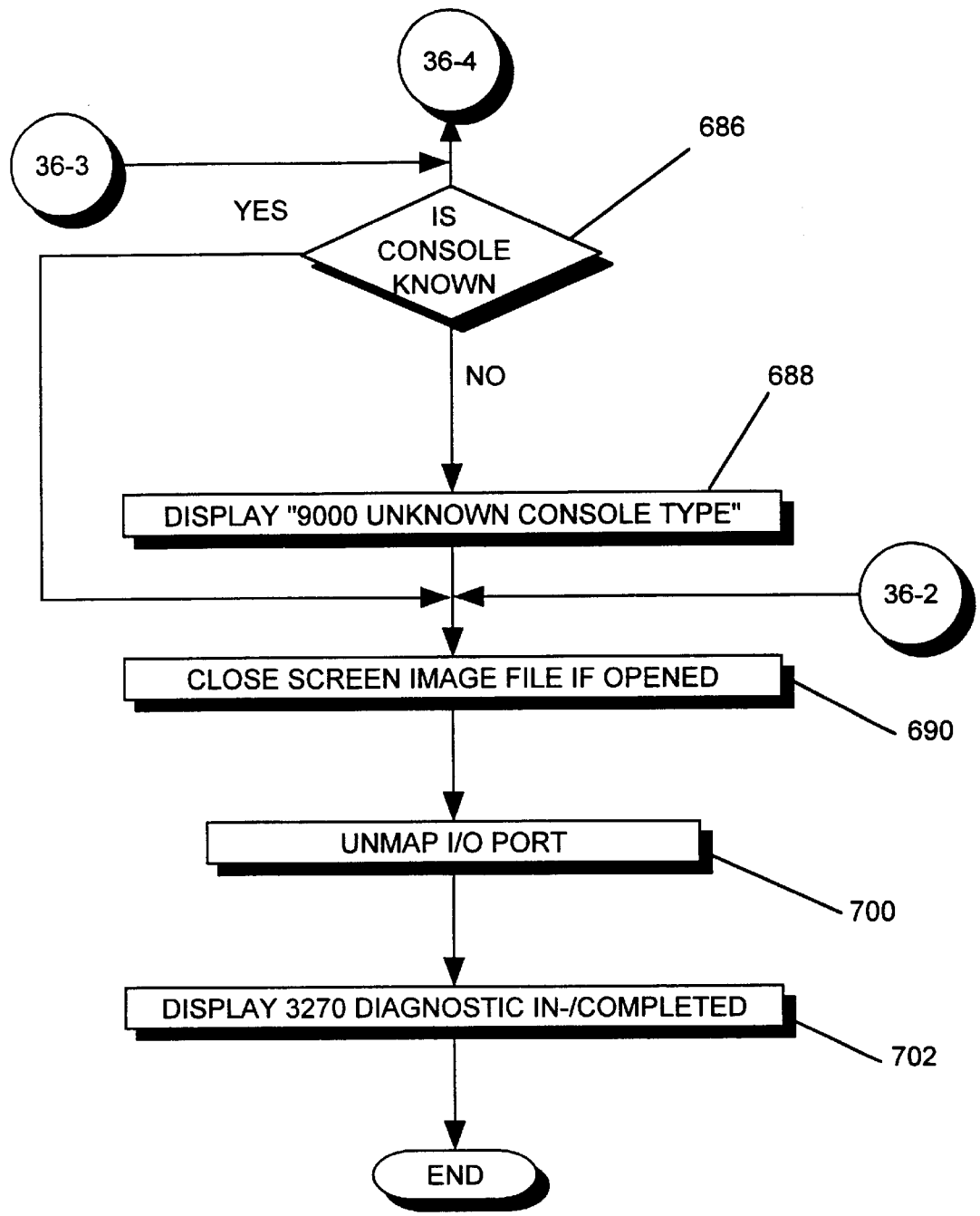

Referring now to FIG. 36, there is shown a method of running diagnostics for the CIRCLE 8280 Mark3 3270 terminal diagnostics 644. First, the command line is passed 644. The help message is displayed 646 upon user request. Diagnostic files are obtained 648. The message "CiRCLE 8280 Mark3 3270 Diagnostics" is displayed 650. The I/O port is mapped 652. If there was an error mapping 654 then the process continues at 690. Alternatively, the hardware configuration file is read 656. See FIG. 72. If there was an error reading the hardware configuration file 658, the process continues at 690. Alternatively, the screen image file is opened 660. If there was an error opening the screen image file 662, then the process continues at 690. Alternatively, console emulator parameters are set up 664. The mapped memory in sparse space is read 666. If the terminal is not a 3278-2J 668, then the process skips to 678. Alternatively, the special 3278-2J 9000 COAX I/F (i.e. an interface) register values are shown 670. The 9000 coax I/F register values are installed 672, and any errors are displayed 672. The controller is initialized 674 provided that controller data is present. The message "Initialize Completed" is displayed 676, and any errors are indicated 676. If the terminal is not a 3151J "MOSS" console 678 then the process skips to 686. Alternatively, the special 3151J 9000 COAX I/F register values are shown 680. The 9000 COAX I/F register values are installed 682, and any errors are displayed 682. The statement whether the controller is ready is displayed 684. If the console is known, then the process skips to 690. Alternatively, the message "9000 unknown console type" is displayed 688. The screen image file is closed 690 if it was previously opened. The I/O port is unmapped 700. The message "3270 Diagnostic In-/Completed" is displayed 702.

Figure 37A:
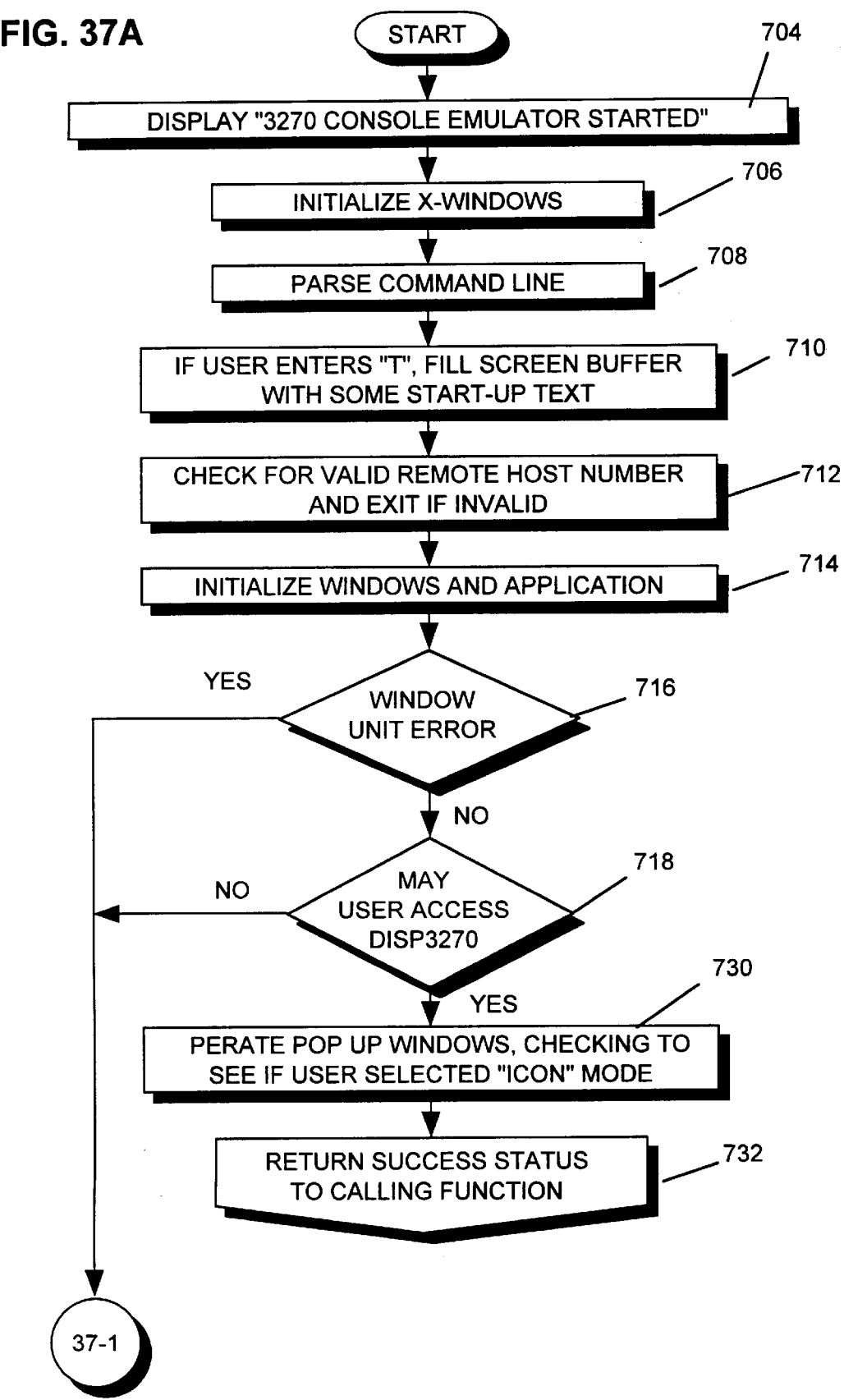
Figure 37B:
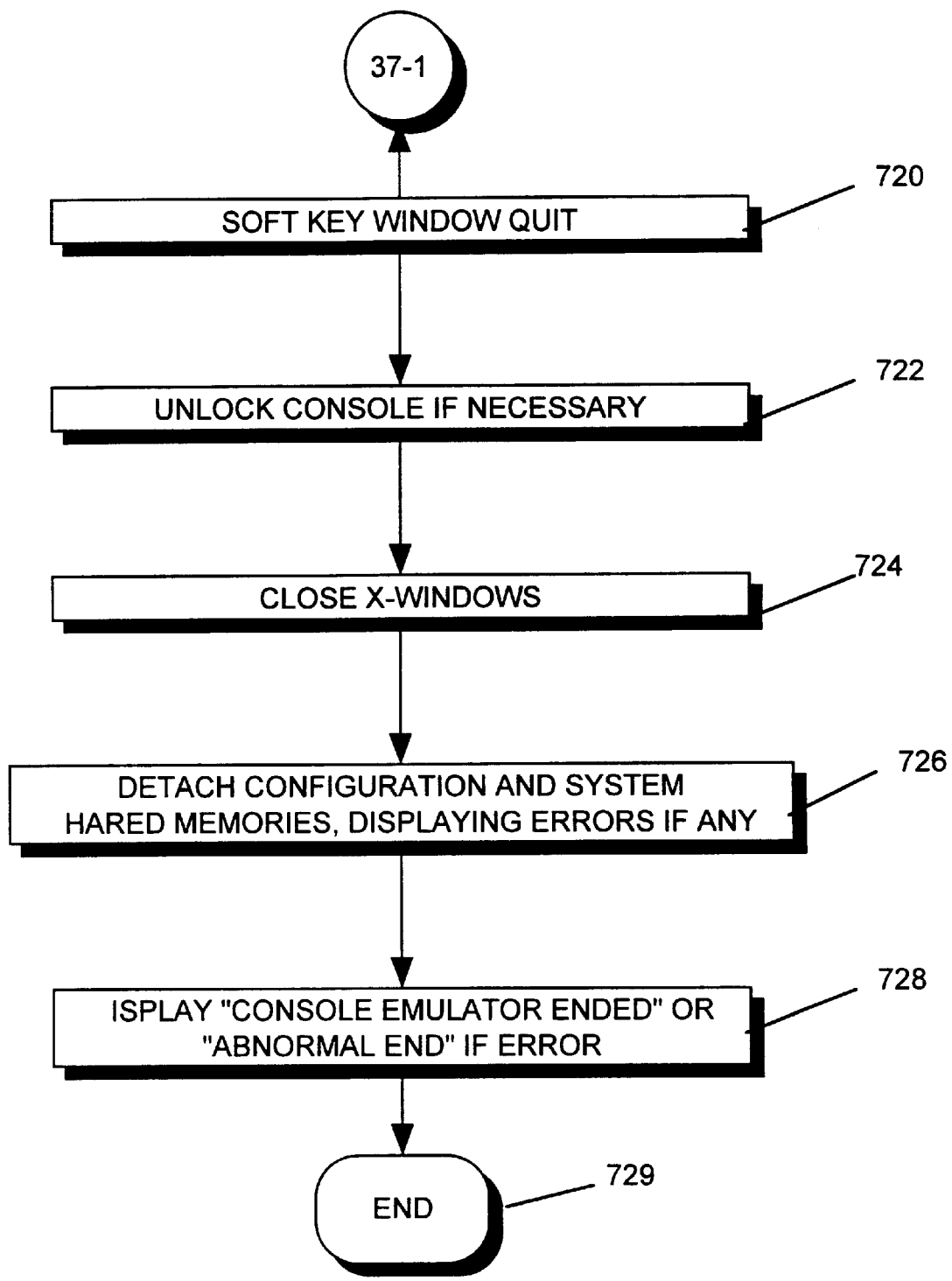

Referring now to FIG. 37 there is shown the method of emulating a 3270 console. First, an X-windows environment is initialized 706. The command line is parsed 708. If the user entered "t", the screen buffer is filled 710 with some start-up text. Then a valid remote host number is checked 712 and the process is exited if invalid 712. Subsequently, the windows environment and the application are initialized 714. If a window unit error occurs 716 or the user is denied access to the 3270 console 718 then the soft key window quits 720, the console is unlocked if necessary 722, X-windows is closed 724, configuration and system memories are detached 726, any errors are displayed 726, and an exit message is displayed 728. Alternatively, pop-up windows are operated 730 and the success code is returned 732 to the calling function.

Figure 38:
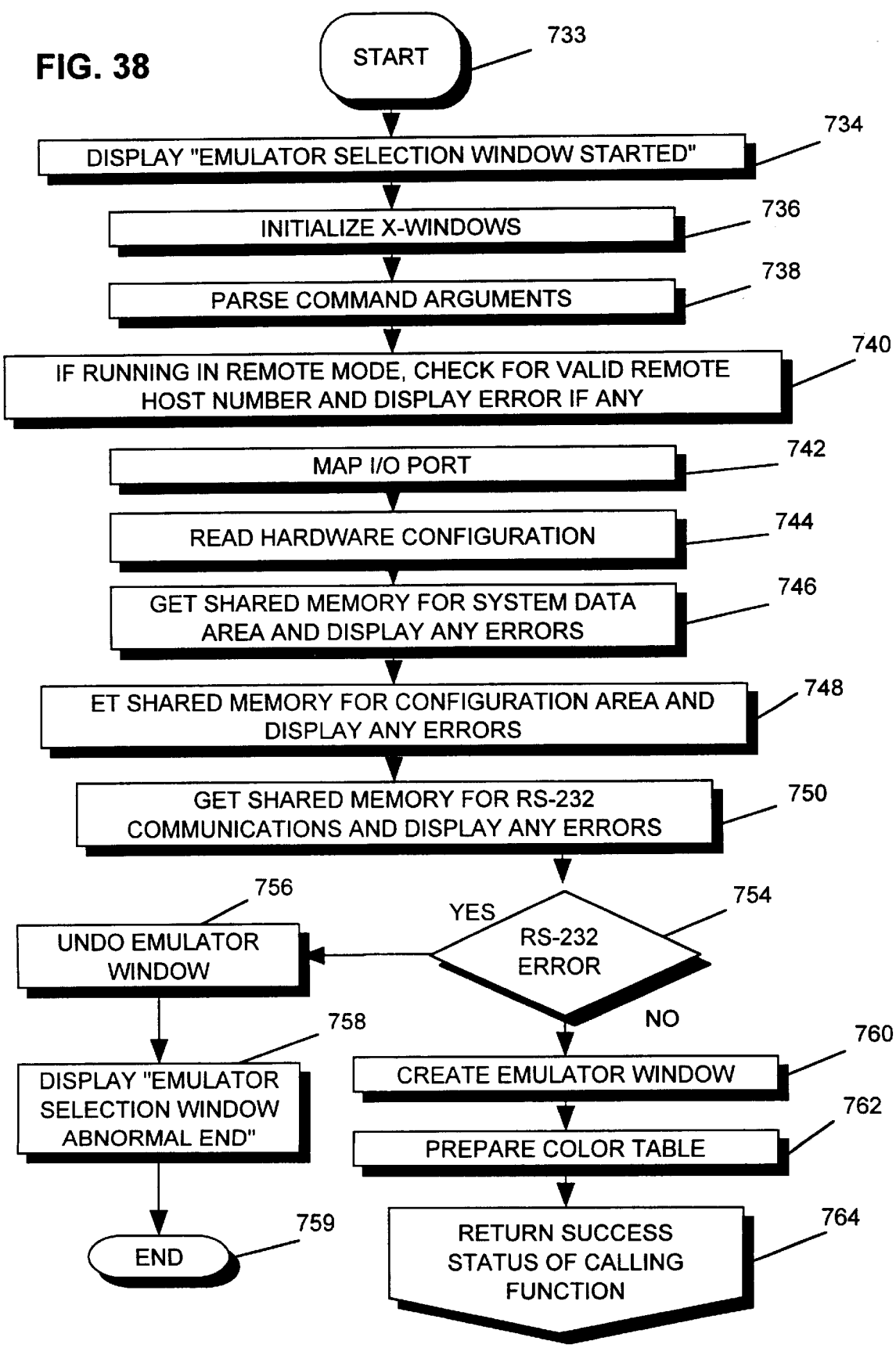

Referring now to FIG. 38, there is shown a method for starting the emulator selection window. First, the message "Emulator Selection Window Started" is displayed 734. X-windows is initialized 736. The command arguments are parsed 738. If the system is running in remote mode a valid remote host number is checked 740 and an error is displayed 740, if any. The I/O port is mapped 742. The hardware configuration is read 746. See FIG. 51. Shared memory is obtained 748 for the system data area and any errors are displayed 748. Shared memories are obtained 750 for the configuration area and any errors are displayed 750. Shared memory is obtained 752 for RS-232 communications, and any errors are displayed 752. If there is an RS-232 error 754, then the emulator window is undone 756 and the message "Emulator Selection Window Abnormal" is displayed 758. Alternatively, the emulator window is created 760, the colored tables are prepared 762, and the success flag is returned 764 to the calling function.

Figure 39A:
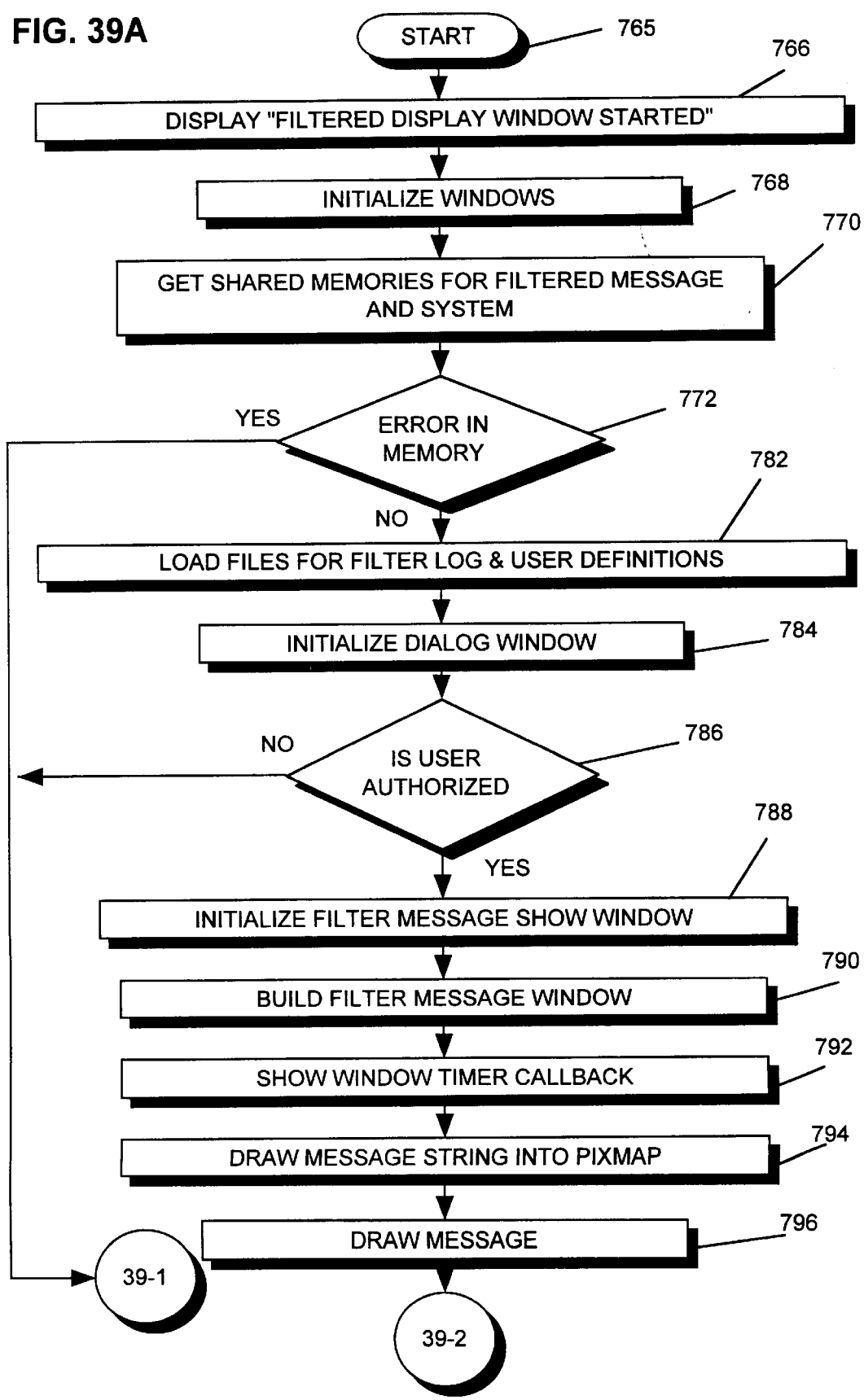
Figure 39B:
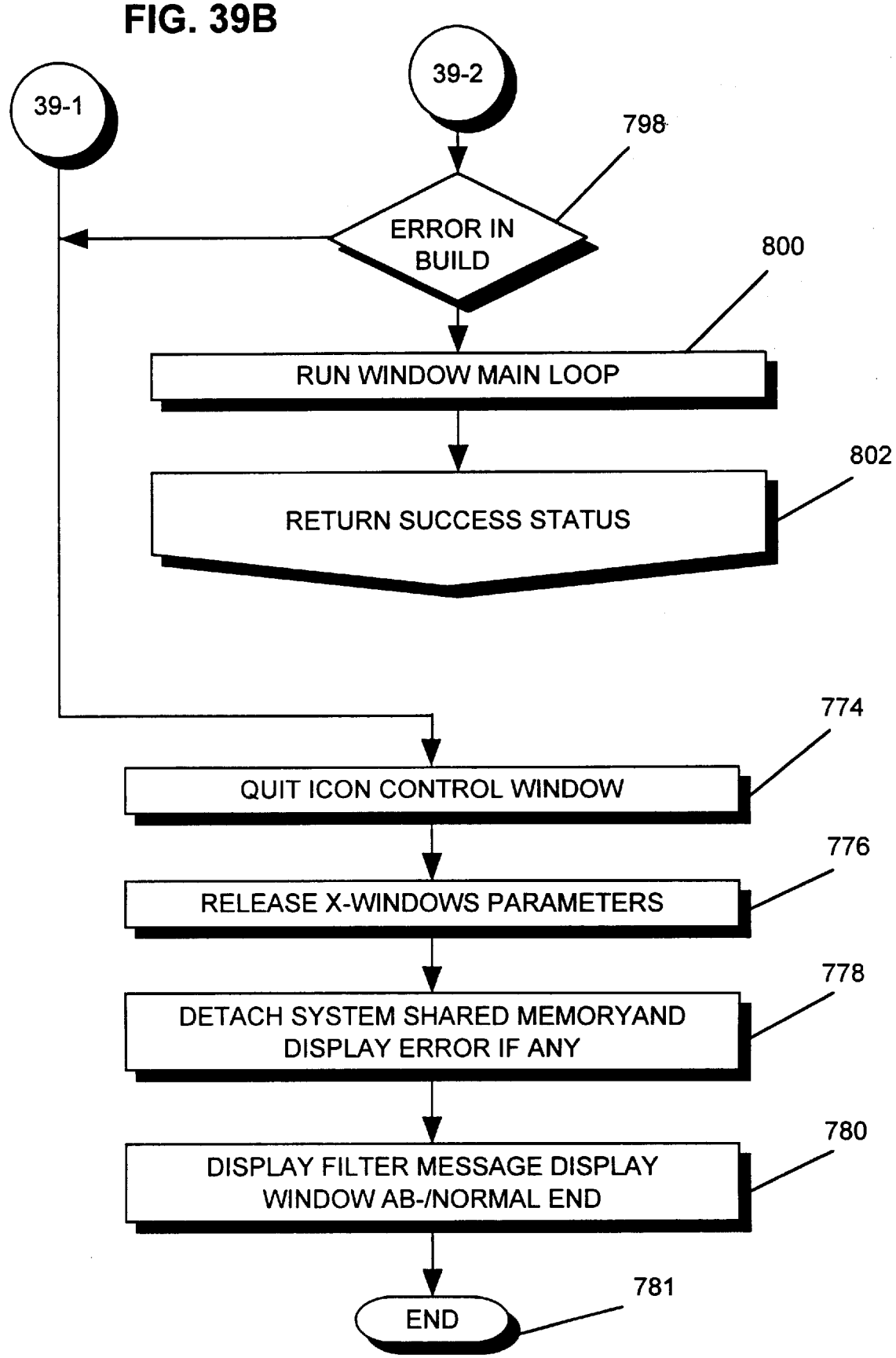

Referring now to FIG. 39, there is shown a method of running a filtered display window. First, the message "Filtered Display Window Started" is displayed 766. Windows are initialized 768. Shared memories are obtained 770 for the filtered message and the system if there is an error in the memory 772. If there is an error in memory 772, then the icon control window is exited 774, the X window's parameters are released 776, the system shared memory is detached 778, any errors are displayed 778 and a message indicating that an abnormal end has occurred is displayed 780. Alternatively, the filter log and the user definitions files are loaded 782. The dialog window is initialized 784. If the user is not authorized 786, then the process continues at 774. Alternatively, the filter message show window is initialized 788. The filter message window is built 790. The window timer callback is shown 792. A message string is drawn 794 into a pixel map and the message is drawn 796. If there was an error in the build 798, then the process skips to 774. Alternatively, the main window loop is run 800, and the success status is returned 802 to the calling function.

Figure 40:
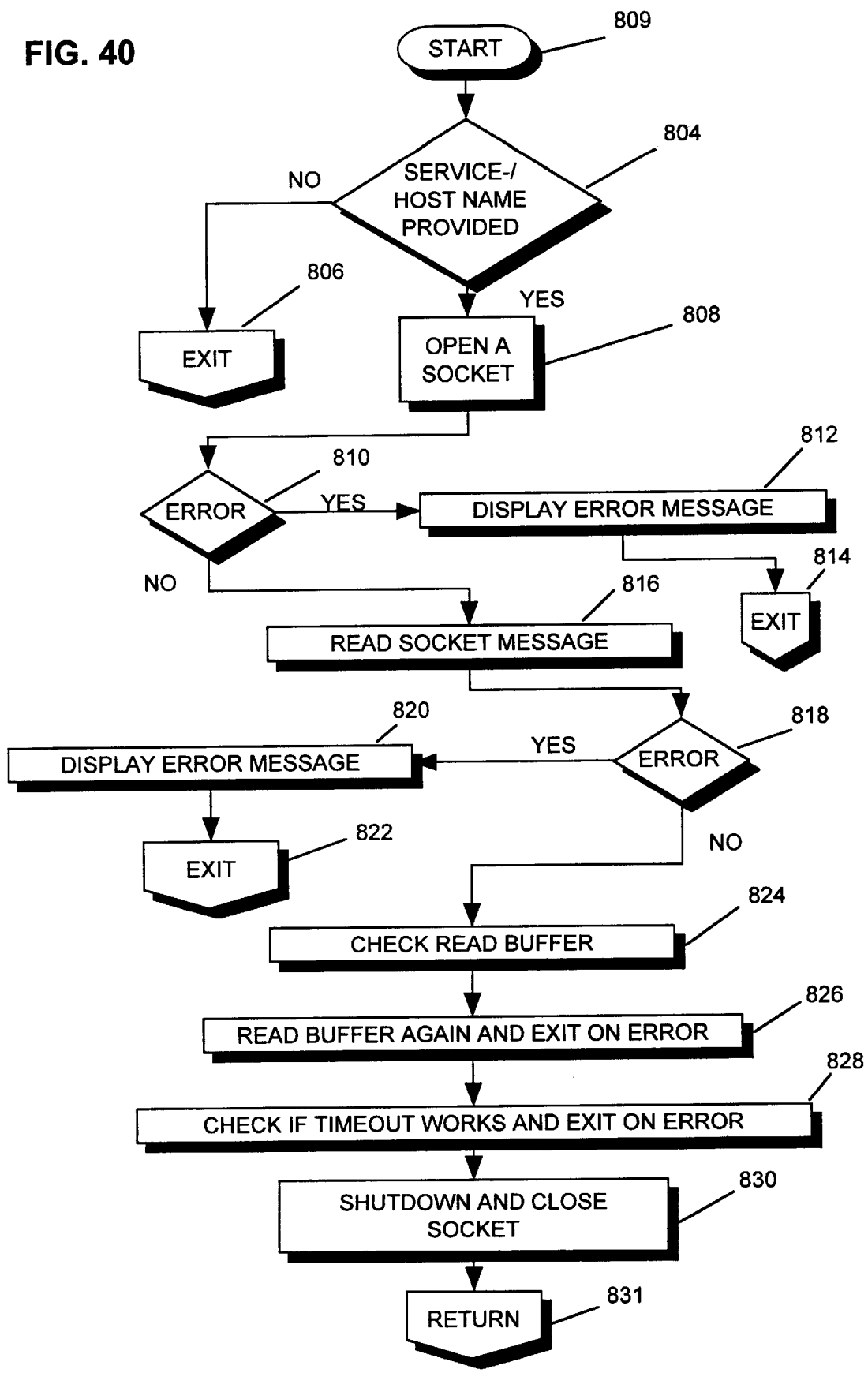

Referring now to FIG. 40 there shown a method of obtaining from the socket a message containing a time variable. First, the command line is parsed 785 to obtain service and host names. A socket is opened 787 with the given names. If there is an error opening the socket 789, then an error message is displayed 791 and the function returns 793. Alternatively, the socket message is read 795. If there is any error 797, an error message is displayed 799 and the function returns 801. Alternatively, the read buffer is checked 803, then the socket is shut down and closed 805.

Figure 41:
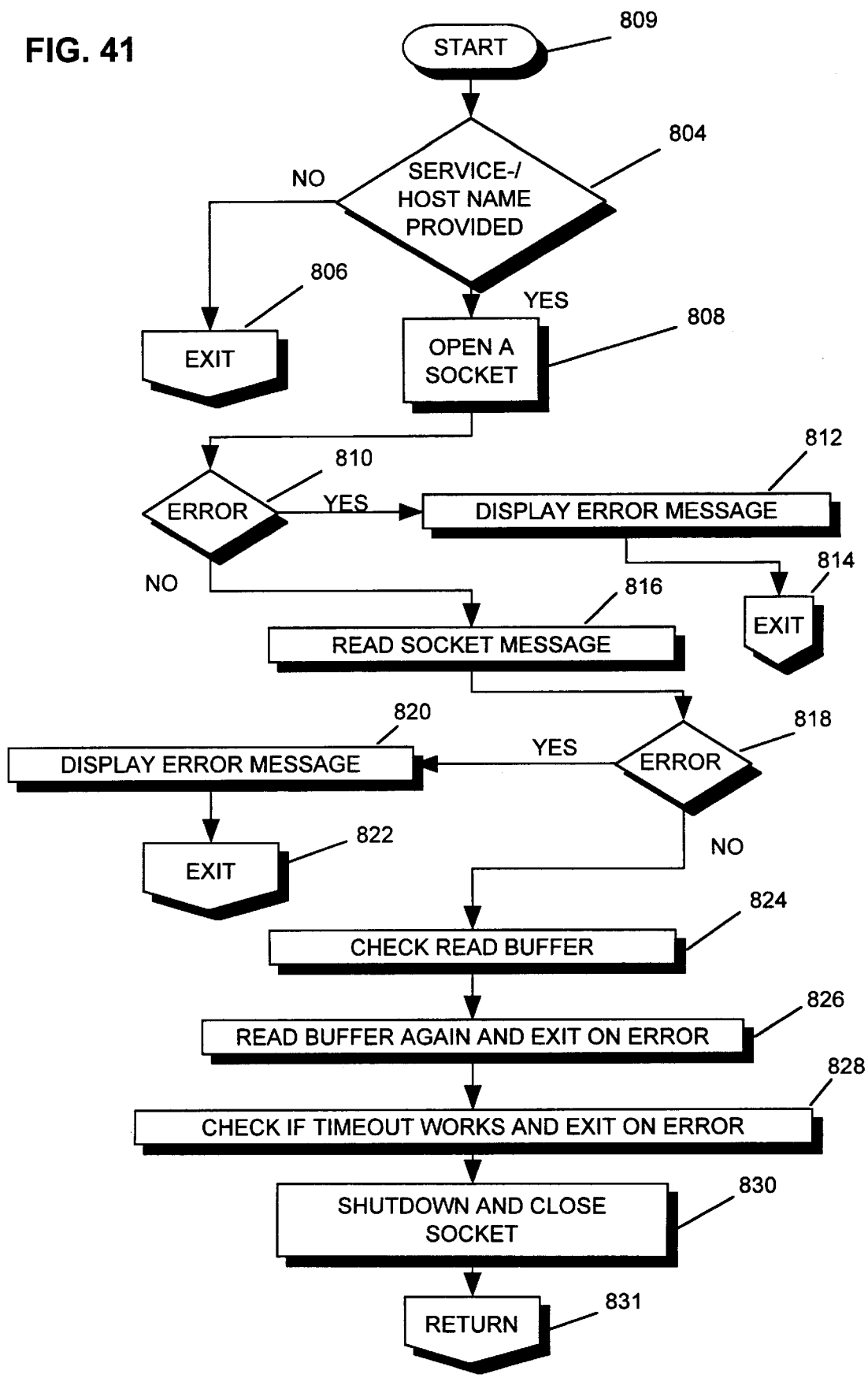

Referring now to FIG. 41, there is shown a method of reading from the socket a value variable. First it is checked whether a service and host name are provided 804. If not, the module ends 806. Alternatively, a socket is opened 808. If there is an error 810, then an error message is displayed 812 and the module ends 814. Alternatively, the socket message is read 816. If there is an error 818, an error message is displayed 820 and the module ends 822. Alternatively, the read buffer is checked 824. The buffer is read again 826. If there is an error 826, the module ends 826. Alternatively, if the time-out does not work, then the module ends 828. Alternatively the module goes through shutdown 830 and closes.

Figure 42A:
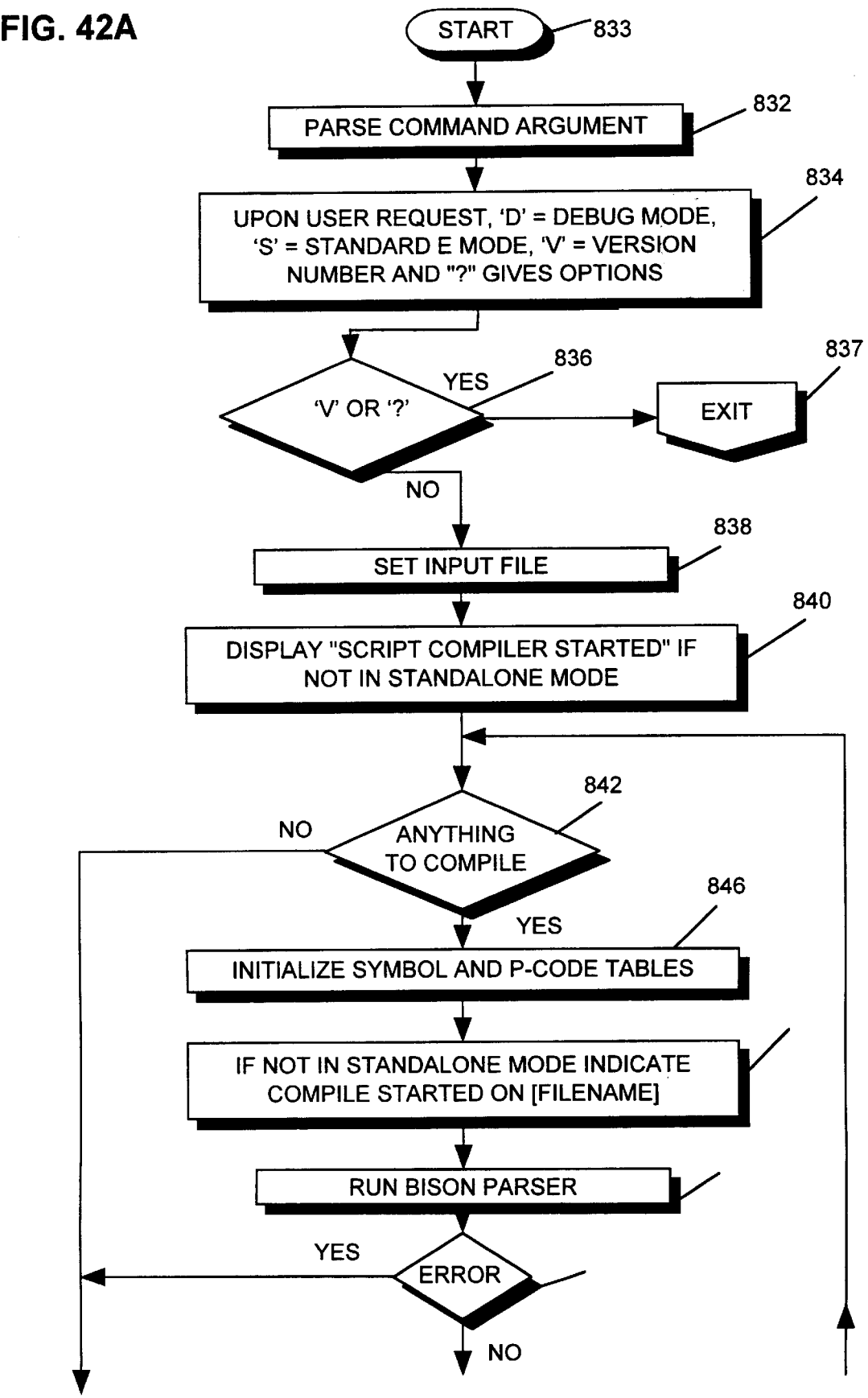
Figure 42B:
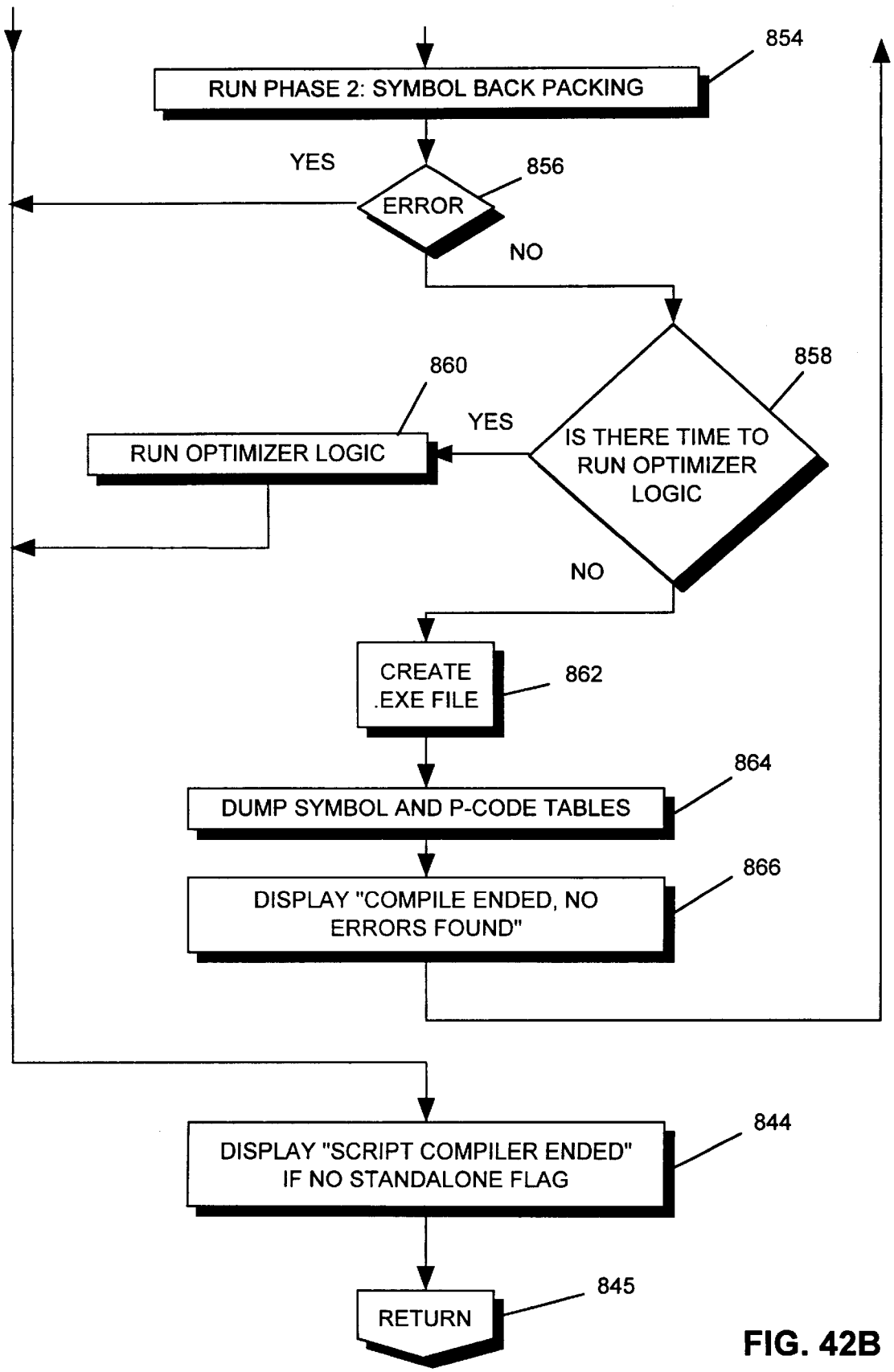

Referring now to FIG. 42, there is shown a method of compiling a script. First the command line is parsed 832. Then upon user request, the proper mode is selected 834 or version-number or help screen is displayed 834. If the version number or help message is displayed 836, then exit 837. Alternatively, the input file is set 838. The message "Script Compiler Started" is displayed 840, provided the module is not in standalone mode. If there is nothing to compile 842, then the message "Script Compiler Ended" is displayed 844, again provided no standalone flag. Alternatively, the symbol and p-code tables are initialized 846. A message informing the user that the compile has started is displayed 848 provided the module is not in standalone mode. The BISON parser is run 850. If there is an error 852, the compiler is exited. Alternatively, in the symbol backpacking, is run 854. If there is an error 856, the module is ended. Alternatively, it is determined 858 whether there is time to run the optimizer logic. If there is such time, then the optimizer logic is run 860. The module is exited 844. Alternatively, the .EXE file is created 862. The symbol and p-code tables are dumped 864. The message "Compile Ended, No Errors Found" is displayed 866 and the next script is loaded at 842.

Figure 43:
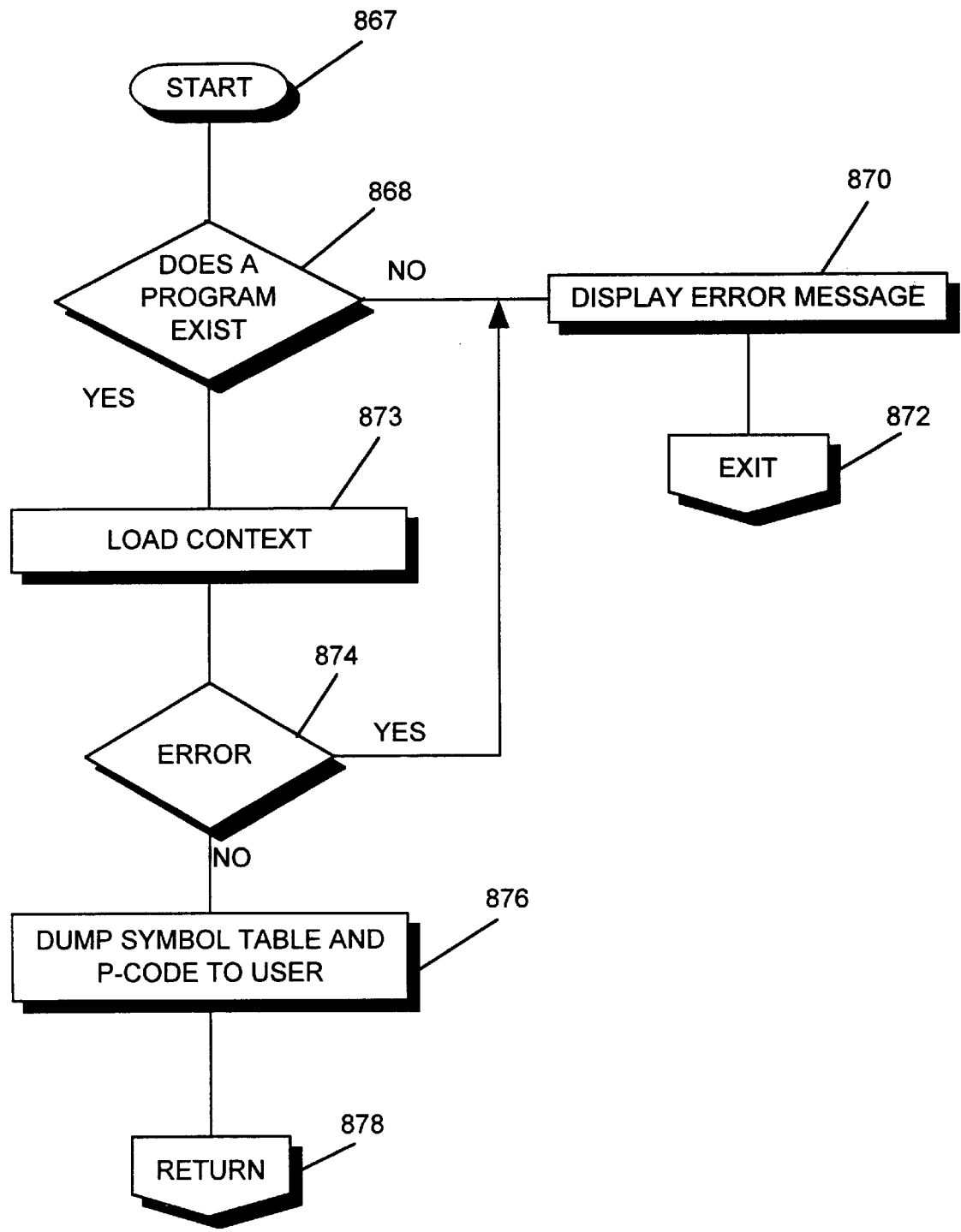

Referring now to FIG. 43, there is shown a method of loading the context for an ICL dump. First, if no ICL program exists 868, then an error message is displayed 870 and the process ends 872. Alternatively a function is called 873 to load the context. If there was an error in the context load 874 then an error message is displayed 870 and the process ends 872. Alternatively, the symbol table and p-code are dumped 876 and the module ends 878.

Figure 44A:
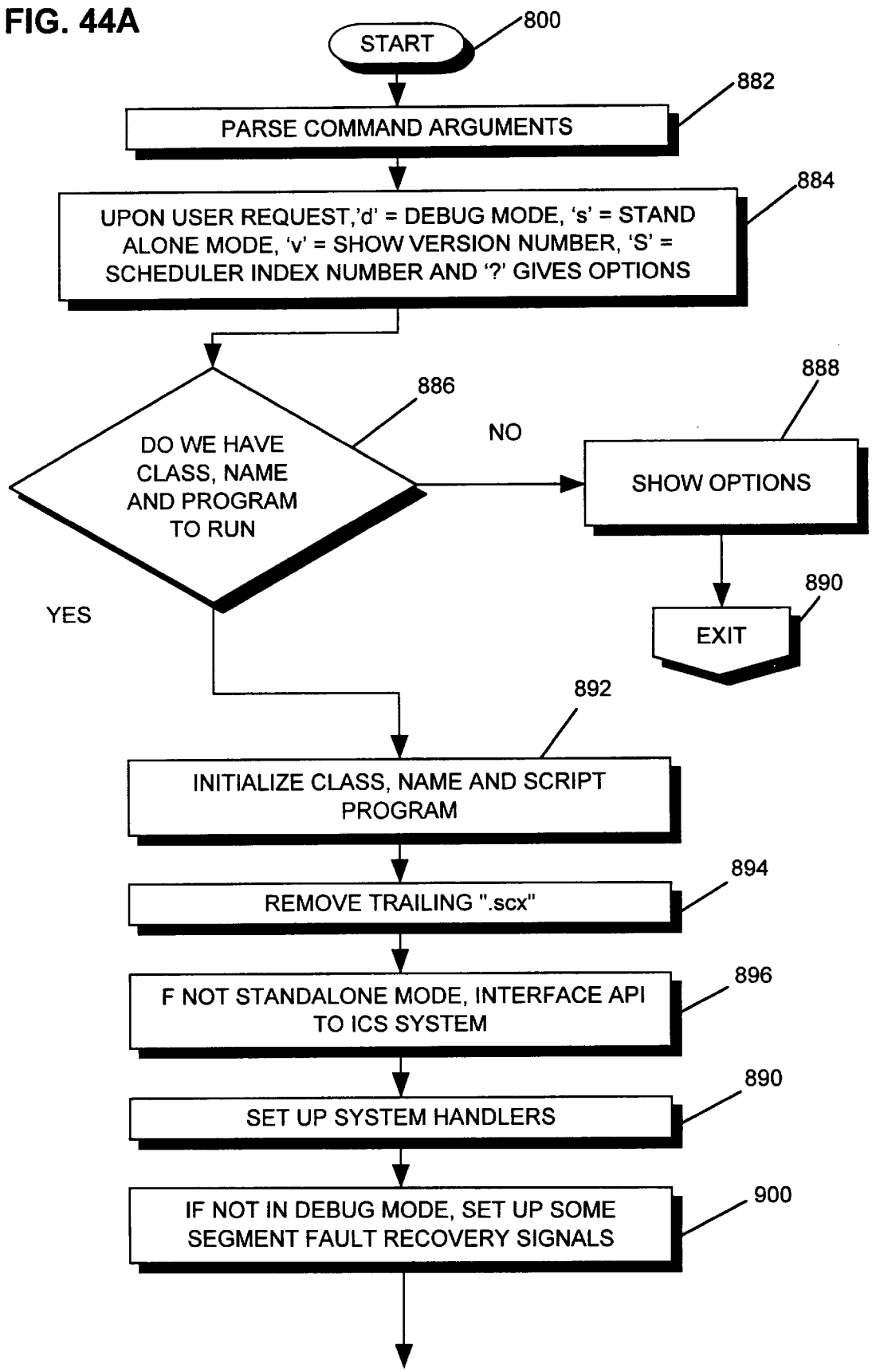
Figure 44B:
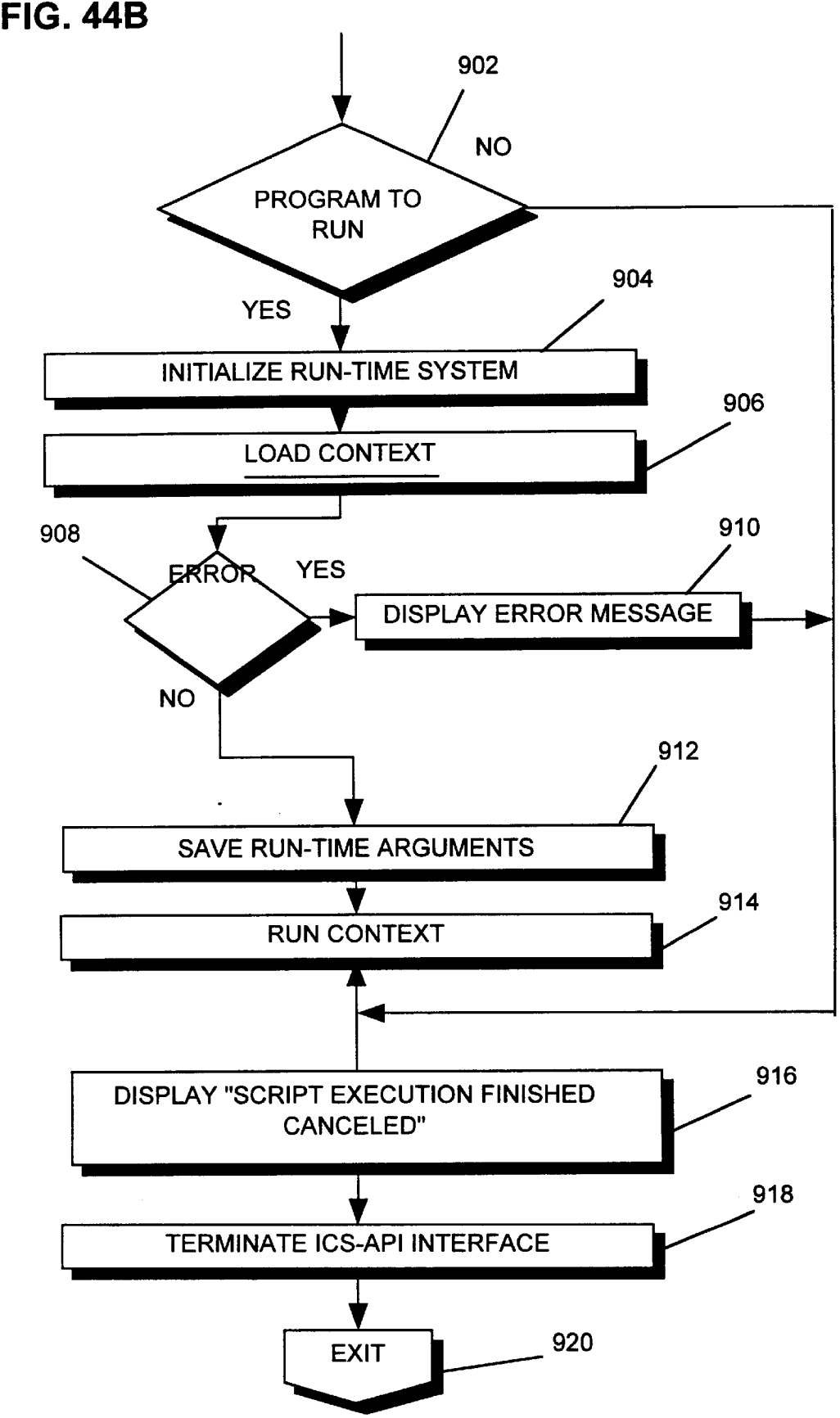
Figure 45A:
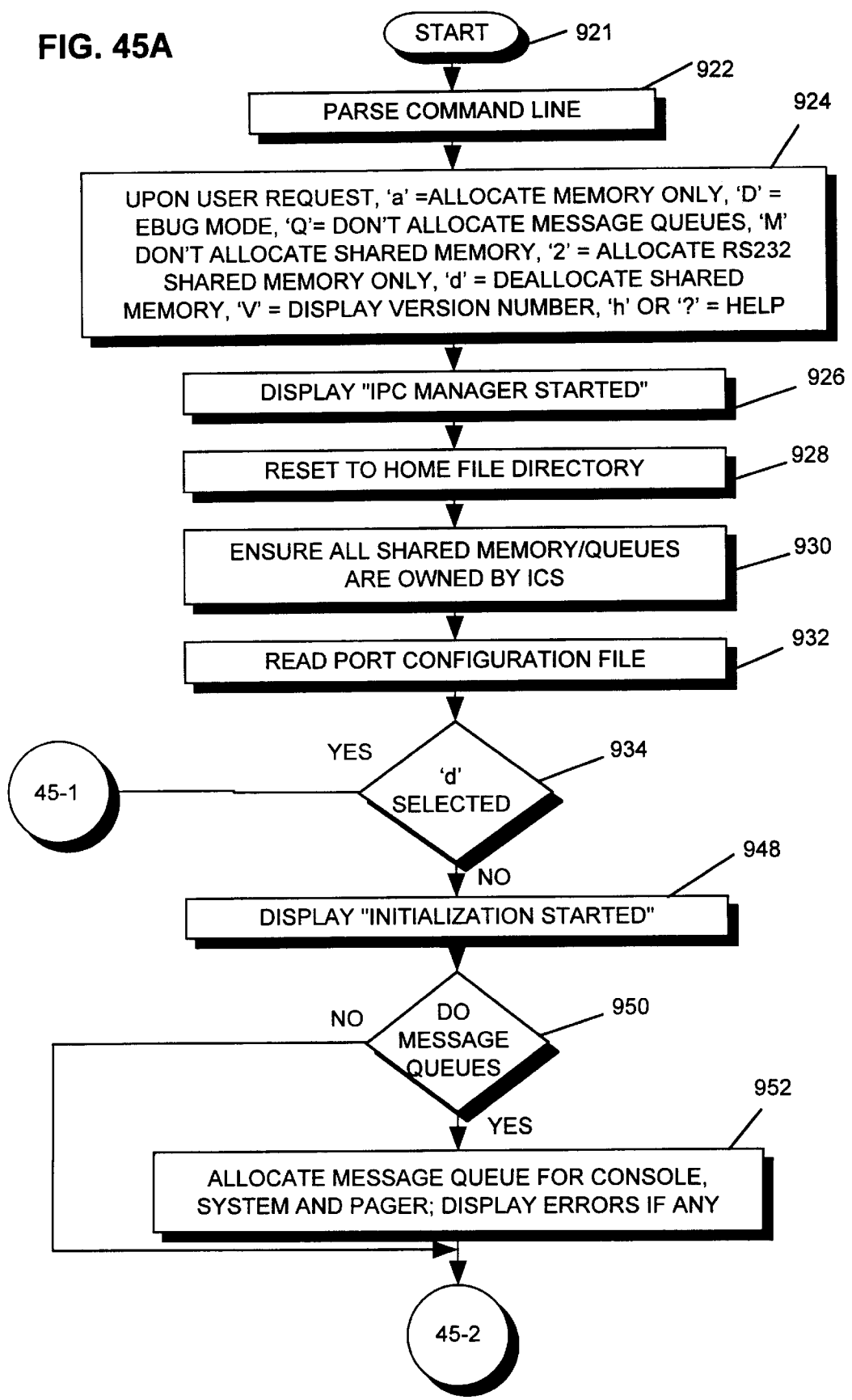
Figure 45B:
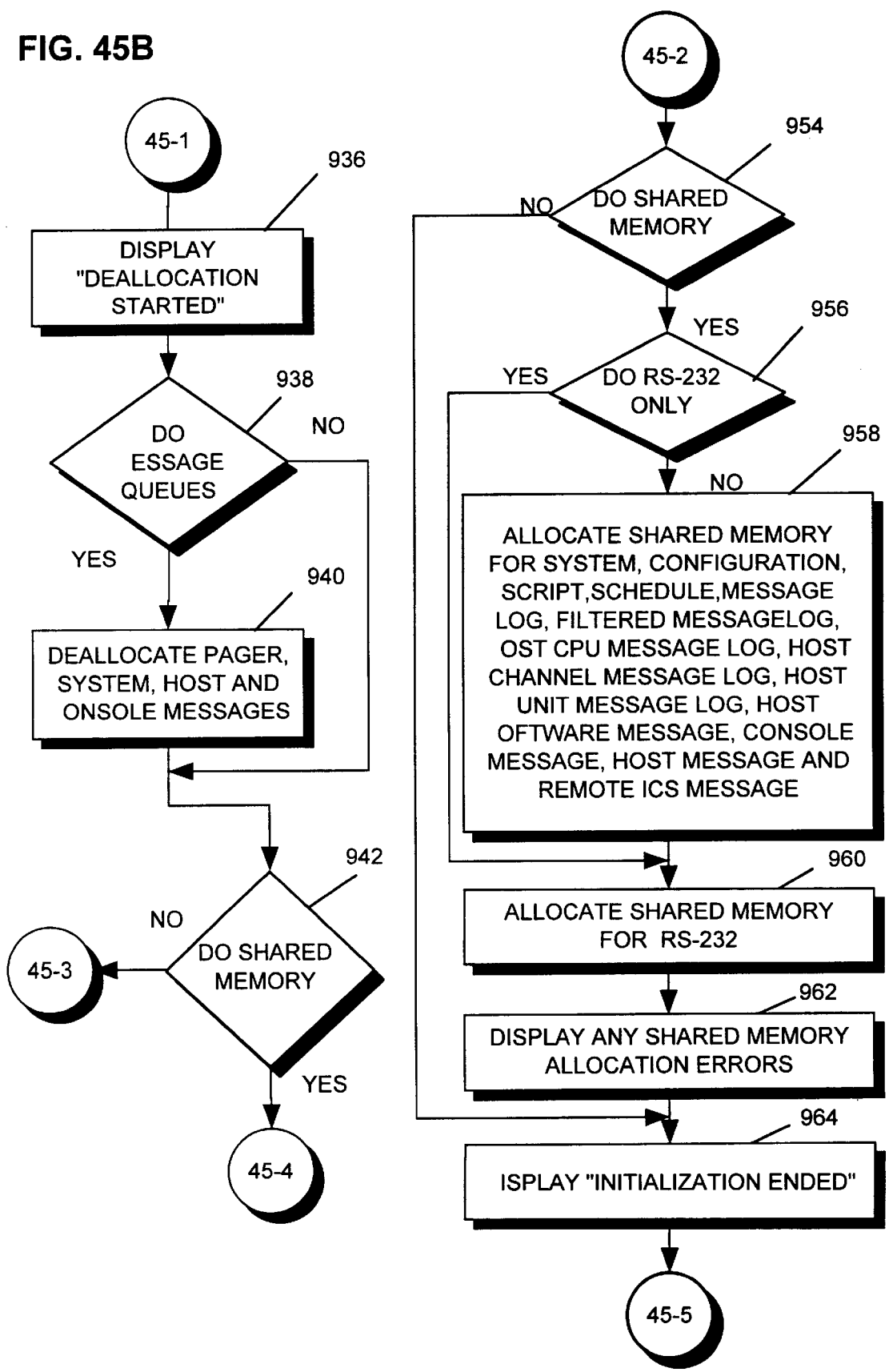
Figure 45C:
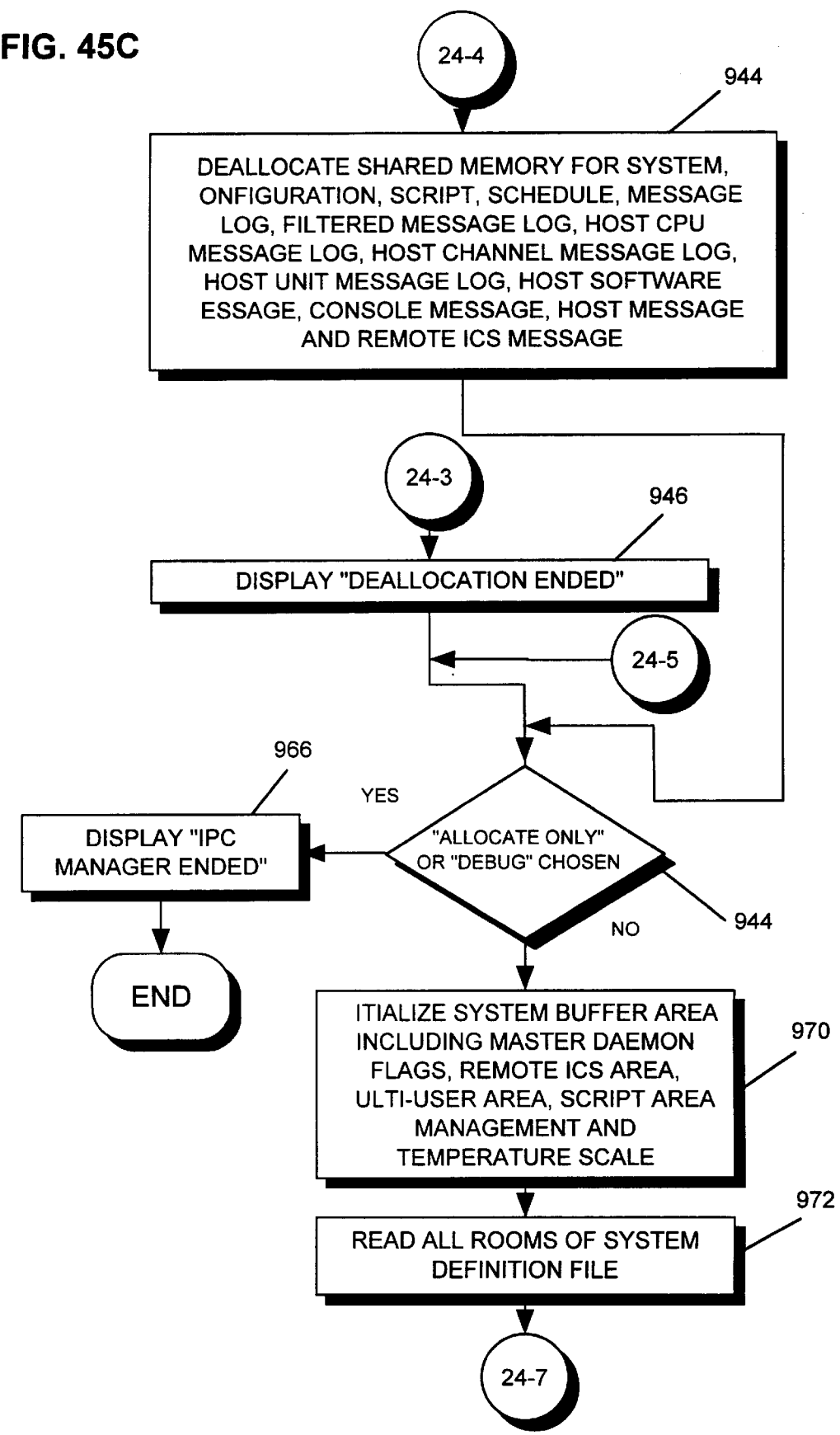
Figure 45D:
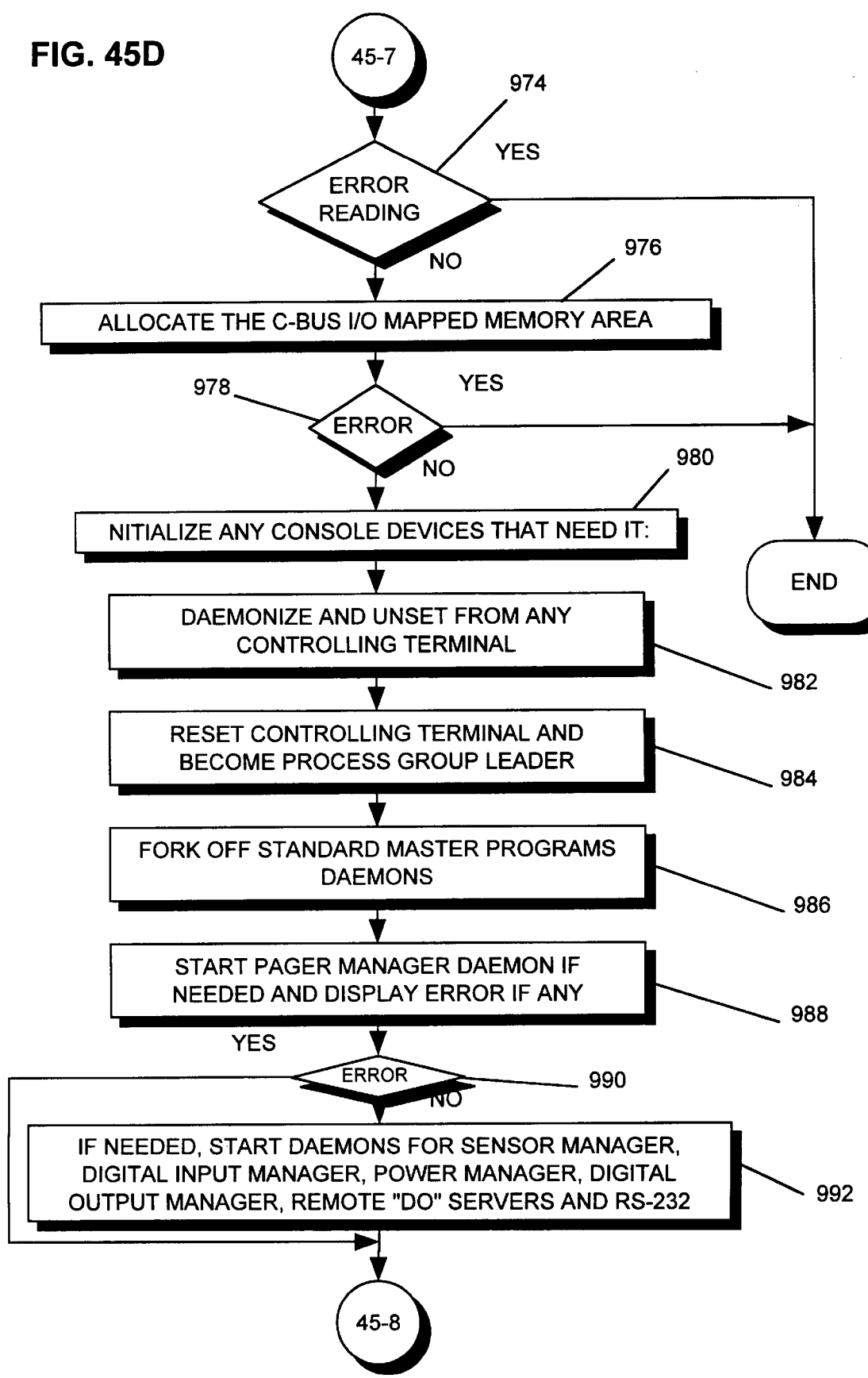
Figure 45E:
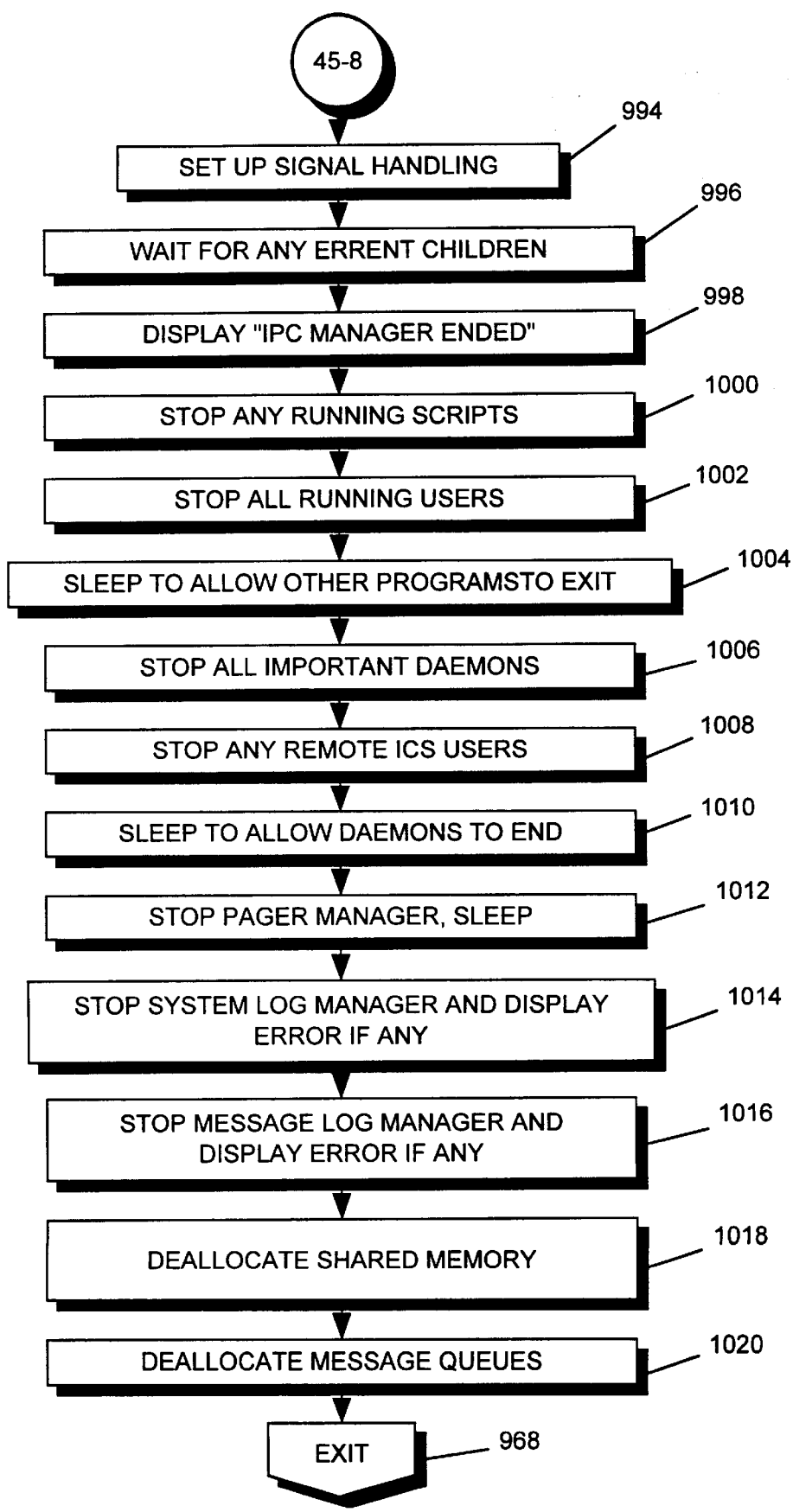

Referring now to FIG. 44, there is shown a method of running an ICL script. First, the command line is parsed 882. Upon user request, either debug mode or standalone mode is requested 884. Also, user may select to have the version number shown 884, then upon user request debug mode or standalone mode is selected 884. Alternatively, a user may; have the version number displayed; have the scheduler index number displayed; or have a help message displayed 884. If there is not a class, name and program to run 886, then the options are shown 888 and the module is exited 890. Alternatively, the class name and script are initialized 892. The trailing ".SCX" is removed 894. If not in standalone mode, an application programming interface (API) is interfaced 896 to the ICS system. The system handlers are set up 898. If the system is not in debug mode, segment fault recovery signals are set up 900. If there is no program to run 902, then the process continues at 916. Alternatively, the run-time system is initialized 904. The context is loaded 906. See FIG. 53. If there is an error 908, then an error message is displayed 910 and the process continues at 916. Alternatively, the run-time arguments are saved 912. The context is run 914. The message "Script Execution Finished" or "Script Execution Canceled" is displayed 916. The ICS-API interface is terminated 918 and the module ends 920.

Referring now to FIG. 45, there is shown a method of managing the IPC. First, the command line is parsed 922. The user-requested mode is registered 924. The message "IPC Manager Started" is displayed 926. A pointer is reset 928 to the home file directory. It is insured 930 that all shared memory and queues are owned by ICS. The port configuration file is read 932. If debug mode is selected 934, then the message "Deallocation Started" is displayed 936. If the message queues are to be done 938, then the pager, system, host and console messages are deallocated 940. If the shared memory is done 942, then shared memory is deallocated 944 for system, configuration, script, schedule, message log, filtered message log, host, CPU message log, host channel message log, host unit message log, host software message, console message, host message and remote ICS message. The process continues at 944. Alternatively, display the message "Deallocation Ended" is displayed 946. The module continues at 944. If debug mode is not selected 934, then the message "Initialization Started" is displayed 948. If the message queues are to be done 950, then the message queues are allocated 952 for console, system and pager. Errors are displayed 952. If the shared memory is not to be done 954, the process continues at 964. Alternatively, if the RS-232 is to be done only, then continue at 960. Alternatively, the shared memory is allocated 958 for system, configuration, script, schedule, message log, filtered message log, host CPU message log, host channel message log, host unit message log, host software message, console message, host message and remote ICS message. Shared memory is allocated 960 for RS-232. Any shared memory allocation errors are displayed 962. The message "Initialization Ended" is displayed 964. If "Allocate Only" or "Debug" is chosen, display the message "IPC Manager Ended" 966. The module ends 968. Alternatively, the system buffer area is initialized 970. All rooms of the system definition file are read 972. If there was an error reading the system definition file 974, the process ends 968. Alternatively, the C-BUS I/O mapped memory area is allocated 976. If there is an error in the allocation 978, the process ends 968. Alternatively, any console devices that need initialization are initialized 980. The process is daemonized (in a Unix operating system environment) and unset 982 from any controlling terminal. The controlling terminal is reset 984 and becomes the process group leader. Standard master programs daemons are forked off 986. The pager manager daemon is started 988 if needed, and any errors are displayed 988. If there were any errors 990, the process continues at 994. Alternatively, daemons are started 992 for sensor manager, digital input manager, power manager, digital output manager, remote "DO" servers and RS-232. Signal handling is set up 994. Any errant children process (i.e. processes called or started by other processes) are waited for 996. "IPC Manager Ended" is displayed 998. Any running scripts are stopped 1000. All running users are stopped 1002. The process sleeps to allow other programs to exit 1004. All important daemons are stopped 1006. Any remote ICS users are stopped 1008. The process sleeps to allow daemons to end 1010. The pager manager is stopped 1012. The system log manager is stopped 1014 and any errors are displayed 1014. The message log manager is stopped 1016 and any errors are displayed 1016. Shared memory is deallocated 1018. Message queues are deallocated 1020.

Figure 46A:
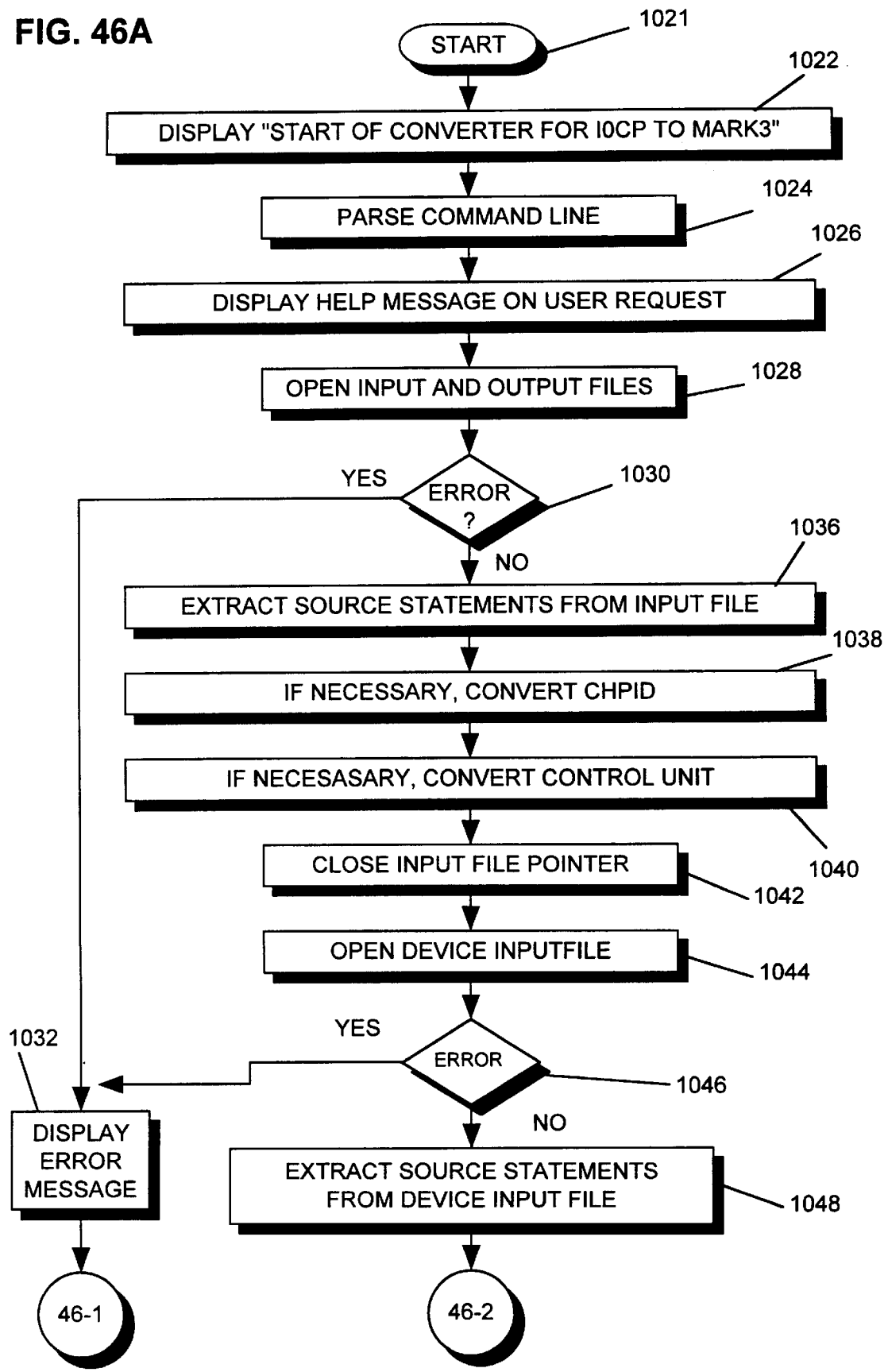
Figure 46B:
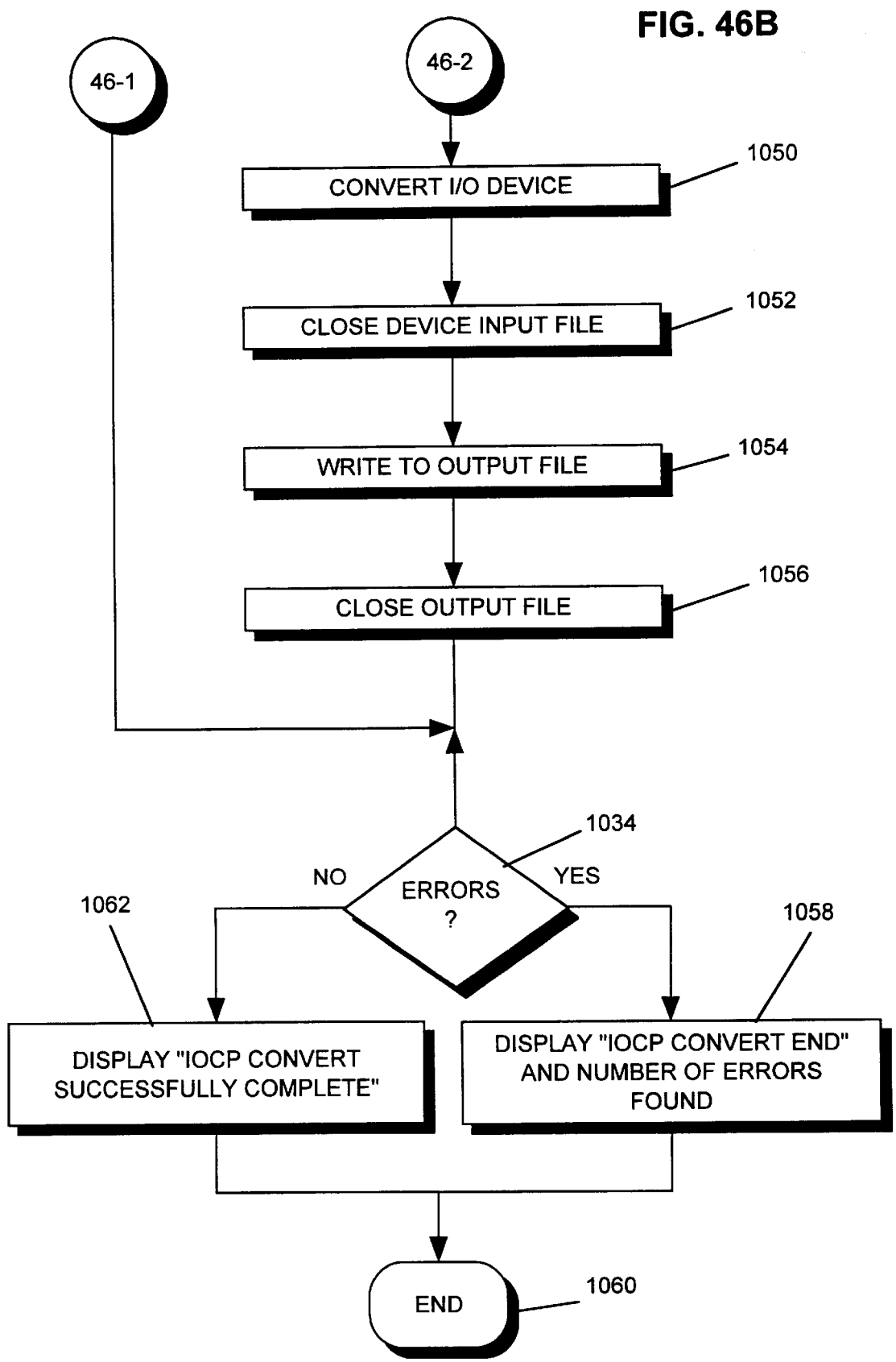
Figure 47A:
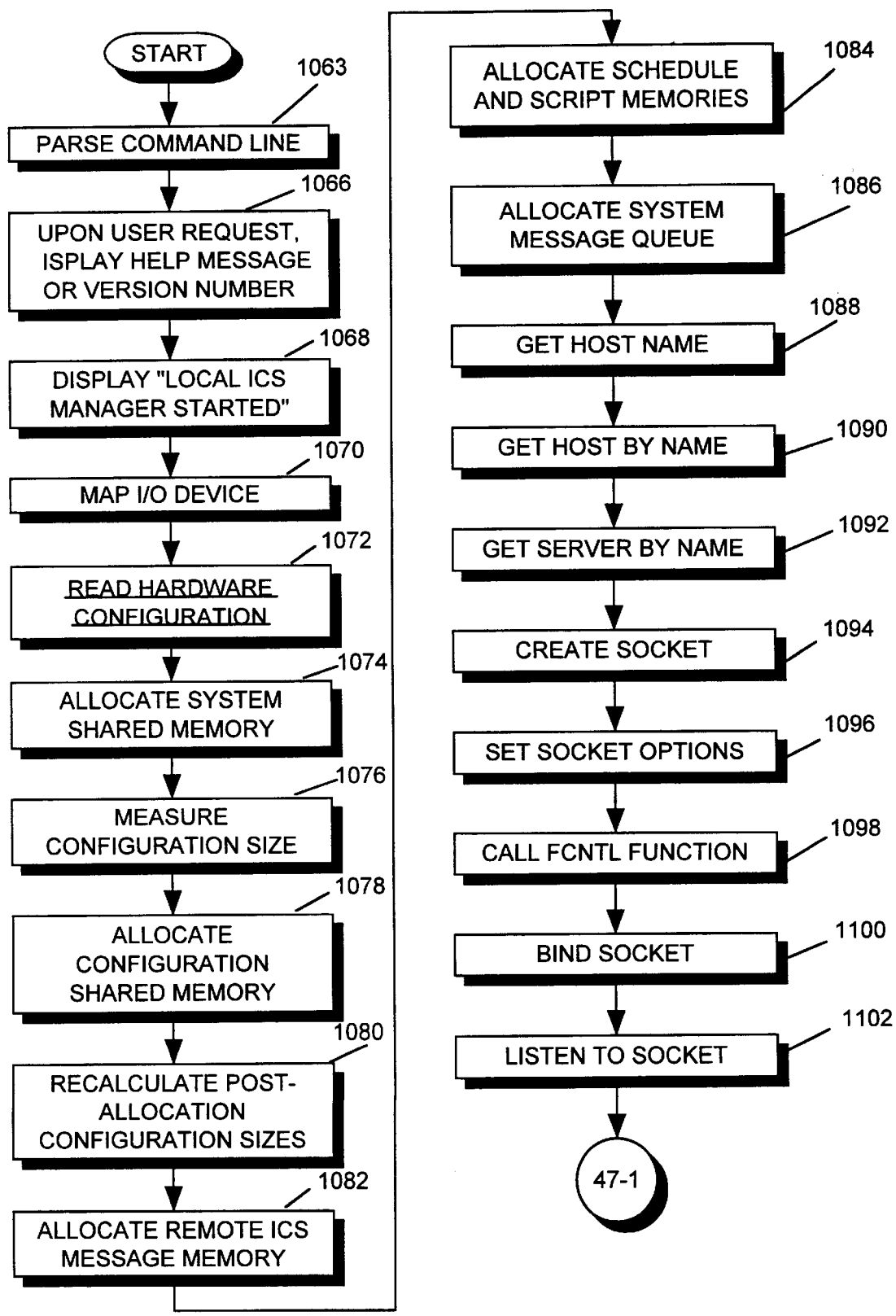
Figure 47B:
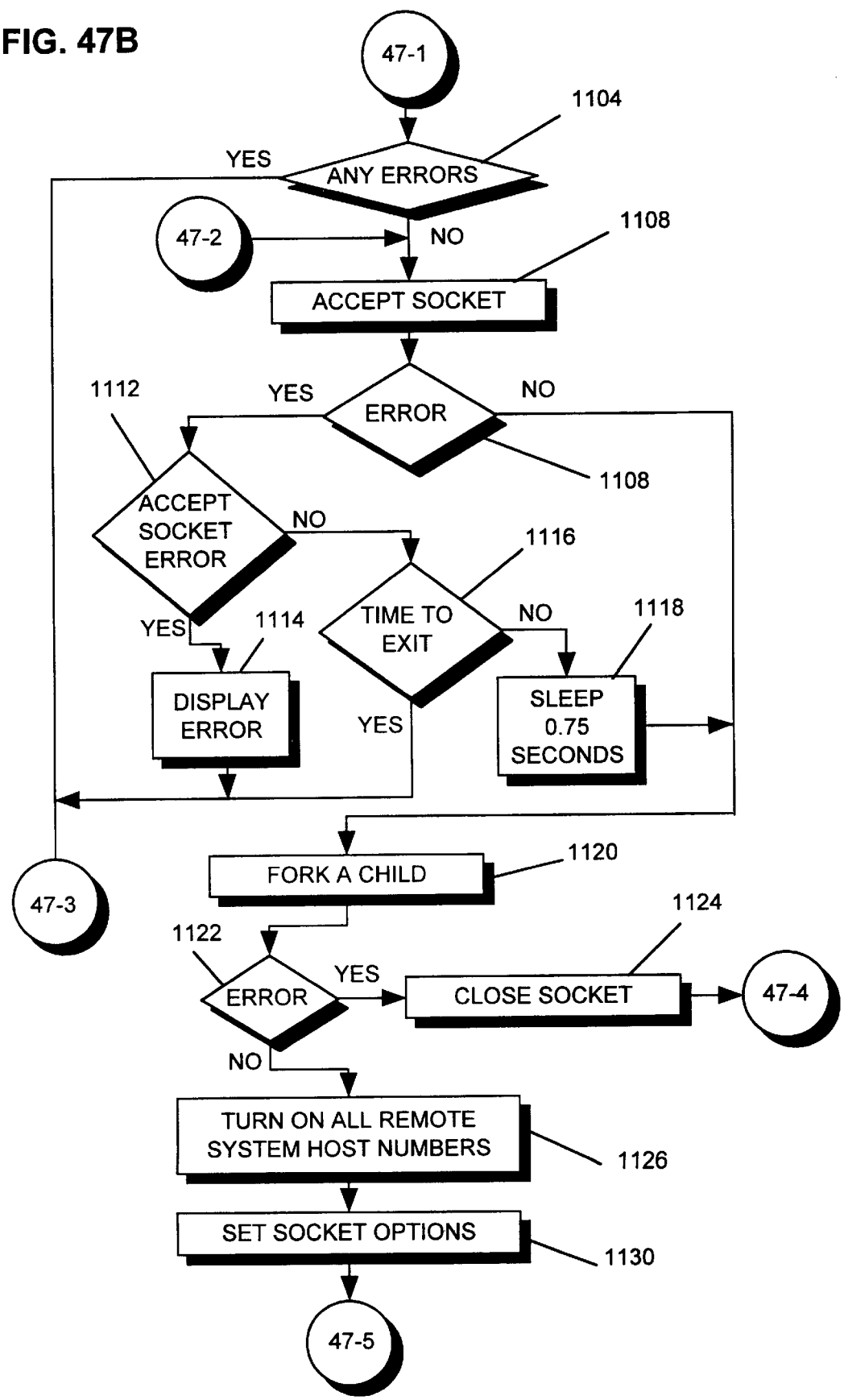
Figure 47C:
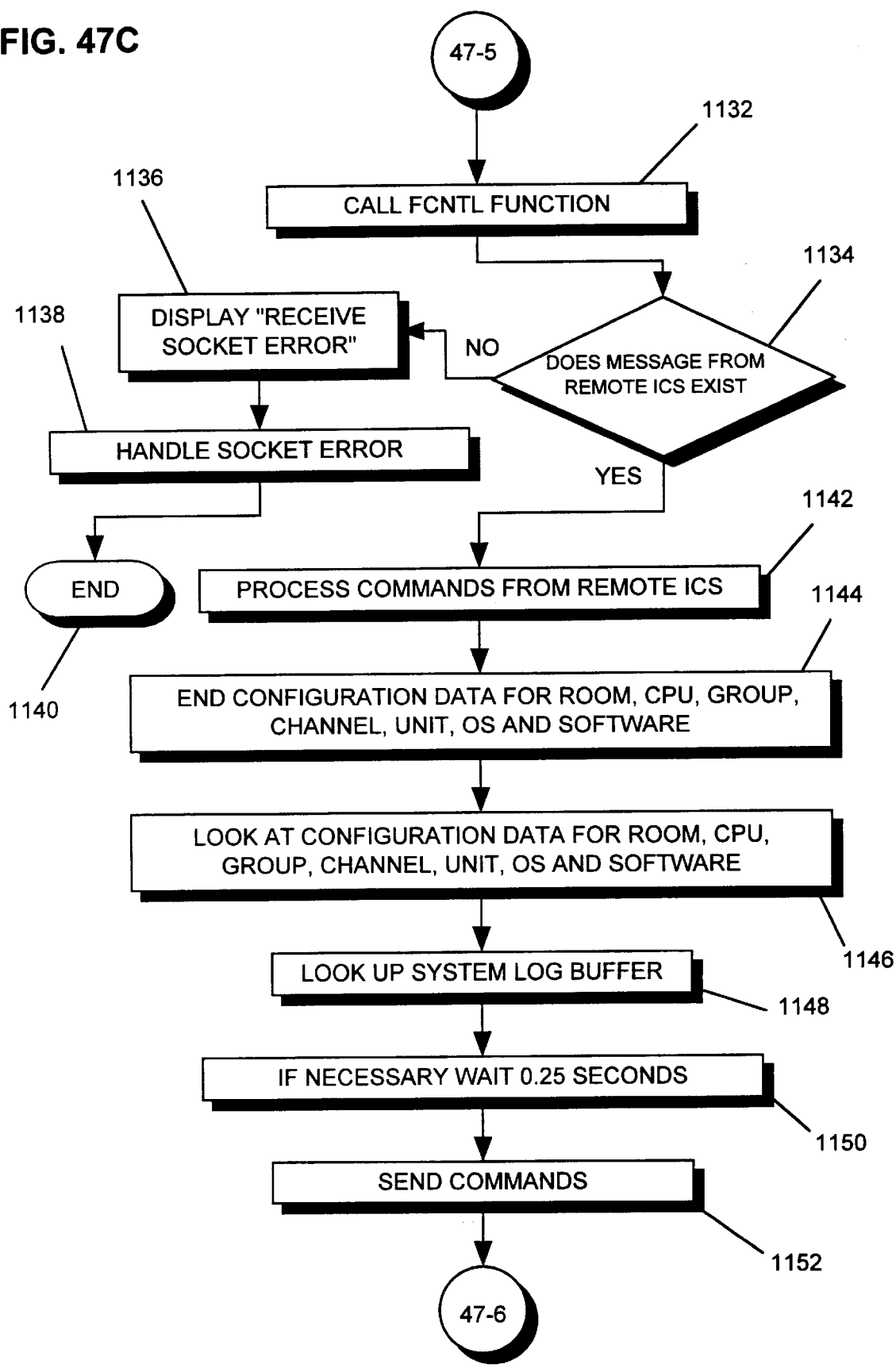
Figure 47D:
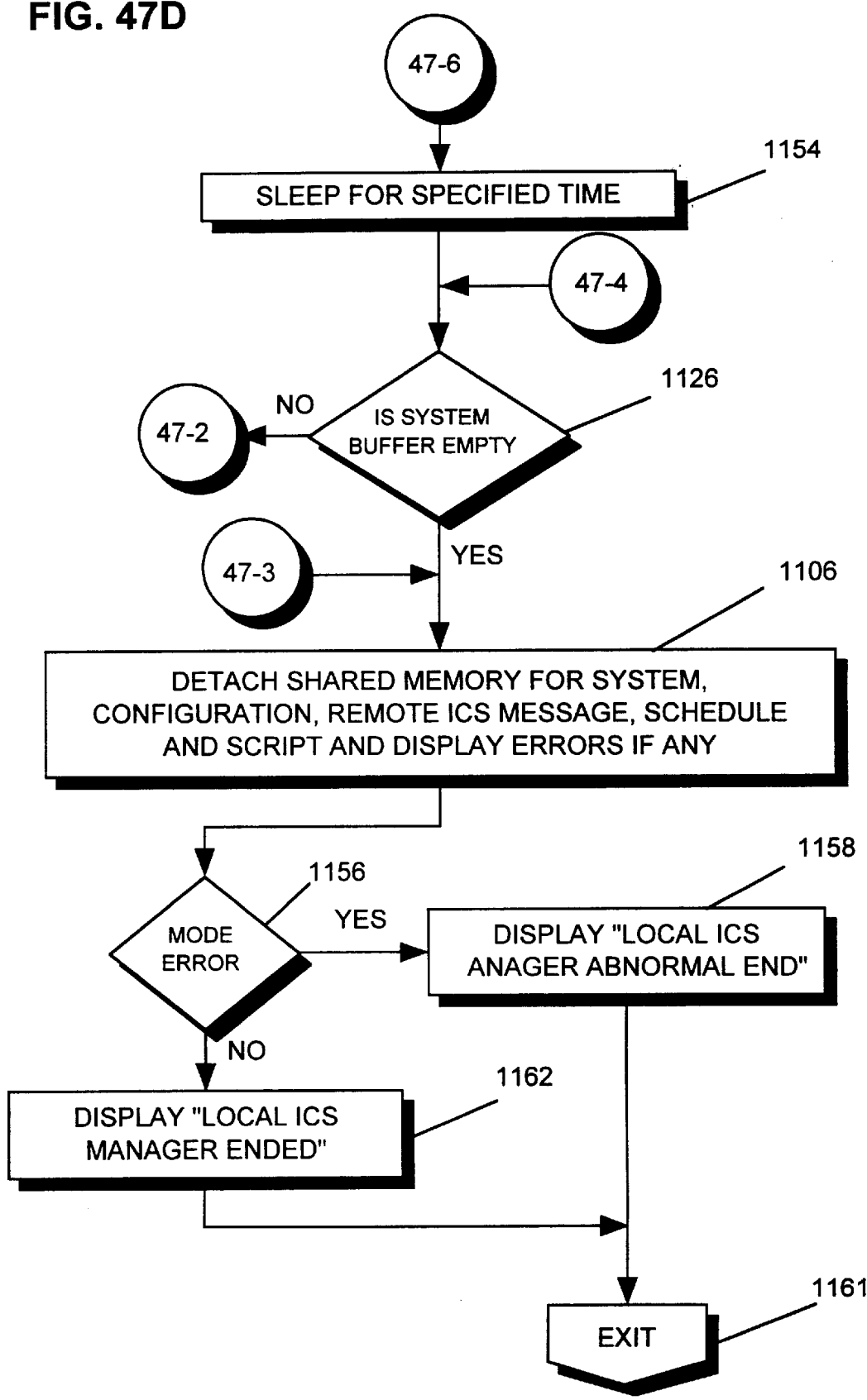

Referring now to FIG. 46, there is shown a method of converting the IOCP to Mark3. First the message "Start of Converter for IOCP to Mark3" is displayed. The command line is parsed 1024. A help message is displayed 1026 upon user request. Input and output files are opened 1028. If there was an error in opening 1030, then an error message is displayed 1032 and the process continues at 1034. Alternatively, source statements are extracted 1036 from the input file. If necessary, the CHPID is converted 1038. Then, if necessary, the control unit is converted 1040. The input file pointer is closed 1042. The input file device is opened 1044. If there was an error 1046 in opening, then an error message is displayed 1032 and the process continues at 1034. Alternatively, source statements are extracted 1048 from the device input file. The I/O device is converted 1050. The device input file is closed 1052. The output file is written to 1054. The output file is closed 1056. If there were any errors in the process, the message "IOCP Convert" is displayed 1058 and the number of errors found is displayed 1058. The module ends 1060. Alternatively, the message "IOCP Convert Successfully Complete" is displayed 1062 and the module ends 1060.

Referring now to FIG. 47, there is shown a method of managing the local ICS. First, the command line is parsed 1064. Then, upon user request, a help message or the version number is displayed 1066. The message "Local ICS Manager Started" is displayed 1068. The I/O device is mapped 1070. The hardware configuration is read 1072. See FIG. 51. The system shared memory is allocated 1074.- The configuration size is measured 1076. The configuration shared memory is allocated 1078. The post allocation configuration sizes are recalculated 1080. The remote ICS message memory is allocated 1082. The schedule and script memories are allocated 1084. The system message queue is allocated 1086. The host name is obtained 1088. The host is obtained 1090. The server is obtained 1092. Then a socket is created 1094. The options for the socket are set 1096. The FCNTL function is called 1098. A socket is bound 1100. The socket is monitored 1102. If there were any errors 1104, the process continues at 1106. Alternatively a socket is accepted 1108. If there was an error in the socket accept 1110 and 1112, then the error is displayed 1114 and the process continues at 1106. If an error occurred 1110 and it was not an accept socket error 1112 then the process checks if it is time to exit 1116. If it is time to exit then the process continues at 1106. Alternatively, the process sleeps for 0.75 seconds 1118 and then continues to 1120. At 1120, a child process is forked. If there is an error 1122, then the socket is closed 1124 and the process continues at 1126. Alternatively, all remote system host numbers are turned on

1128. The socket options are set 1130. The FCNTL function is called 1132. If a message from the remote ICS does not exist 1134, then the message "Receive Socket Error" is displayed 1136 and the socket error is handled 1138 before exiting 1140. Alternatively, the commands from the remote ICS are processed 1142. The configuration data is sent 1144 for room, CPU, group, channel, unit, operating system and software. The configuration data is looked at 1146. The system log buffer is looked up 1148. Then, if necessary, the process waits 0.25 seconds 1150. The commands are sent 1152. The process sleeps 1154 for a specified time. If the system buffer is not empty, the process jumps back to 1108. Alternatively, all shared memories are detached 1106. If there is a mode error 1156, then the message "Local ICS Manager Abnormal" is displayed 1158 and the module is exited 1160. Alternatively, the message "Local ICS Manager Ended" is displayed 1162 and the module ends 1161.

Figure 48B:
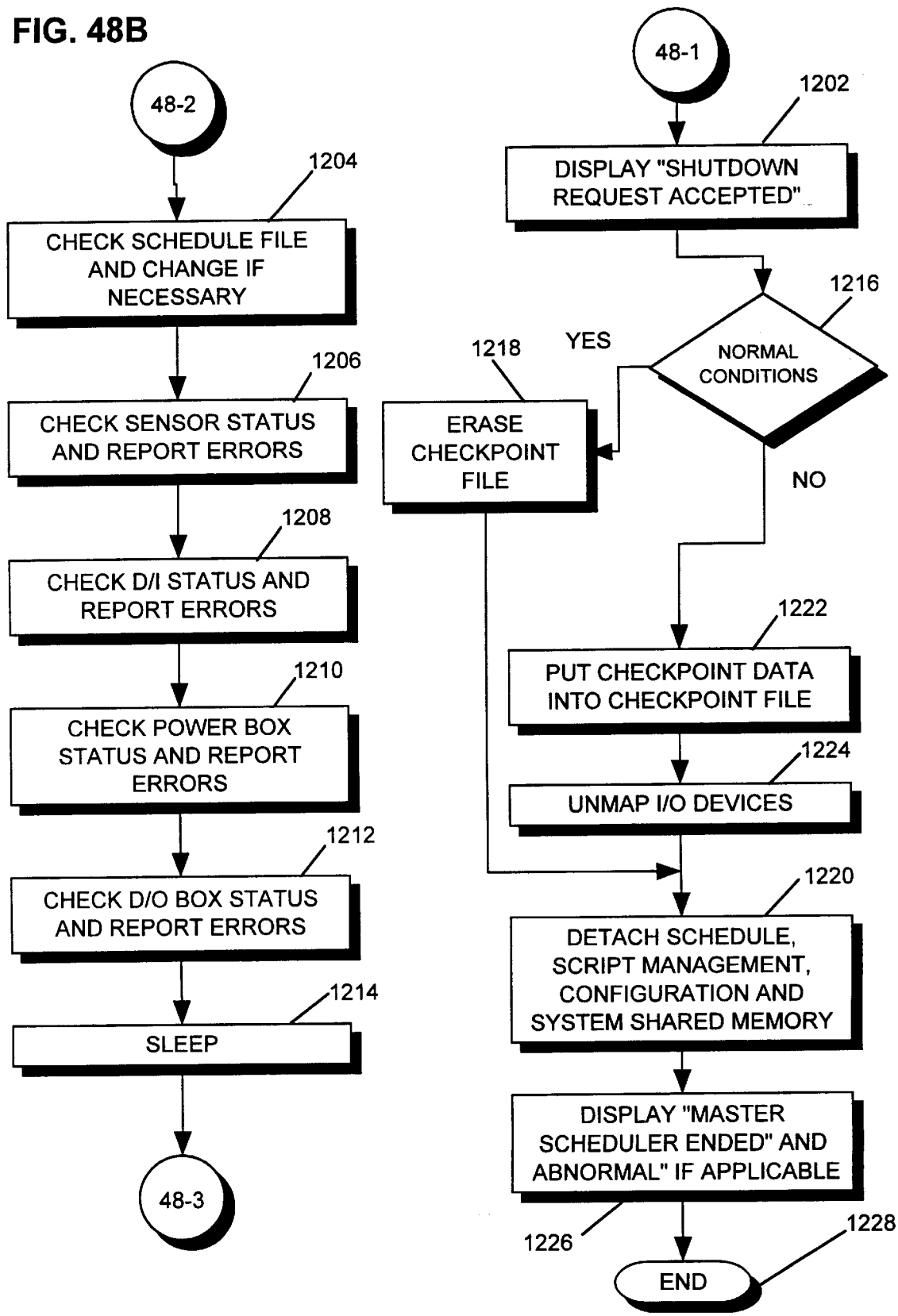

Referring now to FIG. 48, there is shown a method of operating the master scheduler. First, the command line is parsed 1164. Upon user request, the help or version number is shown 1166 or the debug mode is set 1166. The message "Master Scheduler Started" is displayed 1168. The opening title is displayed 1170. The process sleeps for awhile 1172. The message "Master Scheduler Initialization Started" is displayed 1174. The system shared memory is allotted 1176. The process accommodates 1178 for LUNA 88K with SBRK function. The size of the configuration memory needed is measured 1180. The configuration shared memory is allocated 1182. The post allocation configuration memory size is calculated 1184. The 8280 I/O hardware is mapped 1186. The hardware configuration is read 1188. See FIG. 51. The script management shared memory is allocated 1190. The schedule buffer shared memory is allocated 1192. The miscellaneous variables are handled 1194. If the initialization was successful 1196 the schedule file is read 1198. If it is time to exit the loop 1200, the process continues at 1202. Alternatively, the schedule file is checked 1204 and changed 1204, if necessary. The sensor status is checked 1206 and errors are reported 1206. The D/I status is checked 1208 and errors are reported 1208. The power box status is checked 1210 and errors are reported 1210. The V/O box status is checked 1212 and errors are reported 1212. The module sleeps 1214. At this point, the module loops back to processing step 1200. If the initialization was not successful or if it is time to exit the loop, the module continues at 1202. First the message "Shutdown Request Accepted" is displayed 1202. If the shutdown request was accepted under normal conditions 1216, the checkpoint file list is erased 1218 and the module continues at 1220. Alternatively, the checkpoint data is put into 1222 the checkpoint file. The I/O devices are unmapped 1224. The shared memory is detached 1220 for schedule, script management, configuration and system. The message "Master Scheduler Ended" is displayed 1226 and an abnormal end is indicated 1226, if applicable. The process ends 1228.

Figure 49A:
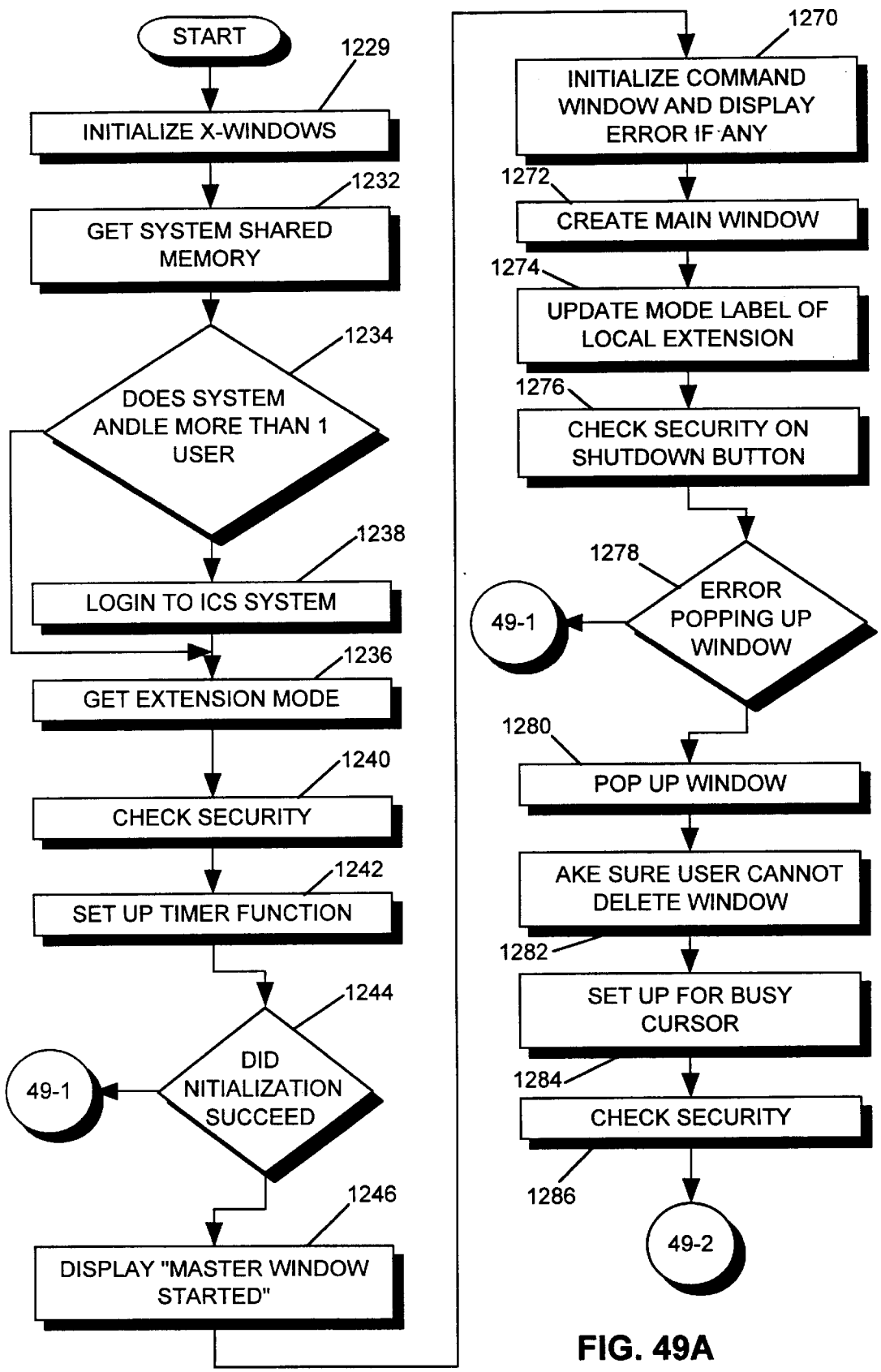
Figure 49B:
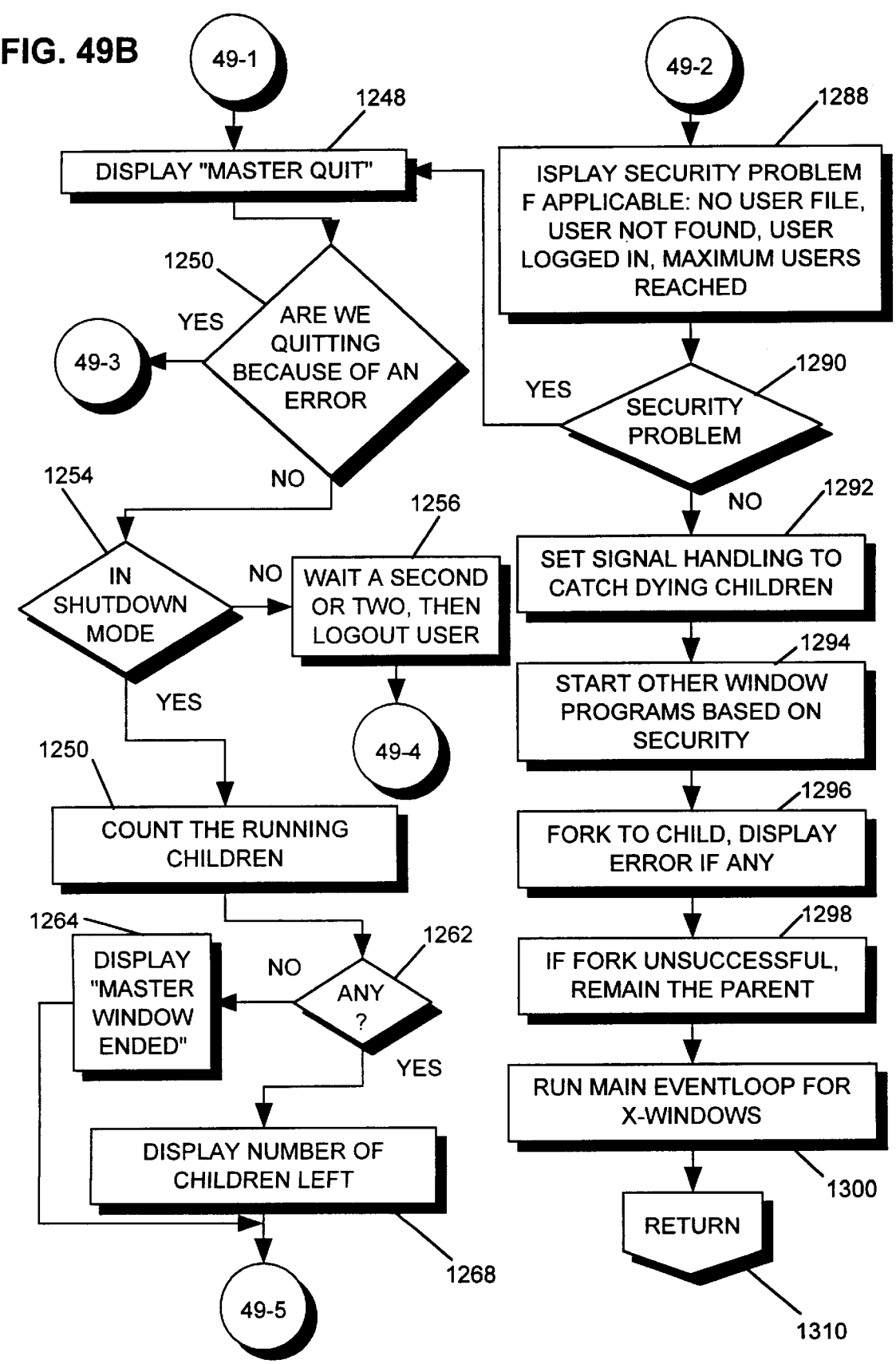
Figure 49C:
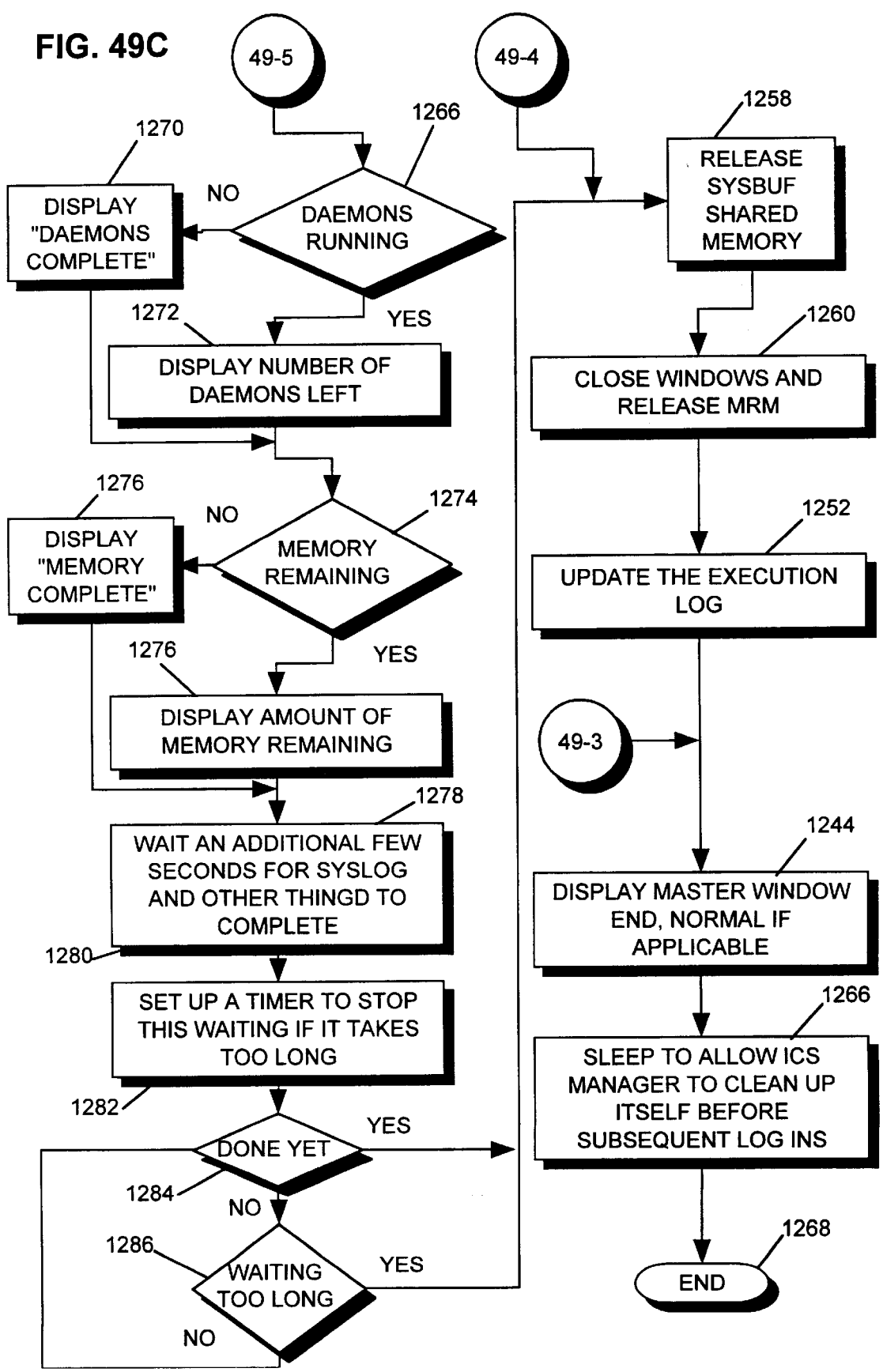

Referring now to FIG. 49 there is shown a method of managing the windows. First X-windows graphical user interface environment is initialized 1230. The system shared memory is allocated 1232. If the system does not handle more than one user 1234, the process continues at 1236. Alternatively, the ICS system requests a log-in 1238. The extension mode is obtained 1236. The security is checked 1240. A timer function is set up 1242. If the initialization succeeds 1244, then the process continues at 1246. Alternatively, the message "Master Quit" is displayed 1248. If the quit is due to an error 1250, the process continues at 1264. Alternatively, if shutdown mode has not been selected 1254, the process waits a second 1256 and then logs out 1256 the user and then continues at 1258. Alternatively, the running children are counted 1260. If there are no running children 1262, the message "Master Window Ended" is displayed 1264 and the process continues at 1266. Alternatively, the number of children left is displayed 1268. If there are no daemons-running 1266, then the message "Daemons Complete" is displayed 1270. Alternatively, the number of daemons left is displayed 1272. If there is no memory remaining 1274, the message "Memory Complete" is displayed 1276. Alternatively, the amount of memory remaining is displayed 1278. A few seconds is waited 1280 for the SYSLOG and other things to complete. In addition, a timer is set up 1282 to stop if the waiting takes too long. If the waiting is not done yet 1284 and the process has not been waiting too long 1286, the process continues waiting. Alternatively, the SYSBUF shared memory is released 1258. Windows are closed 1260 and the MRM is released 1260. The execution log is updated 1252. The message "Master Window Ended" is displayed 1264 and whether the end was abnormal is also displayed 1264. The process sleeps to 1266 to allow the ICS manager to clean itself up before subsequent log INS. The process ends 1268. Referring now back to 1244, if the initialization did succeed 1244, the master window module is initiated. First the message "Master Window Started" is displayed 1246. The command window is initialized 1270 and any errors are displayed 1270. The main window is created 1272. The mode label of the local extension is updated 1274. Security is checked 1276 on the shutdown button. If there is an error popping up the window 1278, the process continues at 1248.

Alternatively, a window is popped up 1280. The user is prevented 1282 from deleting the window. The process prepares 1284 for a busy cursor. Security is checked 1286. If there is a security problem, it is displayed 1288. Security problems include no user file, user not found, user logged in and maximum users reached. If there is a security problem 1290, the module continues at 1248. Alternatively the signal handling is set 1292 to catch dying children processes. Other window programs are started 1294 based on their user access through the security channels. Then a child process is forked or started 1296 and any errors are displayed 1296. If the fork is unsuccessful, the process flow remains with the parent 1298. The main event loop is run 1300 for X windows. The module returns 1310 to the calling function.

Referring now to FIG. 50, there is shown a method of filtering a message. First, the command line arguments are parsed 1312. Then options are set 1314. The message "Message Filter Started" is displayed 1316. The system shared memory is allocated 1318. The printer shared memory is allocated 1320. The system log message queue ID is obtained 1322. The color definition is obtained 1324. The message filter file is opened 1326. The message filter area is initialized 1328. The "COLOR" file is checked 1330 for a message. It is determined 1332 if that color is within the allowable range and any errors are displayed 1332. The filter file is closed 1334. If there were any errors 1336, the module continues at 1338. Alternatively, if the message filter must be exited 1340, then the module continues at 1338. Alternatively, if the user has changed the filter file, then the new filter file is read 1342. The process sleeps 1344. If the message is less than 12 characters 1346, all characters are dumped I1348 and the user is informed 1348 that a short message was found. If there are no filter messages left, 1350, the next message is skipped to, 1352. If it is time to exit the filter 1354, then the system and printer shared memories are detached 1338 and any errors are displayed 1338. The process sleeps 1356. The message "Message Filter End" is displayed 1358 and any abnormal end is indicated 1358. The module ends 1360. Alternatively, if it is not time for the filter to exit 1354, then the file is checked for any more filter messages 1350. If there are any filter messages left 1350, then a key word is searched for 1362 in the message. It is determined whether the message should be skipped 1364. If there are any special "*" messages, then the message is logged according to 1368. Alternatively, and in any event, the found message is taken 1370 and processed 1370 according to the script as shown in 1370. The result is sent 1372 to the message queue send area and any error is displayed 1372. The process continues at 1350.

Referring now to FIG. 51, there is shown a method of filtering the file. First, the command line is parsed 1374. The help message or the version number is displayed 1376 upon user request. The message "Message Filter File Check Started" is displayed 1378. The system shared memory is allocated 1380. The color definition is obtained 1382. The message filter file is obtained 1384 and any errors are displayed 1384. If the filter definition exceeds the maximum 1386, whether the color is within the allowable range is checked 1388 and an error is displayed 1388, if any. The filter file is closed 1390. If there were no errors 1392, the message "Filter Successfully Changed" is displayed 1394. Alternatively, the message "Message Filter Not Changed" is displayed 1396. The system shared memory is detached 1398 and any errors are displayed 1398. The message "Message Filter File Checker Ended" is displayed 1400. The module ends 1402.

Figure 52A:
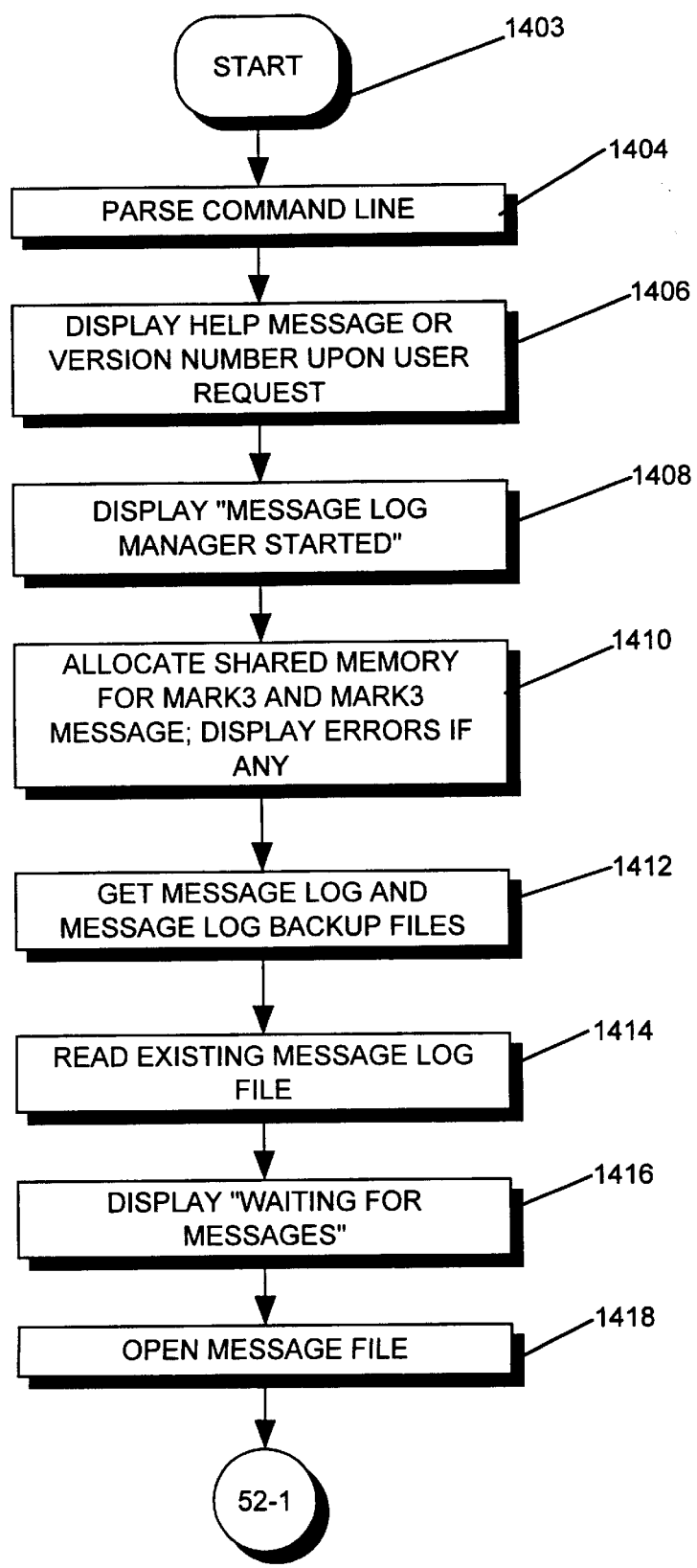
Figure 52B:
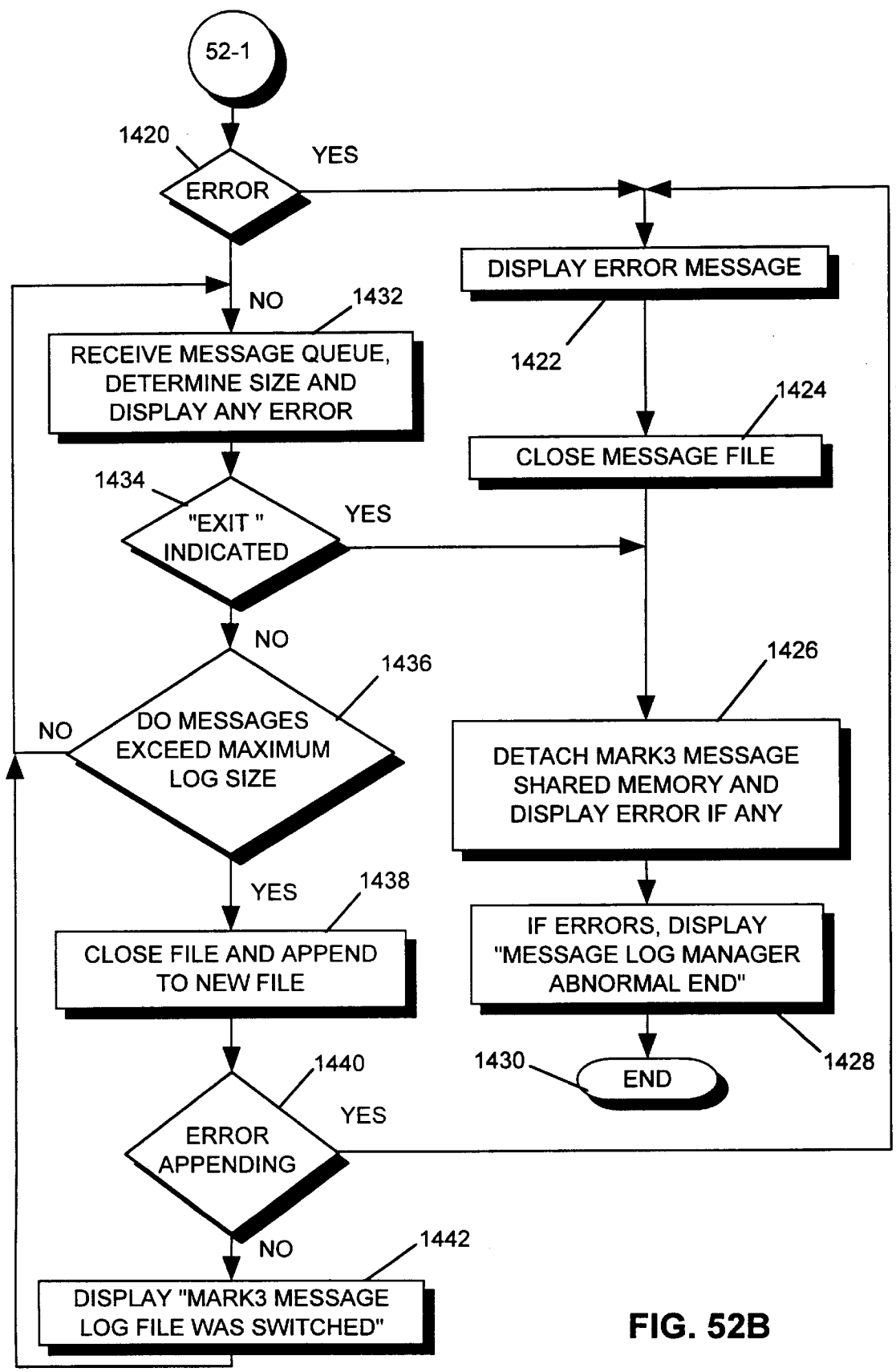

Referring now to FIG. 52, there is shown a method of managing the message log. First, the command line is parsed 1404. A help message or version number is displayed 1406 upon user request. The message "Message Log Manager Started" is displayed 1408. Shared memory is allocated 1410 for the Mark3 and the Mark3 message and any errors are displayed 1410. The message log is obtained 1412 and the message log backup files are obtained 1412. The existing message log file is read 1414. The message "Waiting for Messages" is displayed 1416. The message file is opened 1418. If there was an error opening 1420, then an error message is displayed 1422, the message file is closed 1424, the Mark3 message shared memory message is detached 1426, any errors are displayed 1426, and the message "Message Log Manager Abnormal End" is displayed 1428. If there were errors, then the module ends 1430. Alternatively, the message queue is received 1432 and the size is determined. Any errors are displayed 1432. If an exit was indicated 1434, the process continues at 1426. Alternatively, if the messages exceed the maximum log size 1436, the file is closed 1438 and appended 1438 to the new file. Then if there was an error appending 1440, the process continues at 1422. Alternatively, the message "Mark3 Message Log File was Switched" is displayed 1442 and the process loops back to 1432. If the messages did not exceed the maximum log size at 1436, then the process loops back to 1432.

Figure 53A:
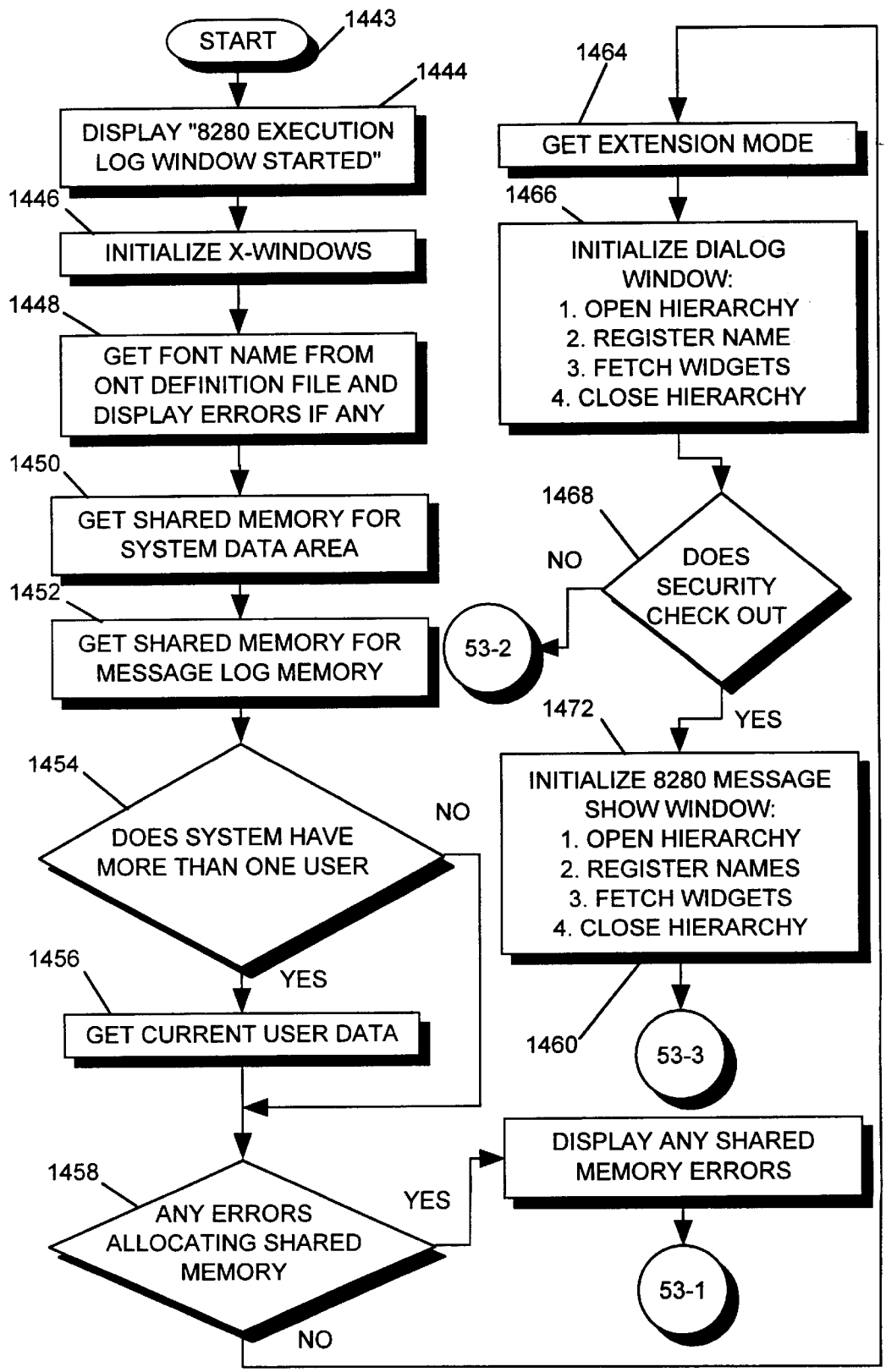
Figure 53B:
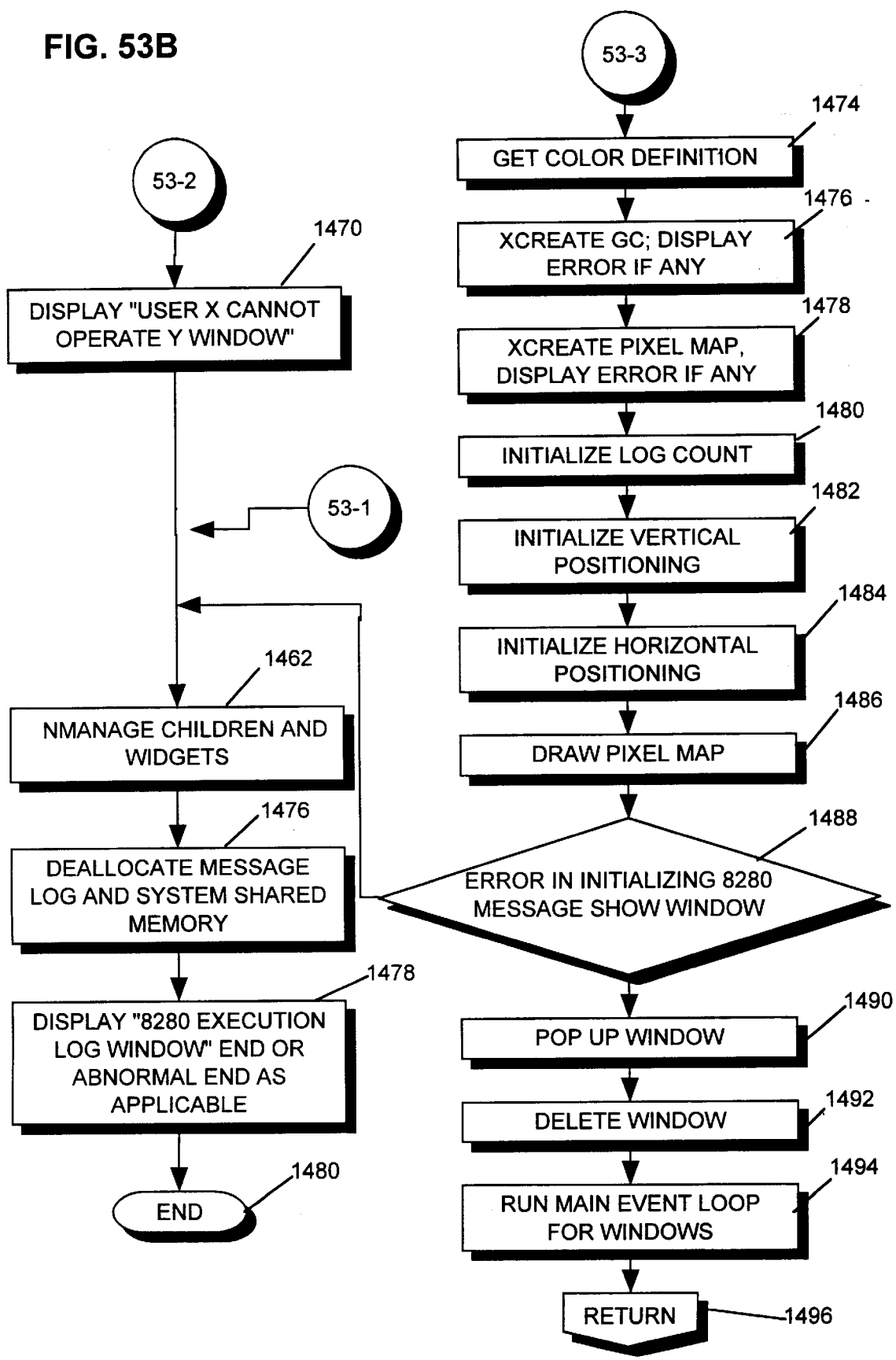

Referring now to FIG. 53, there is shown a method of executing the 8280 log window. First the message "8280 Execution Log Window Started" is displayed 1444. X-windows are initialized 1446. The font name is obtained 1448 from the font definition file and any errors are displayed 1448. The shared memory is obtained 1450 from the system data area. Then the shared memory is obtained 1452 for the message log memory. If the system has more than one user 1454, current user data is obtained 1456. Alternatively, if there are errors allocating shared memory 1458, then the shared memory errors are displayed 1460 and the process continues at 1462. Alternatively, the extension mode is obtained 1464. The dialog window is initialized 1466. If the security does not check out 1468, the process continues at 1470. Alternatively, the 8280 message show window is initialized 1472 and the process continues at 1474. Referring now to 1470, the message "User X Cannot Operate Y Window" is displayed 1470. The children and widgets are unmanaged 1462. The message log and system shared memory are deallocated 1476. The message "8280 Execution Log Window End" is displayed 1478 and any abnormal end is indicated 1478. The process ends 1480. Referring now to 1474, the color definition file is obtained 1474. The X-windows create the GC 1476. The X-windows create the pixel map 1478. The log count is initialized 1480. The vertical positioning is initialized 1482 The horizontal positioning is initialized 1848. The pixel map is drawn 1486. If there was an error in initializing the 8280 message show window 1488, then the process continues at 1462. Alternatively, the window is popped up on the display screen 1490. The window is deleted 1492. The main event window is run 1494 for windows. Finally, the module returns 1496 to its calling function.

Referring now to FIG. 54, there is shown a method of operating an object manager. First, the command line is parsed 1498 and the system is set for verbose if requested. The system configuration is read 1500. See FIG. 52. In particular, configuration sections are read 1502 for "Enum", "List", "Fields", and "Type". The software type pointers are fixed 1504 using the type name if provided. Then if the pointer does not exist 1506, space is made 1506 and the pointer is created 1506. The shared memory is obtained 1508 for the system data area. In addition, whether the shared memory already exists for the object manager is checked 1510. If the shared memory exists 1512, the process continues at 1514. Alternatively, the length of the memory needed is calculated 1516. The shared memory is created 1518 for the object manager. The shared memory is populated 1520 for each room. A list of children is created 1514. The child connection is created 1522 and added 1522 to the list. The socket server is initialized 1524. The sockets are monitored 1526. If the wait time has not expired 1528, then the process continues at 1530. Alternatively, if it is not time to quit 1532, the process continues at 1530. Alternatively, the shutdown flag is set 1534, then if noise is found on the socket 1530, a connection is added 1530 to listen. If noise is found on an existing socket 1530, a message is received 1536 from the socket. If the process timed out waiting 1538, the connection is removed 1538. The message type received is displayed 1540 to the user. If the message is type "WAIT NO MORE" 1542, then the child is removed 1544 from the wait list. If the message is type "WAIT" 1545, then a child is added 1546 to the wait list. If the message is type "NOTIFY" 1547, then a child is added to the wait list and marked "NOTIFY" 1548. If the message is type "CHANGE" 1550 the requested change is made 1552 to the child. If the message is type "WAKE", "OK", "FAIL" or others 1554, then it is indicated 1556 that a bad message is sent, and this indication is sent 1556 to the socket. If there is no shutdown flag, the process loops back to 1526. Alternatively, the socket is shut down 1516 and the process ends 1562.

Figure 55:
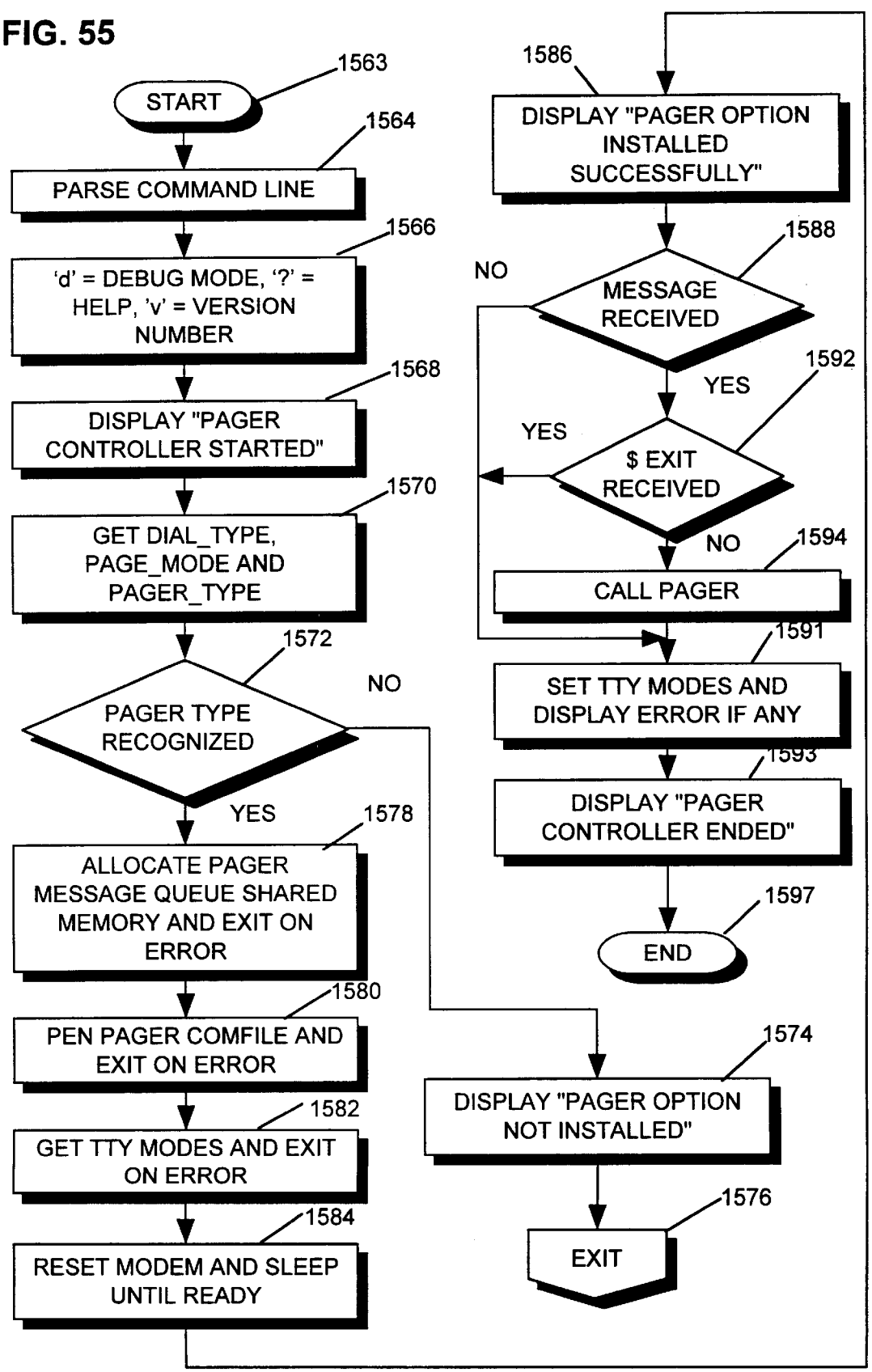

Referring now to FIG. 55, there is shown a process of operating a pager controller. First, the command line is parsed 1564. Subsequently, user options are selected 1556. The message "Pager Controller Started" is displayed 1568. The dial type, page mode and pager type are obtained 1570.

If the page type is not recognized 1572, the message "Pager Option Not Installed" is displayed 1574 and the module ends 1576. Alternatively, the pager message queue shared memory is allocated 1578 and the process ends 1576 if any errors. The pager COMFILE is opened 1580 and the process exits 1576 if any errors. The TTY modes are obtained 1582 and the process exits 1576 if any errors. The modem is reset 1584 and the process sleeps 1584 until ready. The message "Pager Option Installed Successfully" is displayed 1586. If a message is not received 1588, the process continues at 1590. Alternatively, if the $EXIT is received 1592, the process continues at 1591. Alternatively the pager is called 1594. The TTY modes are set 1591 and any errors are displayed 1591. The message "Pager Controller Ended" is displayed 1593 and the module ends 1597.

Figure 56A:
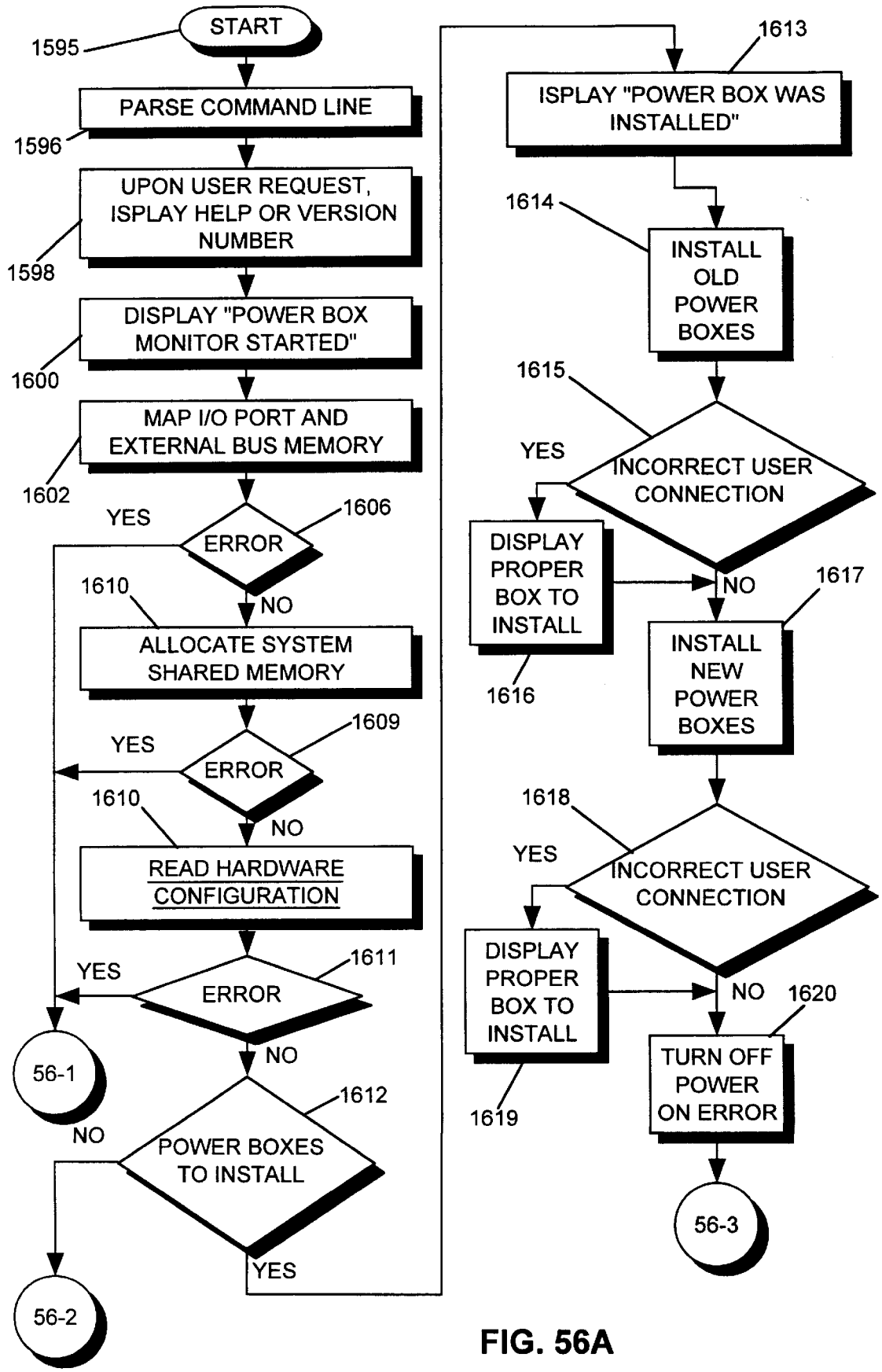
Figure 56B:
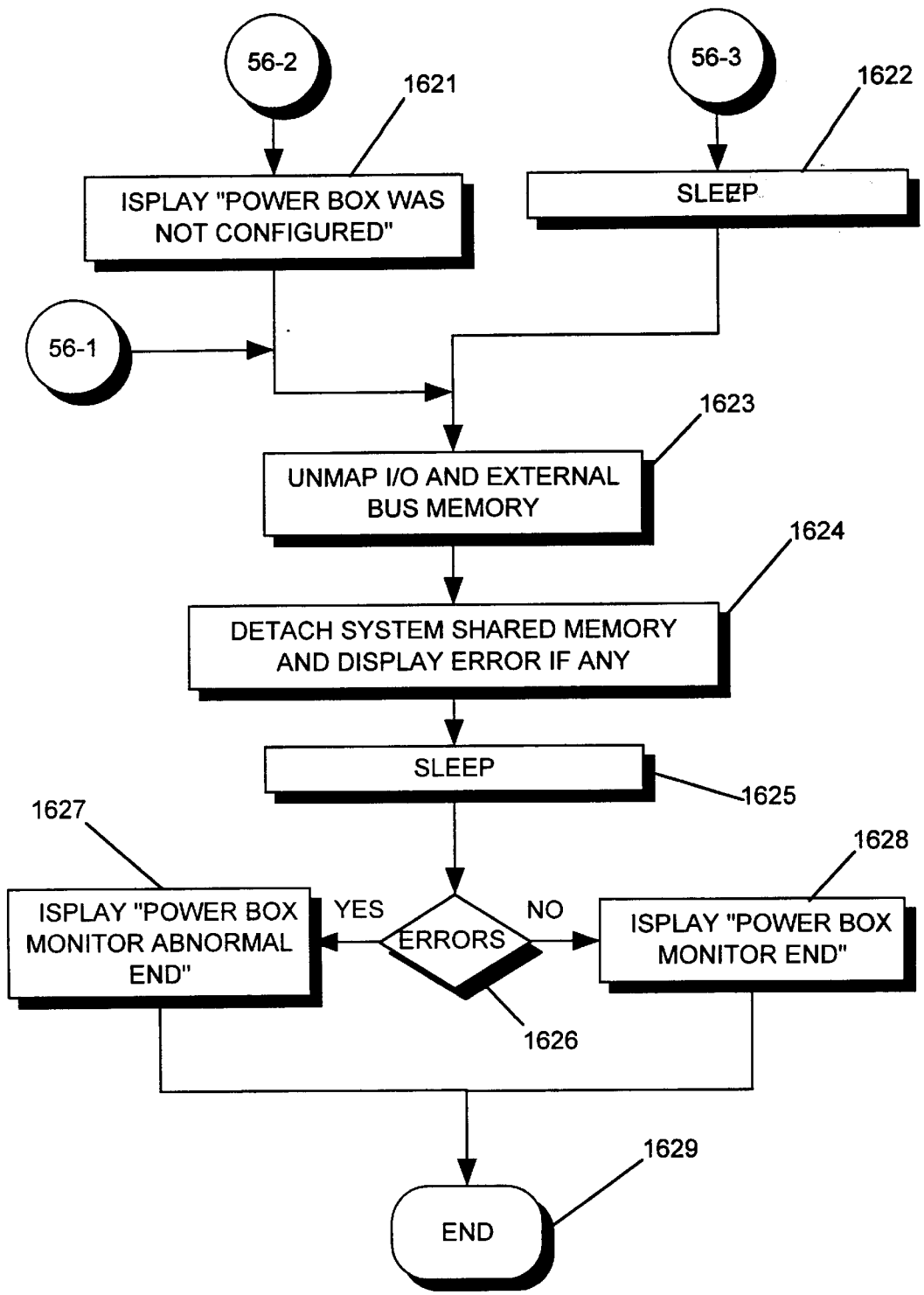

Referring now to FIG. 56, there is shown a method of monitoring a power box. First, the command line is parsed 1596. User options are registered 1598. The message "Power Box Monitor Started" is displayed 1600. The I/O port is mapped 1602 along with the external bus memory. If there is an error 1606 the process continues at 1604. Alternatively the system shared memory is allocated 1608. If there is an error 1606, the process continues at 1604. Alternatively, the system shared memory is allocated 1608. If there is an error, the process continues at 1604. Alternatively, the hardware configuration is read 1610. See FIG. 72. If there is an error 1611, the process continues at 1623. Alternatively, if there are no power boxes to install 1617, the message "Power Box was Not Configured" is displayed 1621 and the process continues at 1604. Alternatively, the message "Power Box was Installed" is displayed 1613. The old power boxes are installed 1614. If there was an incorrect user connection 1615, then the proper box to install is displayed 1616. The new power boxes are installed 1617. If there is an incorrect user connection 1618, the proper box to install is displayed 1619. The power is turned off 1620. If there is an error. The process sleeps 1622. Then the I/O and external bus memories are unmapped 1623. The system shared memory is detached 1624 and any errors are displayed 1624. The process sleeps 1625. If there were any errors 1626, the message "Power Box Monitor Abnormal" is displayed 1627. Alternatively, the message "Power Box Monitor End" is displayed 1628. In either event, the process ends 1629.

Figure 57A:
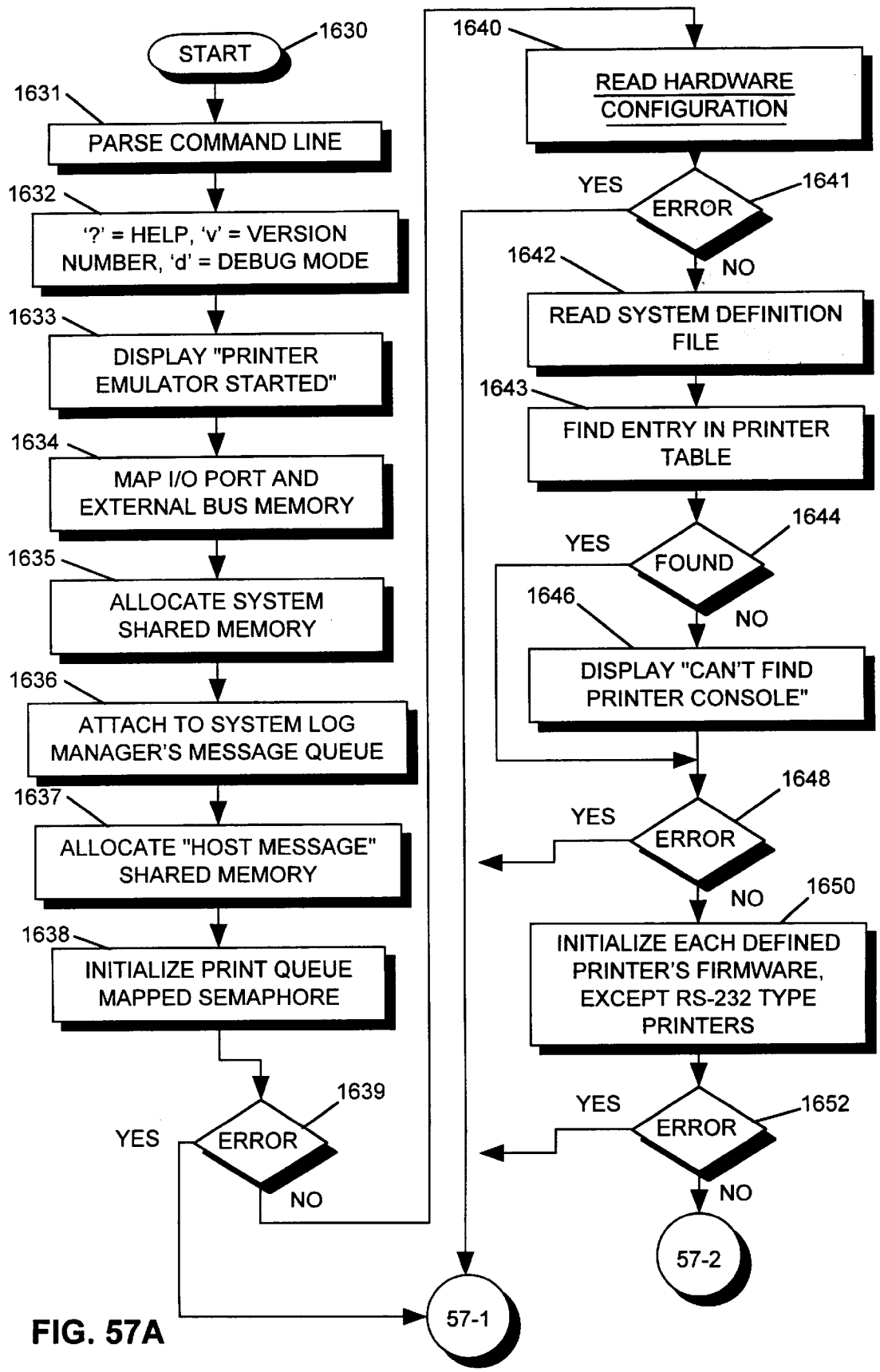
Figure 57B:
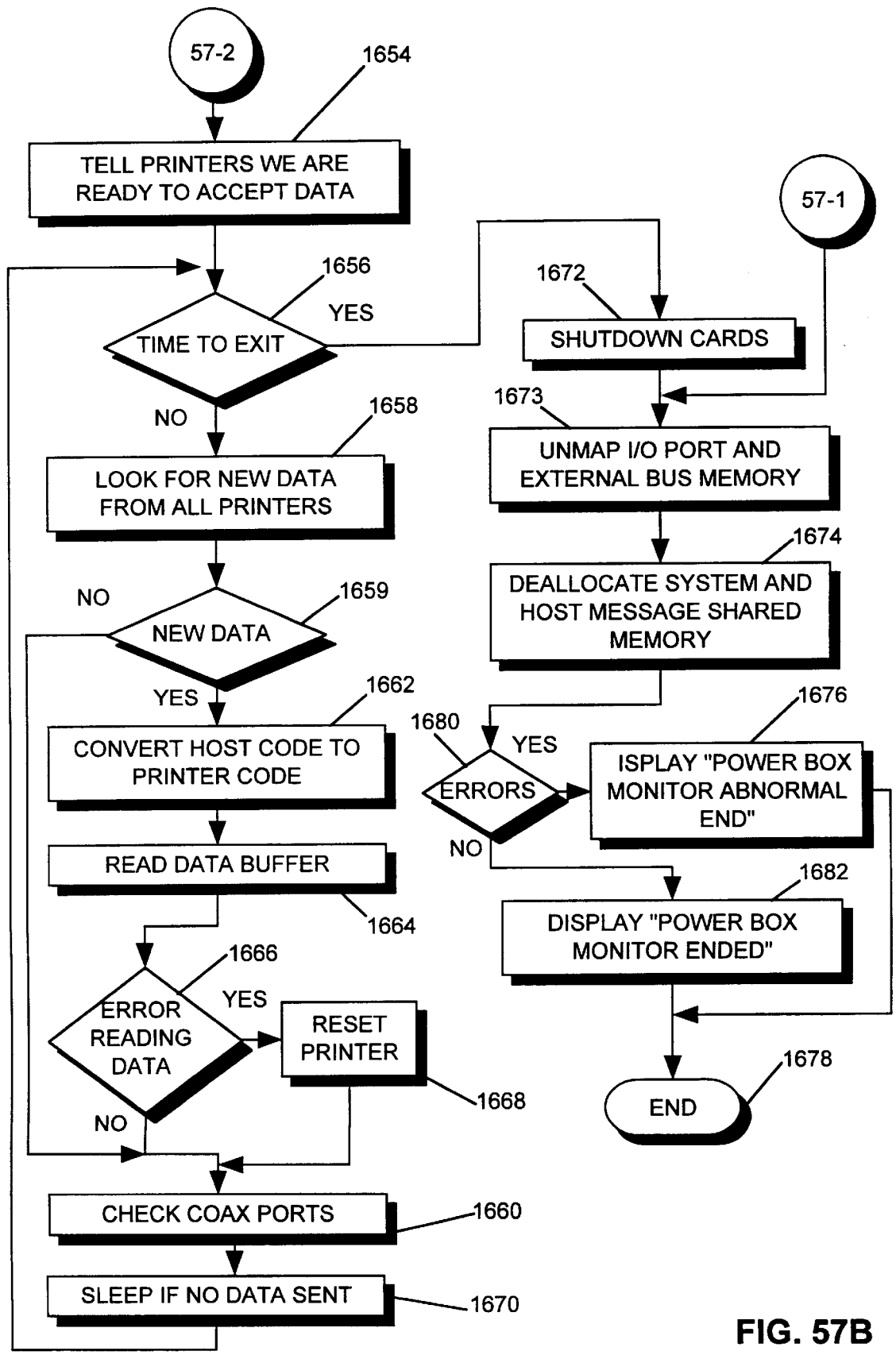

Referring now to FIG. 57, there is shown a method of operating a printer emulator for a 3270 printer. First the command line is parsed 1631. The user options are registered 1632. The message "Printer Emulator Started" is displayed 1633. The I/O port and external bus memory is mapped 1634. The system shared memory is allocated 1635. The system log manager's message queue is attached 1636. The "Host Message" shared memory is allocated 1637. The print queue is initialized 1638. If there was an error 1632, the process continues at 1673. Alternatively, the hardware configuration is read 1640. See FIG. 72. If there was an error 1641, the process continues at 1673. Alternatively, the system definition file is read 1642. The entry in the printer table is found 1643. If the entry cannot be found 1644, the message "Can't Find Printer Console" is displayed 1646 and the process continues at 1673. Alternatively, each defined printer's firmware, except the RS 232 type, is initialized 1650. If there is an error 1652, the process continues at 1634. Alternatively, the printers are informed 1654 that data is ready to be accepted. If it is not time to exit 1656, then new data is searched 1658 from all printers. If no new data is found, the process continues at 1660. Alternatively, the host code is converted 1662 to printer code. The data buffer is read 1664. If there was an error 1666, the printer is reset 1668. Alternatively, the coax ports are checked 1660. The process sleeps 1670 if no data was sent. The process loops back to 1656. If it is time to exit 1656, the cards are shut down 1672. The I/O port and external bus memory are unmapped 1673. The system and host message shared memories are deallocated 1674. If there were any errors the message "Power Box Monitor Abnormal End" is displayed 1676 and the process ends 1678. Alternatively, the message "Power Box Monitor Ended" is displayed 1682 and the process ends 1678.

Figure 58:
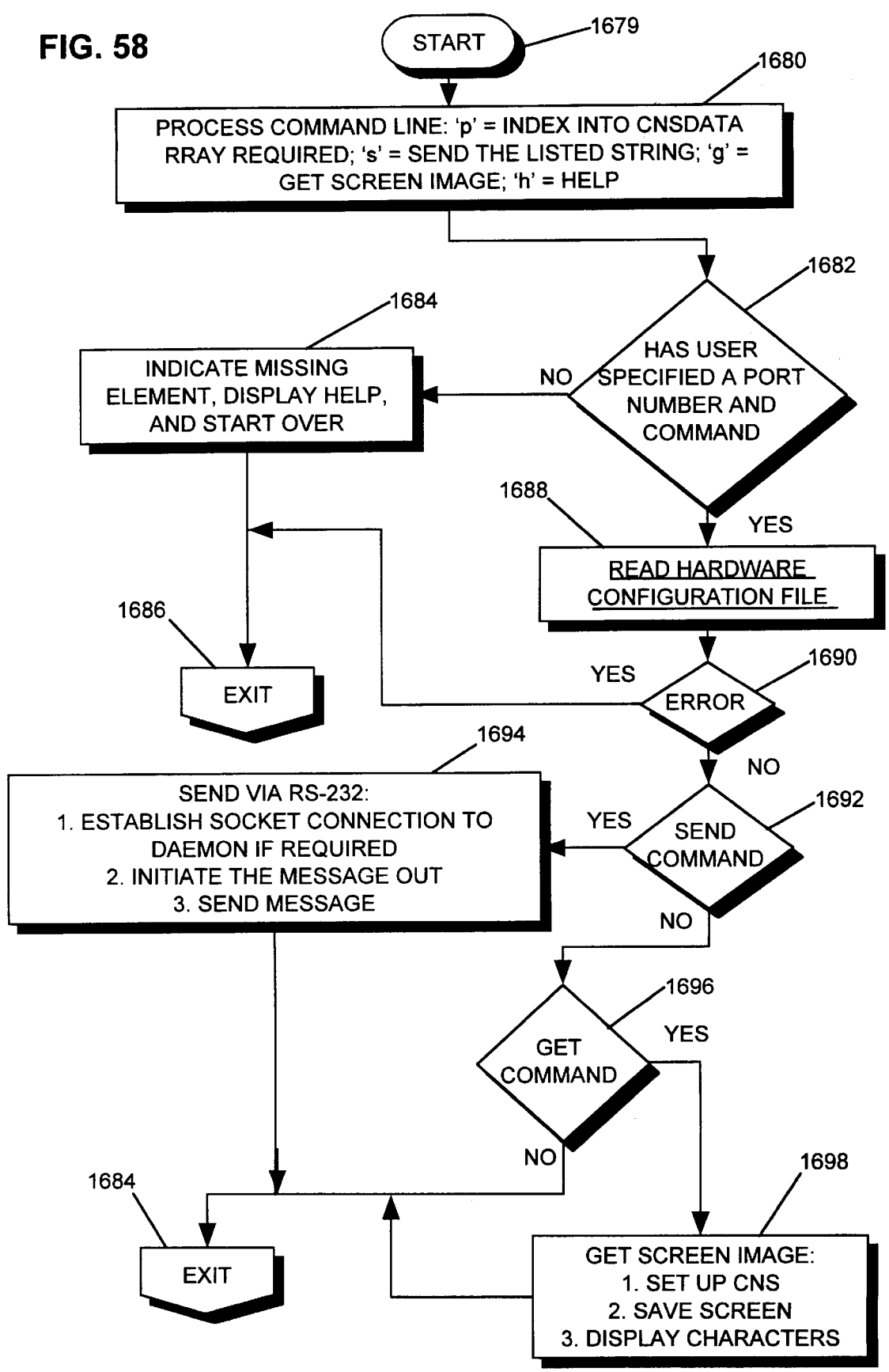

Referring now to FIG. 58, there is shown a method of operating the RS-232 port. User options are registered 1680. If the user has not specified a port number and command 1682, then the missing element is displayed 1684. A help message is displayed 1684 and the process exits 1686. Alternatively, the hardware configuration file is read 1688. See FIG. 72. If there is an error, the process exits 1686. Alternatively, if the command is a send command 1692, then a message is sent 1694 via the RS-232 socket connection. Alternatively, if the command is a get command 1696, then a screen image is obtained 1698. After either a send 1694 or a get 1698, the process exits 1686.

Figure 59A:
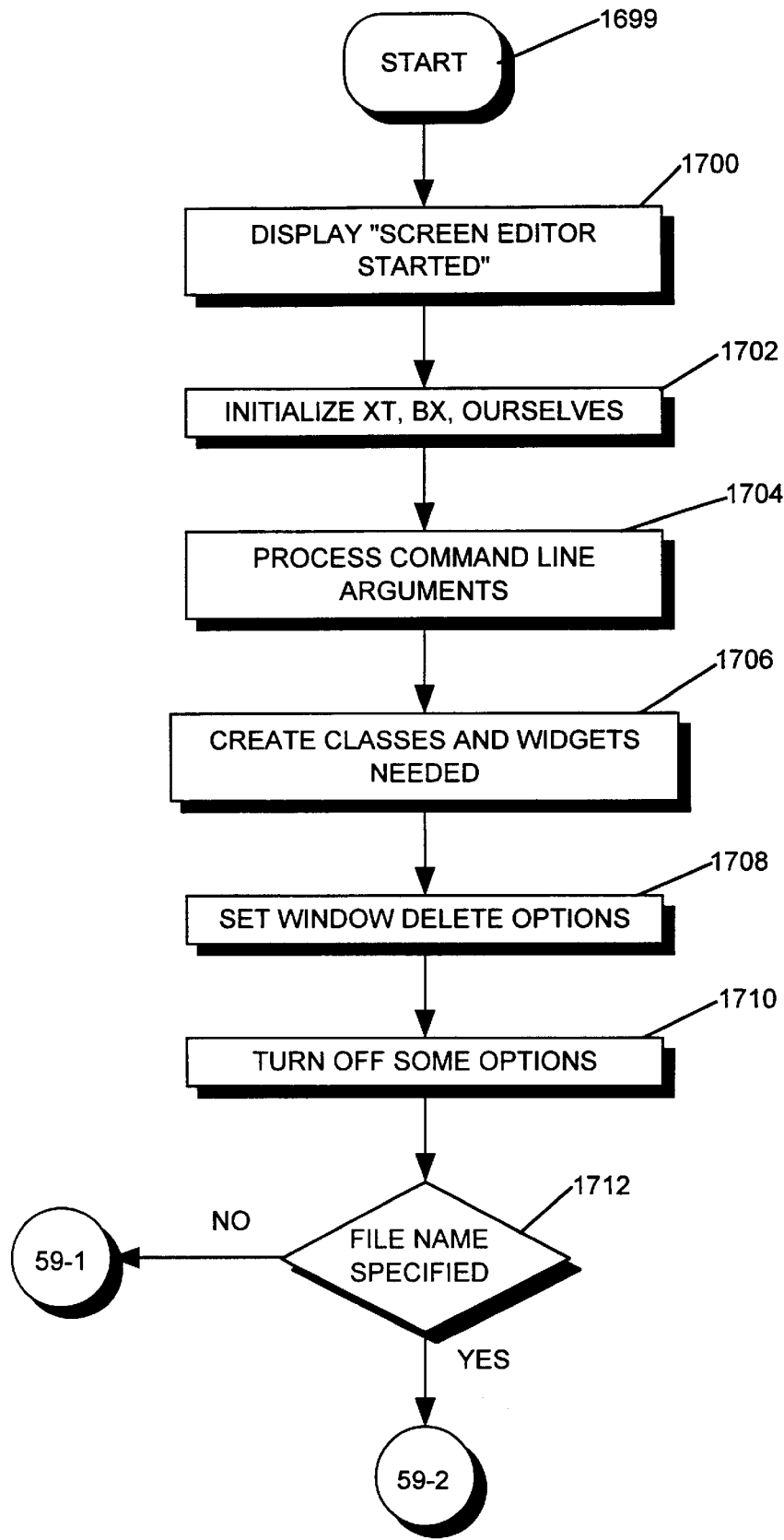
Figure 59B:
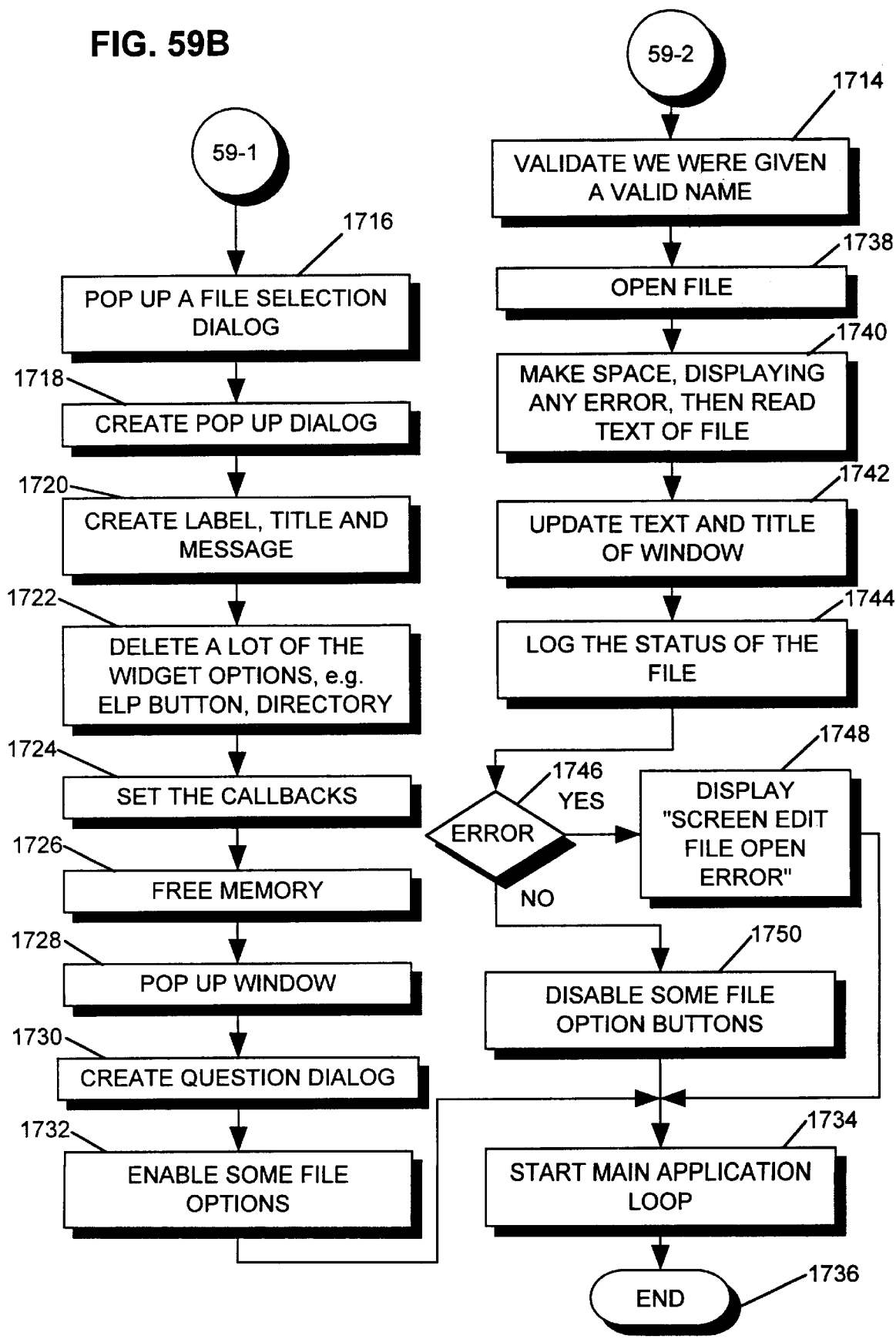

Referring now to FIG. 59 there is shown a method of operating a screen editor. First the message "Screen Editor Started" is displayed 1700. The XT, BX and ourselves are initialized. The command line is parsed 1704. All classes and widgets needed are created 1706. The window delete options are set 1708. Some options are turned off 1710. If a specific file name is given 1712 the process continues at 1714. Alternatively, if no file name is given or a file name containing a wild card is given 1712 the process continues at 1716. Referring now to 1716, first a file selection dialog is popped up 1716. A pop-up dialog is created 1718. A label, title and message are all created 1720. The widget options are deleted-1722. The callbacks are set 1724. The memory is freed 1726. The window is popped up 1728. A question dialog is created 1730. Some file options are enabled 1732. The main application loop is started 1734 and the process ends 1736. Referring now to 1714, it is validated 1714 that a valid file name was received. The file is opened 1738. Space is made 1740, any errors are displayed 1740 and the text from the file is read 1740. The text and title of the window are updated 1742. The status of the file is logged 1744. If there was an error 1746, the message "Screen Edit File Open Error" is displayed 1748. Alternatively some file option buttons are disabled 1750. In either event application loop is started 1734 and the module ends 1736.

Figure 60A:
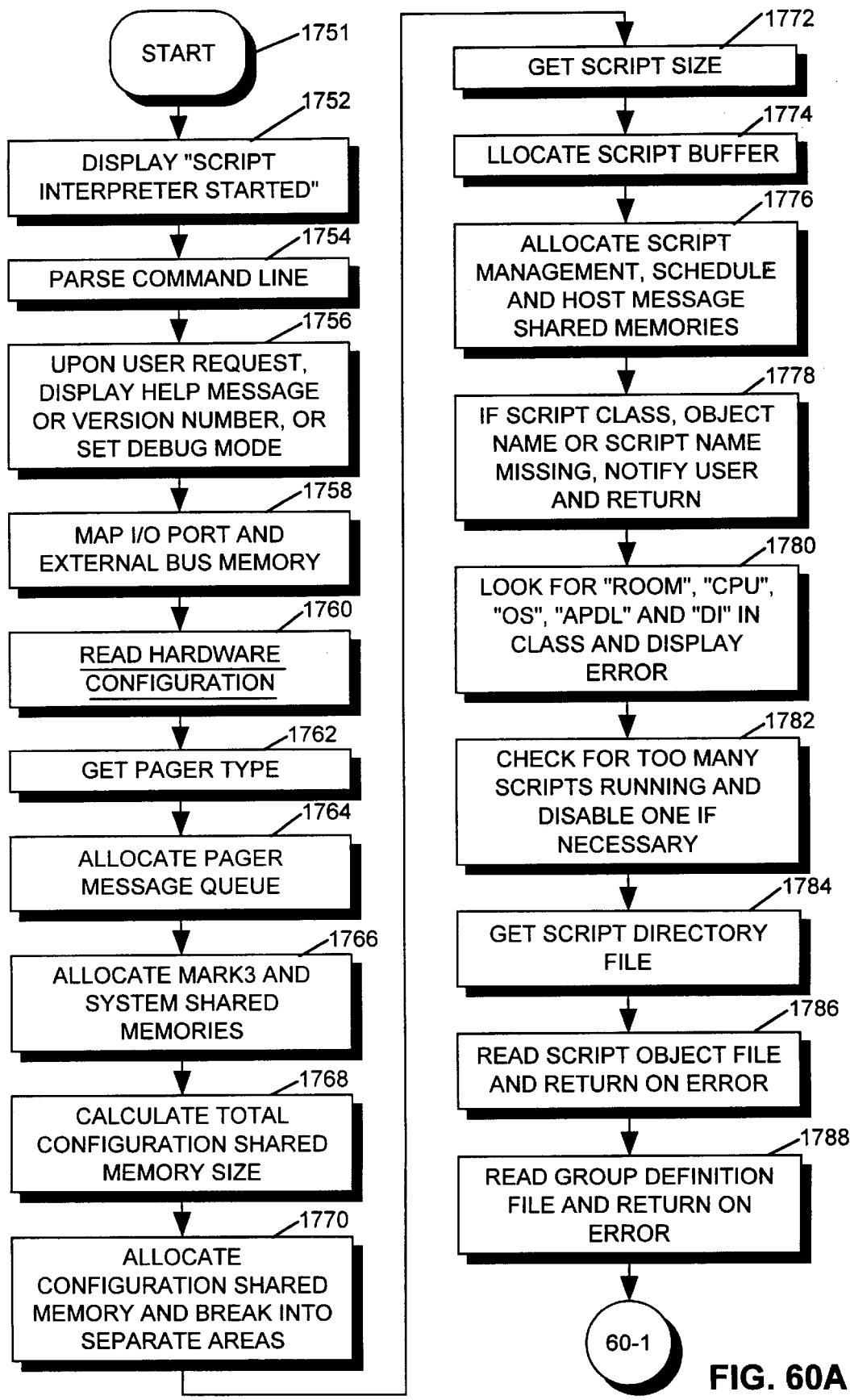
Figure 60B:
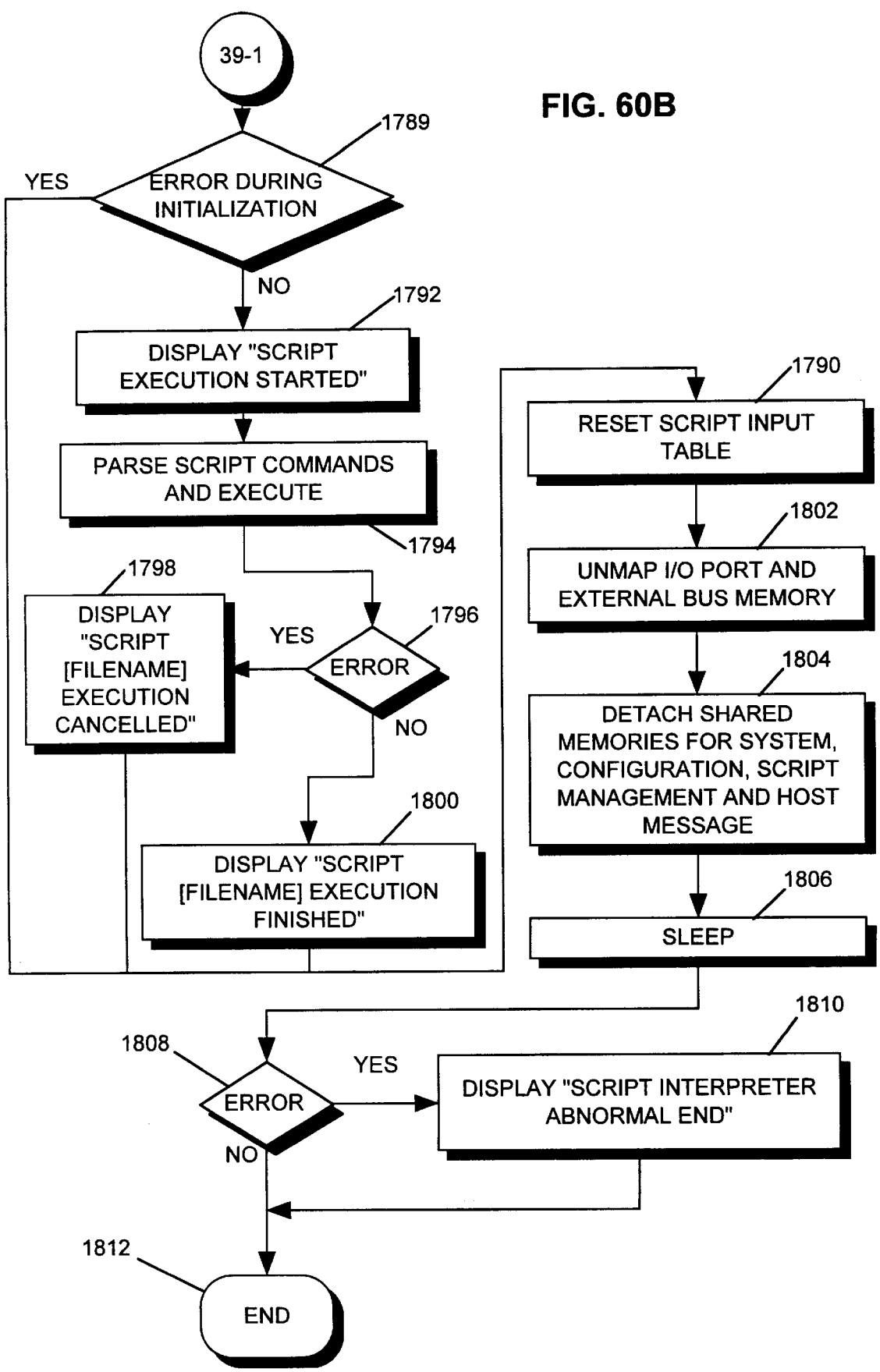

Referring now to FIG. 60. There is shown a method of interpreting a script. First, the message "Script Interpreter Started" is displayed 1752. The command line is parsed 1754. Then, upon user request, the help message or version number is displayed or the debug mode is set 1756. The I/O port and external BUS memories are mapped 1758. The hardware configuration is read 1760. See FIG. 51. The pager type is obtained 1762. The pager message queue is allocated 1764. The Mark3 and system shared memories are allocated 1766. A total configuration shared memory size is calculated 1768. The configuration shared memory is allocated 1770 and the memory is broken 1770 into separate areas. The script size is obtained 1772. The script buffer is allocated 1774. The script management, schedule and host message shared memories are allocated 1776. The user is notified 1778 and the module returns 1778 if the script class, object name or script name are missing. The "ROOM", "CPU", "OS", "APDL" and "DI" are looked for 1780 in the class and any errors are displayed 1780. It is checked 1782 to see if too any scripts are running and one is disabled 1782 if necessary. The script directory file is obtained 1784. The script object file is read 1786 and the process returns 1786 if any errors. The group definition file is read 1788 and the process returns 1788 if any errors. If there were any errors during initialization 1784 the process continues at 1790. Alternatively, the message "Script Execution Started" is displayed 1792. The script commands are parsed 1794 and executed 1794. If there was an error executing the script commands 1796 the message "Script [FileName] Execution Canceled" is displayed 1798 and the process continues at 1790. Alternatively, the message "Script [FileName] Execution Finished" is displayed 1800 and the process continues at 1790. The script input table is reset 1790. The I/O port and external BUS memories are unmapped 1802. The shared memories for system, configuration, script management and host message are detached 1804. The process sleeps 1806. If there was an error 1808 the message "Script Interpreter Abnormal End" is displayed 1810. Alternatively, and in either event, the process ends 1812.

Figure 61A:
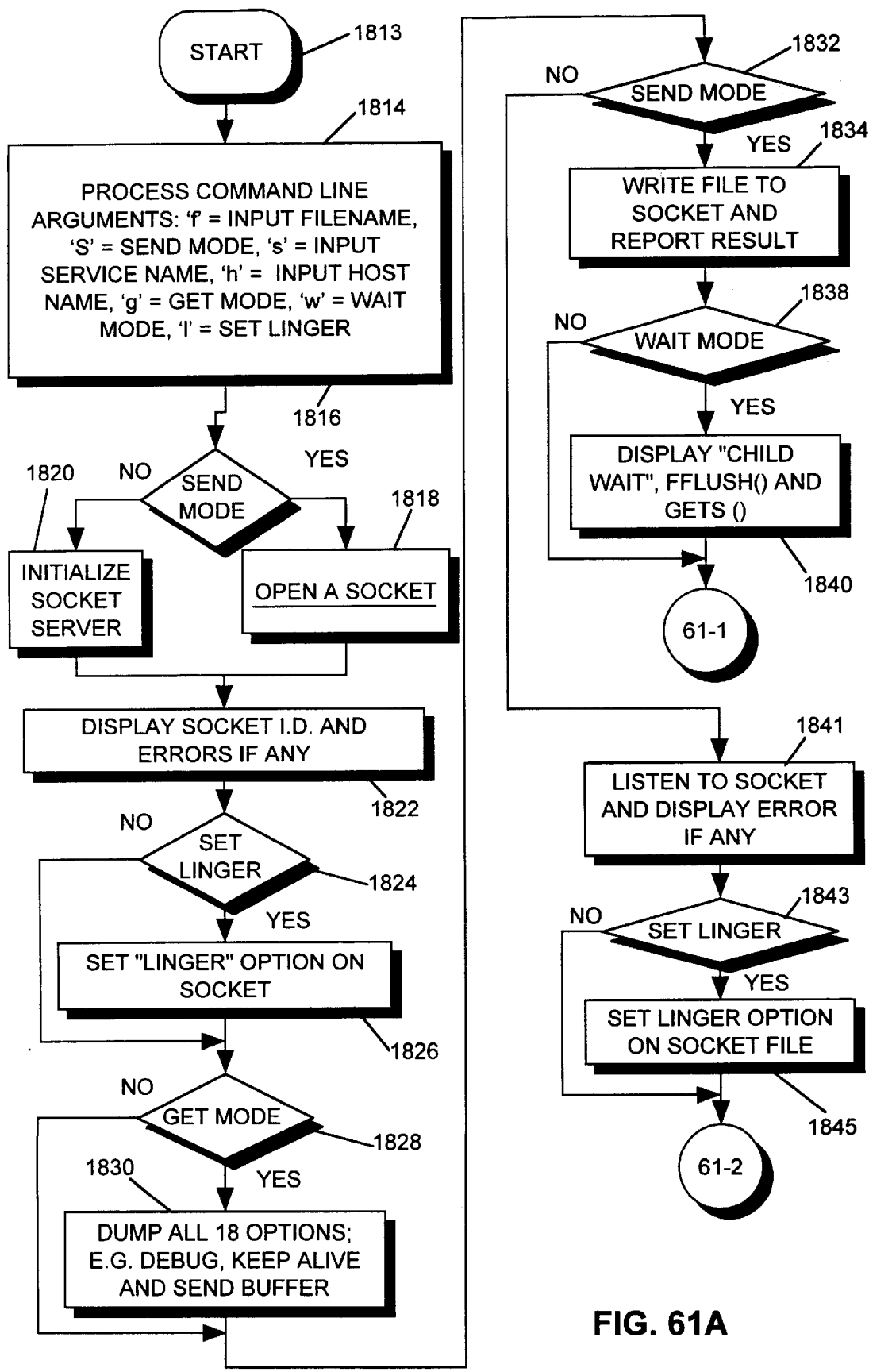
Figure 61B:
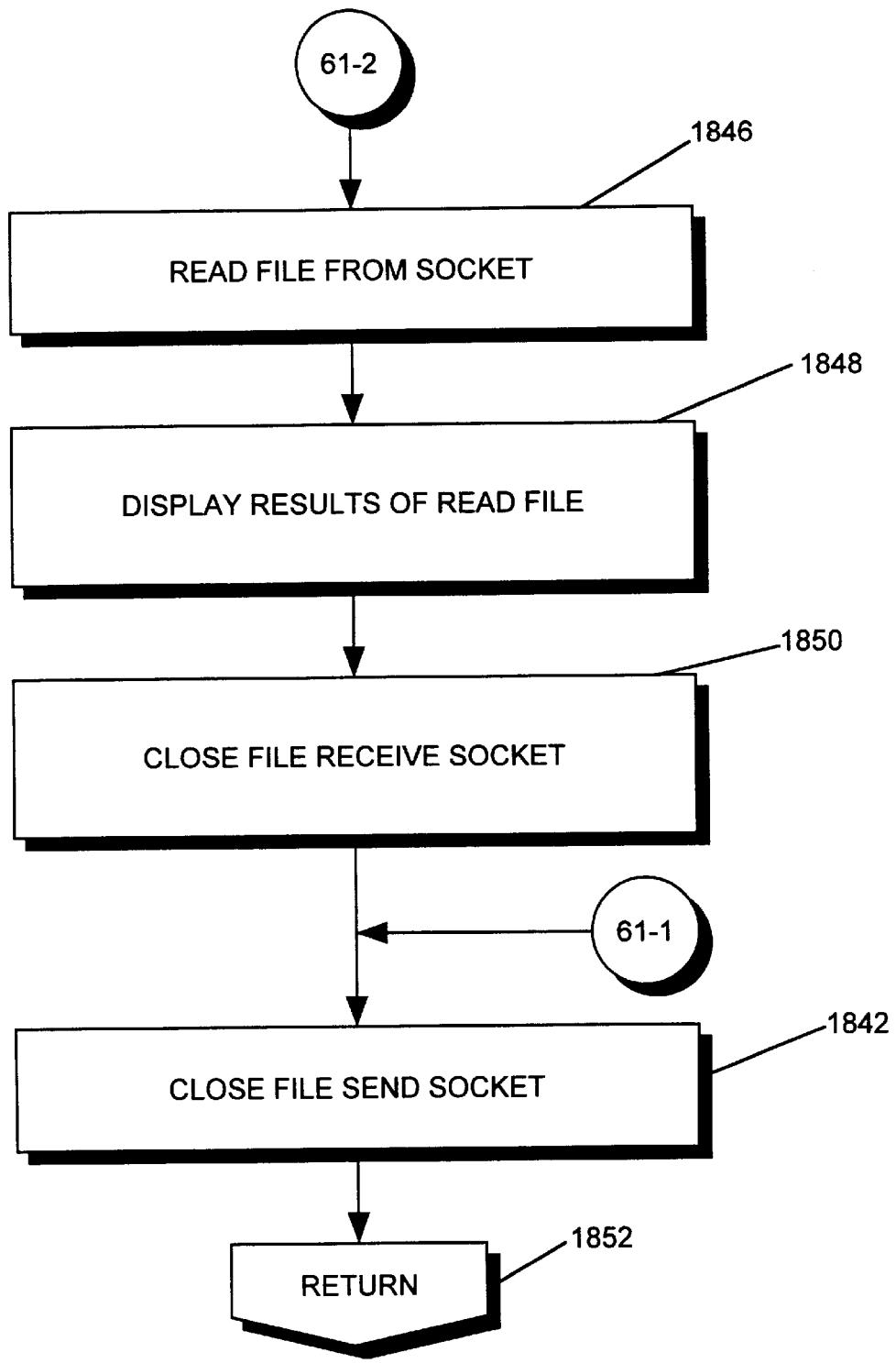

Referring now to FIG. 61, there is shown a method of writing a file to a socket. First, the command line is parsed 1814 and user options are registered. If the "send mode" option was requested 1816, then a socket is opened 1818. Alternatively, the socket server is initialized 1820. In any event, the socket ID is displayed 1822 and any errors are shown 1822. If the "linger" option was requested 1824, then the linger option is set on the socket, 1826. If the "get mode" option was requested 1828, then all 18 options are dumped 1830. If the "send mode option" was selected 1832, then the process continues at 1834. Alternatively, the process continues at 1836. Referring now to 1834, the file is written 1834 to the socket and the result is reported 1834. If the "wait mode" has been selected 1838, the message "Child Wait" is displayed 1840 and the FFlush( ) and GETS[ ] functions are called 1840. The process continues at 1842. Referring now to 1836, the socket is listened to 1836 and any errors are displayed 1836. If the set linger option was requested 1843, then the linger option is set on the socket file 1845. Alternatively, the file is read from the socket 1846. The results of the read file are displayed 1848. The file is received and the socket is closed 1850. The file send socket is closed 1842, then the function returns to its calling function 1852.

Referring now to FIG. 62, there is shown a method of sending messages to the object manager daemon. First the command line is processed 1854 and user options are registered 1854. If a valid command was not entered 1856, then the message "command must be -w or -c" is displayed 1858 to the user. Then, if the operating system is not named, 1860 and "Dump Data" is not selected 1862 the user is informed 1864 that an operating system name is required. If the "Change Message" option is selected 1866, then the process ensures 1868 that the user has specified the proper software, a value and field. If there have been any errors yet, 1870, a help message is displayed 1872. Alternatively, and in any event, the object manager shared memory is allocated 1874. Then all sections are read 1876 from the object manager definition file. A socket is opened 1878 to the object manager. If the "Send Change Message" option is selected 1880, then a message is sent 1882 and the process continues at 1884. Alternatively, if the "Send Wait Message" is selected 1886 the responding message is read 1884 and displayed 1884 and then the socket is closed 1888 and the process ends 1890. Alternatively, if the option "Dump Data" is selected 1892, the fields for this operating system and software are displayed 1894. Alternatively and in any event, the socket is closed 1888 and the module ends 1890.

Figure 63A:
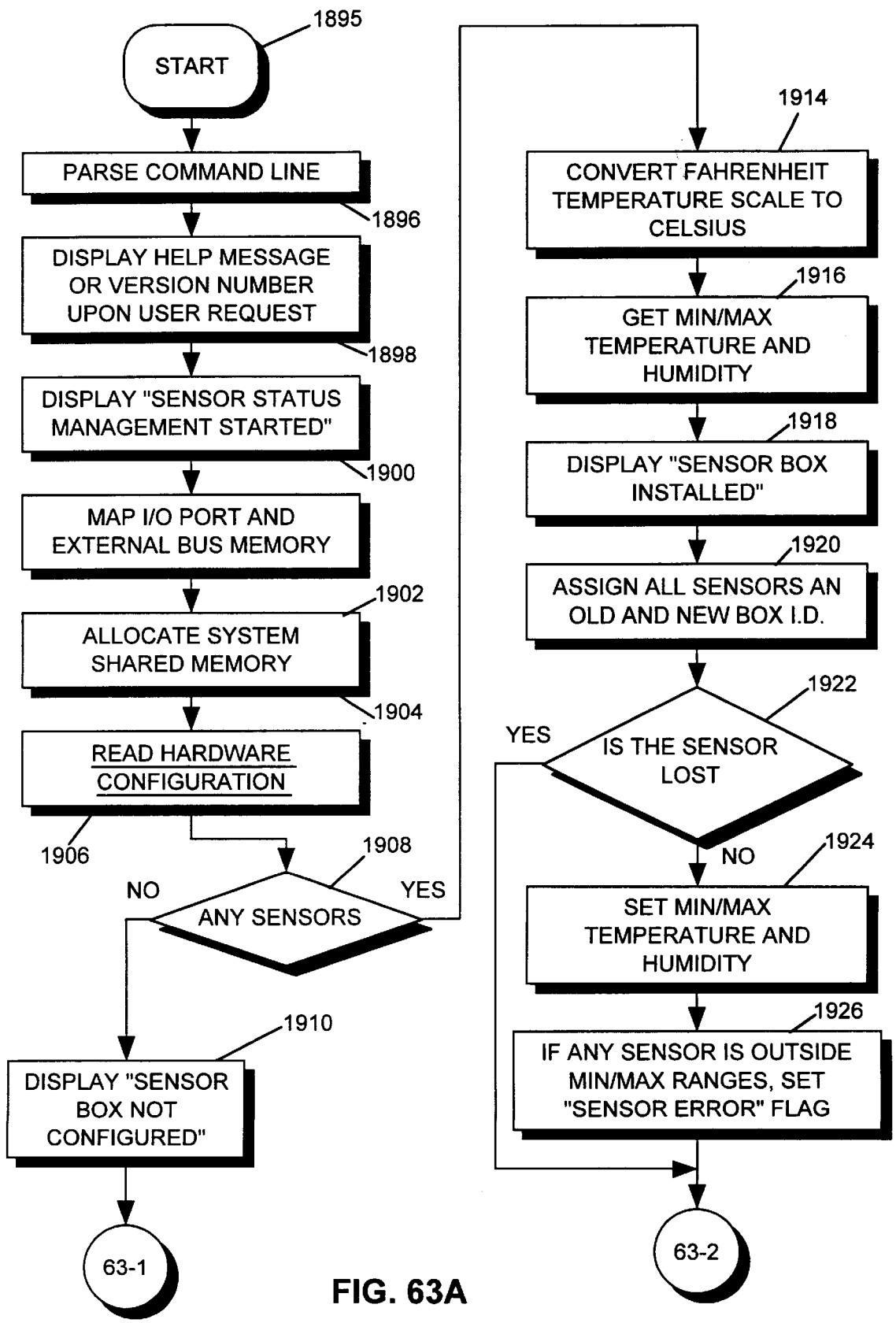
Figure 63B:
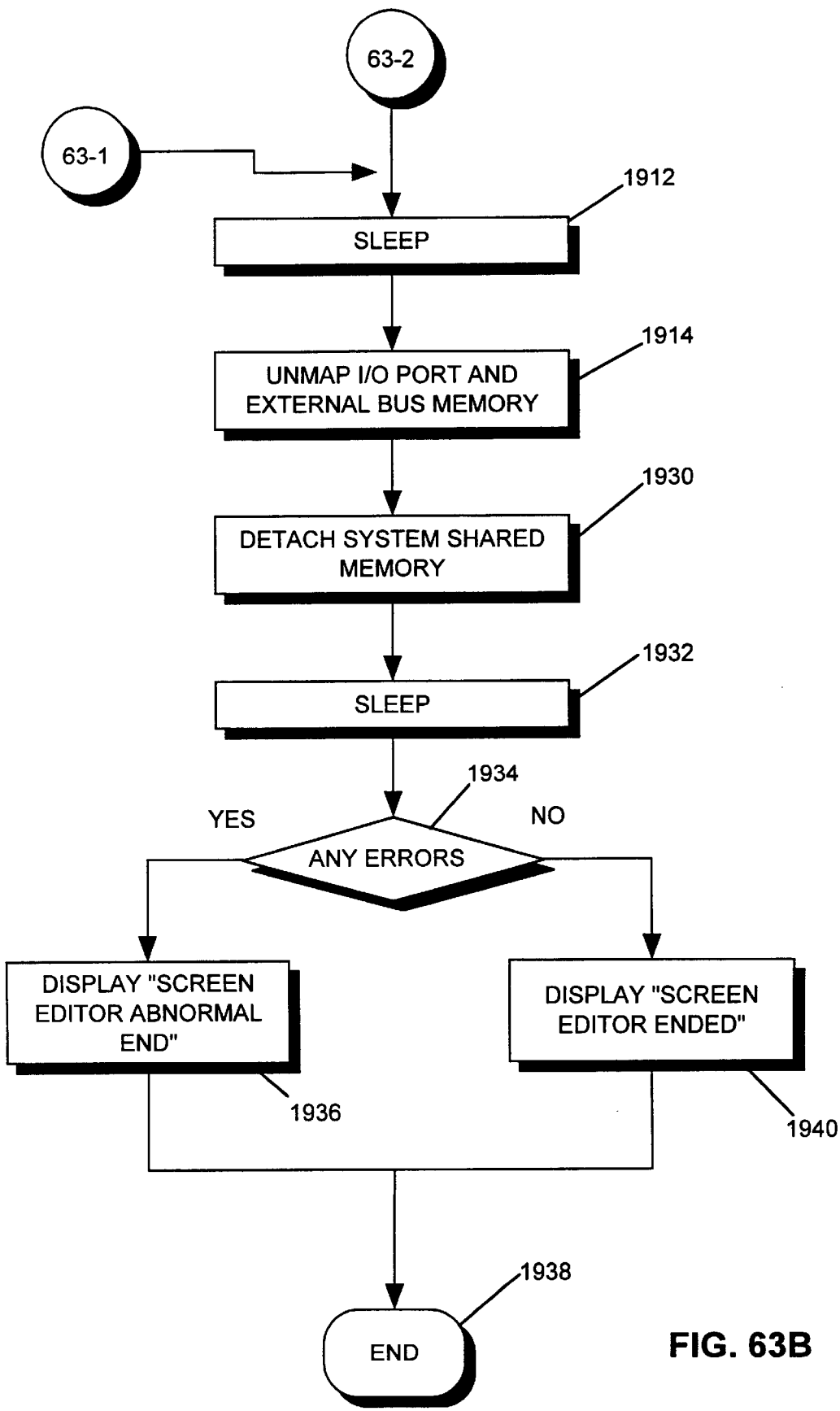

Referring now to FIG. 63, there shown a method of managing the Mark3 sensor status. First, the command line is parsed 1896. A help message or version number is displayed 1898 upon user request. The message "Sensor Status Management Started" is displayed 1900. The I/O port and external bus memories are mapped 1902. The system shared memory is allocated 1904. The hardware configuration is read 1906. See FIG. 72. If there are no sensors 1908, the message "Sensor Box Not Configured" is displayed 1910 and the process continues at 1912. a. Alternatively the Fahrenheit temperature scale is converted to Celsius 1914. The max. and min. temperatures and humidity are obtained 1916. The message "Sensor Box Installed" is displayed 1918. All sensors are assigned 1920 an old and new box ID. If the sensor is lost 1922, the process continues at 1912. Alternatively, the min. and max. temperatures and humidities are set 1924. Then, if any sensors outside the min. or max. ranges then the "Sensor Error" flag is set 1926. The process sleeps 1912. The I/O-port and external bus memories are unmapped 1928. The system shared memory is attached 1930. The process sleeps 1932. If there were any errors 1934, the message "Screen Editor Abnormal End" is displayed 1936. Alternatively, the message "Screen Editor Ended" is displayed 1940. In any event, the process ends 1938.

Figure 64A:
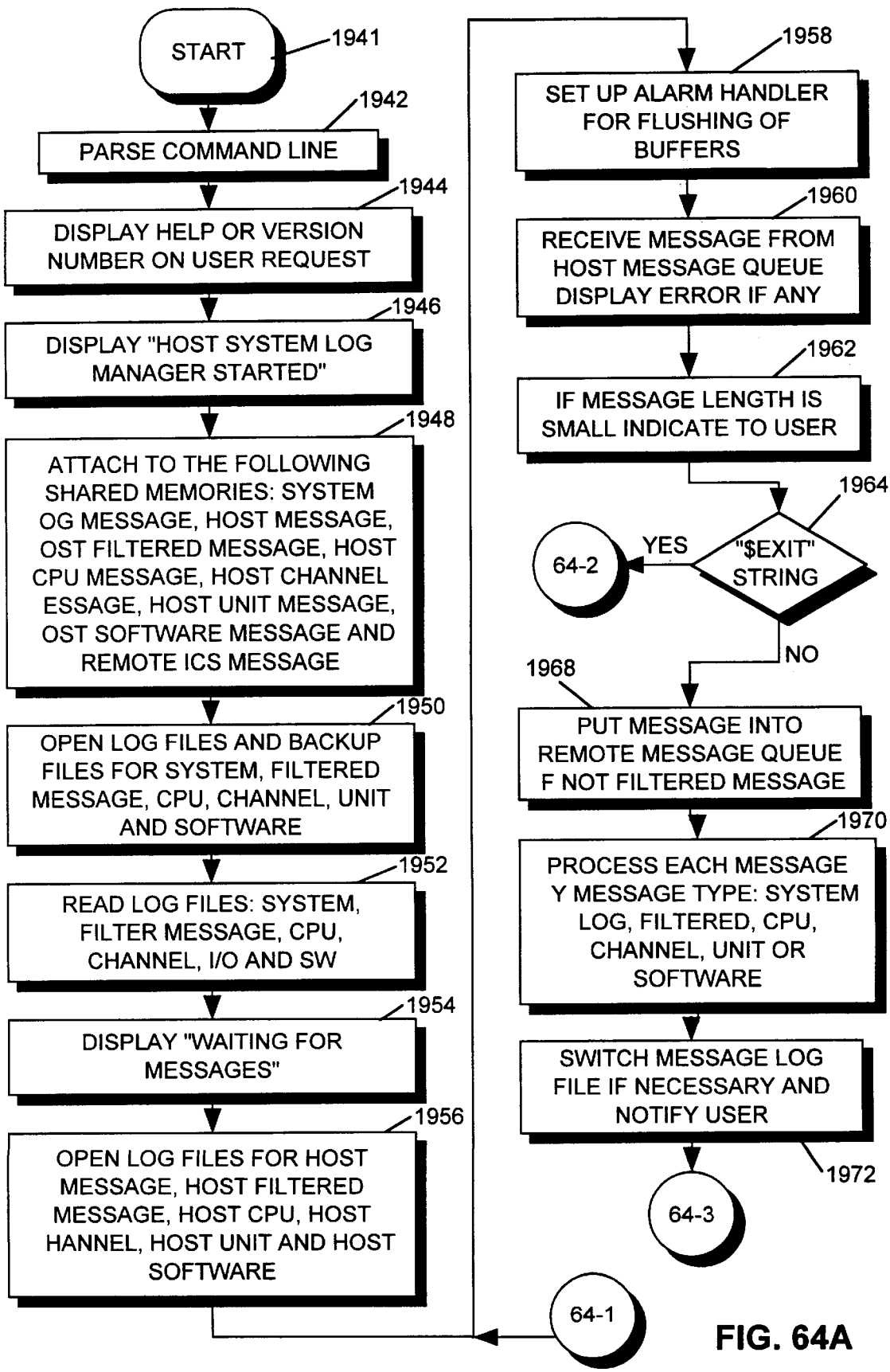
Figure 64B:
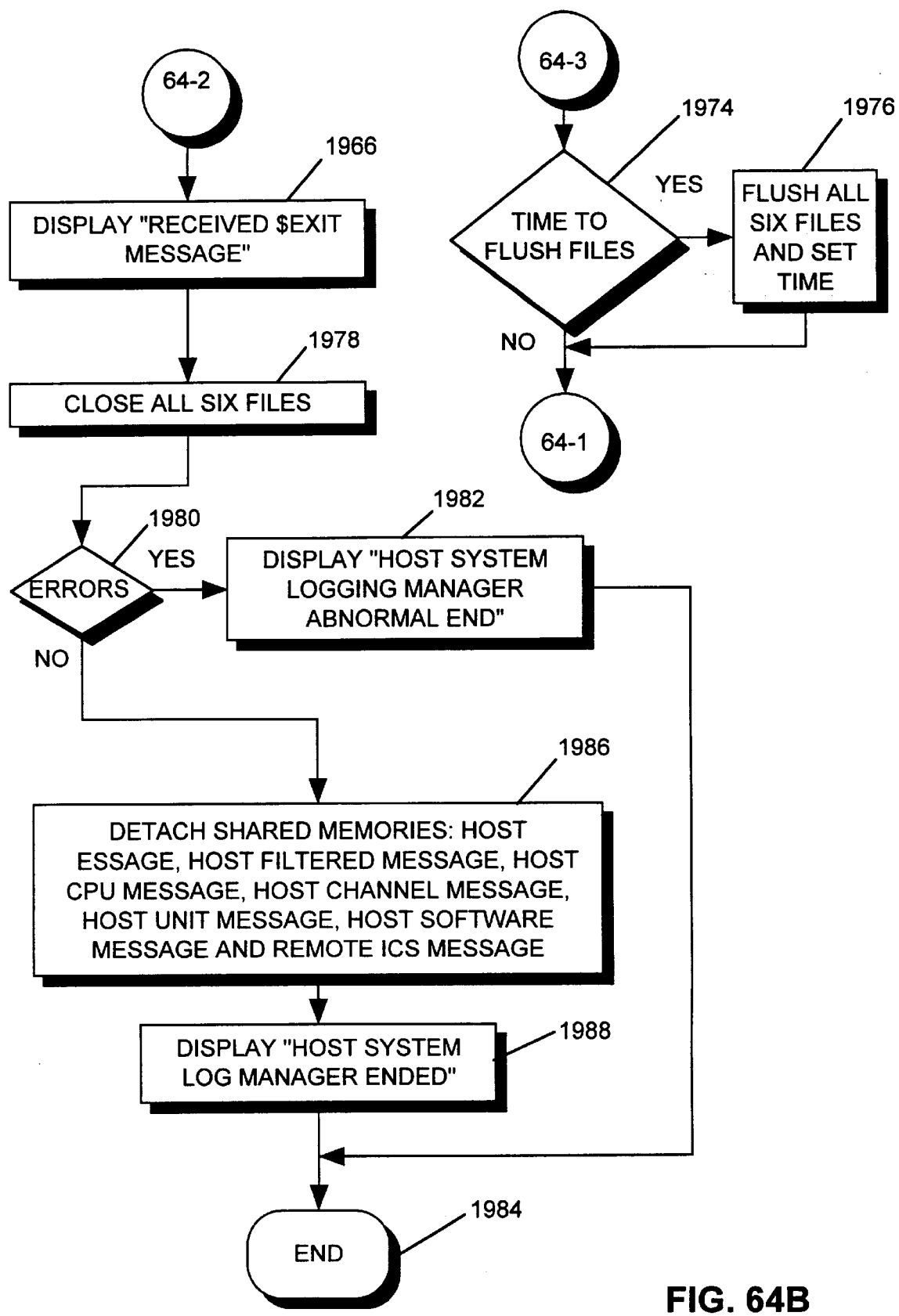

Referring now to FIG. 64, there is shown a method of managing the host system log. First, the command line is parsed 1942. A help message or the version number is displayed 1944 upon user request. The message "Host System Log Manager Started" is displayed 1946. Then shared memories are attached 1948: system log message, host message, host filtered message, host CPU message, host channel message, host unit message, host software message and remote ICS message. Log files are opened 1950 and files are backed up 1950 for system, filtered message, CPU, channel, unit and software. Log files are read 1952 for system, filter message, CPU, channel, I/O and software. The message "Waiting for Messages" is displayed 1954. Log files are opened 1956 for host message, host filtered message, host CPU, host channel, host unit, and host software. An alarm handler is set up 1958 for flushing the buffers. A message is received 1960 from the host message queue and any errors are displayed 1960. If the message length is too small the user is notified 1962. If "$exit" string is received 1964, the process continues at 1966. Alternatively, a message is put into the remote message queue 1968 provided it is not a filtered message. Each message is processed 1970 by message type (i.e., system log, filtered, CPU, channel, unit or software). The message log file is switched to 1972 if necessary and the user is so notified 1972. If it is then time to flush the files 1974, then all six files are flushed 1976 and the time is set. Alternatively, and in any event, the process loops back to 1956. Referring now to 1966, the message "received $exit message". All six files are closed 1978. If there were any errors 1980 the message "host system logging manager abnormal end" is displayed 1982, and the process ends 1984. Alternatively, all shared memories are detached 1986. The message "host system log manager ended" is displayed 1988 and the process ends 1984.

Figure 65A:
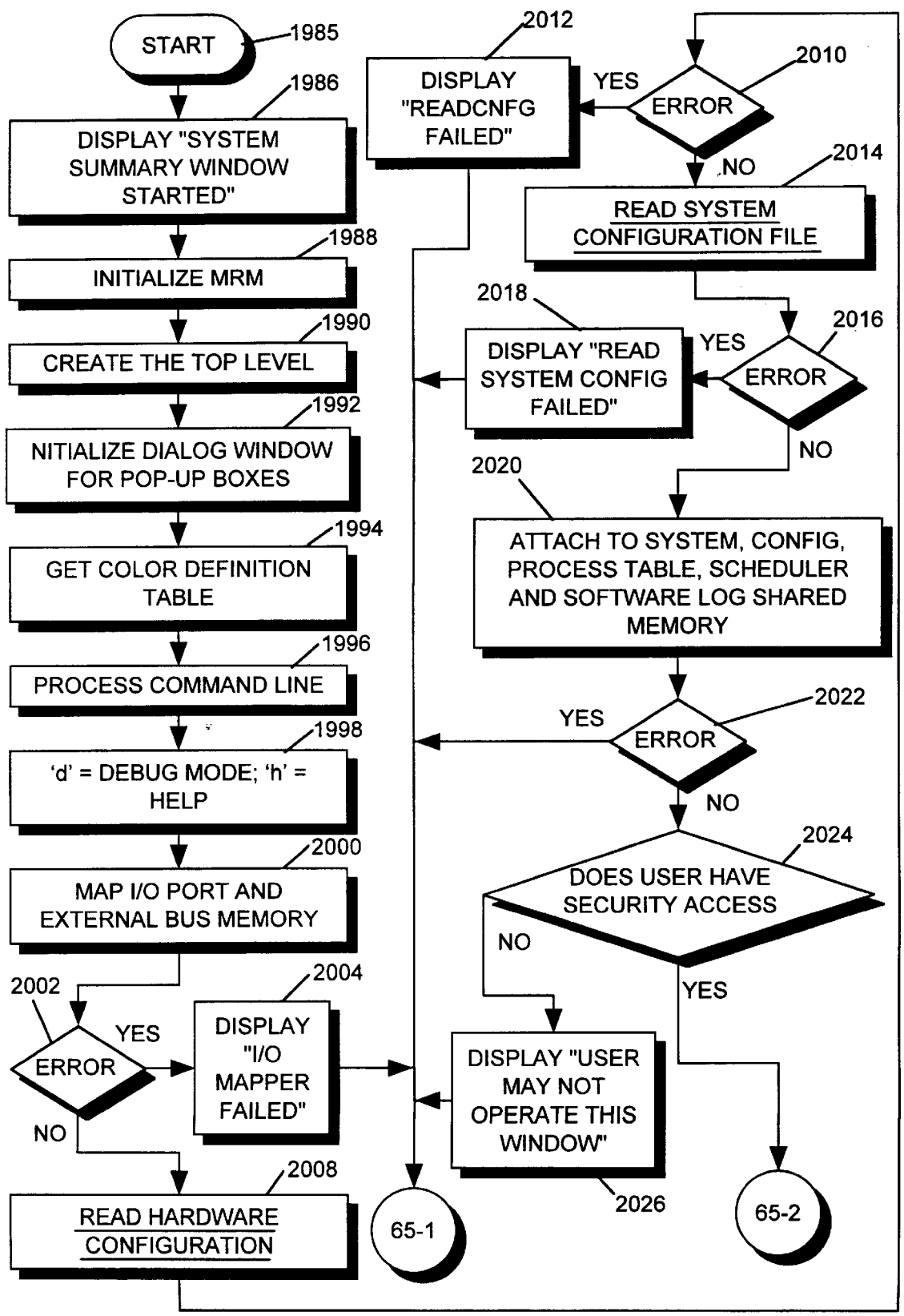
Figure 65B:
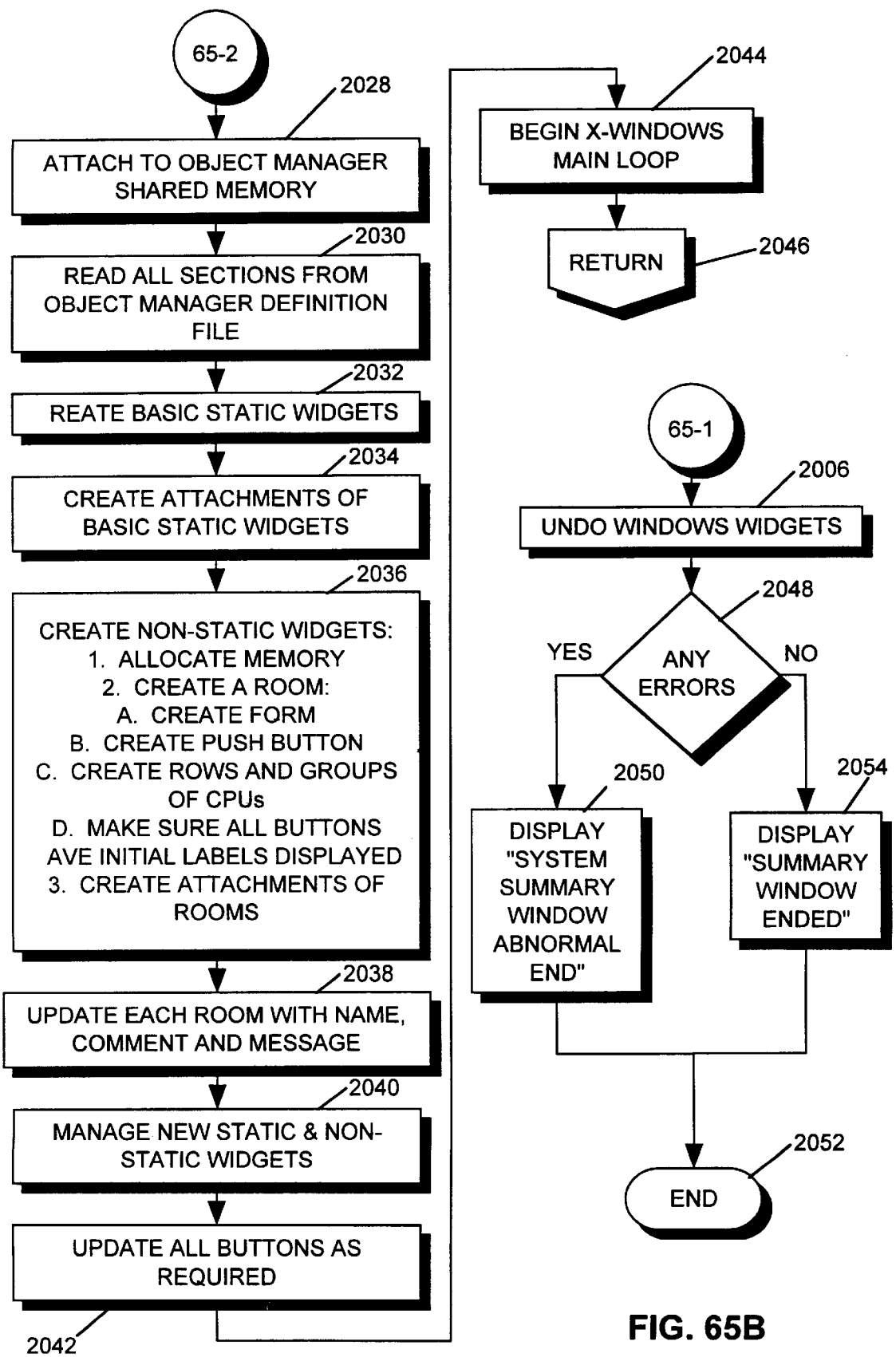

Referring now to FIG. 65, there is shown a method starting the system summary window. First, the message "System Summary Window Started" is displayed 1986. The MRM is initialized 1988. The top level is created 1990. The dialog window is initialized 1992 for pop-up boxes. The color definition table is obtained 1994. The command line is processed 1996. The user's options are registered 1998.

Then the I/O port and external bus memories are mapped 2000. If there is an error 2002 the message "I/O Mapper Failed" is displayed 2004 and then the process continues at 2006. Alternatively, the hardware configuration is read 2008. See FIG. 72. Then, if there is an error reading the hardware configuration 2010, the message "READCNFG Failed" is displayed 2012 and then the process continues at 2006. Alternatively, the system configuration file is read 2014. See FIG. 73. If there are any errors reading the system configuration file 2016, then the message "Read System ConFIG. Failed" is displayed 2018 and the process continues at 2006. Alternatively, the shared memories are attached 2020 for system, config. , process table, scheduler, and software log. If there are any errors attaching 2022 then the process continues at 2006. Alternatively, if the user has not passed security access 2024, the message "User May Not Operate This Window" is displayed 2026 and the process continues at 2006. Alternatively, the object manager shared memory is attached 2028. All sections from the object manager definition file are read 2030. The basic static widgets are created 2032. The attachments are created for the basic static widgets 2034. The non-static widgets are created 2036. Each room is updated 2038 with name, comment, and message. The new static and non-static widgets are managed 2040. All buttons are updated 2042 as required. The main X-Windows loop is begun 2044 and then the process returns 2046 to the calling function. Referring now to 2006, the windows widgets are undone 2006. If there were any errors 2048, the message "System Summary Window Abnormal End" is displayed 2050 and the process ends 2052. Alternatively, the message "Summary Window Ended" is displayed 2054 and the process ends 2052.

Figure 66A:
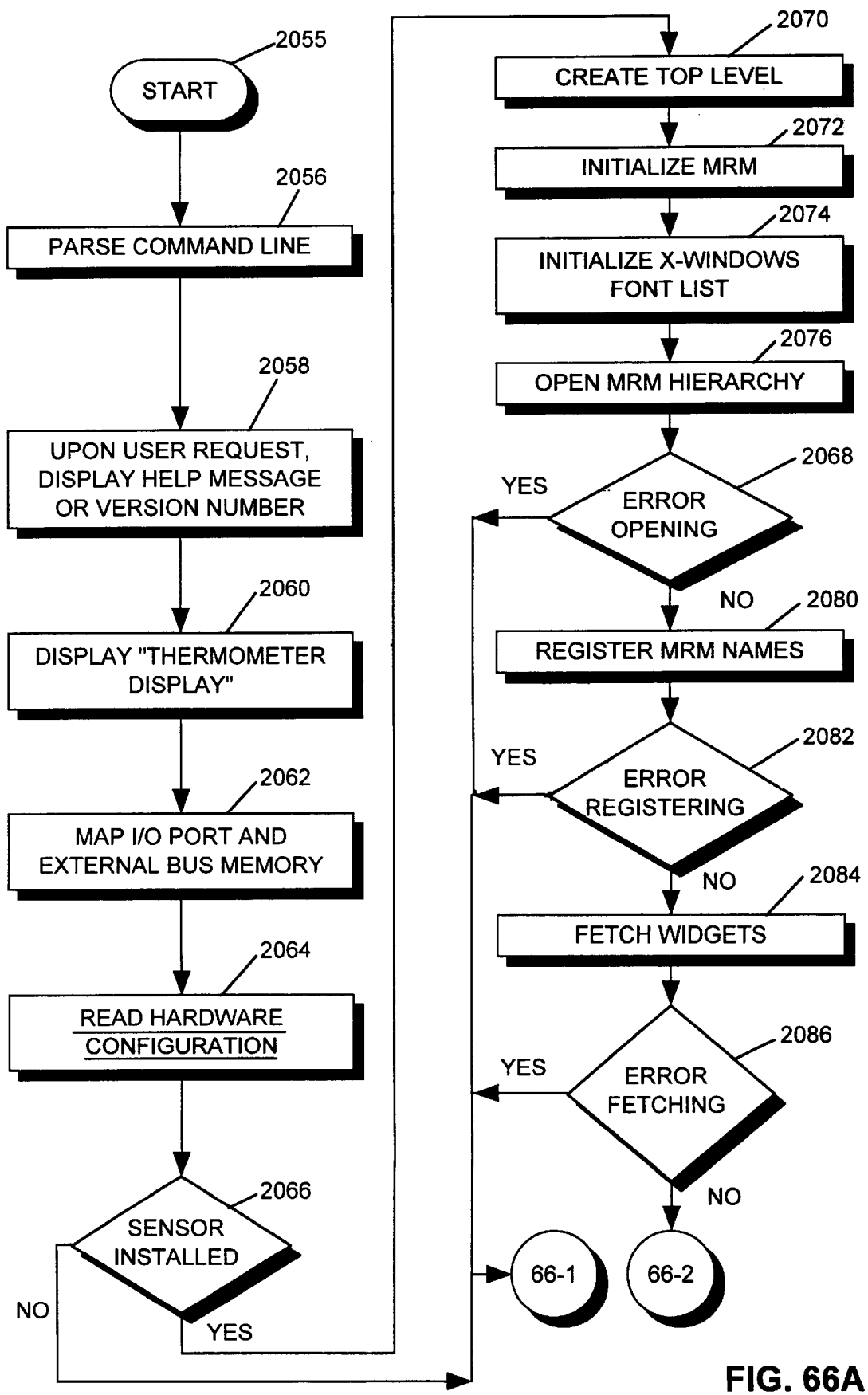
Figure 66B:
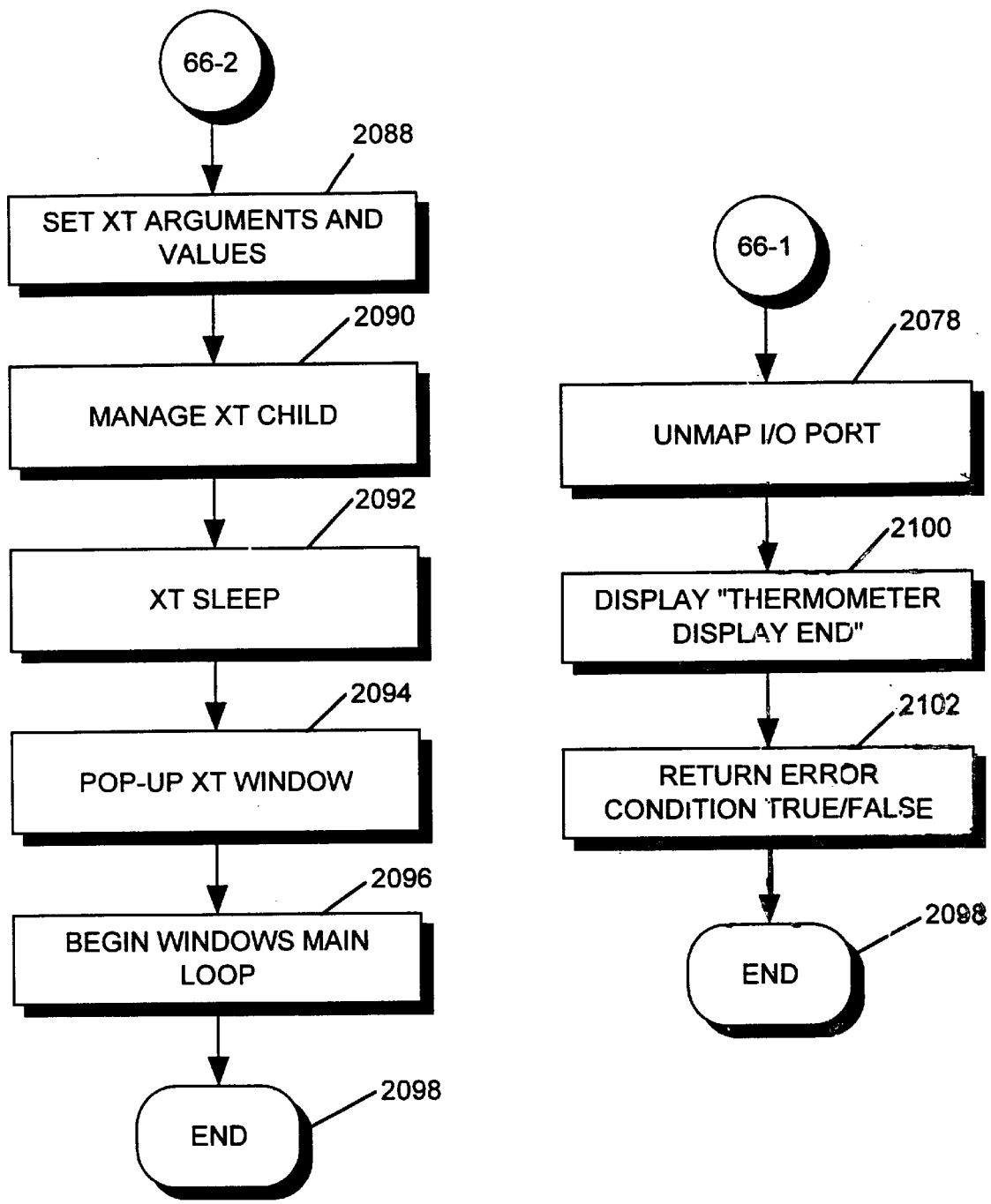
Figure 67:
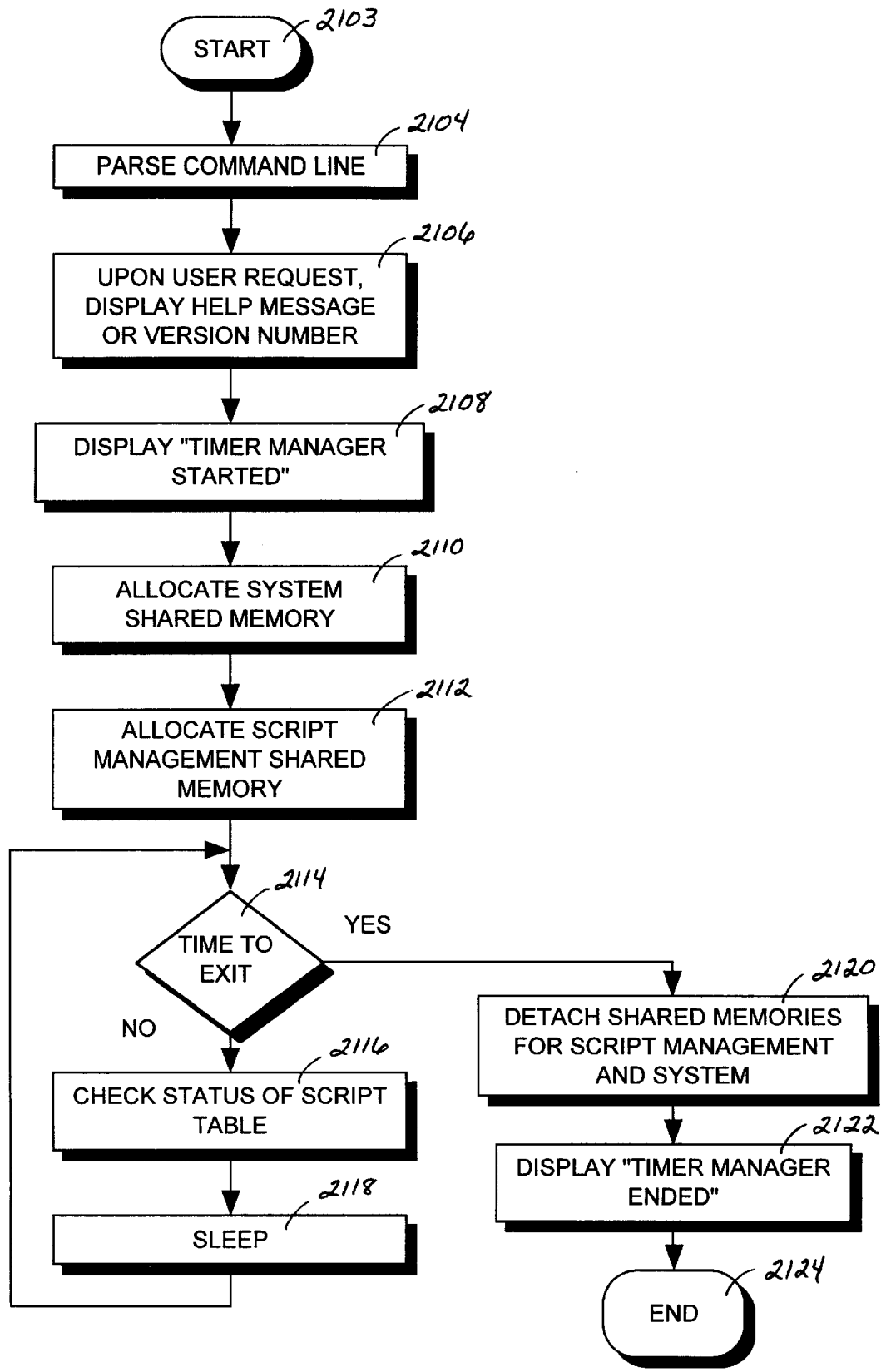

Referring now to FIG. 66, there is shown a method of displaying the thermometer status. First, the command line is parsed 2056. Upon user request a help message or version number is displayed 2058. The message "thermometer display" is displayed 2060. The I/O port and external bus memory are mapped 2062. The hardware configuration is read 2064. See FIG. 51. If no sensor is installed 2066, the process continues at 2078. Alternatively, a top level is created 2070. The MRM is initialized 2072. The X-Windows font list is initialized 2074. The MRM hierarchy is opened 2076. If there is an error opening the MRM hierarchy 2068 then the process continues at 2078. Alternatively, the MRM names are registered 2080. If there was an error registering the MRM names 2082, the process continues at 2078. Alternatively, the widgets are fetched 2084. If there was an error fetching the widgets 2086, then the process continues at 2078. Alternatively, the XT arguments and values are set 2088. Then the XT child is managed 2090. The XT is put to sleep 2092. The XT window is popped up 2094. The main window's loop begins 2096. The process ends 2098. Referring now to 2078, the I/O port is unmapped 2078. The message "Thermometer Display End" is displayed 2100. An error condition is returned 2102 either true or false. The process ends 2098.

Referring now to FIG. 66, there is shown a process for managing the timer. First, the command line is parsed 2104. Then, upon user request, the help message or version number is displayed 2106. The message "Timer Manager Started" is displayed 2108. The system shared memory is allocated 2110. The script management shared memory is allocated 2112. If it is not time to exit 2114, then the status of the script table is checked 2116 and the process sleeps 2118 for a short time. If it is time to exit 2114, the shared memories for script management and system are detached 2120. The message "Timer Manger Ended" is displayed 2122. The process ends 2124.

Figure 68:
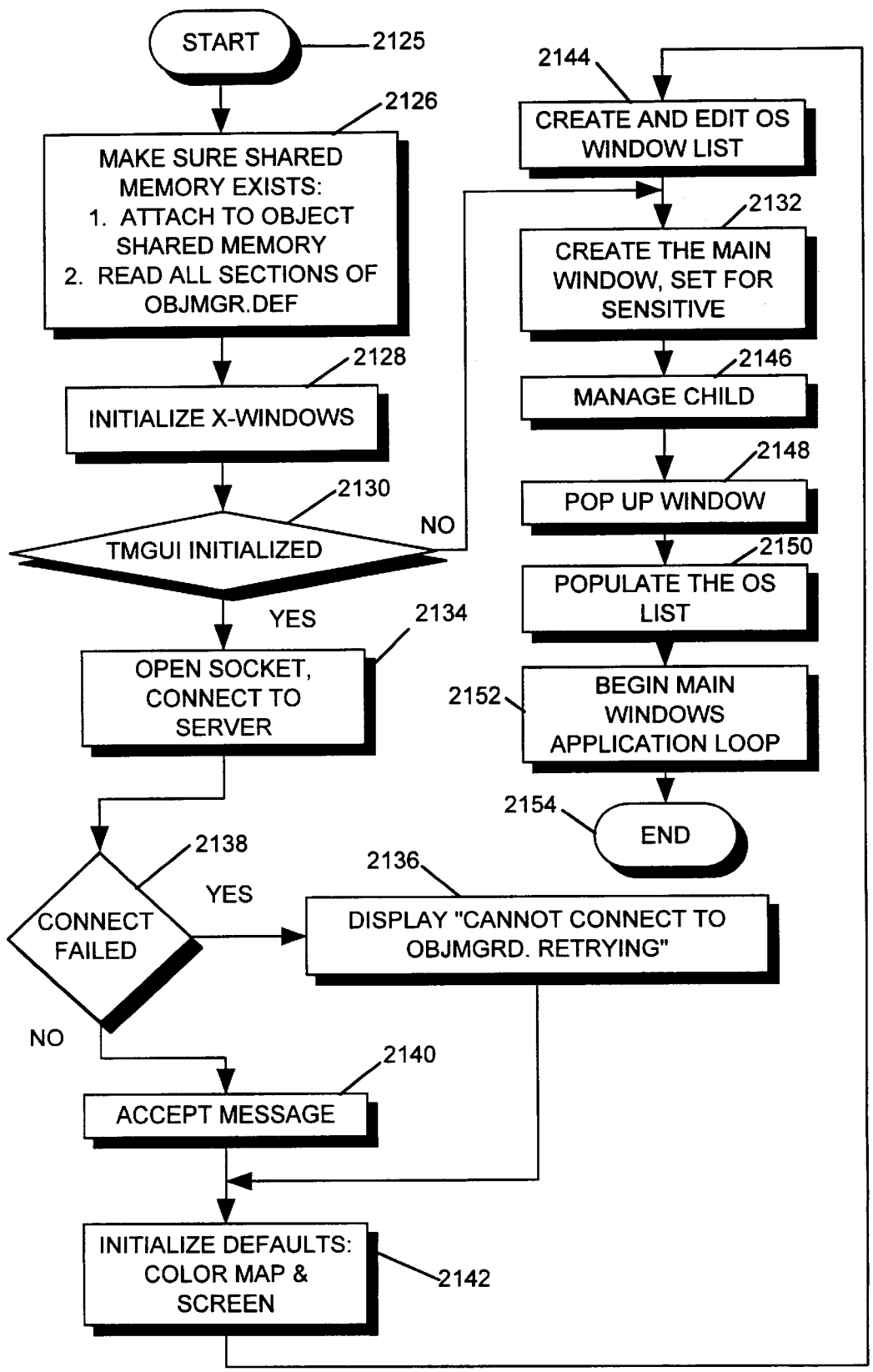

Referring now to FIG. 68, there is shown a method of managing the software attributes. First, it is ensured that the shared memory exists 2126 by first attaching to the object shared memory 2126 and reading all sections of "OBJMGR. DEF". X-Windows is initialized 2128. If TMGUI is not initialized 2130, the process continues at 2132. Alternatively, a socket is opened 2134 and connected 2134 to the server. If the connect failed 2138, the message "Cannot Connect to OBJMGRD. Retrying" is displayed 2136. Alternatively, the message is accepted 2140. The defaults are initialized 2142 for color map and screen. The operating system window list is created 2144 and edited 2144. The main window is created 2132 and set 2132 for sensitive. The child is managed 2146. A window is popped up 2148. The operating system list is populated 2150. The main windows application loop is begun 2152. Then the process ends 2154.

Figure 69A:
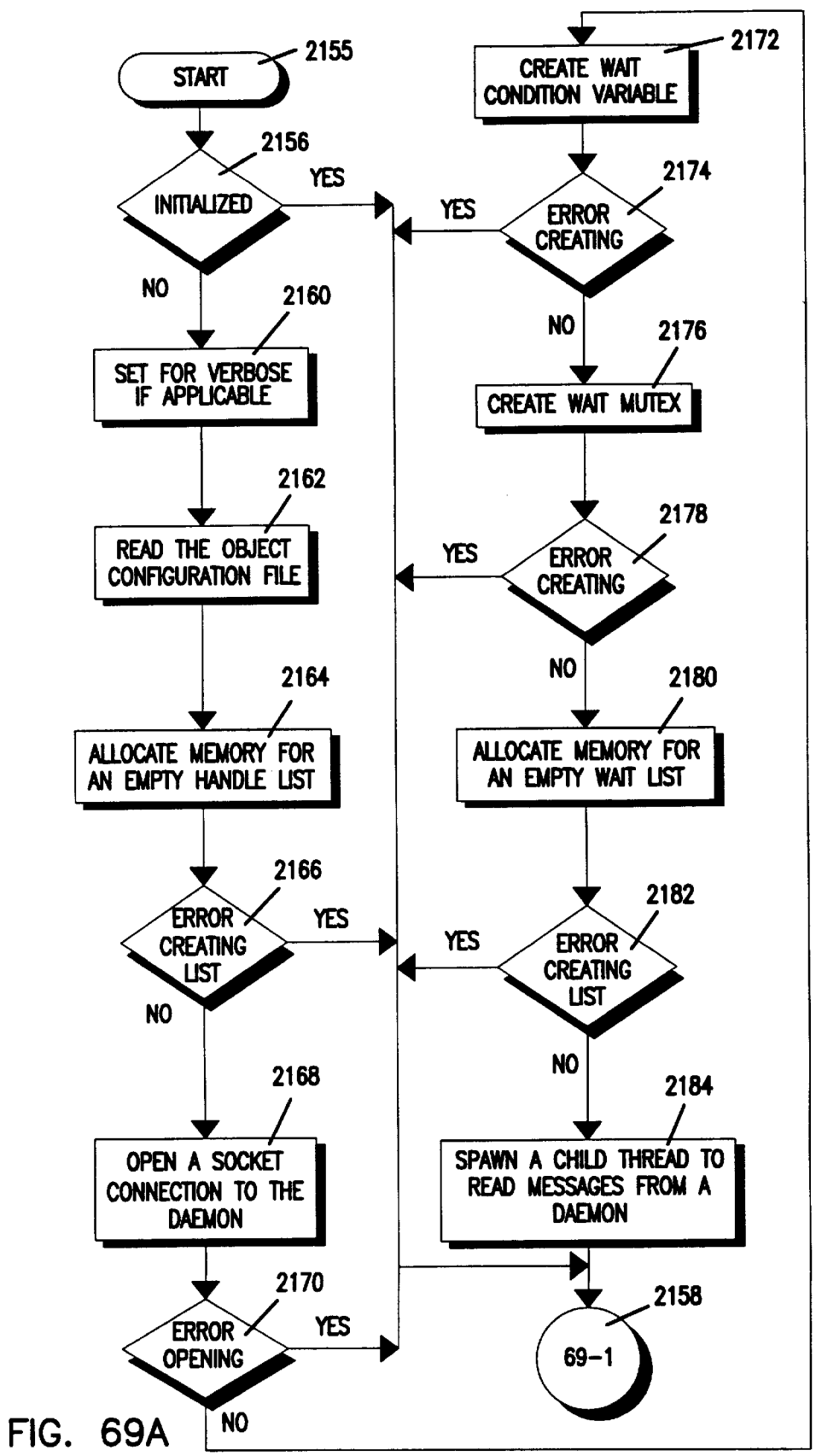
Figure 69B:
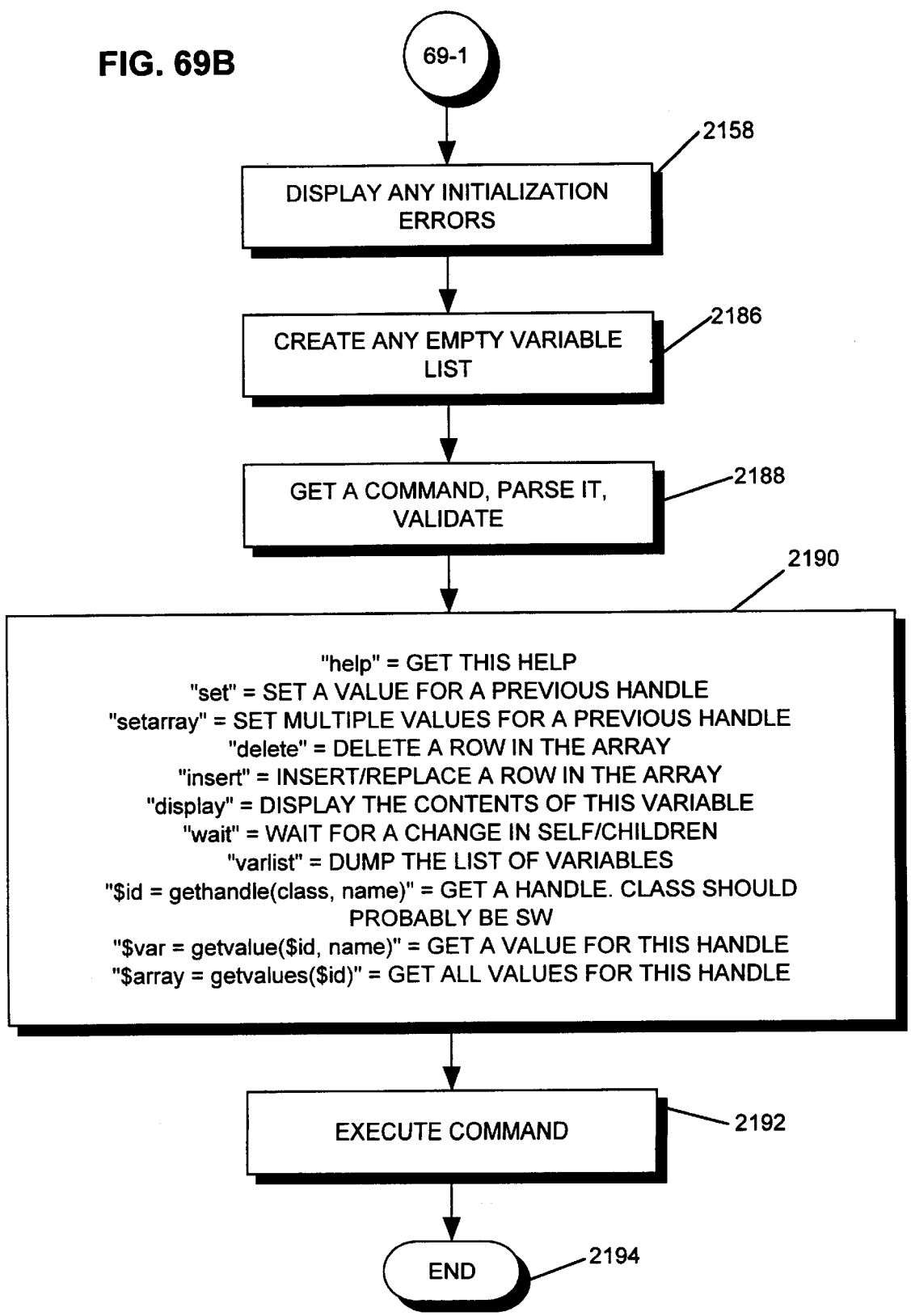

Referring now to FIG. 69, there is shown a method for testing the object API. First if the process is already initialized 2156, then the process continues at 2158. Alternatively, the process is set for verbos 2160 is applicable. The object configuration file is read 2162. Memory for an empty handle list is allocated 2164. If there was an error creating the list 2166, the process continues at 2158. Alternatively, a socket is opened 2168. If there was an error opening the socket 2170, the process continues at 2158. Alternatively, a weight condition variable is created 2172. If there was an error creating the weight condition variable 2174 then the process continues at 2158. A weight mutex is created 2176. If there was an error creating the weight mutex 2178 then the process continues at 2158. Alternatively, memory is allocated 2180 for an empty weight list. If there was an error creating the empty weight list 2182, the process continues at 2158. Alternatively, a child process is spawned 2184 to read messages from a daemon. Any initialization errors are displayed 2158. An empty variable list is created 2186. A command is received 2188, parsed 2188, and validated 2188. If the command is "help" then a help message is displayed 2190. If the command is "set" then a value is set 2190 for a previous handle. If the command is "setarray," then multiple values are set 2190 for a previous handle. If the command is "delete," then a row in the array is deleted 2190. If a command is "insert" then a row is inserted/replaced in the array 2190. If the command is "display end," then the contents of this variable are displayed 2190. If the command is "wait," then a change is waited for in the children 2190. If the command is "varlist," then the list of variables is dumped. If the command is "$ID", then a handle is obtained 2190. If the command is "$VAR" then a value for this handle is obtained 2190. If the command is "$ARRAY" then all values for this handle are obtained 2190. The command is executed 2192. The process ends 2194.

Figure 70:
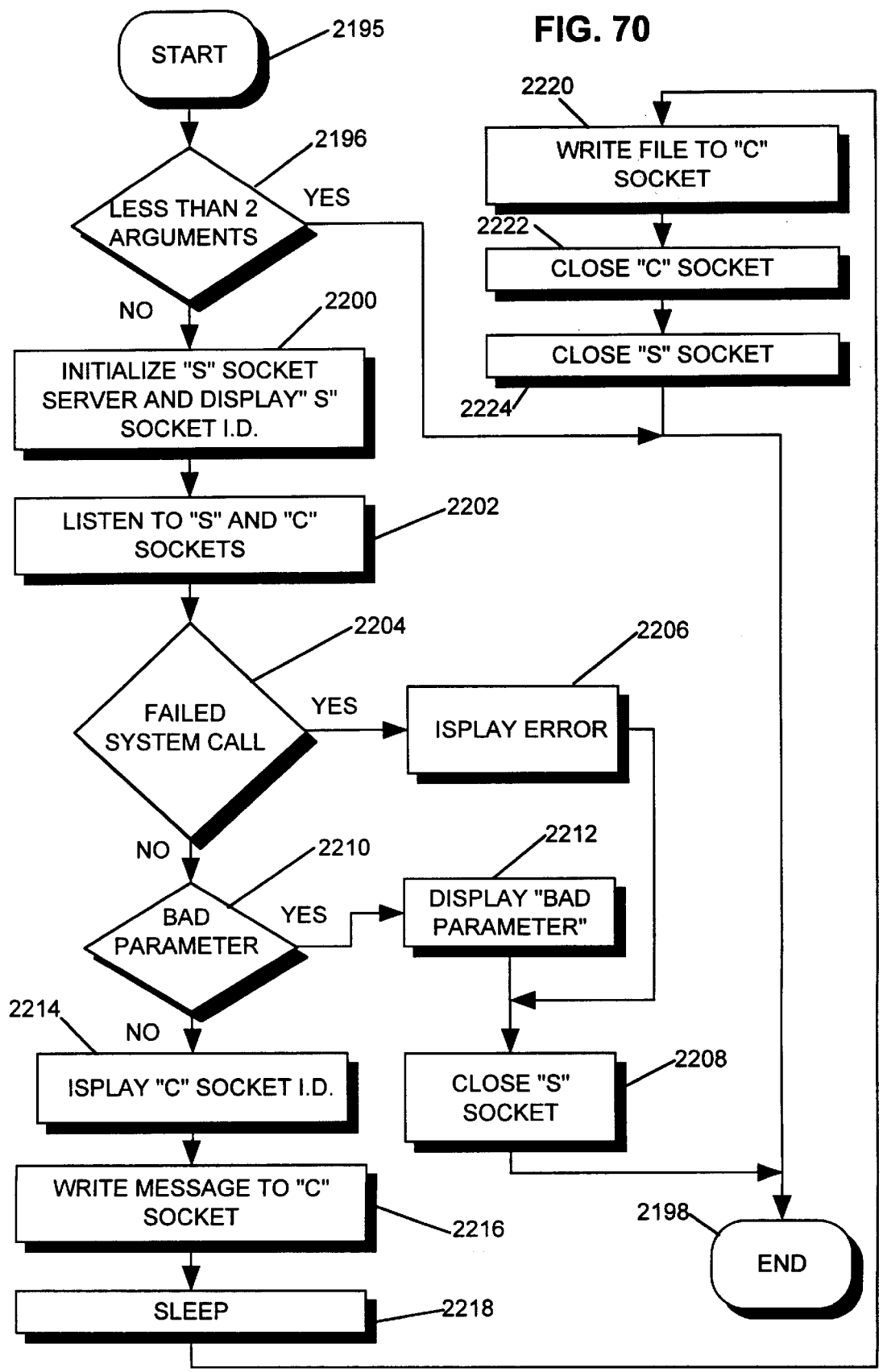

Referring now to FIG. 70, there is shown a method of managing an "S" socket and a "C" socket. First, if there are less than two arguments 2196, then the process ends 2198. Alternatively, the "S" socket server is initialized 2200 and its ID is displayed 2200. Then the "S" and "C" sockets are listened to 2202. If the system call failed 2204, then a display error is indicated 2206. The "S" socket is closed 2208 and the process ends 2198. Alternatively, if a bad parameter is received 2210, then the message "bad parameter" is displayed 2212, the "S" socket is closed 2208 and the process ends 2198. Alternatively, the "C" socket ID is displayed 2214. A message is written 2216 to the "C" socket. The process sleeps 2218. A file is written to the "C" socket 2220. Both "C" and "S" sockets are closed 2222, 2224, and the process ends 2198.

Figure 71:
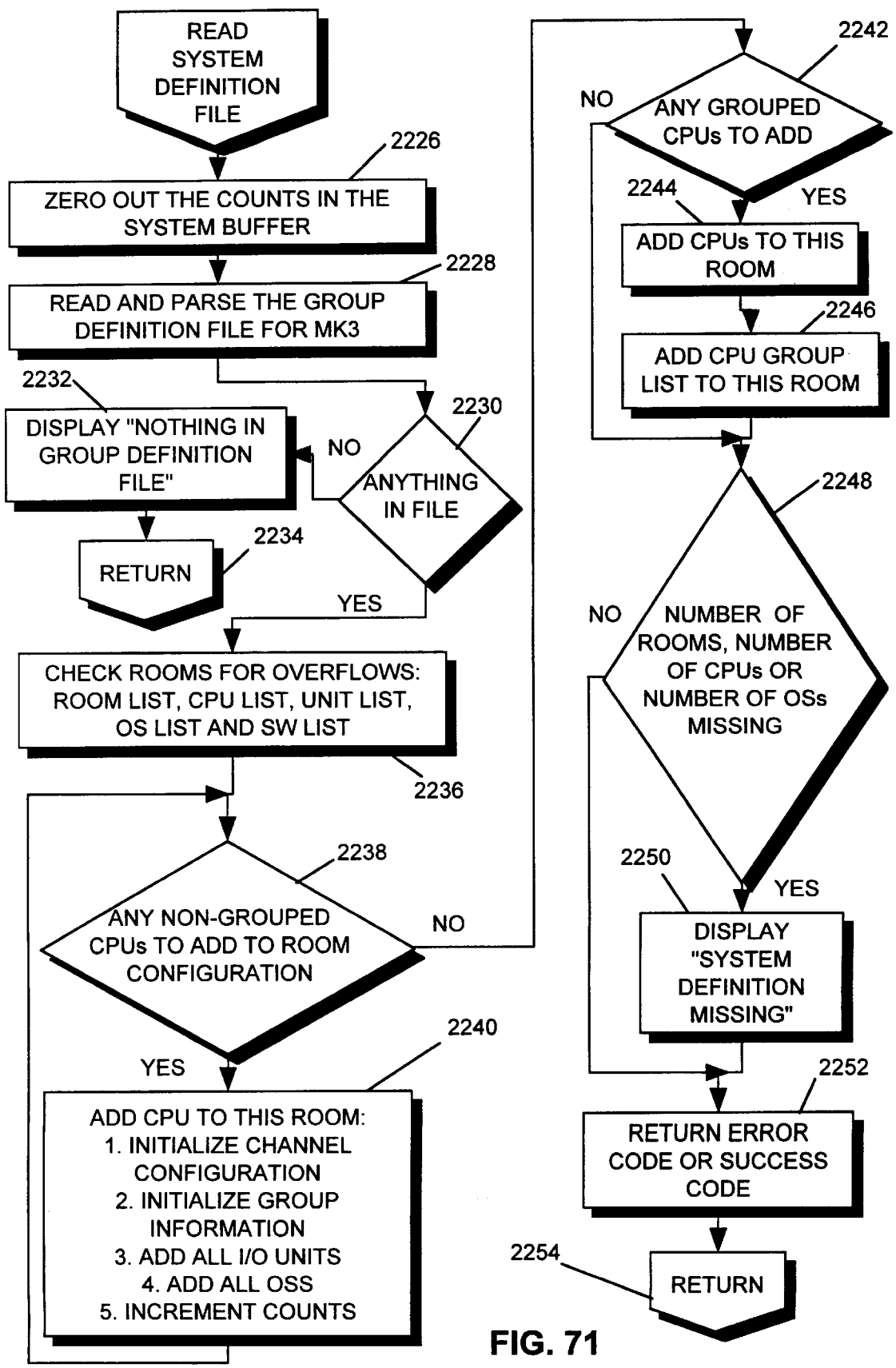

Referring now to FIG. 71, there is shown a method of reading the system definition file. First, the counts in the system buffer are zeroed-out 2226. The group definition file for MK3 is read 2228 and parsed 2228. If there is nothing in the file 2230 the message "Nothing In Group Definition File" is displayed 2232 and the process returns 2234 to the calling function. Alternatively, rooms are checked 2236 for overflows: room list, CPU list, unit list, operating software list and software list. If there are any non-grouped CPUs to add to the room configuration 2238, they are added at this time 2240. And, the process returns to 2238. Alternatively, if there are any grouped CPUs to add 2242, those CPUs are added 2244 to this room and the CPU group list is added 2246 to this room. Alternatively, and in any event, if the number of rooms, number of CPUs or number of operating systems is missing, 2248, then the message "system definition missing" is displayed 2250. Alternatively, and in any event an error code or success code is returned 2252 and the process returns to its calling function 2254.

Figure 72:
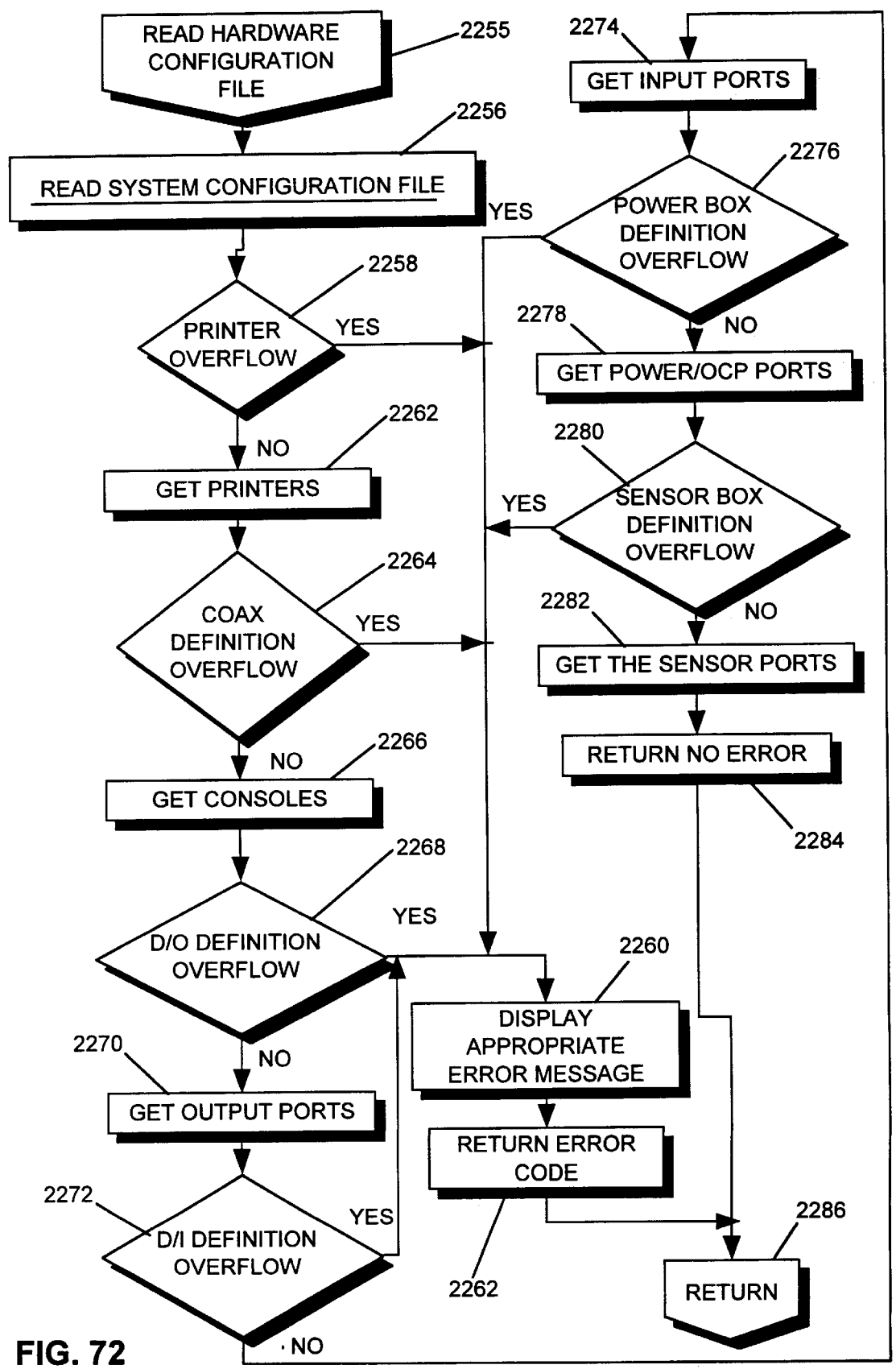

Referring now to FIG. 72, there is shown a method of reading the hardware configuration file. First, the system configuration file is read 2256. See FIG. 73. If there is a printer overflow 2258, the process continues at 2260. Alternatively, the printers are contained 2262. If there is a coax definition overflow 2264, the process continues at 2260. Alternatively, the consoles are obtained 2266. If there is a D/O definition overflow 2268, then the process continues at 2260. Alternatively, the output ports are obtained 2270. If the D/I definition has an overflow 2272, then the process continues at 2260. Alternatively, the input ports are obtained 2274. If there is a power box definition overflow 2276, then the process continues at 2260. Alternatively, the power/OCP ports are obtained 2278. If there is a sensor box definition overflow, the process continues after overflow at 2280. Alternatively, the sensor ports are obtained 2282. A "No Error" message is returned 2284 and the process returns to its calling function 2286. Referring now to 2260, an appropriate error message is displayed 2260 and an error code is returned 2262.

Figure 73:
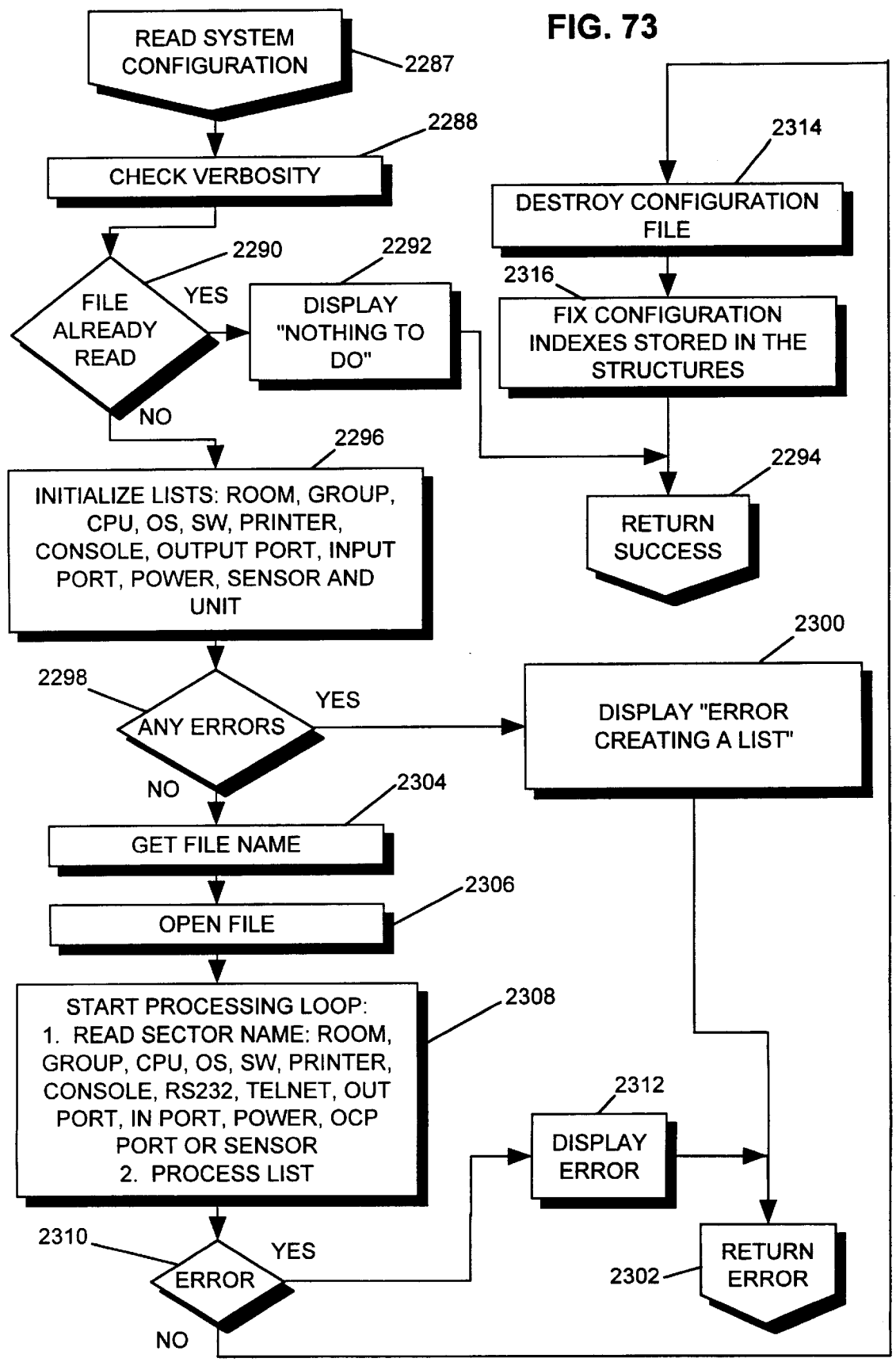

Referring now to FIG. 73, there is shown a method of reading the system configuration. First the verbosity is checked. If the file is already read 2290 then the message "nothing to do" is displayed 2292 and the process returns a success code 2294. Alternatively, the lists are initialized 2296 for room, group, CPU, O/S, SW, printer, console, output port, input port, power, sensor, and unit. If there were any errors 2298, the message "Error Creating a List" is displayed 2300 and an error code is returned 2302. Alternatively, a file name is obtained 2304. The file is opened 2306. The processing loop is begun 2308. f there were any errors in the processing loop 2310 an error message is displayed 2312 and the process returns the error 2302. Alternatively, the configuration file is destroyed 2314. The configuration indexes are stored 2316, the structures are fixed 2316, and the process returns a success code 2294 to the calling function.

Figure 74:
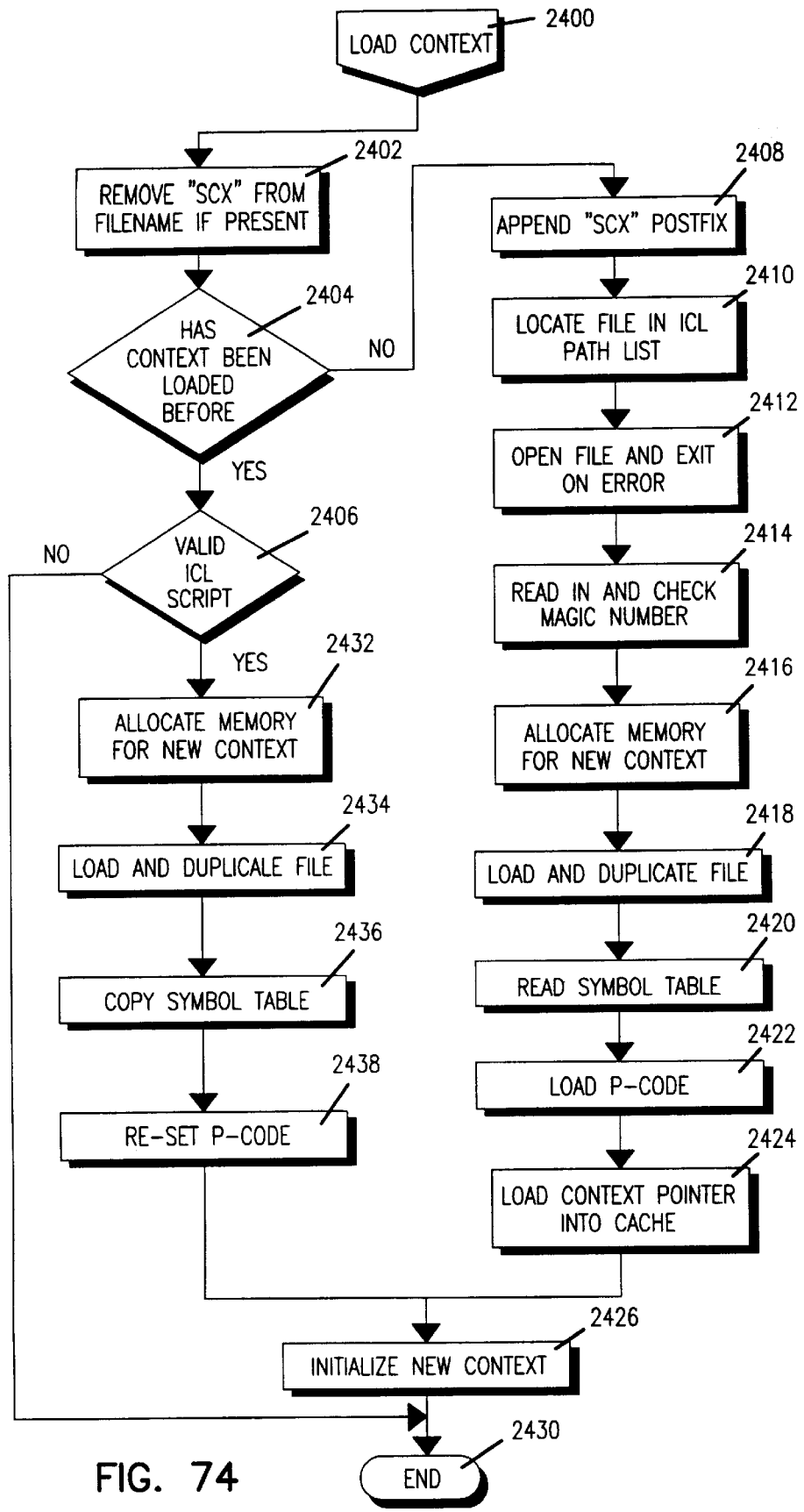

Referring now to FIG. 74, there is shown a method of loading a context. First, the ".SCX" is removed 2402 from the file name if present. If the context has been loaded before 2404 the process continues at 2406. Alternatively, a ".SCX" appendage is affixed 2408. The file is located 2410 in the ICL path. The file is opened 2412 and the process ends 2412 if there was an error opening. A magic number is read in 2414 and checked 2414. Memory is allocated 2416 for a new context. A file is loaded 2418 and duplicated 2418. The symbol table is read 2420. The P-code is loaded 2422. A context pointer is loaded 2424 into the cash. The new context is initialized 2426 and the process ends 2430. Referring now to 2406, if there is not a valid ICL script 2406, then the process ends 2430. Alternatively, memory is allocated 2432 for a new context. A file is loaded 2434 and duplicated 2434. The symbol table is copied 2436. The P-code is reset 2438. The new context is initialized 2426 and then the process ends 2430.

The present invention can be summarized in reference to FIGS. 1 and 2 which are block diagram of the preferred embodiment ICS 100.

In one embodiment of the present invention, an electronic control system 100 external to a computer system 140, 148, and 150 for controlling processes in the computer system is provided. A graphical user interface 136 which presents data as graphical information to a user on a display device 138. An input device 122 which receives data input by the user through a keyboard 124 or mouse 126. A processor 110 is operatively coupled to the graphical user interface 136, the input device 122, and the computer system, to control operations of the computer system based on user input provided through the input device 122 in response to processing rules displayed to the user by the graphical user interface 136. As a result of this configuration of components in the control system 100, automatic external and direct control of the computer system can be accomplished by only utilizing preexisting computer system signals received from the computer system and control signals sent to the computer system (i.e., no additional hardware or software needs to be added to the computer system being monitored).

The control system 100 preferably includes a receiving device 134 which receives the preexisting computer system generated signals which are output by a particular process in the computer system and a sending device 134 which sends the control signals to the computer system. In addition, the control system 100 includes a transformation device 118 operatively coupled to the receiving device 134 and the sending device 134 which transforms the received preexisting computer system generated signals into an incoming plurality of message signals in a common message signal format and which transforms an outgoing plurality of message signals into the control signals. A common data storage 114 is operatively coupled to the transformation device 118 and the processor 110 to store the incoming and the outgoing message signals. As a result, the processor 110 performs different operations on a particular message signal of the incoming plurality of message signals retrieved from the common data storage 114 based on the processing rules and stores a particular message signal of the outgoing plurality of message signals in the common data storage 114 based on the processing rules.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. An electronic control system external to a computer system for controlling processes in heterogenous computer systems, comprising:

(a) a graphical user interface which presents data as graphical information to a user on a display device;

(b) an input device which receives data input by the user; and (c) processing means, operatively coupled to the graphical user interface, the input device, and the computer system, for controlling operations of the heterogenous computer systems based on processing rules generated from user input provided through the input device in response to processing rules displayed to the user by the graphical user interface such that the computer systems can be automatically externally and directly controlled with the processing rules by only utilizing preexisting computer system signals received from the computer systems and control signals sent to the computer system.

2. The control system of claim 1 further comprising:

(d) a receiving device which receives the preexisting computer system generated signals which are output by a particular process in one of the computer systems; and (e) a sending device which sends the control signals to one of the computer systems.

3. The control system of claim 2 further comprising:

(f) a transformation device, operatively coupled to the receiving device and the sending device, which transforms the received preexisting computer system generated signals into an incoming plurality of message signals in a common message signal format and which transforms an outgoing plurality of message signals into the control signals; and (g) a common data storage, operatively coupled to the transformation device and the processing means, which stores the incoming and the outgoing plurality of message signals such that the processing means performs different operations on a particular message signal of the incoming plurality of message signals retrieved from the common data storage based on the processing rules and stores a particular message signal of the outgoing plurality of message signals in the common data storage based on the processing rules.

4. An electronic control method for externally controlling processes in heterogenous computer systems, comprising steps of:

(a) presenting electronic data as graphical information to a user on a display device;

(b) receiving electronic data input by the user;

(c) obtaining processing rules generated from user input provided through the input device in response to processing rules displayed to the user on the display device;

and (d) controlling operations of the heterogenous computer systems based on the processing rules with an electronic data processor such that the computer systems can be automatically externally and directly controlled with the processing rules by only utilizing preexisting computer system signals received from the computer systems and control signals sent to the computer systems.

5. The method of claim 4 further comprising steps of:

(e) receiving the preexisting computer system generated signals which are output by a particular process in one of the computer systems; and (f) sending the control signals to one of the computer systems.

6. The method of claim 5 further comprising steps of:

(g) transforming the received preexisting computer system generated signals into an incoming plurality of message signals in a common message signal format;

(h) transforming an outgoing plurality of message signals into the control signals; and (i) storing the incoming and the outgoing plurality of message signals in a common data storage such that the electronic data processor performs different operations on a particular message signal of the incoming plurality of message signals retrieved from the common data storage based on the processing rules and stores a particular message signal of the outgoing plurality of message signals in the common data storage based on the processing rules.

* * * * *

UNITED STATES PATENT AND TRADEMARK OFFICE
CERTIFICATE OF CORRECTION

PATENT NO. : 6,044,393
DATED      : MARCH 28, 2000
INVENTOR(S): DONALDSON ET AL.

It is certified that error appears in the above-identified patent and that said Letters Patent is hereby corrected as shown below:

Col. 13, line 45, Table 5: both occurrences of "CFU" should read --CPU--

Col. 20, line 39: "ar e" should read --are--

Col. 22, line 53, Table 23: "[DTB]" should read --[DT8]--

Col. 36, line 63: "I1348" should read --1348--

Col. 37, line 59: both occurrences of "8280" should be in bold print

Col. 38, line 5: "8280" should be in bold print

Col. 38, line 10: "8280" should be in bold print

Col. 38, line 18: "8280" should be in bold print

Col. 43, line 9: "ConFIG." should be --Config.--

Signed and Sealed this

Eighth Day of May, 2001

*Attest:*

NICHOLAS P. GODICI

*Attesting Officer*   *Acting Director of the United States Patent and Trademark Office*